(12) United States Patent
Park et al.

(10) Patent No.: US 12,132,175 B2
(45) Date of Patent: Oct. 29, 2024

(54) ELECTRODE ASSEMBLY, BATTERY, AND BATTERY PACK AND VEHICLE INCLUDING THE SAME

(71) Applicant: LG ENERGY SOLUTION, LTD., Seoul (KR)

(72) Inventors: Jong-Sik Park, Daejeon (KR); Jae-Won Lim, Daejeon (KR); Yu-Sung Choe, Daejeon (KR); Hak-Kyun Kim, Daejeon (KR); Je-Jun Lee, Daejeon (KR); Byoung-Gu Lee, Daejeon (KR); Duk-Hyun Ryu, Daejeon (KR); Kwan-Hee Lee, Daejeon (KR); Jae-Eun Lee, Daejeon (KR); Pil-Kyu Park, Daejeon (KR); Kwang-Su Hwangbo, Daejeon (KR); Do-Gyun Kim, Daejeon (KR); Geon-Woo Min, Daejeon (KR); Hae-Jin Lim, Daejeon (KR); Min-Ki Jo, Daejeon (KR); Su-Ji Choi, Daejeon (KR); Bo-Hyun Kang, Daejeon (KR); Jae-Woong Kim, Daejeon (KR); Ji-Min Jung, Daejeon (KR); Jin-Hak Kong, Daejeon (KR); Soon-O Lee, Daejeon (KR); Kyu-Hyun Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/086,485

(22) Filed: Dec. 21, 2022

(65) Prior Publication Data
US 2023/0121876 A1 Apr. 20, 2023

Related U.S. Application Data

(63) Continuation of application No. 17/665,896, filed on Feb. 7, 2022.

(30) Foreign Application Priority Data

Feb. 19, 2021 (KR) .......................... 10-2021-0022881
Feb. 19, 2021 (KR) .......................... 10-2021-0022891

(Continued)

(51) Int. Cl.
*H01M 50/536* (2021.01)
*H01M 4/64* (2006.01)
(Continued)

(52) U.S. Cl.
CPC ......... *H01M 10/0587* (2013.01); *H01M 4/64* (2013.01); *H01M 4/70* (2013.01);
(Continued)

(58) Field of Classification Search
CPC ...... H01M 10/0587; H01M 4/64; H01M 4/70; H01M 50/107; H01M 50/152;
(Continued)

(56) References Cited

U.S. PATENT DOCUMENTS

| 3,761,314 A | 9/1973 | Cailley |
| 5,576,113 A | 11/1996 | Hirofumi et al. |

(Continued)

FOREIGN PATENT DOCUMENTS

| CN | 1170782 A | 1/1998 |
| CN | 1407642 A | 4/2003 |

(Continued)

OTHER PUBLICATIONS

English translation of KR101743136B1; Secondary battery with decreased internal resistance and method of making the same (Year: 2017).*

(Continued)

*Primary Examiner* — Matthew T Martin
*Assistant Examiner* — Adam J Francis
(74) *Attorney, Agent, or Firm* — Birch, Stewart, Kolasch & Birch, LLP

(57) ABSTRACT

An electrode assembly includes a first electrode; a second electrode; and a separator, the first electrode, the second electrode, and the separator wound about an axis defining a core and an outer circumference of the electrode assembly. The first electrode has a pair of first sides and a pair of second sides, a first portion extending between the pair of first sides, and a second portion extending between the pair of first sides, the first portion being coated with an active material, and at least a part of the second portion includes an electrode tab. The second portion includes a first part adjacent to the core of the electrode assembly, a second part (Continued)

adjacent to the outer circumference of the electrode assembly, and a third part between the first part and the second part. The first or second part has a smaller height than the third part.

30 Claims, 42 Drawing Sheets

(30) Foreign Application Priority Data

| Feb. 19, 2021 | (KR) | 10-2021-0022894 |
|---|---|---|
| Feb. 19, 2021 | (KR) | 10-2021-0022897 |
| Feb. 23, 2021 | (KR) | 10-2021-0024424 |
| Mar. 8, 2021 | (KR) | 10-2021-0030291 |
| Mar. 8, 2021 | (KR) | 10-2021-0030300 |
| Apr. 9, 2021 | (KR) | 10-2021-0046798 |
| May 4, 2021 | (KR) | 10-2021-0058183 |
| Jun. 14, 2021 | (KR) | 10-2021-0077046 |
| Jun. 28, 2021 | (KR) | 10-2021-0084326 |
| Oct. 1, 2021 | (KR) | 10-2021-0131205 |
| Oct. 1, 2021 | (KR) | 10-2021-0131207 |
| Oct. 1, 2021 | (KR) | 10-2021-0131208 |
| Oct. 1, 2021 | (KR) | 10-2021-0131215 |
| Oct. 1, 2021 | (KR) | 10-2021-0131225 |
| Oct. 14, 2021 | (KR) | 10-2021-0137001 |
| Oct. 15, 2021 | (KR) | 10-2021-0137856 |
| Oct. 22, 2021 | (KR) | 10-2021-0142196 |
| Nov. 9, 2021 | (KR) | 10-2021-0153472 |
| Nov. 19, 2021 | (KR) | 10-2021-0160823 |
| Nov. 24, 2021 | (KR) | 10-2021-0163809 |
| Nov. 26, 2021 | (KR) | 10-2021-0165866 |
| Dec. 3, 2021 | (KR) | 10-2021-0172446 |
| Dec. 10, 2021 | (KR) | 10-2021-0177091 |
| Dec. 31, 2021 | (KR) | 10-2021-0194572 |
| Dec. 31, 2021 | (KR) | 10-2021-0194593 |
| Dec. 31, 2021 | (KR) | 10-2021-0194610 |
| Dec. 31, 2021 | (KR) | 10-2021-0194611 |
| Dec. 31, 2021 | (KR) | 10-2021-0194612 |
| Jan. 5, 2022 | (KR) | 10-2022-0001802 |

(51) Int. Cl.
| | |
|---|---|
| *H01M 4/70* | (2006.01) |
| *H01M 10/0587* | (2010.01) |
| *H01M 50/107* | (2021.01) |
| *H01M 50/152* | (2021.01) |
| *H01M 50/179* | (2021.01) |
| *H01M 50/183* | (2021.01) |
| *H01M 50/213* | (2021.01) |
| *H01M 50/242* | (2021.01) |
| *H01M 50/507* | (2021.01) |
| *H01M 50/509* | (2021.01) |
| *H01M 50/531* | (2021.01) |
| *H01M 50/533* | (2021.01) |
| *H01M 50/559* | (2021.01) |
| *H01M 50/567* | (2021.01) |

(52) U.S. Cl.
CPC ....... *H01M 50/107* (2021.01); *H01M 50/152* (2021.01); *H01M 50/179* (2021.01); *H01M 50/183* (2021.01); *H01M 50/213* (2021.01); *H01M 50/242* (2021.01); *H01M 50/507* (2021.01); *H01M 50/509* (2021.01); *H01M 50/531* (2021.01); *H01M 50/533* (2021.01); *H01M 50/536* (2021.01); *H01M 50/559* (2021.01); *H01M 50/567* (2021.01); *H01M 2220/20* (2013.01)

(58) Field of Classification Search
CPC ............. H01M 50/179; H01M 50/183; H01M 50/213; H01M 50/242; H01M 50/507; H01M 50/509; H01M 50/531; H01M 50/533; H01M 50/536; H01M 50/559; H01M 50/567; H01M 2220/20
See application file for complete search history.

(56) References Cited

U.S. PATENT DOCUMENTS

| 5,665,483 | A | 9/1997 | Saito et al. |
|---|---|---|---|
| 5,849,431 | A | 12/1998 | Kita et al. |
| 6,399,237 | B1 | 6/2002 | Souliac et al. |
| 6,451,473 | B1 | 9/2002 | Saito et al. |
| 6,653,017 | B2 | 11/2003 | Satoh et al. |
| 6,677,082 | B2 | 1/2004 | Thackeray et al. |
| 6,680,143 | B2 | 1/2004 | Thackeray et al. |
| 7,273,678 | B2 | 9/2007 | Akita et al. |
| 7,364,817 | B2 | 4/2008 | Lee |
| 8,007,549 | B2 | 8/2011 | Ligeois et al. |
| 9,496,539 | B2 | 11/2016 | Tyler et al. |
| 9,496,557 | B2 | 11/2016 | Fuhr et al. |
| 10,840,555 | B2 | 11/2020 | Iwama et al. |
| 2001/0004505 | A1 | 6/2001 | Kim et al. |
| 2001/0051297 | A1 | 12/2001 | Nemoto et al. |
| 2001/0053477 | A1 | 12/2001 | Kitoh et al. |
| 2002/0061435 | A1 | 5/2002 | Hisai |
| 2002/0110729 | A1 | 8/2002 | Hozumi et al. |
| 2003/0035993 | A1 | 2/2003 | Enomoto et al. |
| 2003/0049536 | A1 | 3/2003 | Wiepen |
| 2003/0064285 | A1 | 4/2003 | Kawamura et al. |
| 2004/0023108 | A1 | 2/2004 | Nakanishi et al. |
| 2005/0048365 | A1 | 3/2005 | Miyahisa et al. |
| 2005/0058184 | A1 | 3/2005 | Paul et al. |
| 2005/0118499 | A1 | 6/2005 | Kim |
| 2005/0158620 | A1* | 7/2005 | Kim ..................... H01M 50/533 429/185 |
| 2005/0181272 | A1 | 8/2005 | Kim |
| 2005/0214640 | A1 | 9/2005 | Kim |
| 2005/0238951 | A1 | 10/2005 | Yoo et al. |
| 2005/0260487 | A1 | 11/2005 | Kim et al. |
| 2005/0260489 | A1 | 11/2005 | Kim |
| 2005/0287428 | A1 | 12/2005 | Cheon et al. |
| 2005/0287432 | A1* | 12/2005 | Cheon ............... H01M 10/0431 429/211 |
| 2006/0024574 | A1 | 2/2006 | Yim et al. |
| 2006/0063063 | A1 | 3/2006 | Mori et al. |
| 2006/0204841 | A1* | 9/2006 | Satoh .................. H01M 50/533 29/623.2 |
| 2008/0026293 | A1 | 1/2008 | Marple et al. |
| 2008/0038629 | A1 | 2/2008 | Okabe et al. |
| 2008/0057394 | A1 | 3/2008 | Rigobert et al. |
| 2008/0145756 | A1 | 6/2008 | Taniguichi |
| 2008/0182159 | A1 | 7/2008 | Mitani et al. |
| 2009/0104520 | A1 | 4/2009 | Marple |
| 2009/0208830 | A1 | 8/2009 | Okabe et al. |
| 2009/0208836 | A1 | 8/2009 | Fuhr et al. |
| 2009/0239133 | A1* | 9/2009 | Kosugi ............... H01M 50/538 429/94 |
| 2009/0280406 | A1* | 11/2009 | Kozuki ............ H01M 10/0431 429/209 |
| 2009/0311583 | A1 | 12/2009 | Wu |
| 2010/0081052 | A1* | 4/2010 | Morishima ......... H01M 50/533 429/231.95 |
| 2010/0129716 | A1 | 5/2010 | Kato et al. |
| 2010/0151317 | A1 | 6/2010 | Kim et al. |
| 2010/0216001 | A1 | 8/2010 | Byun et al. |
| 2010/0266893 | A1 | 10/2010 | Martin et al. |
| 2010/0316897 | A1 | 12/2010 | Kozuki et al. |
| 2010/0330414 | A1 | 12/2010 | Mori |
| 2011/0027644 | A1 | 2/2011 | Kiyama |

(56) References Cited

U.S. PATENT DOCUMENTS

| | | | |
|---|---|---|---|
| 2011/0067227 A1* | 3/2011 | Sohn | H01M 10/0431 29/623.1 |
| 2011/0171508 A1 | 7/2011 | Kim | |
| 2011/0256433 A1 | 10/2011 | Fuhr et al. | |
| 2012/0058375 A1 | 3/2012 | Tanaka et al. | |
| 2012/0094169 A1 | 4/2012 | Kim et al. | |
| 2012/0231641 A1 | 9/2012 | Sugai et al. | |
| 2012/0297611 A1* | 11/2012 | Ma | H01M 50/538 29/623.1 |
| 2013/0136977 A1 | 5/2013 | Masuda | |
| 2013/0183556 A1 | 7/2013 | Kim | |
| 2013/0273401 A1 | 10/2013 | Lee et al. | |
| 2013/0323574 A1 | 12/2013 | Tsunaki et al. | |
| 2014/0079971 A1 | 3/2014 | Huang | |
| 2014/0113185 A1* | 4/2014 | Mori | H01M 50/562 29/25.03 |
| 2014/0162097 A1 | 6/2014 | Fuhr et al. | |
| 2014/0205868 A1 | 7/2014 | Phillips | |
| 2014/0212695 A1 | 7/2014 | Lane et al. | |
| 2014/0234676 A1 | 8/2014 | Tyler et al. | |
| 2014/0255748 A1 | 9/2014 | Jan et al. | |
| 2015/0104694 A1 | 4/2015 | Okuda et al. | |
| 2015/0140379 A1 | 5/2015 | Yau | |
| 2015/0155532 A1 | 6/2015 | Harayama et al. | |
| 2016/0043373 A1 | 2/2016 | Arishima et al. | |
| 2016/0098451 A1 | 4/2016 | Murai et al. | |
| 2016/0141589 A1 | 5/2016 | Kang et al. | |
| 2016/0155998 A1 | 6/2016 | Wakimoto et al. | |
| 2016/0181577 A1 | 6/2016 | Kajiwara et al. | |
| 2016/0226056 A1 | 8/2016 | Masson et al. | |
| 2016/0329542 A1 | 11/2016 | Tyler et al. | |
| 2017/0018750 A1 | 1/2017 | Winter | |
| 2017/0047575 A1* | 2/2017 | Tsuji | H01M 4/04 |
| 2017/0062789 A1 | 3/2017 | Sim et al. | |
| 2017/0149042 A1 | 5/2017 | Koo et al. | |
| 2017/0187068 A1 | 6/2017 | Morisawa et al. | |
| 2017/0200935 A1 | 7/2017 | Hong et al. | |
| 2017/0256769 A1 | 9/2017 | Wynn et al. | |
| 2017/0317326 A1* | 11/2017 | Fujikawa | H01M 50/169 |
| 2017/0372848 A1 | 12/2017 | Yoon et al. | |
| 2018/0123143 A1 | 5/2018 | Sato et al. | |
| 2018/0130995 A1 | 5/2018 | Nemoto et al. | |
| 2018/0182560 A1 | 6/2018 | Khakhalev | |
| 2018/0205044 A1 | 7/2018 | Urushihara | |
| 2018/0219208 A1 | 8/2018 | Dewulf et al. | |
| 2018/0247773 A1 | 8/2018 | Lee | |
| 2018/0375162 A1 | 12/2018 | Wakimoto et al. | |
| 2019/0006639 A1 | 1/2019 | Ito | |
| 2019/0148683 A1 | 5/2019 | Kwon et al. | |
| 2019/0221791 A1 | 7/2019 | Wakimoto | |
| 2019/0296283 A1 | 9/2019 | Chen et al. | |
| 2019/0379019 A1 | 12/2019 | Fukuda et al. | |
| 2019/0379028 A1 | 12/2019 | Lim et al. | |
| 2019/0386272 A1 | 12/2019 | Shin et al. | |
| 2020/0044289 A1 | 2/2020 | Pasma et al. | |
| 2020/0083492 A1 | 3/2020 | Koshiol et al. | |
| 2020/0119328 A1 | 4/2020 | Zheng et al. | |
| 2020/0127249 A1 | 4/2020 | Yoon et al. | |
| 2020/0144581 A1 | 5/2020 | Thunot | |
| 2020/0144676 A1 | 5/2020 | Tsuruta et al. | |
| 2020/0203773 A1 | 6/2020 | Fujita et al. | |
| 2020/0212374 A1 | 7/2020 | Gaugler | |
| 2020/0235369 A1 | 7/2020 | Jeong et al. | |
| 2020/0295341 A1* | 9/2020 | Kim | H01M 50/538 |
| 2020/0388856 A1 | 12/2020 | Hayashi | |
| 2021/0039195 A1 | 2/2021 | Jost et al. | |
| 2021/0075051 A1 | 3/2021 | Zhou | |
| 2021/0167467 A1 | 6/2021 | Yang et al. | |
| 2021/0210792 A1 | 7/2021 | Mukai et al. | |
| 2021/0257652 A1 | 8/2021 | Ko et al. | |
| 2021/0273298 A1 | 9/2021 | Babinot et al. | |
| 2021/0278479 A1 | 9/2021 | Park et al. | |
| 2021/0280835 A1 | 9/2021 | Peng et al. | |
| 2021/0344033 A1 | 11/2021 | Park et al. | |
| 2021/0376333 A1 | 12/2021 | Shiozaki et al. | |
| 2022/0037712 A1 | 2/2022 | Kritzer et al. | |
| 2022/0069335 A1 | 3/2022 | Kim | |
| 2022/0123373 A1 | 4/2022 | Takahashi | |
| 2022/0123444 A1 | 4/2022 | Liu et al. | |
| 2023/0123195 A1 | 4/2023 | Fang et al. | |

FOREIGN PATENT DOCUMENTS

| | | |
|---|---|---|
| CN | 1426609 A | 6/2003 |
| CN | 1444303 A | 9/2003 |
| CN | 1495943 A | 5/2004 |
| CN | 2681364 Y | 2/2005 |
| CN | 1700495 A | 11/2005 |
| CN | 1832228 A | 9/2006 |
| CN | 1309105 C | 4/2007 |
| CN | 101010818 A | 7/2007 |
| CN | 100349321 C | 11/2007 |
| CN | 101083317 A | 12/2007 |
| CN | 200990393 Y | 12/2007 |
| CN | 201066701 Y | 5/2008 |
| CN | 201117731 Y | 9/2008 |
| CN | 101286572 A | 10/2008 |
| CN | 100468827 C | 3/2009 |
| CN | 101404338 A | 4/2009 |
| CN | 101501884 A | 8/2009 |
| CN | 201466087 U | 5/2010 |
| CN | 201638890 U | 11/2010 |
| CN | 201725845 U | 1/2011 |
| CN | 201781028 U | 3/2011 |
| CN | 202423400 U | 9/2012 |
| CN | 103280543 A | 9/2013 |
| CN | 103427063 A | 12/2013 |
| CN | 203553261 U | 4/2014 |
| CN | 103797611 A | 5/2014 |
| CN | 203967145 U | 11/2014 |
| CN | 104396044 A | 3/2015 |
| CN | 204230370 U | 3/2015 |
| CN | 204596910 U | 8/2015 |
| CN | 204885267 U | 12/2015 |
| CN | 105449291 A | 3/2016 |
| CN | 105655623 A | 6/2016 |
| CN | 106159350 A | 11/2016 |
| CN | 205863251 U | 1/2017 |
| CN | 106463654 A | 2/2017 |
| CN | 107112597 A | 8/2017 |
| CN | 206461019 U | 9/2017 |
| CN | 206461044 U | 9/2017 |
| CN | 206471426 U | 9/2017 |
| CN | 104488113 B | 10/2017 |
| CN | 107275524 A | 10/2017 |
| CN | 206619636 U | 11/2017 |
| CN | 107431215 A | 12/2017 |
| CN | 107482156 A | 12/2017 |
| CN | 107851769 A | 3/2018 |
| CN | 207217654 U | 4/2018 |
| CN | 108063192 A | 5/2018 |
| CN | 207381468 U | 5/2018 |
| CN | 108496269 A | 9/2018 |
| CN | 108695451 A | 10/2018 |
| CN | 208400966 U | 1/2019 |
| CN | 110048065 A | 7/2019 |
| CN | 209328958 U | 8/2019 |
| CN | 110459705 A | 11/2019 |
| CN | 110476273 A | 11/2019 |
| CN | 110581235 A | 12/2019 |
| CN | 209912959 U | 1/2020 |
| CN | 110870099 A | 3/2020 |
| CN | 111033807 A | 4/2020 |
| CN | 111446386 A | 7/2020 |
| CN | 211208547 U | 8/2020 |
| CN | 111668534 A | 9/2020 |
| CN | 111952525 A | 11/2020 |
| CN | 211879534 U | 11/2020 |
| CN | 212182379 U | 12/2020 |
| CN | 112310574 A | 2/2021 |
| CN | 112335075 A | 2/2021 |
| CN | 212907981 U | 4/2021 |
| CN | 112909445 A | 6/2021 |
| CN | 113193165 A | 7/2021 |

(56) References Cited

FOREIGN PATENT DOCUMENTS

| | | |
|---|---|---|
| CN | 214378637 U | 10/2021 |
| CN | 215342666 U | 12/2021 |
| CN | 114865242 A | 8/2022 |
| EP | 2677592 A1 | 12/2013 |
| EP | 2 728 647 A1 | 5/2014 |
| EP | 2 876 338 A1 | 5/2015 |
| EP | 2160777 B1 | 3/2019 |
| EP | 4087034 A1 | 11/2022 |
| EP | 4336649 A1 | 3/2024 |
| GB | 1191105 A | 5/1970 |
| GB | 2564670 A | 1/2019 |
| JP | 62-7157 U | 1/1987 |
| JP | 6-124696 A | 5/1994 |
| JP | 7-201309 A | 8/1995 |
| JP | 8-22818 A | 1/1996 |
| JP | 8-102313 A | 4/1996 |
| JP | 8-180849 A | 7/1996 |
| JP | 9-92338 A | 4/1997 |
| JP | 10-83833 A | 3/1998 |
| JP | 10-106532 A | 4/1998 |
| JP | 10-214609 A | 8/1998 |
| JP | 10-228908 A | 8/1998 |
| JP | 11-67279 A | 3/1999 |
| JP | 11-176447 A | 7/1999 |
| JP | 11-297301 A | 10/1999 |
| JP | 2955135 B2 | 10/1999 |
| JP | 11-329398 A | 11/1999 |
| JP | 2000-77054 A | 3/2000 |
| JP | 2000-243433 A | 9/2000 |
| JP | 2000-260417 A | 9/2000 |
| JP | 2001-28274 A | 1/2001 |
| JP | 2001-43844 A | 2/2001 |
| JP | 2001-52756 A | 2/2001 |
| JP | 2001-93579 A | 4/2001 |
| JP | 2001-48238 A | 6/2001 |
| JP | 2001-256954 A | 9/2001 |
| JP | 3252846 B2 | 2/2002 |
| JP | 2002-157991 A | 5/2002 |
| JP | 2002-289170 A | 10/2002 |
| JP | 2003-115285 A | 4/2003 |
| JP | 2004-14173 A | 1/2004 |
| JP | 2004-95487 A | 3/2004 |
| JP | 2004-253253 A | 9/2004 |
| JP | 2004-319311 A | 11/2004 |
| JP | 3632586 B2 | 3/2005 |
| JP | 2005-100927 A | 4/2005 |
| JP | 2005-129433 A | 5/2005 |
| JP | 2005-166664 A | 6/2005 |
| JP | 2005-276840 A | 10/2005 |
| JP | 3718872 B2 | 11/2005 |
| JP | 3751782 B2 | 3/2006 |
| JP | 2006-120606 A | 5/2006 |
| JP | 2006-278016 A | 10/2006 |
| JP | 3906519 B2 | 1/2007 |
| JP | 2007-234486 A | 9/2007 |
| JP | 2008-66302 A | 3/2008 |
| JP | 2008-123848 A | 5/2008 |
| JP | 2008-243811 A | 10/2008 |
| JP | 2009-104925 A | 5/2009 |
| JP | 2009-110885 A | 5/2009 |
| JP | 2009-176449 A | 8/2009 |
| JP | 4346637 B2 | 10/2009 |
| JP | 2009-259452 A | 11/2009 |
| JP | 4356209 B2 | 11/2009 |
| JP | 2009-289672 A | 12/2009 |
| JP | 4401634 B2 | 1/2010 |
| JP | 2010-33940 A | 2/2010 |
| JP | 4430587 B2 | 3/2010 |
| JP | 2010-529624 A | 8/2010 |
| JP | 2011-113845 A | 6/2011 |
| JP | 2011-159582 A | 8/2011 |
| JP | 2012-74359 A | 4/2012 |
| JP | 2012-510143 A | 4/2012 |
| JP | 2012-160658 A | 8/2012 |
| JP | 5019557 B2 | 9/2012 |
| JP | 5030379 B2 | 9/2012 |
| JP | 5051410 B2 | 10/2012 |
| JP | 5206242 B2 | 6/2013 |
| JP | 2013-246996 A | 12/2013 |
| JP | 2012-190739 A | 10/2014 |
| JP | 2014-222683 A | 11/2014 |
| JP | 5651536 B2 | 1/2015 |
| JP | 2015-106613 A | 6/2015 |
| JP | 2015-222685 A | 12/2015 |
| JP | 5877724 B2 | 3/2016 |
| JP | 2016-100323 A | 5/2016 |
| JP | 5935878 B2 | 6/2016 |
| JP | 2016-225014 A | 12/2016 |
| JP | 2017-143004 A | 8/2017 |
| JP | 2018-507544 A | 3/2018 |
| JP | 2018-092776 A | 6/2018 |
| JP | 2018-163765 A | 10/2018 |
| JP | 6406836 B2 | 10/2018 |
| JP | 2019-46639 A | 3/2019 |
| JP | WO2019/194182 A1 | 10/2019 |
| JP | 2020-71898 A | 5/2020 |
| JP | 6735445 B2 | 8/2020 |
| JP | 2020-527841 A | 9/2020 |
| JP | 2020-202038 A | 12/2020 |
| KR | 2001-0017098 A | 3/2001 |
| KR | 10-2001-0038811 A | 5/2001 |
| KR | 2001-0056363 A | 7/2001 |
| KR | 10-0490526 B1 | 8/2005 |
| KR | 10-2005-0110460 A | 11/2005 |
| KR | 10-2005-0121904 A | 12/2005 |
| KR | 10-2005-0121914 A | 12/2005 |
| KR | 10-0551885 B1 | 2/2006 |
| KR | 10-2006-0022128 A | 3/2006 |
| KR | 10-2006-0022358 A | 3/2006 |
| KR | 10-0599710 B1 | 7/2006 |
| KR | 10-0612236 B1 | 8/2006 |
| KR | 10-2007-0033762 A | 3/2007 |
| KR | 10-2008-0047165 A | 5/2008 |
| KR | 10-2010-0068080 A | 6/2010 |
| KR | 10-2010-0089092 A | 8/2010 |
| KR | 10-2010-0096100 A | 9/2010 |
| KR | 10-2013-0084086 A | 7/2013 |
| KR | 10-1320581 B1 | 10/2013 |
| KR | 10-1446151 B1 | 10/2014 |
| KR | 10-2016-0043725 A | 4/2016 |
| KR | 10-2016-0092748 A | 8/2016 |
| KR | 10-1679413 B1 | 11/2016 |
| KR | 10-2017-0025074 A | 3/2017 |
| KR | 10-2017-0033543 A | 3/2017 |
| KR | 101743136 B1 * | 6/2017 | ........ H01M 10/0431 |
| KR | 10-1807353 B1 | 12/2017 |
| KR | 10-2017-0026910 A | 3/2018 |
| KR | 10-1839158 B1 | 3/2018 |
| KR | 10-2018-0106367 A | 10/2018 |
| KR | 10-2018-0116004 A | 10/2018 |
| KR | 10-2018-0116156 A | 10/2018 |
| KR | 20180116156 A * | 10/2018 |
| KR | 10-2018-0129115 A | 12/2018 |
| KR | 10-2019-0030016 A | 3/2019 |
| KR | 10-2019-0040699 A | 4/2019 |
| KR | 10-2019-0078094 A | 7/2019 |
| KR | 10-2042999 B1 | 11/2019 |
| KR | 10-2020-0007561 A | 1/2020 |
| KR | 10-2020-0020173 A | 2/2020 |
| KR | 10-2020-0037599 A | 4/2020 |
| KR | 10-2020-0039214 A | 4/2020 |
| KR | 10-2020-0041625 A | 4/2020 |
| KR | 10-2021-0006203 A | 1/2021 |
| TW | I679311 B | 12/2019 |
| WO | 01/59856 A1 | 8/2001 |
| WO | 2021/020237 A1 | 11/2004 |
| WO | 3588264 B2 | 11/2004 |
| WO | 2006/035980 A1 | 4/2006 |
| WO | WO 2006/085437 A1 | 8/2006 |
| WO | WO 2010/146154 A2 | 12/2010 |
| WO | WO 2012/090599 A1 | 7/2012 |
| WO | WO 2013/024774 A1 | 2/2013 |
| WO | 2015/025388 A1 | 2/2015 |
| WO | WO 2018/117457 A1 | 6/2018 |

(56) References Cited

FOREIGN PATENT DOCUMENTS

| WO | 2020/060069 A1 | 3/2020 |
|---|---|---|
| WO | WO 2020/149350 A1 | 7/2020 |
| WO | 2020/171426 A1 | 8/2020 |
| WO | WO 2020/159071 A1 | 8/2020 |
| WO | WO 2021/020119 A1 | 2/2021 |
| WO | WO 2022/163482 A1 | 8/2022 |

OTHER PUBLICATIONS

European Search Report mailed in EP 22 15 2207 dated Jul. 22, 2022 (9 pages).
European Search Report mailed in EP 22152223 dated Jul. 29, 2022 (10 pages).
European Search Report mailed in EP 22152237 dated Aug. 2, 2022 (11 pages).
European Search Report mailed in EP 22152245 dated Jul. 28, 2022 (11 pages).
European Search Report mailed in EP 22152250 dated Aug. 5, 2022 (12 pages).
U.S. Office Action for U.S. Appl. No. 17/592,597, dated Jun. 21, 2023.
U.S. Office Action for U.S. Appl. No. 18/086,410, dated Jul. 24, 2023.
"Laser Welding vs. Arc (Tig) Welding of Medical Instruments," ACCUMET, Oct. 22, 2014, URL: <https://www.accumet.com/updates/consider_laser_welding_instead/>.
Ma et al., "Electro-Thermal Modeling of a Lithium-ion Battery System," SAE International Journal of Engines, vol. 3, No. 2, Oct. 25, 2010, p. 306 (abstract only).
U.S. Office Action for U.S. Appl. No. 17/579,380, dated Jul. 20, 2023.
U.S. Office Action for U.S. Appl. No. 18/132,085, dated Jun. 14, 2023.
U.S. Office Action for U.S. Appl. No. 18/132,166, dated Oct. 2, 2023.
U.S. Office Action for U.S. Appl. No. 17/592,594, dated Nov. 24, 2023.
U.S. Office Action for U.S. Appl. No. 18/132,140, dated Nov. 28, 2023.
Nigel, "Tesla 4680 Cell," Battery Design, Nov. 18, 2022, URL: <https://www.batterydesign.net/tesla-4680-cell/>.
U.S. Notice of Allowance for U.S. Appl. No. 18/131,751, dated Jan. 16, 2024.
European Communication pursuant to Rule 114(2) EPC for European Application No. 22742840.6, dated Feb. 5, 2024.
ASM Aerospace Specification Metals Inc., "Aluminum 5052-H19 Foil", 2001, https://asm.matweb.com/search/SpecificMaterial.asp?bassnum=ma5052h 19, 2 pages.
Iowa State University, Center for Nondestructive Evaluation, NDE-Ed.org, Physics of Nondestructive Evaluation>Electricity, 2021, https://www.nde-ed.org/Physics/Electricity/voltage.xhtml, 14 pages.
Third Party Observation dated Feb. 13, 2024 for European Application No. 22742834.9.
U.S. Notice of Allowance for U.S. Appl. No. 17/579,380, dated Feb. 14, 2024.
U.S. Office Action for U.S. Appl. No. 17/665,896, dated Feb. 12, 2024.
Youtube, "Tesla Battery Day", Sep. 22, 2020, https://www.youtube.com/watch ?v=16T9xleZTds, 2 pages.
Automotive & Accessories Magazine, "The core topic of Tesla's "Battery Day": reducing battery manufacturing costs," Sep. 23, 2020, 6 pages.
Third Party Observation dated Feb. 26, 2024 for European Application No. 22152256.8.
Third Party Observation dated Feb. 26, 2024 for European Application No. 22152262.6.
Japanese Publication No. 2002-289170-A dated Oct. 4, 2002.
Translation of WO 2021/020119-A1 dated Feb. 4, 2021.
Third Party Observation dated Apr. 9, 2024 for European Application No. 227428331.
Third Party Observation dated Apr. 17, 2024 for European Application No. 22742840.6.
Third Party Observation dated Apr. 18, 2024 for European Application No. 23214922.9.
Third Party Observation dated Apr. 19, 2024 for European Application No. 22742838.0.
Third Party Observation dated Apr. 25, 2024 for European Application No. 22742834.9.
Third Party Observation dated Apr. 4, 2024 for U.S. Appl. No. 17/592,576.
Third Party Observation dated Mar. 22, 2024 for U.S. Appl. No. 17/592,672.
European Communication pursuant to Rule 114(2) EPC dated Apr. 16, 2024 for European Application No. 22756576.9.
European Communication pursuant to Rule 114(2) EPC dated Apr. 16, 2024 for European Application No. 22895785.8.
European Communication pursuant to Rule 114(2) EPC dated Apr. 30, 2024 for European Application No. 22856151.0.
European Communication pursuant to Rule 114(2) EPC dated Jun. 6, 2024 for European Application No. 22756569.4.
European Communication pursuant to Rule 114(2) EPC dated May 27, 2024 for European Application No. 22756569.4.
European Communication pursuant to Rule 114(2) EPC dated May 3, 2024 for European Application No. 22756574.4.
European Communication pursuant to Rule 114(2) EPC dated May 3, 2024 for European Application No. 22881171.7.
European Communication pursuant to Rule 114(2) EPC dated May 8, 2024 for European Application No. 22883724.1.
Partial Supplementary European Search Report dated Jul. 15, 2024 for European Application No. 2274284.6.
Third Party Observation dated Jul. 22, 2024 for European Application No. 22881172.5.
U.S. Office Action for U.S. Appl. No. 18/086,402 dated Jun. 12, 2024.

\* cited by examiner

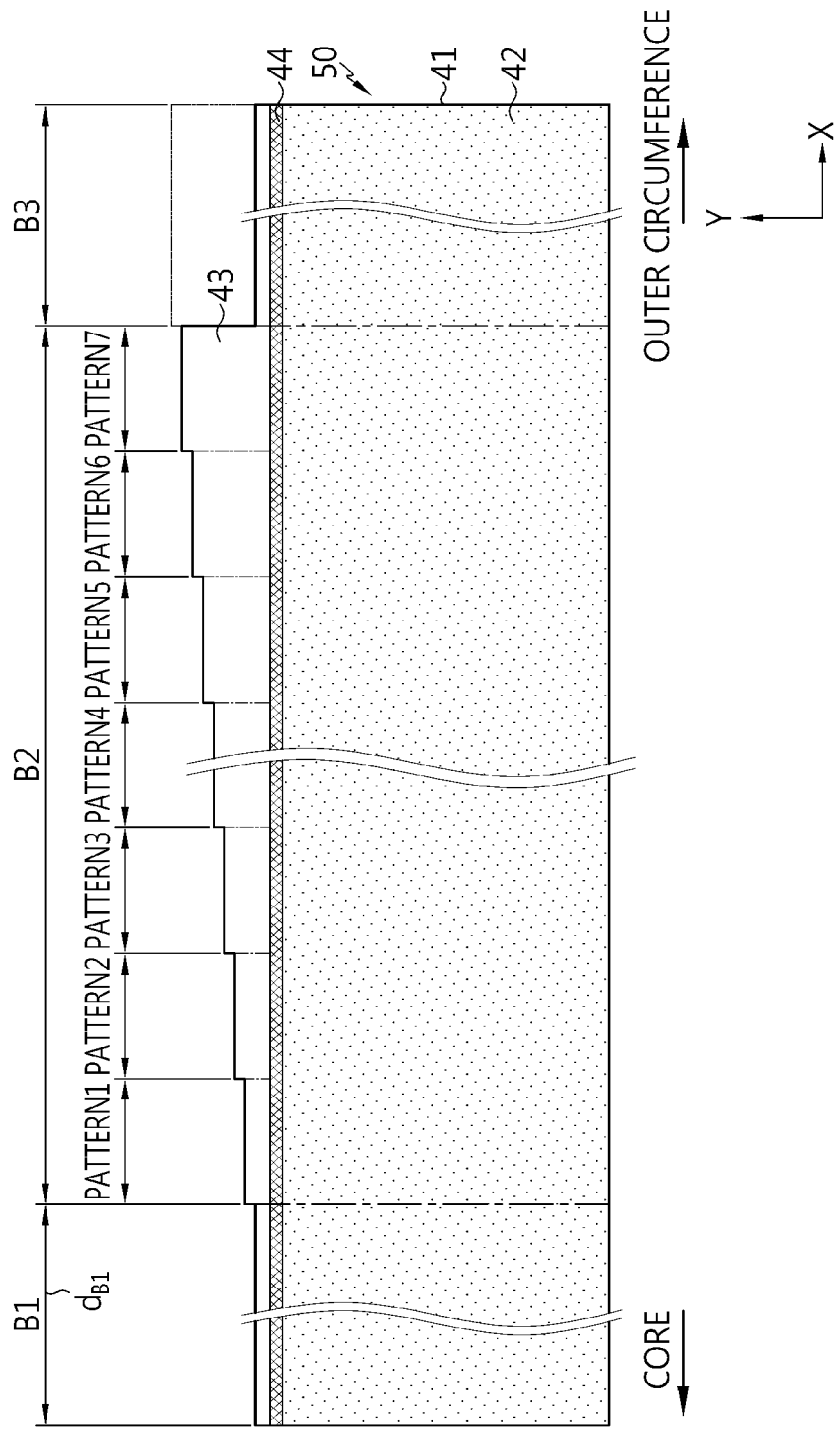

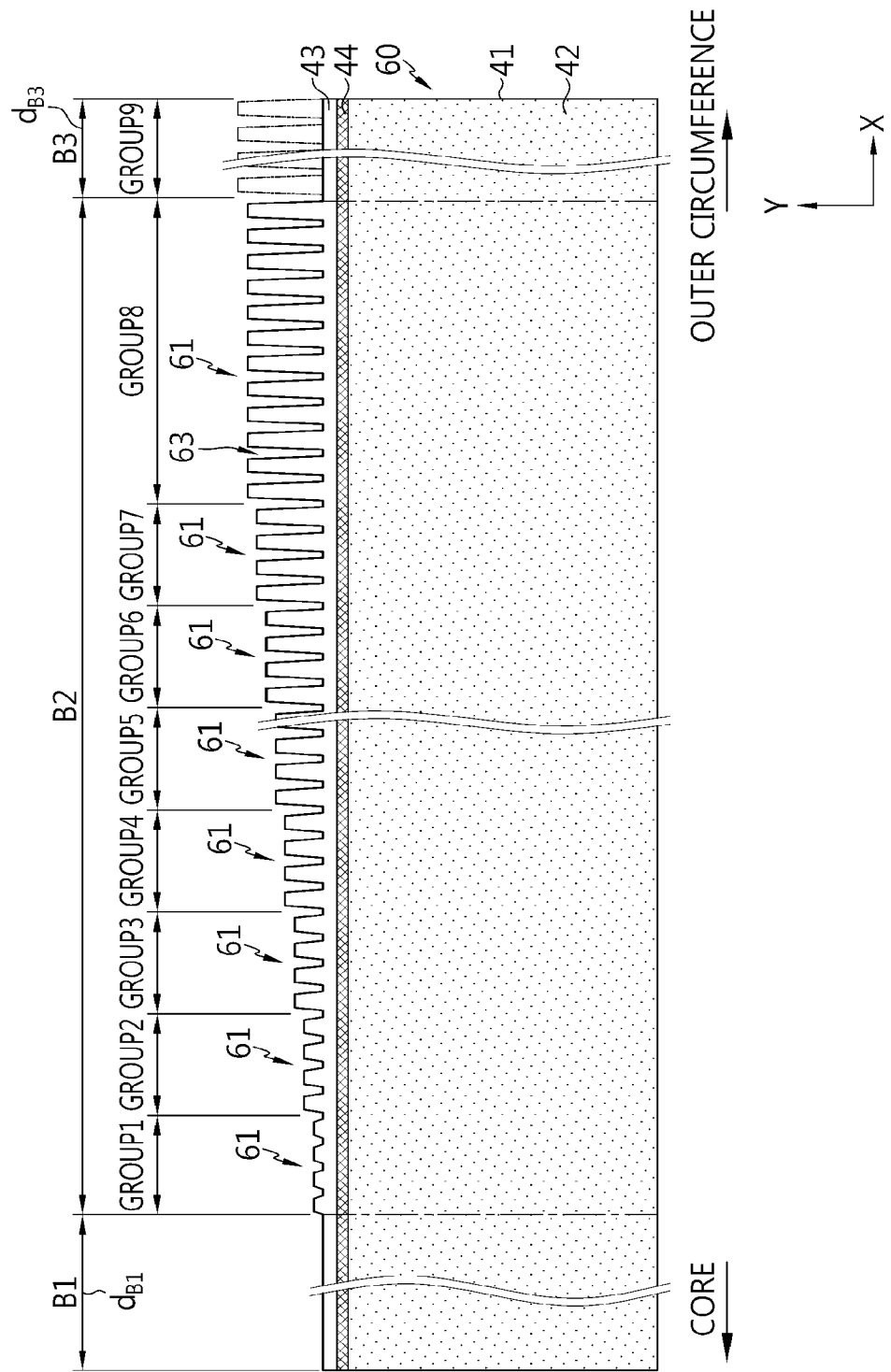

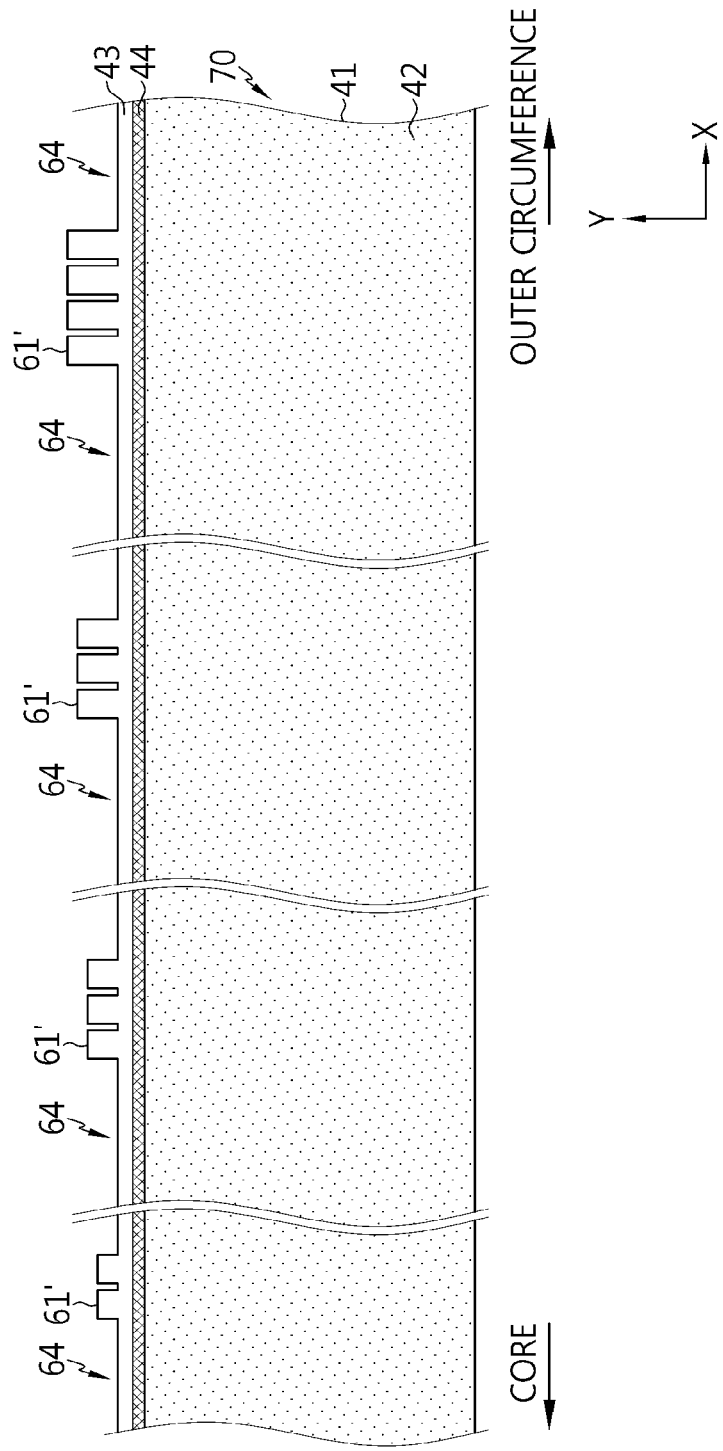

ELECTRODE ASSEMBLY, BATTERY, AND BATTERY PACK AND VEHICLE INCLUDING THE SAME

CROSS-REFERENCE TO RELATED APPLICATIONS

This application is a Continuation of U.S. application Ser. No. 17/665,896, filed on Feb. 7, 2022, which claims the benefit under 35 U.S.C. § 119(a) to Patent Application No. 10-2021-0022881, filed in the Republic of Korea on Feb. 19, 2021, Patent Application No. 10-2021-0022891, filed in the Republic of Korea on Feb. 19, 2021, Patent Application No. 10-2021-0022894, filed in the Republic of Korea on Feb. 19, 2021, Patent Application No. 10-2021-0022897, filed in the Republic of Korea on Feb. 19, 2021, Patent Application No. 10-2021-0024424, filed in the Republic of Korea on Feb. 23, 2021, Patent Application No. 10-2021-0030291, filed in the Republic of Korea on Mar. 8, 2021, Patent Application No. 10-2021-0030300, filed in the Republic of Korea on Mar. 8, 2021, Patent Application No. 10-2021-0046798, filed in the Republic of Korea on Apr. 9, 2021, Patent Application No. 10-2021-0058183, filed in the Republic of Korea on May 4, 2021, Patent Application No. 10-2021-0077046, filed in the Republic of Korea on Jun. 14, 2021, Patent Application No. 10-2021-0084326, filed in the Republic of Korea on Jun. 28, 2021, Patent Application No. 10-2021-0131205, filed in the Republic of Korea on Oct. 1, 2021, Patent Application No. 10-2021-0131207, filed in the Republic of Korea on Oct. 1, 2021, Patent Application No. 10-2021-0131208, filed in the Republic of Korea on Oct. 1, 2021, Patent Application No. 10-2021-0131215, filed in the Republic of Korea on Oct. 1, 2021, Patent Application No. 10-2021-0131225, filed in the Republic of Korea on Oct. 1, 2021, Patent Application No. 10-2021-0137001, filed in the Republic of Korea on Oct. 14, 2021, Patent Application No. 10-2021-0137856, filed in the Republic of Korea on Oct. 15, 2021, Patent Application No. 10-2021-0142196, filed in the Republic of Korea on Oct. 22, 2021, Patent Application No. 10-2021-0153472, filed in the Republic of Korea on Nov. 9, 2021, Patent Application No. 10-2021-0160823, filed in the Republic of Korea on Nov. 19, 2021, Patent Application No. 10-2021-0163809, filed in the Republic of Korea on Nov. 24, 2021, Patent Application No. 10-2021-0165866, filed in the Republic of Korea on Nov. 26, 2021, Patent Application No. 10-2021-0172446, filed in the Republic of Korea on Dec. 3, 2021, Patent Application No. 10-2021-0177091, filed in the Republic of Korea on Dec. 10, 2021, Patent Application No. 10-2021-0194572, filed in the Republic of Korea on Dec. 31, 2021, Patent Application No. 10-2021-0194593, filed in the Republic of Korea on Dec. 31, 2021, Patent Application No. 10-2021-0194610, filed in the Republic of Korea on Dec. 31, 2021, Patent Application No. 10-2021-0194611, filed in the Republic of Korea on Dec. 31, 2021, Patent Application No. 10-2021-0194612, filed in the Republic of Korea on Dec. 31, 2021, and Patent Application No. 10-2022-0001802, filed in the Republic of Korea on Jan. 5, 2022, all of these applications being hereby expressly and fully incorporated by reference in their entireties into the present application.

Also, Patent Application No. 10-2021-0007278, filed in the Republic of Korea on Jan. 19, 2021, is hereby expressly incorporated by reference in its entirety into the present application.

TECHNICAL FIELD

The present disclosure relates to an electrode assembly, a battery, and a battery pack and a vehicle including the same.

BACKGROUND ART

Secondary batteries that are easily applicable to various product groups and have electrical characteristics such as high energy density are universally applied not only to portable devices but also to electric vehicles (EVs) or hybrid electric vehicles (HEVs) driven by an electric drive source.

These secondary batteries are attracting attention as a new energy source to improve eco-friendliness and energy efficiency because they have the primary advantage that they can dramatically reduce the use of fossil fuels as well as the secondary advantage that no by-products are generated from the use of energy.

Secondary batteries currently widely used in the art include lithium ion batteries, lithium polymer batteries, nickel cadmium batteries, nickel hydrogen batteries, nickel zinc batteries, and the like. A unit secondary battery, namely a unit battery, has an operating voltage of about 2.5V to 4.5V. Therefore, when a higher output voltage is required, a battery pack may be configured by connecting a plurality of batteries in series. In addition, a plurality of batteries may be connected in parallel to form a battery pack according to the charge/discharge capacity required for the battery pack. Accordingly, the number of batteries included in the battery pack and the form of electrical connection may be variously set according to the required output voltage and/or charge/discharge capacity.

Meanwhile, as a kind of unit secondary battery, there are known cylindrical, rectangular, and pouch-type batteries. In the case of a cylindrical battery, a separator serving as an insulator is interposed between a positive electrode and a negative electrode, and they are wound to form an electrode assembly in the form of a jelly roll, which is inserted into a battery housing to configure a battery. In addition, a strip-shaped electrode tab may be connected to an uncoated portion of each of the positive electrode and the negative electrode, and the electrode tab electrically connects the electrode assembly and an electrode terminal exposed to the outside. For reference, the positive electrode terminal is a cap of a sealing body that seals the opening of the battery housing, and the negative electrode terminal is the battery housing. However, according to the conventional cylindrical battery having such a structure, since current is concentrated in the strip-shaped electrode tab coupled to the uncoated portion of the positive electrode and/or the uncoated portion of the negative electrode, the current collection efficiency is not good due to large resistance and large heat generation.

For small cylindrical batteries with a form factor of 1865 (diameter: 18 mm, height: 65 mm) or 2170 (diameter: 21 mm, height: 70 mm), resistance and heat are not a major issue. However, when the form factor is increased to apply the cylindrical battery to an electric vehicle, the cylindrical battery may ignite while a lot of heat is generated around the electrode tab during the rapid charging process.

In order to solve this problem, there is provided a cylindrical battery (so-called tab-less cylindrical battery) in which the uncoated portion of the positive electrode and the uncoated portion of the negative electrode are designed to be positioned at the top and bottom of the jelly-roll type electrode assembly, respectively, and the current collector is welded to the uncoated portion to improve the current collecting efficiency.

FIGS. 1 to 3 are diagrams showing a process of manufacturing a tab-less cylindrical battery. FIG. 1 shows the structure of an electrode, FIG. 2 shows a process of winding the electrode, and FIG. 3 shows a process of welding a current collector to a bent surface region of an uncoated portion.

Referring to FIGS. 1 to 3, a positive electrode 10 and a negative electrode 11 have a structure in which a sheet-shaped current collector 20 is coated with an active material 21, and include an uncoated portion 22 at one long side along the winding direction X. The long side is a direction parallel to the x-axis direction and means a side with a relatively long length.

An electrode assembly A is manufactured by sequentially stacking the positive electrode and the negative electrode 11 together with two sheets of separators 12 as shown in FIG. 2 and then winding them in one direction X. At this time, the uncoated portions of the positive electrode 10 and the negative electrode 11 are arranged in opposite directions.

After the winding process, the uncoated portion 10a of the positive electrode 10 and the uncoated portion 11a of the negative electrode 11 are bent toward the core. After that, current collectors 30, 31 are welded and coupled to the uncoated portions 10a, 11a, respectively.

An electrode tab is not separately coupled to the positive electrode uncoated portion 10a and the negative electrode uncoated portion 11a, the current collectors 30, 31 are connected to external electrode terminals, and a current path is formed with a large cross-sectional area along the winding axis direction of electrode assembly A (see arrow), which has an advantage of lowering the resistance of the battery. This is because resistance is inversely proportional to the cross-sectional area of the path through which the current flows.

In the tab-less cylindrical battery, in order to improve the welding characteristics of the uncoated portions 10a, 11a and the current collectors 30, 31, a strong pressure should be applied to the welding region of the uncoated portions 10a, 11a to bend the uncoated portions 10a, 11a as flat as possible.

However, when the welding region of the uncoated portions 10a, 11a is bent, the shapes of the uncoated portions 10a, 11a may be irregularly distorted and deformed. In this case, the deformed portion may come into contact with the electrode of opposite polarity to cause an internal short circuit or cause micro cracks in the uncoated portions 10a, 11a. In addition, as the uncoated portion 32 adjacent to the core of the electrode assembly A is bent, all or a significant portion of the cavity 33 in the core of the electrode assembly A is blocked. In this case, it causes a problem in the electrolyte injection process. That is, the cavity 33 in the core of the electrode assembly A is used as a passage through which an electrolyte is injected. However, if the corresponding passage is blocked, electrolyte injection is difficult. In addition, while an electrolyte injector is being inserted into the cavity 33, the electrolyte injector may interfere with the uncoated portion 32 near the core, which may cause the uncoated portion 32 to tear.

In addition, the bent portions of the uncoated portions 10a, 11a to which the current collectors 30, 31 are welded should be overlapped in multiple layers and there should not be any empty spaces (gaps). In this way, sufficient welding strength may be obtained, and even with the latest technology such as laser welding, it is possible to prevent laser from penetrating into the electrode assembly A and melting the separator or the active material.

Meanwhile, in the conventional tab-less cylindrical battery, the positive electrode uncoated portion 10a is formed entirely on the upper portion of the electrode assembly A. Therefore, when the outer circumference of the top of the battery housing is pressed inward to form a beading portion, a top edge area 34 of the electrode assembly A is compressed by the battery housing. This compression may cause a partial deformation of the electrode assembly A, which may tear the separator 12 and cause an internal short circuit. If a short circuit occurs inside the battery, it may cause heating or explosion of the battery.

SUMMARY OF THE DISCLOSURE

Technical Problem

The present disclosure is designed to solve the problems of the related art, and therefore the present disclosure is directed to providing an electrode assembly having an improved uncoated portion structure to relieve stress applied to the uncoated portion when bending the uncoated portion exposed at both ends of the electrode assembly The present disclosure is also directed to providing an electrode assembly in which an electrolyte injection passage is not blocked even if the uncoated portion is bent.

The present disclosure is also directed to providing an electrode assembly including a structure that may prevent a top edge of the electrode assembly from contacting an inner surface of a battery housing when the top of the battery housing is beaded.

The present disclosure is also directed to providing an electrode assembly with improved physical properties of a welding region by applying a segment structure to the uncoated portion of the electrode and optimizing the dimensions (width, height, separation pitch) of the segments to sufficiently increase the number of overlapping layers of the segments in an area used as a welding target region.

The present disclosure is also directed to providing an electrode assembly with improved energy density and reduced resistance by applying a structure in which a current collector is welded over a large area to a bending surface region formed by bending the segments.

The present disclosure is also directed to providing a battery including a terminal and a current collector having an improved design so as to perform electrical wiring at an upper portion thereof.

The present disclosure is also directed to providing a battery including the electrode assembly having an improved structure, a battery pack including the battery, and a vehicle including the battery pack.

The technical objects to be solved by the present disclosure are not limited to the above, and other objects not mentioned herein will be clearly understood by those skilled in the art from the following disclosure.

Technical Solution

In one aspect of the present disclosure, there is provided an electrode assembly including a first electrode; a second electrode; and a separator between the first electrode and the second electrode, the first electrode, the second electrode, and the separator wound about an axis defining a core and an outer circumference of the electrode assembly, wherein the first electrode has a pair of first sides and a pair of second sides extending between the pair of first sides, a first portion extending between the pair of first sides, and a second portion extending between the pair of first sides, wherein the first portion is coated with an active material along a winding direction, and at least a part of the second portion includes an electrode tab, wherein the second portion includes a first part adjacent to the core of the electrode assembly, a second part adjacent to the outer circumference of the electrode assembly, and a third part between the first part and the second part, and wherein the first part or the second part has a smaller height than the third part in a direction of the axis.

The third part may be bent along a radial direction of the electrode assembly to be the electrode tab.

The second part and the third part may be bent along a radial direction of the electrode assembly to define the electrode tab.

At least a partial region of the third part is divided into a plurality of segments that are independently bendable.

Each of the plurality of segments may have a geometric shape in which one or more straight lines, one or more curves, or a combination thereof are connected.

In each of the plurality of segments, a width of a lower portion may be greater than a width of an upper portion.

In each of the plurality of segments, a width of a lower portion may be identical to a width of an upper portion.

Each of the plurality of segments may have a width that gradually decreases from a lower portion to an upper portion.

Each of the plurality of segments may have a width that gradually decreases and then increases from a lower portion to an upper portion.

Each of the plurality of segments may have a width that gradually increases and then decreases from a lower portion to an upper portion.

Each of the plurality of segments may have a width that gradually increases and then is kept constant from a lower portion to an upper portion.

Each of the plurality of segments may have a width that gradually decreases and then is kept constant from a lower portion to an upper portion.

The plurality of segments may have a lower internal angle that increases individually or in groups in one direction parallel to the winding direction.

The lower internal angle of the plurality of segments may increase individually or in groups in the range of 60 to 85 degrees in the one direction parallel to the winding direction.

Each of the plurality of segments may have a geometric shape with a width that gradually decreases from a lower portion to an upper portion, and a lower internal angle (θ) of a segment located in a winding turn having a radius r based on the core of the electrode assembly falls within an angle range of the following formula:

$$\cos^{-1}\left(\frac{0.5*D}{r}\right) \le \theta \le \tan^{-1}\left(\frac{2*H*\tan\theta_{refer}}{2*H - p*\tan\theta_{refer}}\right)$$

wherein D is a width of the segment in the winding direction, r is a radius of the winding turn including the segment, H is a height of the segment, and p is a separation pitch of the segment.

Each of the plurality of segments may have a side formed with one or more straight lines, one or more curves, or a combination thereof.

Each of the plurality of segments may have a side that is convex outward or convex inward.

A corner of an upper portion of each of the plurality of segments may have a round shape.

The plurality of segments may have a cut groove between segments adjacent to each other along the winding direction, and a lower portion of the cut groove may include a bottom portion and a round portion connecting both ends of the bottom portion to sides of the segments adjacent to each other.

The round portion of the cut groove may have a radius of curvature greater than 0 and equal to or smaller than 0.1 mm.

The round portion of the cut groove may have a radius of curvature of 0.01 mm to 0.05 mm.

The bottom portion of the cut groove may be flat.

A separation pitch defined as an interval between two points at which lines extending from the sides of two segments located at both sides of the cut groove meet a line extending from the bottom portion of the cut groove may be 0.05 mm to 1.00 mm.

The plurality of segments may be made of an aluminum foil, and a separation pitch defined as an interval between two points at which lines extending from the sides of two segments located at both sides of the cut groove meet a line extending from the bottom portion of the cut groove may be 0.05 mm to 1.00 mm.

The bottom portion of the cut groove may be spaced apart from the first portion by a predetermined distance.

The predetermined distance may be 0.2 mm to 4 mm.

A bending region of the plurality of segments in a radial direction of the electrode assembly may be located in the range of 0 to 1 mm above a lower end of the cut groove.

In each of the plurality of segments, a circumferential angle of an arc formed by a lower end of the segment based on a core center of the electrode assembly may be 45 degrees or less. In each of the plurality of segments, a width of the segment in the winding direction D(r) may satisfy the following formula:

$$1 \le D(r) \le (2*\pi*r/360°)*45°,$$

wherein r is a radius of a winding turn including the segment based on a core center of the electrode assembly.

In each of the plurality of segments, as the radius r of the winding turn where the segment is located based on the core center of the electrode assembly increases, the width D(r) in the winding direction may increase or decrease gradually or stepwise.

In each of the plurality of segments, as the radius r of the winding turn where the segment is located based on the core center of the electrode assembly increases, the width D(r) in the winding direction increases gradually or stepwise and then decreases gradually or stepwise or decreases gradually or stepwise and then increases gradually or stepwise.

In the plurality of segments, the circumferential angle may be substantially the same based on the core center of the electrode assembly.

Widths of the plurality of segments in the winding direction may increase at substantially the same rate along one direction parallel to the winding direction of the electrode assembly.

In each of the plurality of segments, as a radius r of the winding turn where the segment is located based on the core center of the electrode assembly increases, a width in the winding direction may increase gradually or stepwise within the range of 1 mm to 11 mm.

In at least a partial region of the third part, a height in the direction of the axis may change gradually or stepwise along one direction parallel to the winding direction.

In at least a partial region of the second part and the third part, a height in the direction of the axis may change gradually or stepwise along one direction parallel to the winding direction.

The third part may be divided into a plurality of regions having different heights along one direction parallel to the winding direction, and the height of the third part in the plurality of regions may increase gradually or stepwise along one direction parallel to the winding direction. The second portion may include a height variable region in which a height of the segment increases stepwise from a first height $h_1$ to an $N-1^{th}$ height $h_{N-1}$, and a height uniform region in which the height of the segment is maintained as an $N^{th}$ height $h_N$ which is greater than $h_{N-1}$, and N is a height index and a natural number of 2 or above.

N may be a natural number of 2 to 30.

A plurality of segments may have a height $h_k$, and the plurality of segments having the height $h_k$ may be disposed in at least one winding turn, and k is a natural number of 1 to N.

The core of the electrode assembly may not be covered by a bent portion of the segment located at $r_k$ by at least 90% or more of a diameter thereof, wherein $r_k$ is a start radius of a winding turn including the segment having a height $h_k$, and k is a natural number of 1 to N.

A height $h_k$ of the segment may satisfy the following formula:

$$2\ \text{mm} \leq h_k \leq r_k - \alpha^* r_c$$

wherein $r_k$ is a start radius of a winding turn including the segment having a height $h_k$, k is a natural number of 1 to N, $r_c$ is a radius of the core, and a is 0.90 to 1.

The electrode assembly may include a segment skip region having no segment, a height variable region where segments have variable heights, and a height uniform region where segments have a substantially uniform height in order along a radial direction, based on a cross section along the direction of the axis, and the plurality of segments may be disposed in the height variable region and the height uniform region and bent along the radial direction of the electrode assembly forming a bending surface region.

The first part may not be divided into segments, and the segment skip region may correspond to the first part.

The third part may be divided into a plurality of segments that are independently bendable, and the height variable region and the height uniform region may correspond to the third part.

The second part and the third part may be divided into a plurality of segments that are independently bendable, and the height variable region and the height uniform region may correspond to the second part and the third part.

In the height variable region and the height uniform region, a maximum height $h_{max}$ of the segments may satisfy the following formula:

$$h_{max} \leq W_{foil} - W_{scrap,min} - W_{margin,min} - W_{gap}$$

wherein $W_{foil}$ is a width of a current collector foil before segments are formed, $W_{scrap,min}$ is a width corresponding to a minimum cut scrap margin when segments are formed by cutting the current collector foil, $W_{margin,min}$ is a width corresponding to a minimum meandering margin of the separator, and $W_{gap}$ is a width corresponding to an insulation gap between an end of the separator and an end of the second electrode facing the first electrode with the separator therebetween.

The first electrode may be a positive electrode and the insulation gap may be in the range of 0.2 mm to 6 mm.

The first electrode may be a negative electrode and the insulation gap may be in the range of 0.1 mm to 2 mm.

The minimum cut scrap margin may be in the range of 1.5 mm to 8 mm.

The minimum meandering margin may be in the range of 0 to 1 mm.

The minimum cut scrap margin may be zero.

The heights of the segments disposed in the height variable region may increase gradually or stepwise within the range of 2 mm to 10 mm.

A ratio of a radial length of the segment skip region to a radius of the electrode assembly except for the core in the radial direction of the electrode assembly may be 10% to 40%.

A ratio of a radial length of the height variable region to a radial length corresponding to the height variable region and the height uniform region in the radial direction of the electrode assembly may be 1% to 50%.

A ratio of a length of an electrode area corresponding to the segment skip region to the entire length of the first electrode may be 1% to 30%.

A ratio of a length of an electrode area corresponding to the height variable region to the entire length of the first electrode may be 1% to 40%.

A ratio of a length of an electrode area corresponding to the height uniform region to the entire length of the first electrode may be 50% to 90%.

Widths of the plurality of segments in the winding direction or heights thereof in the direction of the axis, or both may increase gradually or stepwise along one direction parallel to the winding direction.

Widths of the plurality of segments in the winding direction or heights thereof in the direction of the axis, or both may increase gradually or stepwise and then may decrease gradually or stepwise along one direction parallel to the winding direction or may decrease gradually or stepwise and then may increase gradually or stepwise along the one direction parallel to the winding direction.

The plurality of segments may form a plurality of segment groups along one direction parallel to the winding direction of the electrode assembly, and segments belonging to the same segment group may be substantially the same as each other in terms of a width in the winding direction and a height in the direction of the axis.

Widths of the segments belonging to the same segment group in the winding direction or heights thereof in the direction of the axis, or both may increase stepwise along one direction parallel to the winding direction of the electrode assembly.

The plurality of segment groups include a combination of segment groups in which W3/W2 is smaller than W2/W1, and wherein W1, W2 and W3 are widths in the winding direction of three segment groups successively adjacent to each other in one direction parallel to the winding direction of the electrode assembly, respectively.

The first part may not be divided into segments, and the first part may not be bent along a radial direction of the electrode assembly.

The second part may not be divided into segments, and the second part may not be bent along a radial direction of the electrode assembly.

An insulating coating layer may be formed at a boundary between the first portion and a region of the second portion provided in a section where the bottom portion of the cut groove and the first portion are separated.

The insulating coating layer may include a polymer resin and an inorganic filler dispersed in the polymer resin.

The insulating coating layer may be formed to cover a boundary portion of the first portion and the second portion along the winding direction.

The insulating coating layer may be formed to cover the boundary portion of the first portion and the second portion along the direction of the axis by a width of 0.3 mm to 5 mm.

An end of the insulating coating layer may be located within the range of −2 mm to 2 mm along the direction of the axis with respect to an end of the separator.

The insulating coating layer may be exposed beyond the separator.

A lower end of the cut groove and the insulating coating layer may be spaced apart by a distance of 0.5 mm to 2 mm.

An end of the insulating coating layer in the direction of the axis may be located within the range of −2 mm to +2 mm based on the lower end of the cut groove.

The second electrode may include a third portion coated with an active material along the winding direction, and an end of the third portion may be located between an upper end and a lower end of the insulating coating layer in the direction of the axis.

At least one of the third part or the second part may be divided into a plurality of segments that are independently bendable, and the electrode assembly may include a bending surface region formed by bending the plurality of segments along a radial direction of the electrode assembly.

When the number of segments meeting a virtual line parallel to the direction of the axis at any radial location of the bending surface region based on a core center of the electrode assembly is defined as the number of overlapping layers of segments at the corresponding radial location, the bending surface region may include an overlapping layer number uniform region in which the number of overlapping layers of segments is substantially uniform from the core toward the outer circumference and an overlapping layer number decreasing region located adjacent to the overlapping layer number uniform region and the number of overlapping layers of segments in the overlapping layer number decreasing region gradually decreases toward the outer circumference.

A radial length of the overlapping layer number uniform region and the overlapping layer number decreasing region based on the core center of the electrode assembly may correspond to a radial length of a radial region in which winding turns including the plurality of segments are located.

The electrode assembly may include a segment skip region having no segment, a height variable region where segments have variable heights, and a height uniform region where segments have a substantially uniform height in order along the radial direction, and a radius at which the overlapping layer number uniform region starts based on the core center of the electrode assembly may correspond to a radius at which the height variable region starts.

In the overlapping layer number uniform region, the number of overlapping layers of the segments may be 10 to 35.

The first electrode may be a positive electrode, and in the overlapping layer number uniform region, an overlapping thickness of segments may be between 100 μm and 875 μm.

The first electrode may be a negative electrode, and in the overlapping layer number uniform region, an overlapping thickness of segments may be between 50 μm and 700 μm.

A ratio of a radial length of the overlapping layer number uniform region to a radial length of the overlapping layer number uniform region and the overlapping layer number decreasing region may be 30% to 85%.

The electrode assembly may further include a current collector welded to the bending surface region, and in the radial direction of the electrode assembly, a welding region of the current collector may overlap with the overlapping layer number uniform region by at least 50%.

In the radial direction of the electrode assembly, a region of the welding region of the current collector not overlapping with the overlapping layer number uniform region may overlap with the overlapping layer number decreasing region.

An edge of the current collector may be disposed on the bending surface region to cover an end of a bent portion of the outermost segment in the radial direction of the electrode assembly and welded to the bending surface region.

A welding strength of the current collector to the welding region may be at least 2 kgf/cm$^2$ or more.

A welding strength of the current collector to the welding region may be at least 4 kgf/cm$^2$ or more.

The second portion may be made of a metal foil, and the metal foil may have an elongation of 1.5% to 3.0% and a tensile strength of 25 kgf/mm$^2$ to 35 kgf/mm$^2$.

The metal foil may be an aluminum foil.

The first electrode may have a camber length smaller than 20 mm.

In the first portion, a ratio of a length of a short side parallel to the direction of the axis to a length of a long side parallel to the winding direction may be 1% to 4%.

A height of the second part may decrease gradually or stepwise from the core toward the outer circumference of the electrode assembly.

The second part and the third part may be divided into a plurality of segments that are independently bendable, and a width in the winding direction or a height in the direction of the axis of the segments included in the second part, or both may be greater than those of the segments included in the third part.

The third part may include a segment skip region having no segment along one direction parallel to the winding direction.

The third part may include a plurality of segment skip regions along the one direction parallel to the winding direction.

The plurality of segment skip regions may have widths gradually increasing or decreasing along the one direction parallel to the winding direction.

A height of the second portion of the segment skip region may be substantially the same as a height of the first part or the second part.

The plurality of segments may be located within a circumferential angle range preset based on a core center of the electrode assembly.

The plurality of segments may be located in at least two sectoral regions or polygonal regions disposed in a circumferential direction based on a core center of the electrode assembly.

The sectoral region may have a circumferential angle of 20 degrees or more.

The second electrode may have a pair of third sides and a pair of fourth sides extending between the pair of third sides, a third portion extending between the pair of third sides, and a fourth portion extending between the pair of third sides, the third portion may be coated with an active material along the winding direction and at least a part of the fourth portion includes an electrode tab, and the fourth portion may include a region divided into a plurality of segments that are independently bendable, and the plurality of segments may be bent along a radial direction of the electrode assembly to form a bending surface region.

In another aspect of the disclosure, there is also provided an electrode assembly including a first electrode; a second electrode; and a separator between the first electrode and the second electrode, the first electrode, the second electrode, and the separator wound about an axis defining a core and an outer circumference of the electrode assembly, wherein the first electrode has a pair of first sides and a pair of second sides extending between the pair of first sides, a first portion extending between the pair of first sides, and a second portion extending between the pair of first sides, wherein the first portion is coated with an active material along a winding direction, wherein the second portion includes a region divided into a plurality of segments that are independently bendable from the core toward the outer circumference of the electrode assembly, wherein the plurality of segments are bent along a radial direction of the electrode assembly to form a bending surface region, and wherein the bending surface region includes an overlapping layer number uniform region in which the number of overlapping layers of the segments is 10 or more and an overlapping layer number decreasing region located adjacent to the overlapping layer number uniform region and the number of overlapping layers of the segments in the overlapping layer number decreasing region decreases away from the overlapping layer number uniform region, along the radial direction.

The electrode assembly may include a segment skip region having no segment, a height variable region where segments have heights increasing stepwise, and a height uniform region where segments have a substantially uniform height in order along the radial direction of the electrode assembly, and a start radius of the overlapping layer number uniform region may correspond to a start radius of the height variable region based on a core center of the electrode assembly.

A region of the second portion adjacent to the core may not be divided into segments and may be disposed in a winding turn of the segment skip region.

A ratio of a radial length of the overlapping layer number uniform region to a radial length of the overlapping layer number uniform region and the overlapping layer number decreasing region may be 30% to 85%.

A ratio of a length of an electrode area corresponding to the segment skip region to the entire length of the first electrode may be 1% to 30%.

A ratio of a length of an electrode area corresponding to the height variable region to the entire length of the first electrode may be 1% to 40%.

A ratio of a length of an electrode area corresponding to the height uniform region to the entire length of the first electrode may be 50% to 90%.

In the region divided into the plurality of segments, at least one selected from widths of the segments in the winding direction, heights thereof in the direction of the axis, and a lower internal angle thereof may increase stepwise along one direction parallel to the winding direction.

A height of a region of the second portion adjacent to the core or the outer circumference of the electrode assembly may be lower than a height of the plurality of segments.

The plurality of segments may be bent toward the core of the electrode assembly, and the core of the electrode assembly may not be covered by the bent portion of a segment located closest to the core of the electrode assembly by at least 90% or more of a diameter thereof.

In another aspect of the present disclosure, there is also provided an electrode assembly including a positive electrode; a negative electrode; and a separator between the positive electrode and the negative electrode, the positive electrode, the negative electrode, and the separator wound about an axis defining a core and an outer circumference, wherein the positive electrode has a pair of first sides and a pair of second sides extending between the pair of first sides, a first portion extending between the pair of first sides, and a second portion extending between the pair of first sides, wherein the first portion is coated with an active material along a winding direction, wherein at least a part of the second portion includes an electrode tab, wherein the second portion includes a plurality of segments that are independently bendable from the core toward the outer circumference of the electrode assembly, wherein the plurality of segments are bent along a radial direction of the electrode assembly and overlapped into multiple layers to form a bending surface region, wherein the bending surface region includes an overlapping layer number uniform region in which the number of overlapping layers of the segments is substantially uniform and an overlapping layer number decreasing region located adjacent to the overlapping layer number uniform region and the number of overlapping layers of the segments in the overlapping layer number decreasing region decreases away from the overlapping layer number uniform region, along the radial direction, and wherein, in the overlapping layer number uniform region, an overlapping thickness of segments is between 100 μm and 875 μm.

In still another aspect of the present disclosure, there is also provided an electrode assembly including a positive electrode; a negative electrode; and a separator between the positive electrode and the negative electrode, the positive electrode, the negative electrode, and the separator wound about an axis defining a core and an outer circumference, wherein the negative electrode has a pair of first sides and a pair of second sides extending between the pair of first sides, a first portion extending between the pair of first sides, and a second portion extending between the pair of first sides, wherein the first portion is coated with an active material along a winding direction, wherein at least a part of the second portion includes an electrode tab, wherein the second portion includes a plurality of segments that are independently bendable from the core toward the outer circumference of the electrode assembly, wherein the plurality of segments are bent along a radial direction of the electrode assembly and overlapped into multiple layers to form a bending surface region, wherein the bending surface region includes an overlapping layer number uniform region in which the number of overlapping layers of the segments is substantially uniform and an overlapping layer number decreasing region located adjacent to the overlapping layer number uniform region and the number of overlapping layers of the segments in the overlapping layer number decreasing region decreases away from the overlapping layer number uniform region, along the radial direction, and wherein, in the overlapping layer number uniform region, an overlapping thickness of segments is between 50 μm and 700 μm.

In another aspect of the present disclosure, there is also provided a battery including an electrode assembly including a first electrode, a second electrode, and a separator between the first electrode and the second electrode, the first electrode, the second electrode, and the separator wound about an axis defining a core and an outer circumference, wherein the first electrode has a pair of first sides and a pair of second sides extending between the pair of first sides, a first portion extending between the pair of first sides, and a second portion extending between the pair of first sides, wherein the first portion is coated with an active material along a winding direction, at least a part of the second portion includes an electrode tab, the second portion includes a first part adjacent to the core of the electrode assembly, a second part adjacent to the outer circumference of the electrode assembly, and a third part between the first part and the second part, and the first part or the second part has a smaller height than the third part in the direction of the axis; a battery housing including a first end with a first opening and a second end opposite thereto, wherein the electrode assembly is accommodated in a space between the first end and the second end, and the battery housing is electrically connected to one of the first electrode or the second electrode to have a first polarity; a sealing body sealing the first opening at the first end of the battery housing; and a terminal electrically connected to the other of the first electrode or the second electrode to have a second polarity and having a surface exposed outside the battery housing.

The second part may have a smaller height than the third part in the direction of the axis, the battery housing may have a beading portion press-fitted inward at a region adjacent to the first opening at the first end, and an inner circumference of the beading portion facing a top edge of the electrode assembly and the second part are spaced apart by a predetermined distance.

A press-in depth D1 of the beading portion and a distance D2 from an inner circumference of the battery housing to a boundary between the second part and the third part may satisfy a formula D1≤D2.

The battery may further include a current collector electrically coupled to the third part; and an insulator covering the current collector and having an edge fixed between the inner circumference of the beading portion and the current collector.

A diameter of the current collector may be smaller than a minimum inner diameter of the inner circumference of the beading portion, and a diameter of the current collector may be equal to or greater than an outermost diameter of the third part.

The current collector may be located higher than the beading portion in the direction of the axis.

The sealing body may include a cap sealing the first opening at the first end of the battery housing, and a gasket between an edge of the cap and the first opening at the first end of the battery housing, and the battery housing may include a crimping portion bent inward and surrounding and fixing an edge of the cap together with the gasket, and the terminal having the second polarity may be the cap.

The battery may further include a first current collector electrically connected to the second portion, and the terminal may be a rivet terminal installed in a hole formed in the second end of the battery housing to be insulated therefrom and electrically connected to the first current collector to have the second polarity.

The battery may further include an insulator between an inner surface of the bottom portion of the battery housing and an upper surface of the first current collector to electrically insulate the inner surface of the bottom portion of the battery housing and the first current collector.

The insulator may have a thickness corresponding to a distance between the inner surface of the bottom portion of the battery housing and the upper surface of the first current collector and may be in contact with the inner surface of the bottom portion of the battery housing and the upper surface of the first current collector.

The terminal may include a flat portion at a lower end thereof, the insulator may have an opening for exposing the flat portion, and the flat portion may be welded to the first current collector through the opening.

The second electrode may have a pair of third sides and a pair of fourth sides extending between the pair of third sides, a third portion extending between the pair of third sides, and a fourth portion extending between the pair of third sides, wherein the third portion may be coated with an active material along the winding direction, wherein the second electrode may have the first polarity, and at least a part of the fourth portion may include an electrode tab, and wherein the battery may further include a second current collector electrically connected to the fourth portion and having an edge at least partially coupled to a sidewall of the battery housing.

The second electrode has a pair of third sides and a pair of fourth sides extending between the pair of third sides, a third portion extending between the pair of third sides, and a fourth portion extending between the pair of third sides, wherein the third portion may be coated with an active material along the winding direction, wherein the second electrode may have the first polarity, and wherein at least a part of the fourth portion may include an electrode tab, wherein the battery may further include a second current collector electrically connected to the fourth portion and having an edge at least partially coupled to a sidewall of the battery housing, and wherein the first current collector may have an outer diameter equal to or greater than that of the second current collector.

The first current collector and the second current collector may be respectively welded to the second portion and the fourth portion along a radial direction of the electrode assembly forming welding patterns, and a length of the welding pattern of the first current collector may be longer than a length of the welding pattern of the second current collector.

The welding pattern of the first current collector and the welding pattern of the second current collector may be located substantially at a same distance from a core center of the electrode assembly.

The battery housing may include a beading portion press-fitted inward at an inner wall adjacent to the first opening at the first end, and the edge of the second current collector may be electrically connected to the beading portion.

A region of the second current collector in electrical contact with the fourth portion may be located farther inward than an inner circumference of the beading portion.

The battery may include a cap having an edge supported by the beading portion and having no polarity, a gasket between the edge of the cap and the first opening at the first end of the battery housing, and a crimping portion bent and extended into the first opening of the battery housing and surrounding and fixing the edge of the cap together with the gasket, and wherein the edge of the second current collector may be fixed between the beading portion and the gasket by the crimping portion.

The edge of the second current collector may be welded to the beading portion.

At least one of the third part or the second part may be divided into a plurality of segments that are independently bendable, and a region of the second portion divided into the plurality of segments may include a height variable region in which the height of the segments varies stepwise from a first height $h_1$ to an N–1$^{th}$ height $h_{N-1}$, and a height uniform region in which the height of the segments is maintained as an N$^{th}$ height $h_N$ which is greater than $h_{N-1}$, and N is a height index of 2 or above.

N may be a natural number of 2 to 30.

A plurality of segments may have a height $h_k$, and the plurality of segments having the height $h_k$ may be disposed in at least one winding turn, and k is a natural number of 1 to N.

The core of the electrode assembly may not be covered by a bent portion of the segment located at $r_k$ by at least 90% or more of a diameter thereof, wherein $r_k$ is a start radius of a winding turn including the segment having a height $h_k$, and k is a natural number of 1 to N.

The height $h_k$ of the segment may satisfy the following formula:

$$2 \text{ mm} \leq h_k \leq r_k - \alpha * r_c$$

wherein $r_k$ is a start radius of a winding turn including the segment having a height $h_k$, k is a natural number of 1 to N, $r_c$ is a radius of the core, and a is 0.90 to 1.

A width of the segment in the winding direction D(r) may satisfy the following formula:

$$1 \leq D(r) \leq (2*\pi*r/360°)*45°$$

wherein r is a radius of a winding turn including the segment based on a core center of the electrode assembly.

In each of the plurality of segments, as the radius r of the winding turn where the segment is located based on a core center of the electrode assembly increases, the width of segments in the winding direction may increase or may decrease gradually or stepwise.

In each of the plurality of segments, as the radius r of the winding turn where the segment is located based on a core center of the electrode assembly increases, heights of segments in the winding direction may increase gradually or stepwise and then may decrease gradually or stepwise or may decrease gradually or stepwise and then may increase gradually or stepwise.

Each of the plurality of segments has a geometric shape in which a width of a lower portion is greater than a width of an upper portion, and a lower internal angle (θ) of a segment located in a winding turn having a radius r based on the core of the electrode assembly may fall within an angle range of the following formula:

$$\cos^{-1}\left(\frac{0.5*D}{r}\right) \leq \theta \leq \tan^{-1}\left(\frac{2*H*\tan\theta_{refer}}{2*H - p*\tan\theta_{refer}}\right)$$

wherein D is a width of the segment in the winding direction, r is a radius of the winding turn including the segment, H is a height of the segment, and p is a separation pitch of the segment.

The lower internal angle of the plurality of segments may increase individually or in groups in the range of 60 to 85 degrees in one direction parallel to the winding direction.

In the height variable region and the height uniform region, a maximum height $h_{max}$ of the segments may satisfy the following formula:

$$h_{max} \leq W_{foil} - W_{scrap,min} - W_{margin,min} - W_{gap}$$

wherein $W_{foil}$ is a width of a current collector foil before segments are formed, $W_{scrap,min}$ is a width corresponding to a minimum cut scrap margin when segments are formed by cutting the current collector foil, $W_{margin,min}$ is a width corresponding to a minimum meandering margin of the separator, and $W_{gap}$ is a width corresponding to an insulation gap between an end of the separator and an end of the second electrode facing the first electrode with the separator therebetween.

The first electrode may be a positive electrode and the insulation gap may be in the range of 0.2 mm to 6 mm.

The first electrode may be a negative electrode and the insulation gap may be in the range of 0.1 mm to 2 mm.

The minimum cut scrap margin may be in the range of 1.5 mm to 8 mm.

The minimum meandering margin may be in the range of 0 to 1 mm.

The minimum cut scrap margin may be zero.

The heights of the segments disposed in the height variable region may increase gradually or stepwise within the range of 2 mm to 10 mm.

At least one of the third part or the second part may be divided into a plurality of segments that are independently bendable, the electrode assembly may include a segment skip region having no segment, a height variable region where segments have variable heights, and a height uniform region where segments have a substantially uniform height in order along a radial direction, based on a cross section along the direction of the axis, and the plurality of segments may be disposed in the height variable region and the height uniform region and bent along the radial direction of the electrode assembly forming a bending surface region.

The first part may not be divided into segments, and the segment skip region may correspond to the first part.

A ratio of a radial length of the segment skip region to a radius of the electrode assembly except for the core in the radial direction of the electrode assembly may be 10% to 40%.

A ratio of a radial length of the height variable region to a radial length corresponding to the height variable region and the height uniform region in the radial direction of the electrode assembly may be 1% to 50%.

A ratio of a length of an electrode area corresponding to the segment skip region to the entire length of the first electrode may be 1% to 30%.

A ratio of a length of an electrode area corresponding to the height variable region to the entire length of the first electrode may be 1% to 40%.

A ratio of a length of an electrode area corresponding to the height uniform region to the entire length of the first electrode may be 50% to 90%.

The plurality of segments may form a plurality of segment groups along one direction parallel to the winding direction of the electrode assembly, and segments belonging to the same segment group may be substantially the same as each other in terms of a width in the winding direction and a height in the direction of the axis.

Widths of the segments belonging to the same segment group in the winding direction or heights thereof in the direction of the axis, or both may increase stepwise along one direction parallel to the winding direction of the electrode assembly.

The plurality of segment groups may include a combination of segment groups in which W3/W2 is smaller than W2/W1, and wherein W1, W2 and W3 are widths in the winding direction of three segment groups successively adjacent to each other in one direction parallel to the winding direction of the electrode assembly.

When the number of segments meeting a virtual line parallel to the direction of the axis at any radial location of the bending surface region based on a core center of the electrode assembly is defined as the number of overlapping layers of segments at the corresponding radial location, the bending surface region may include an overlapping layer number uniform region in which the number of overlapping layers of segments is substantially uniform from the core toward the outer circumference and an overlapping layer number decreasing region located adjacent to the overlapping layer number uniform region and the number of overlapping layers of segments in the overlapping layer number decreasing region may decrease away from the overlapping layer number uniform region.

In the overlapping layer number uniform region, the number of overlapping layers of the segments may be 10 or more.

In the overlapping layer number uniform region, the number of overlapping layers of the segments may be 10 to 35.

A start radius of the overlapping layer number uniform region may correspond to a start radius of the height variable region based on the core center of the electrode assembly.

A ratio of a radial length of the overlapping layer number uniform region to a radial length of the overlapping layer number uniform region and the overlapping layer number decreasing region may be 30% to 85%.

The first electrode may be a positive electrode, and in the overlapping layer number uniform region, an overlapping thickness of segments may be between 100 μm and 875 μm.

The battery may further include a current collector welded to the overlapping layer number uniform region such that at least a part of a welding region of the current collector overlaps with the overlapping layer number uniform region, and wherein the first electrode may be a positive electrode and the overlapping layers of segments in the welding region may have a thickness in the range of 100 μm to 875 μm.

The first electrode may be a negative electrode, and in the overlapping layer number uniform region, an overlapping thickness of segments may be between 50 μm and 700 μm.

The battery may further include a current collector welded to the overlapping layer number uniform region such that at least a part of a welding region of the current collector overlaps with the overlapping layer number uniform region, and wherein the first electrode may be a negative electrode and the overlapping layers of segments in the welding region may have a thickness in the range of 50 μm to 700 μm.

At least one of the third part or the second part may be divided into a plurality of segments that are independently bendable, wherein the plurality of segments may have a cut groove between segments adjacent to each other along the winding direction, and a lower portion of the cut groove may include a bottom portion, and a round portion connecting both ends of the bottom portion to sides of the segments which are at both sides of the cut groove.

The round portion may have a radius of curvature greater than 0 and equal to or smaller than 0.1 mm.

The round portion may have a radius of curvature of 0.01 mm to 0.05 mm.

The bottom portion may be flat.

A separation pitch defined as an interval between two points at which lines extending from the sides of two segments located at both sides of the cut groove meet a line extending from the bottom portion of the cut groove may be 0.05 mm to 1.00 mm.

The plurality of segments may be made of an aluminum foil, and a separation pitch defined as an interval between two points at which lines extending from the sides of two segments located at both sides of the cut groove meet a line extending from a lower end of the cut groove may be 0.05 mm to 1.00 mm.

The bottom portion of the cut groove may be spaced apart from the first portion by a predetermined distance.

The predetermined distance may be 0.2 mm to 4 mm.

A bending region of the plurality of segments in a radial direction of the electrode assembly may be located in the range of 0 to 1 mm above a lower end of the cut groove.

An insulating coating layer may be formed at a boundary between the first portion and a region of the second portion provided in a section where the bottom portion of the cut groove and the first portion are separated.

The insulating coating layer may include a polymer resin and an inorganic filler dispersed in the polymer resin.

The insulating coating layer may be formed to cover a boundary portion of the first portion and the second portion along the winding direction.

The insulating coating layer may be formed to cover the boundary portion of the first portion and the second portion along the direction of the axis by a width of 0.3 mm to 5 mm.

An end of the insulating coating layer may be located within the range of −2 mm to 2 mm along the direction of the axis with respect to an end of the separator.

The insulating coating layer may be exposed beyond the separator.

A lower end of the cut groove and the insulating coating layer may be spaced apart by a distance of 0.5 mm to 2 mm.

An end of the insulating coating layer in the direction of the axis may be located within the range of −2 mm to +2 mm based on the lower end of the cut groove.

The battery further include a current collector welded to the bending surface region, wherein, in the radial direction of the electrode assembly, a welding region of the current collector may overlap with the overlapping layer number uniform region by at least 50%. In the radial direction of the electrode assembly, a region of the welding region of the current collector not overlapping with the overlapping layer number uniform region may overlap with the overlapping layer number decreasing region.

An edge of the current collector may be disposed on the bending surface region to cover an end of a bent portion of the outermost segment in the radial direction of the electrode assembly and welded to the bending surface region.

A welding strength of the current collector to the welding region may be 2 kgf/cm$^2$ or more.

A welding strength of the current collector to the welding region may be 4 kgf/cm$^2$ or more.

The second portion may be made of a metal foil, and the metal foil may have an elongation of 1.5% to 3.0% and a tensile strength of 25 kgf/mm$^2$ to 35 kgf/mm$^2$.

The metal foil may be an aluminum foil.

The first electrode may have a camber length smaller than 20 mm.

In the first portion, a ratio of a length of a short side parallel to the direction of the axis to a length of a long side parallel to the winding direction may be 1% to 4%.

In still another aspect of the present disclosure, there is also provided a battery including an electrode assembly including a first electrode, a second electrode, and a separator between the first electrode and the second electrode, the first electrode, the second electrode, and the separator are wound about an axis defining a core and an outer circumference, wherein the first electrode has a pair of first sides and a pair of second sides extending between the pair of first sides, a first portion extending between the pair of first sides, and a second portion extending between the pair of first sides, wherein the first portion is coated with an active material along a winding direction, the second portion includes a region divided into a plurality of segments that are independently bendable from the core toward the outer circumference of the electrode assembly, the plurality of segments are bent along a radial direction of the electrode assembly forming a bending surface region, and the bending surface region includes an overlapping layer number uniform region in which the number of overlapping layers of the segments is 10 or more and an overlapping layer number decreasing region located adjacent to the overlapping layer number uniform region and the number of overlapping layers of the segments in the overlapping layer number decreasing region decreases away from the overlapping layer number uniform region, along the radial direction; a battery housing including a first end with first opening and a second end opposite thereto, wherein the electrode assembly is accommodated in a space between the first end and the second end, and the battery housing is electrically connected to one of the first electrode or the second electrode to have a first polarity; a sealing body sealing the first opening at the first end of the battery housing; and a terminal electrically connected to the other of the first electrode or the second electrode to have a second polarity and having a surface exposed outside the battery housing.

In yet another aspect of the present disclosure, there is also provided a battery including an electrode assembly including a positive electrode, a negative electrode, and a separator between the positive electrode and the negative electrode, the positive electrode, the negative electrode, and the separator wound about an axis defining a core and an outer circumference, wherein the positive electrode has a pair of first sides and a pair of second sides extending between the pair of first sides, a first portion extending between the pair of first sides, and a second portion extending between the pair of first sides, wherein the first portion is coated with an active material along a winding direction, at least a part of the second portion includes an electrode tab, the second portion includes a plurality of segments that are independently bendable from the core toward the outer circumference of the electrode assembly, the plurality of segments are bent along a radial direction of the electrode assembly and overlapped into multiple layers to form a bending surface region, the bending surface region includes an overlapping layer number uniform region in which the number of overlapping layers of the segments is substantially uniform and an overlapping layer number decreasing region located adjacent to the overlapping layer number uniform region and the number of overlapping layers of the segments in the overlapping layer number decreasing region decreases away from the overlapping layer number uniform region, along the radial direction, and an overlapping thickness of segments is between 100 μm to 875 μm in the overlapping layer number uniform region; a battery housing including a first end with a first opening and a second end opposite thereto, wherein the electrode assembly is accommodated in a space between the first end and the second end, and the battery housing is electrically connected to one of the positive electrode or the negative electrode to have a first polarity; a sealing body sealing the first opening at the first end of the battery housing; and a terminal electrically connected to the other of the positive electrode or the negative electrode to have a second polarity and having a surface exposed outside the battery housing.

The battery may further include a current collector welded to the overlapping layer number uniform region such that at least a part of a welding region of the current collector overlaps with the overlapping layer number uniform region, and wherein the overlapping layers of segments in the welding region may have a thickness in the range of 100 μm to 875 μm.

In another aspect of the present disclosure, there is also provided a battery including an electrode assembly including a positive electrode, a negative electrode, and a separator between the positive electrode and the negative electrode, the positive electrode, the negative electrode, and the separator wound about an axis defining a core and an outer circumference, wherein the negative electrode has a pair of first sides and a pair of second sides extending between the pair of first sides, a first portion extending between the pair of first sides, and a second portion extending between the pair of first sides, the first portion is coated with an active material along a winding direction, at least a part of the second portion includes an electrode tab, the second portion includes a plurality of segments that are independently bendable from the core toward the outer circumference of the electrode assembly, the plurality of segments are bent along a radial direction of the electrode assembly and overlapped into multiple layers to form a bending surface region, the bending surface region includes an overlapping layer number uniform region in which the number of overlapping layers of the segments is substantially uniform and an overlapping layer number decreasing region located adjacent to the overlapping layer number uniform region and the number of overlapping layers of the segments in the overlapping layer number decreasing region decreases away from the overlapping layer number uniform region, along the radial direction, and an overlapping thickness of segments is between 50 μm to 700 μm in the overlapping layer number uniform region; a battery housing including a first end with a first opening and a second end opposite thereto, wherein the electrode assembly is accommodated in a space between the first end and the second end, and the battery housing is electrically connected to one of the first electrode or the second electrode to have a first polarity; a sealing body sealing the first opening at the first end of the battery housing; and a terminal electrically connected to the other of the first electrode or the second electrode to have a second polarity and having a surface exposed to the outside.

The battery may further include a current collector welded to the overlapping layer number uniform region such that at least a part of a welding region of the current collector overlaps with the overlapping layer number uniform region, and wherein the overlapping layers of segments in the welding region may have a thickness in the range of 50 μm to 700 μm.

In another aspect of the present disclosure, there is also provided a battery pack that includes a plurality of batteries described above.

A ratio of diameter to height of each battery may be greater than 0.4.

Each battery may have a form factor of 46110, 4875, 48110, 4880 or 4680.

Each battery may have a resistance of 4 milliohms or less.

The plurality of batteries may be arranged in a predetermined number of columns, such that the terminal of each battery and an outer surface of the second end of the battery housing of each battery may face vertically upward.

The battery pack may further include a plurality of bus bars connecting the plurality of batteries in series and in parallel, wherein the plurality of bus bars may be disposed at an upper portion of adjacent batteries among the plurality of batteries, and wherein each of the bus bars may include: a body portion extending between the adjacent batteries; a plurality of first bus bar terminals extending in a first side direction of the body portion and electrically coupled to the terminals of the adjacent batteries located in the first side direction; and a plurality of second bus bar terminals extending in a second side direction of the body portion opposite the first side direction and electrically coupled to an outer surface of the second end of the battery housing of each of the adjacent batteries located in the second side direction of the body portion.

In yet another aspect of the present disclosure, there is also provided a vehicle that includes the battery pack described above.

Finally, in another aspect of the present disclosure, there is also provided a method of producing a battery including forming an electrode assembly having a first electrode, a second electrode and a separator between the first electrode and the second electrode, wherein the first electrode, the second electrode, and the separator are wound about an axis defining a core and a circumferential surface of the electrode assembly, wherein the first electrode has a pair of first sides and a pair of second sides extending between the pair of first sides, a first portion extending between the pair of first sides, and a second portion extending between the pair of first sides, wherein the first portion is coated with an active material along a winding direction, wherein at least a part of the second portion includes an electrode tab, wherein the second portion includes a first part adjacent to the core of the electrode assembly, a second part adjacent to the outer circumference of the electrode assembly, and a third part between the first part and the second part, and the first part or the second part has a smaller height than the third part in the direction of the axis; forming a battery housing having a first end with a first opening and a second end opposite the first end, the battery housing accommodating the electrode assembly in a space between the first end and the second end and electrically connected to one of the first electrode or the second electrode to have a first polarity; forming a sealing body sealing the first opening at the first end of the battery housing; and forming a terminal electrically connected to the other of the first electrode or the second electrode to have a second polarity and having a surface exposed outside the battery housing.

Advantageous Effects

According to an embodiment of the present disclosure, since the uncoated portions themselves protruding from the upper and lower portions of the electrode assembly are used as electrode tabs, it is possible to reduce the internal resistance of the battery and increase the energy density.

According to another embodiment of the present disclosure, since the structure of the uncoated portion of the electrode assembly is improved so that the electrode assembly does not interfere with the inner circumference of the battery in the process of forming the beading portion of the battery housing, it is possible to prevent a short circuit in the cylindrical battery caused by partial deformation of the electrode assembly.

According to still another embodiment of the present disclosure, since the structure of the uncoated portion of the electrode assembly is improved, it is possible to prevent the uncoated portion from being torn when the uncoated portion is bent, and the number of overlapping layers of the uncoated portions is sufficiently increased to improve welding strength of the current collector.

According to still another embodiment of the present disclosure, it is possible to improve physical properties of a region where the current collector is welded, by applying a segment structure to the uncoated portion of the electrode and optimizing the dimensions (width, height, separation pitch) of the segments to sufficiently increase the number of overlapping layers of the segments in an area used as a welding target region.

According to still another embodiment of the present disclosure, it is possible to provide an electrode assembly with improved energy density and reduced resistance by applying a structure in which a current collector is welded over a large area to a bending surface region formed by bending the segments.

According to still another embodiment of the present disclosure, it is possible to provide a cylindrical battery having an improved design so as to perform electrical wiring at an upper portion thereof.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery housing (or the terminal) and the current collector may be carried out easily.

According to still another embodiment of the present disclosure, it is possible to provide a cylindrical battery having a structure that has a low internal resistance, prevents internal short circuit and improves welding strength of the current collector and the uncoated portion, and a battery pack and a vehicle including the cylindrical battery.

In particular, the present disclosure may provide a cylindrical battery having a diameter to height ratio of 0.4 or more and a resistance of 4 milliohms (mohm) or less, and a battery pack and a vehicle including the same.

In addition, the present disclosure may have several other effects, and such effects will be described in each embodiment, or any description that can be easily inferred by a person skilled in the art will be omitted for an effect.

DESCRIPTION OF THE DRAWINGS

The accompanying drawings illustrate embodiments of the present disclosure and together with the foregoing disclosure, serve to provide further understanding of the technical features of the present disclosure, and thus, the present disclosure is not construed as being limited to the drawing.

FIG. 6 is a plan view showing a structure of an electrode according to the third embodiment of the present disclosure.

FIG. 7a is a plan view showing a structure of an electrode according to the fourth embodiment of the present disclosure.

FIG. 8c is a plan view showing a modified structure of the electrode according to the fifth embodiment of the present disclosure.

DETAILED DESCRIPTION OF THE EMBODIMENTS

Figure 1:
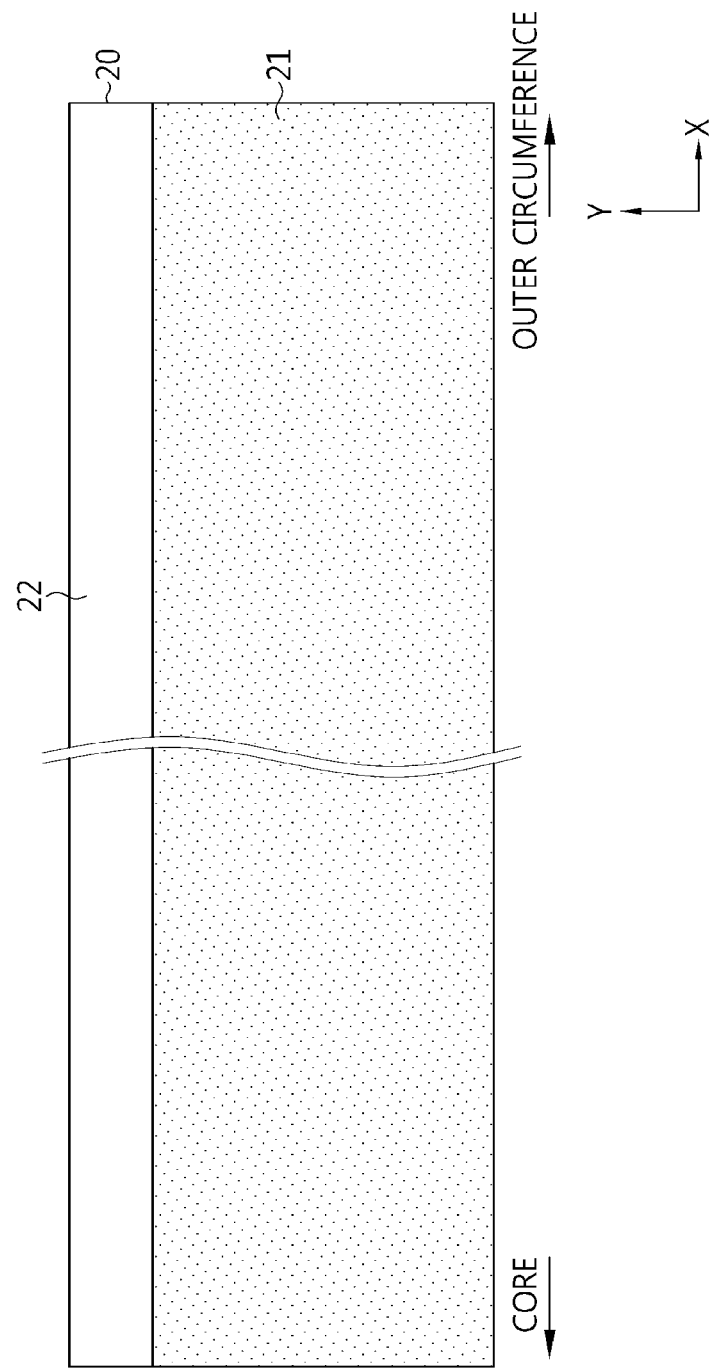
FIG. 1 is a plan view showing a structure of an electrode used for manufacturing a conventional tab-less cylindrical battery.

Hereinafter, embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the descriptions provided herein are just examples for the purpose of illustrations only, not intended to limit the scope of the disclosure, so it should be understood that other equivalents and modifications could be made thereto without departing from the scope of the disclosure.

In addition, in order to help understanding of the invention, in the accompanying drawings, some components may not be drawn to scale, but their dimensions may be exaggerated. Also, the same reference numbers may be assigned to the same components in different embodiments.

When it is explained that two objects are 'identical', this means that these objects are 'substantially identical'. Accordingly, the substantially identical objects may include deviations considered low in the art, for example, deviations within 5%. Also, when it is explained that certain parameters are uniform in a region, this may mean that the parameters are uniform in terms of an average in the corresponding region.

First, an electrode assembly according to an embodiment of the present disclosure will be described. The electrode assembly may be a jelly-roll type electrode assembly in which a first electrode and a second electrode having a sheet shape and a separator interposed therebetween are wound in one direction. The first electrode may have a pair of first sides along a winding axis of the electrode assembly and a pair of second sides extending between the pair of first sides in a winding direction of the electrode assembly. The second electrode may have a pair of third sides along a winding axis of the electrode assembly and a pair of fourth sides extending between the pair of third sides in a winding direction of the electrode assembly. The first and third sides of the first electrode and the second electrode, respectively, may be short sides, and the second and fourth sides of the first electrode and the second electrode, respectively, may be long sides. However, the present invention is not limited to a specific kind of the electrode assembly.

Preferably, at least one of the first electrode and the second electrode includes an uncoated portion not coated with an active material at a long side end in the winding direction. At least a part of the uncoated portion is used as an electrode tab by itself. The uncoated portion includes a core-side uncoated portion adjacent to a core of the electrode assembly, a circumferential uncoated portion adjacent to an outer circumference of the electrode assembly, and an intermediate uncoated portion interposed between the core-side uncoated portion and the circumferential uncoated portion. For example, in the case of the first electrode, a region extending between the pair of first sides may be coated with an active material and may be referred to as a first portion, and another region extending between the pair of first sides may not be coated with the active material and may be referred to as a second portion. Similarly, in the case of the second electrode, a region extending between the pair of third sides may be coated with an active material and may be referred to as a third portion, and another region extending between the pair of fourth sides may not be coated with the active material and may be referred to as a fourth portion.

Preferably, at least one of the core-side uncoated portion and the circumferential uncoated portion has a relatively lower height than the intermediate uncoated portion.

Figure 4:
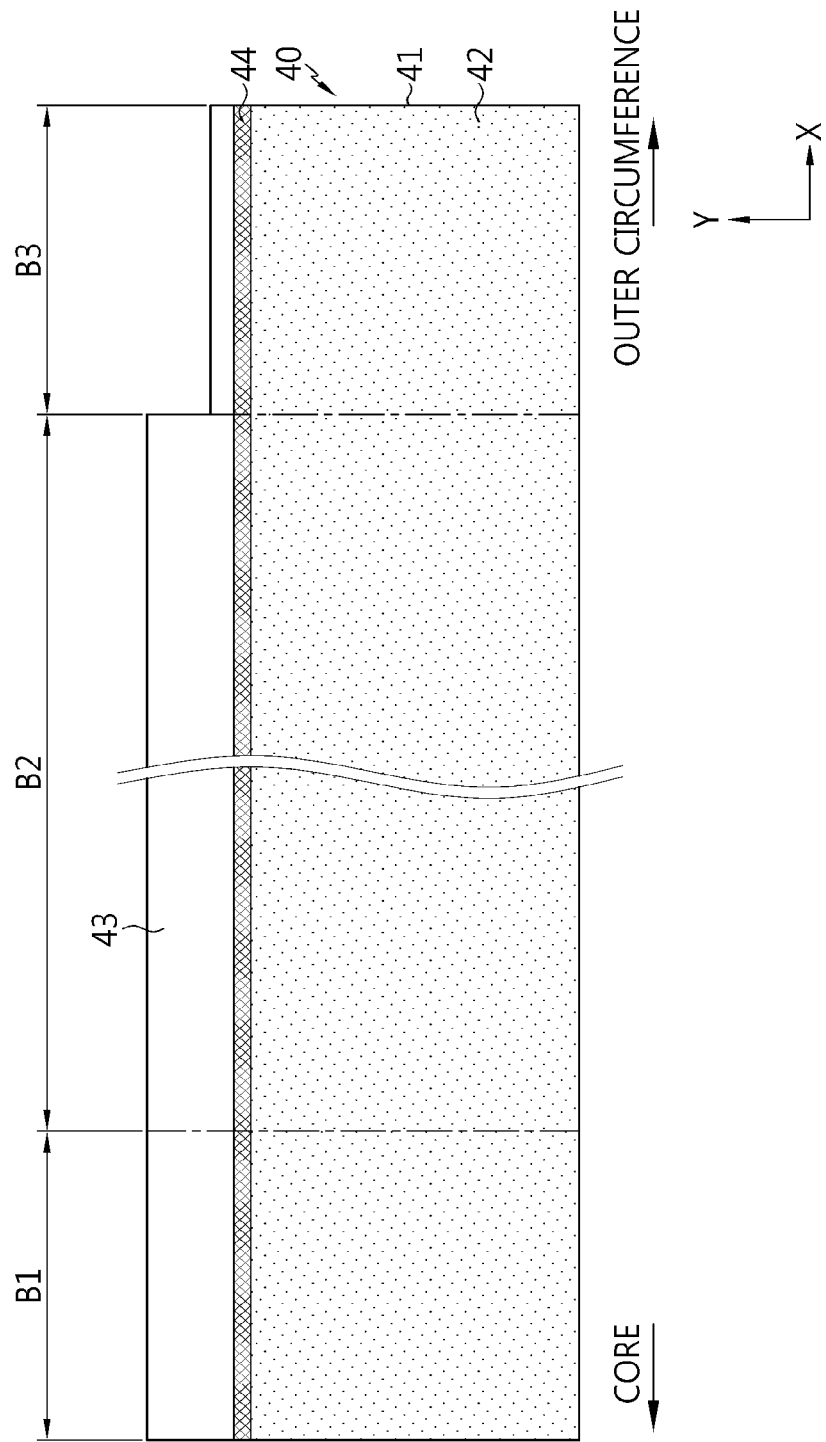
FIG. 4 is a plan view showing a structure of an electrode according to the first embodiment of the present disclosure.

FIG. 4 is a plan view showing a structure of an electrode 40 according to the first embodiment of the present disclosure.

Referring to FIG. 4, the electrode 40 of the first embodiment includes a current collector made of metal foil and an active material layer 42. The metal foil may be metal with conductivity, for example aluminum or copper, and is appropriately selected according to the polarity of the electrode 40. The active material layer 42 is formed on at least one surface of the current collector 41. The active material layer 42 is formed along the winding direction X. The electrode 40 includes an uncoated portion 43 at the long side end in the winding direction X. The uncoated portion 43 is a partial area of the current collector 41 where the active material is not coated. The region of the current collector 41 where the active material is formed may be called an active material portion.

In the electrode 40, the width of the active material portion in a direction along a short side of the current collector 41 may be 50 mm to 120 mm, and the length of the active material portion in a direction along a long side of the current collector 41 may be 3 m to 5 m. Accordingly, the ratio of the short side to the long side of the active material portion may be 1% to 4%.

Preferably, in the electrode 40, the width of the active material portion in a direction along a short side of the current collector 41 may be 60 mm to 70 mm, and the length of the active material portion in a direction along a long side of the current collector 41 may be 3 m to 5 m. Accordingly, the ratio of the short side to the long side of the active material portion may be 1.2% to 2.3%.

The ratio of the short side to the long side of the active material portion is significantly smaller than the ratio of the short side to the long side of an active material portion in the electrode used in a cylindrical battery having a form factor of 1865 or 2170, which is 6% to 11%.

Preferably, the current collector 41 may have an elongation of 1.5% to 3.0% and a tensile strength of 25 kgf/mm$^2$ to 35 kgf/mm$^2$. The elongation and tensile strength may be measured according to the measurement method of IPC-TM-650. The electrode 40 is manufactured by forming an active material layer 42 on the current collector 41 and then compressing the same. During the compression, a region of the uncoated portion 43 and a region of the active material layer 42 have different elongations. Therefore, a swell occurs on the electrode 40 after the compression, and the swell is more severe as the electrode 40 is longer.

Optimization of the elongation and tensile strength for the current collector 41 reduces the camber length after the compression to less than 20 mm when the length of the electrode 40 is about 4 m. The camber length is a maximum amount of deflection of the electrode 20 in the winding direction X when the swelled electrode 20 is unfolded. The maximum amount of deflection may be measured at a circumferential end. The electrode 40 in which the elongation and tensile strength of the current collector 41 are optimized has a small camber length, so that there is no meandering defect while notching the uncoated portion 43 or winding the electrode 40.

The current collector 41 tends to be easily ruptured as the elongation is small. When the elongation of the current collector 41 is less than 1.5%, the rolling process efficiency of the current collector 41 is deteriorated, and thus, when the electrode 40 coated with the active material layer 42 is compressed onto the current collector 41, a disconnection may occur in the current collector 41. Meanwhile, when the elongation of the current collector 41 exceeds 3.0%, the active material portion of the electrode 40 is elongated more, and accordingly the camber length increases significantly. When the tensile strength of the current collector 41 is less than kgf/mm$^2$ or more than 35 kgf/mm$^2$, the electrode process efficiency of the electrode 40 is deteriorated.

The camber phenomenon is particularly problematic in a positive electrode current collector made of an aluminum foil. According to the present disclosure, if an aluminum foil having an elongation of 1.5% to 3.0% and a tensile strength of 25 kgf/mm$^2$ to 35 kgf/mm$^2$ is used as a current collector, the camber phenomenon may be suppressed. It is preferable that an active material layer is formed on the current collector to serve as a positive electrode.

Preferably, an insulating coating layer 44 may be formed at a boundary between the active material layer 42 and the uncoated portion 43. The insulating coating layer 44 is formed such that at least a part thereof overlaps with the boundary between the active material layer 42 and the uncoated portion 43. The insulating coating layer 44 prevents a short circuit between two electrodes having different polarities and facing each other with a separator interposed therebetween. The insulating coating layer 44 has a width of 0.3 mm to 5 mm and thus may cover the boundary portion of the active material layer 42 and the uncoated portion 43. The width of the insulating coating layer 44 may vary in a winding direction of the electrode 40. The insulating coating layer 44 contains a polymer resin and may contain inorganic fillers such as $Al_2O_3$. The portion of the current collector 41 covered by the insulating coating layer 44 is not an area coated with an active material layer and thus may be regarded as an uncoated portion.

The uncoated portion 43 may comprise a core-side uncoated portion B1 adjacent to the core side of the electrode assembly, a circumferential uncoated portion B3 adjacent to the outer circumference side of the electrode assembly, and an intermediate uncoated portion B2 interposed between the core-side uncoated portion B1 and the circumferential uncoated portion B3.

The core-side uncoated portion B1, the circumferential uncoated portion B3 and the intermediate uncoated portion B2 may be defined as an uncoated portion of a region adjacent to the core, an uncoated portion of a region adjacent to the outer circumference, and an uncoated portion of a remaining region excluding the above, respectively, when the electrode 40 is wound into a jelly-roll type electrode assembly.

Hereinafter, the core-side uncoated portion B1, the circumferential uncoated portion B3, and the intermediate uncoated portion B2 will be referred to as a first part, a second part, and a third part, respectively.

In one example, the first part B1 may be an uncoated portion of the electrode area including an innermost winding turn, and the second part B3 may be an uncoated portion of the electrode area including an outermost winding turn.

In another example, the boundary of B1/B2 may be suitably defined as a point at which the height (or, change pattern) of the uncoated portion substantially changes from the core of the electrode assembly to the outer circumference, or a certain percentage (%) point based on the radius of the electrode assembly (e.g., 5% point, 10% point, 15% point of the radius, etc.).

The boundary of B2/B3 is a point at which the height (or, change pattern) of the uncoated portion substantially changes from the outer circumference of the electrode assembly to the core, or a certain percentage (%) point based on the radius of the electrode assembly (e.g., 85% point, 90% point, 95% point of the radius, etc.). When the boundary of B1/B2 and the boundary of B2/B3 are specified, the third part B2 may be specified automatically.

If only the boundary of B1/B2 is specified, the boundary of B2/B3 may be appropriately selected at a point near the circumference of the electrode assembly. In an example, the second portion may be defined as an uncoated portion of the electrode region that constitutes an outermost winding turn. Conversely, if only the boundary of B2/B3 is specified, the boundary of B1/B2 may be appropriately selected at a point near the core of the electrode assembly. In an example, the first part B1 may be defined as an uncoated portion of the electrode region that constitutes an innermost winding turn.

In the first embodiment, the height of the uncoated portion 43 is not constant and there is a relative difference in the winding direction X. That is, the height (length in the Y-axis direction) of the second part B3 is relatively smaller than that of the first part B1 and the third part B2.

Figure 5:
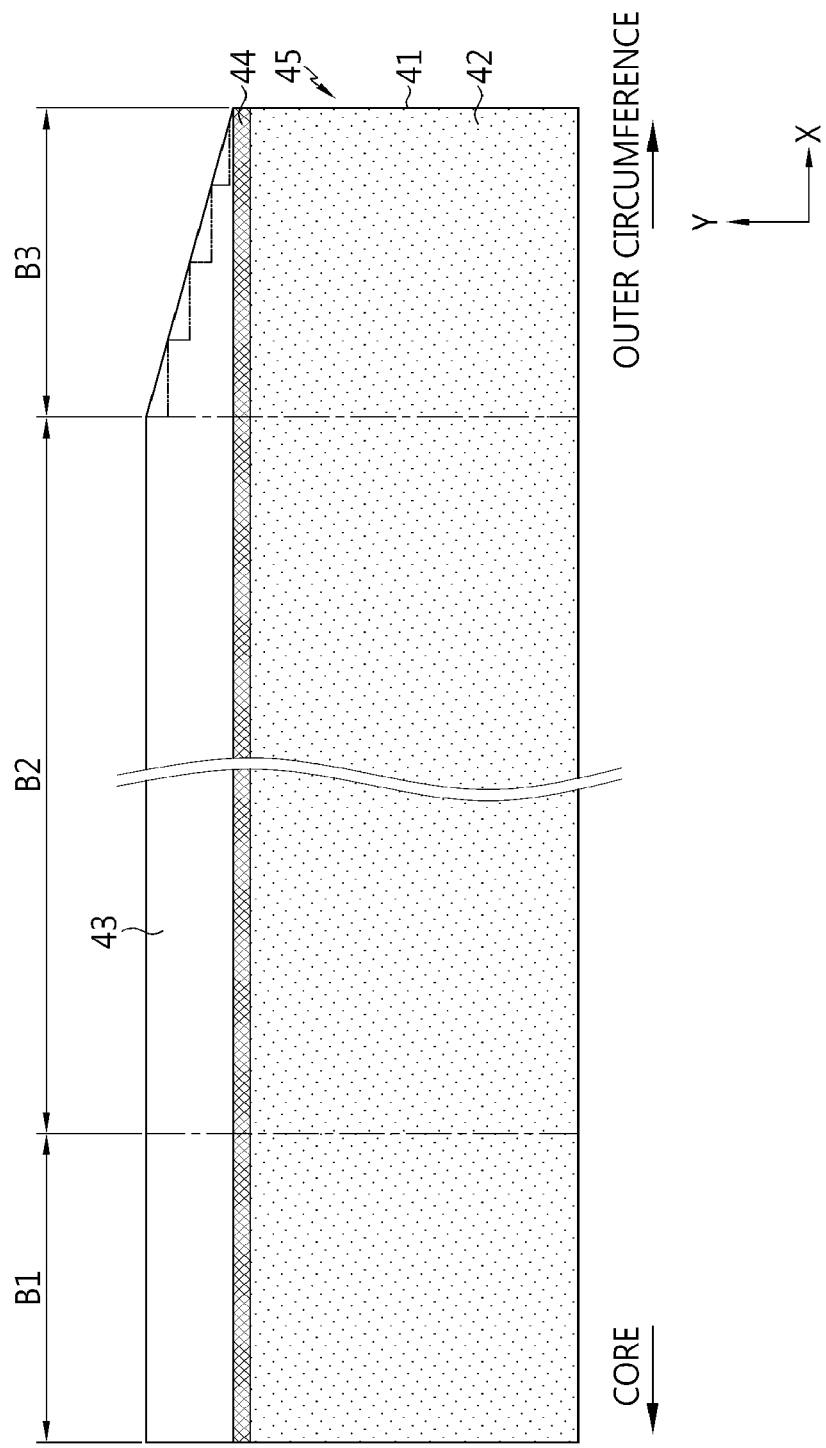
FIG. 5 is a plan view showing a structure of an electrode according to the second embodiment of the present disclosure.

FIG. 5 is a plan view showing a structure of an electrode 45 according to the second embodiment of the present disclosure.

Referring to FIG. 5, the electrode 45 of the second embodiment differs from that of the first embodiment only in that the height of the second part B3 gradually decreases toward the outer circumference, and the other configuration is substantially the same.

In one modification, the second part B3 may be transformed into a step shape (see dotted lines) in which the height is decreased stepwise.

FIG. 6 is a plan view showing a structure of an electrode 50 according to the third embodiment of the present disclosure.

Referring to FIG. 6, in the electrode 50 of the third embodiment, the heights of the first part B1 and the second part B3 are 0 or more and relatively smaller than that of the third part B2. In addition, the heights of the first part B1 and the second part B3 may be the same or different from each other.

Preferably, the height of the third part B2 may have a step shape that increases stepwise from the core to the outer circumference.

Patterns 1 to 7 classify the third part B2 based on the position where the height of the uncoated portion 43 changes. Preferably, the number of patterns and the height (length in the Y-axis direction) and width (length in the X-axis direction) of each pattern may be adjusted to disperse stress as much as possible during the bending process of the uncoated portion 43. The stress dispersion is to prevent the uncoated portion 43 from being torn when the uncoated portion is bent toward the core of the electrode assembly.

The width ($d_{B1}$) of the first part B1 is designed by applying a condition that the core of the electrode assembly is not covered when the patterns of the third part B2 are bent toward the core. The core means a cavity existing at the winding center of the electrode assembly.

In one example, the width ($d_{B1}$) of the first part B1 may increase in proportion to the bending length of Pattern 1. The bending length corresponds to the height of the pattern based on the bending point of the pattern.

Preferably, the width ($d_{B1}$) of the first part B1 may be set so that the radial width of the winding turns formed by the first part B1 is equal to or greater than the bending length of Pattern 1. In a modified example, the width ($d_{B1}$) of the first part B1 may be set so that the value obtained by subtracting the radial width of the winding turns formed by the first part B1 from the bending length of Pattern 1 is less than 0 or equal to or less than 10% of the radius of the core.

In a specific example, when the electrode 60 is used to manufacture an electrode assembly of a cylindrical battery having a form factor of 4680, the width ($d_{B1}$) of the first part B1 is set to 180 to 350 mm according to the diameter of the core of the electrode assembly and the bending length of Pattern 1.

In an embodiment, the width of each pattern may be designed to constitute one or more winding turns of the electrode assembly.

In one modification, the height of the third part B2 may have a step shape that increases and then decreases from the core to the outer circumference.

In another modification, the second part B3 may be modified to have the same structure as the second embodiment.

In still another modification, the pattern structure applied to the third part B2 may be expanded to the second part B3 (see a dotted line).

FIG. 7a is a plan view showing a structure of an electrode 60 according to the fourth embodiment of the present disclosure.

Referring to FIG. 7a in the electrode 60 of the fourth embodiment, the heights of the first part B1 and the second part B3 in the winding axis (Y) direction are 0 or more and relatively smaller than that of the third part B2. In addition, the height of the first part B1 and the second part B3 in the winding axis (Y) direction may be the same or different.

Preferably, at least a partial region of the third part B2 may include a plurality of segments 61. The plurality of segments 61 may increase in height stepwise from the core to the outer circumference. The plurality of segments 61 have a geometric shape in which the width gradually decreases from the bottom to the top. Preferably, the geometric shape is a trapezoidal shape. As will be explained later, the shape of the geometric figure may be modified in various ways.

The segment 61 may be formed by laser notching. The segment 61 may be formed by a known metal foil cutting process such as ultrasonic cutting or punching.

In the fourth embodiment, in order to prevent the active material layer 42 and/or the insulating coating layer 44 from being damaged during bending of the uncoated portion 43, it is preferable to provide a predetermined gap between a bottom G (see FIG. 7b) of a cut groove 63 between the segments 61 and the active material layer 42. This is because stress is concentrated near the bottom of the cut groove 63 when the uncoated portion 43 is bent. The gap is 0.2 mm to 4 mm, more particularly, 1.5 mm to 2.5 mm. The gap may by vary along a winding direction of the electrode 60. If the gap is adjusted within the corresponding numerical range, it is possible to prevent the active material layer 42 and/or the insulating coating layer 44 from being damaged near the bottom of the cut groove 63 by the stress generated during bending of the uncoated portion 43. In addition, the gap may prevent the active material layer 42 and/or the insulating coating layer 44 from being damaged due to tolerances during notching or cutting of the segments 61. The lower end of the cut groove 63 and the insulating coating layer 44 may be separated by 0.5 mm to 2.0 mm. When the electrode 60 is wound, the end of the insulating coating layer 44 in the winding axis (Y) direction may be located in the range of −2 mm to 2 mm along the winding axis direction with respect to the end of the separator. The insulating coating layer 44 may prevent a short circuit between two electrodes having different polarities facing each other with a separator interposed therebetween and support the bending point when the segments 61 are bent. In order to improve the effect of preventing a short circuit between the two electrodes, the insulating coating layer 44 may be exposed out of the separator. In addition, in order to further maximize the effect of preventing a short circuit between the two electrodes, the width of the insulating coating layer 44 may be increased so that its end in the winding axis (Y) direction is located higher than the lower end of the cut groove 63. In one embodiment, the end of the insulating coating layer 44 in the winding axis direction may be located within the range of −2 mm to +2 mm with respect to the lower end of the cut groove 63.

The plurality of segments 61 may form a plurality of segment groups from the core to the outer circumference. The plurality of segments belonging to the same segment group may be substantially the same as each other in terms of at least one of a width, a height, and a separation pitch. The width, height and separation pitch of segments belonging to the same segment group may be the same as each other.

Figure 7B:
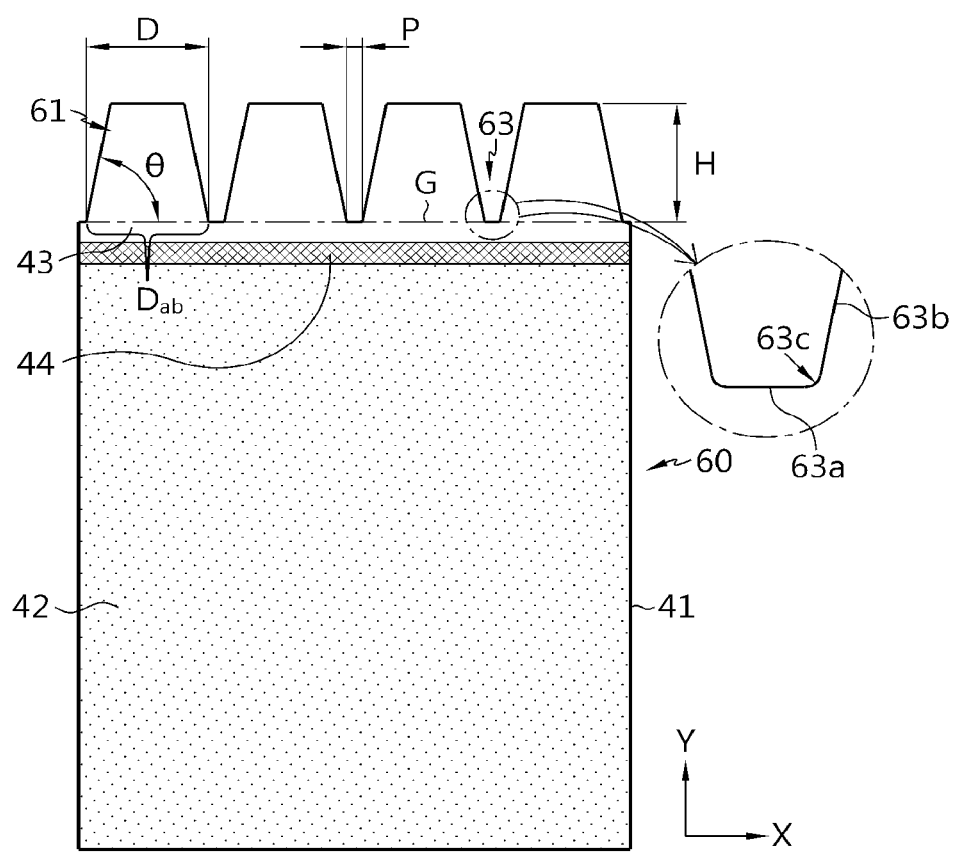
FIG. 7b is a diagram showing the definitions of width, height and separation pitch of a segment according to an embodiment of the present disclosure.

FIG. 7b is a diagram showing the definitions of width (D), height (H) and separation pitch (P) of the trapezoidal segment 61.

Referring to FIG. 7b, the width (D), height (H) and separation pitch (P) of the segment are designed to prevent abnormal deformation of the uncoated portion 43 while sufficiently increasing the number of overlapping layers in order to prevent the uncoated portion 43 near the bending point from being torn during bending of the uncoated portion 43 and improve sufficient welding strength of the uncoated portion 43.

The segment 61 is bent on a line G passing through the lower end of cut groove 63 or above the line G. The cut groove 63 may render bending of the segment 61 smooth and easy in a radial direction of the electrode assembly.

The width (D) of the segment 61 is defined as a length between two points where two straight lines extending from both sides 63b of the segment 61 meet a straight line extending from the bottom portion 63a of the cut groove 63. The height (H) of the segment 61 is defined as a shortest distance between the uppermost side of the segment 61 and a straight line extending from the bottom portion 63a of the cut groove 63. The separation pitch (P) of the segment 61 is defined as a length between two points where a straight line extending from the bottom portion 63a of the cut groove 63 meets straight lines extending from two sides 63b connected to the bottom portion 63a. When the side 63b and/or the bottom portion 63a is curved, the straight line may be replaced with a tangent line extending from the side 63b and/or the bottom portion 63a at the intersection point where the side 63b and the bottom portion 63a meet.

Preferably, the width (D) of the segment 61 is at least 1 mm. If D is less than 1 mm, an area where the segment 61 does not overlap enough to secure welding strength or an empty space (gap) may occur when the segment 61 is bent toward the core.

Preferably, the width (D) of the segment 61 may be adaptively adjusted according to the radius of the winding turn where the segment 61 is located so that the segment 61 easily overlaps in the radial direction when the segment 61 is bent toward the core of the electrode assembly.

Figure 7C:
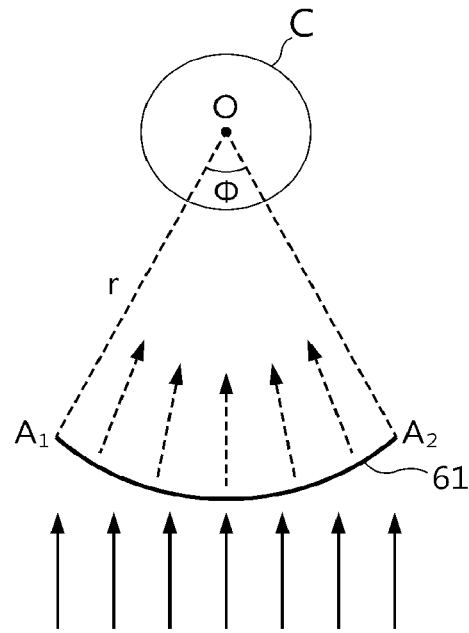
FIG. 7c is a diagram showing an arc formed by a lower end of a segment defining a width of the segment based on a core center of an electrode assembly, when the electrode is wound according to an embodiment of the present disclosure.

FIG. 7c is a diagram showing an arc ($A_1 A_2$) formed by the lower end (line segment $D_{ab}$ of FIG. 7b) of the segment 61 where the width (D) of the segment 61 is defined when the electrode 60 is wound according to an embodiment of the present disclosure, based on the core center O of the electrode assembly.

Referring to FIG. 7c, the arc ($A_1A_2$) has a length corresponding to the width (D) of the segment 61, and has a circumferential angle (Φ) with respect to the core center of the electrode assembly. The circumferential angle (Φ) may be defined as an angle between two line segments connecting both ends of the arc ($A_1A_2$) and the core center O on a plane perpendicular to the winding axis passing through the arc ($A_1A_2$).

For example, when the radius of the electrode assembly is 22 mm, the radius of the core is 4 mm, and the segment 61 starts to be disposed from the winding turn located at a point where the radius is 7 mm, if the circumferential angle (Φ) of the segments 61 is constant at 28.6 degrees, the width (D) of the segment 61 may be proportionally increased according to the radius (r) of the winding turn where the segment 61 is located as shown in Table 1 below. That is, the width of the segment 61 may be increased at substantially the same rate by 0.5 mm whenever the radius (r) of the winding turn increases by 1 mm.

TABLE 1

| | winding turn radius (mm) | | | | | | | | | | | | | | | |
|---|---|---|---|---|---|---|---|---|---|---|---|---|---|---|---|---|
| | 7.0 | 8.0 | 9.0 | 10.0 | 11.0 | 12.0 | 13.0 | 14.0 | 15.0 | 16.0 | 17.0 | 18.0 | 19.0 | 20.0 | 21.0 | 22.0 |
| segment width (D, mm) | 3.5 | 4.0 | 4.5 | 5.0 | 5.5 | 6.0 | 6.5 | 7.0 | 7.5 | 8.0 | 8.5 | 9.0 | 9.5 | 10.0 | 10.5 | 11.0 |
| circumferential angle (degree) | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 | 28.6 |

When the length of the arc ($A_1A_2$) of the segment 61 is the same, the circumferential angle (Φ) decreases as the radius (r) of the winding turn where the segment 61 is located increases. Conversely, when the circumferential angle (Φ) of the segment 61 is the same, as the radius (r) of the winding turn where the segment 61 is located increases, the length of the arc ($A_1A_2$) increases proportionally.

The circumferential angle (Φ) affects the bending quality of the segment 61. In the drawing, a solid arrow indicates a direction of a force applied to bend the segment 61, and a dotted arrow indicates a direction in which the segment 61 is bent. The bending direction is toward the core center O.

The circumferential angle (Φ) of the segment 61 may be 45 degrees or less and more particularly 30 degrees or less depending on a radius (r) of a winding turn at which the segment is located, thereby to improve the uniformity of bending and prevent cracks from occurring.

In one aspect, the circumferential angle (Φ) of the segment 61 may increase or decrease gradually or stepwise along a radial direction of the electrode assembly within the above numerical range. In other aspects, the circumferential angle (Φ) of the segment 61 may increase gradually or stepwise and then decreases gradually or stepwise along a radial direction of the electrode assembly within the above numerical range, or vice versa. In another aspect, the circumferential angle (Φ) of the segment 61 may be substantially the same along a radial direction of the electrode assembly within the above numerical range.

According to the experiment, when the circumferential angle (Φ) of the segment 61 exceeds 45 degrees, the bending shape of the segment 61 is not uniform. The force applied to a middle part of the segment 61 is seriously different from the force applied to a side part, so the segment 61 is not uniformly pressed in the circumferential direction. In addition, if the pressing force is increased for the uniformity of bending, there is a possibility that cracks may occur in the uncoated portion 43 near the cut groove 63.

In one embodiment, the circumferential angle (Φ) of the segments 61 included in the electrode 60 is substantially the same, and the width of the segment 61 may be proportionally increased as the radius (r) of the winding turn where the segment 61 is located increases. The term 'substantially identical' means that they are completely identical or that there is a deviation of less than 5%.

Preferably, the width D(r) of the segment 61 located in a winding turn having a radius of r with respect to the core center O of the electrode assembly may be determined in a range satisfying Formula 1 below.

$$1 \leq D(r) \leq (2*\pi*r/360°)*45° \qquad \text{<Formula 1>}$$

Preferably, each of the plurality of segments 61, as the radius (r) of the winding turn where the segment is located based on the core center of the electrode assembly increases, the width D(r) in the winding direction increases gradually or stepwise, or vice versa.

In another aspect, each of the plurality of segments 61, as the radius (r) of the winding turn where the segment is located based on the core center of the electrode assembly increases, the width D(r) in the winding direction increases gradually or stepwise within the range of 1 mm to 11 mm, or vice versa.

In another aspect, each of the plurality of segments 61, as the radius (r) of the winding turn where the segment is located based on the core center of the electrode assembly increases, the width D(r) in the winding direction increases gradually or stepwise and then decrease gradually or stepwise, or vice versa.

In another aspect, each of the plurality of segments 61, as the radius (r) of the winding turn where the segment is located based on the core center of the electrode assembly increases, the width D(r) in the winding direction increases gradually or stepwise and then decrease gradually or stepwise within the range of 1 mm to 11 mm, or vice versa.

In another aspect, a variation ratio of D(r), as the radius (r) of the winding turn where the segment is located based on the core center of the electrode assembly increases, may be substantially the same or different depending on the radius (r).

In another aspect, a variation ratio of D(r), as the radius (r) of the winding turn where the segment is located based on the core center of the electrode assembly increases, may be substantially the same or different depending on the radius (r), within the range of 1 mm to 11 mm.

Referring to FIG. 7b again, the height (H) of the segment 61 may be 2 mm or more. If D2 is less than 2 mm, an area where the segment 61 does not overlap enough to secure welding strength or an empty space (gap) may occur when the segment 61 is bent toward the core.

The height (H) of the segment 61 may be determined by applying the condition that the segment 61 does not cover the core when being bent toward the core. Preferably, the height (H) of the segment 61 may be adjusted so that the core may be opened to the outside by 90% or more of its diameter.

Preferably, the height (H) of the segment 61 may gradually increase from the core to the outer circumference depending on the radius of the core and the radius of the winding turn where the segment 61 is located.

In one embodiment, assuming that the height (H) of the segment 61 increases stepwise over N steps from $h_1$ to $h_N$ as the radius of the winding turn increases, when a $k^{th}$ height of the segment 61 is $h_k$ (k is a natural number of 1 to N), a start radius of the winding turn including the segment 61 having the height $h_k$ is $r_k$, and the radius of the core is $r_c$, the height $h_1$ to $h_N$ of the segment 61 may be determined to satisfy Formula 2 below.

$$2 \text{ mm} \leq h_k \leq r_k - \alpha * r_c \text{(preferably, } \alpha \text{ is 0.90 to 1)} \quad \text{<Formula 2>}$$

If the height ($h_k$) of the segment 61 satisfies Formula 2, even if the segment 61 is bent toward the core, 90% or more of the diameter of the core may be opened to the outside.

In one example, the total winding turn radius of the electrode 60 is 22 mm, the height of the segment 61 starts from 3 mm, the height of the segment 61 increases sequentially to 3 mm, 4 mm, 5 mm, and 6 mm whenever the radius of the winding turn including the segment 61 increases by 1 mm, and the height of the segment 61 may be kept substantially the same at 6 mm in the remaining winding turn. That is, among the radii of all winding turns, the radial direction width of a height variable region of the segment 61 is 3 mm, and the remaining radial region corresponds to a height uniform region.

In this case, according to the radius ($r_c$) of the core of the electrode assembly, the start radius $r_1$, $r_2$, $r_3$, $r_4$ of the winding turn including the segment 61 with the height of 3 mm, 4 mm, 5 mm and 6 mm may be as shown in Table 2 below, when α is 1 and the equal sign condition is applied in a right inequation of the above formula.

TABLE 2

| Item | | segment height (mm) | | | |
|---|---|---|---|---|---|
| | | 3 ($h_1$) | 4 ($h_2$) | 5 ($h_3$) | 6 ($h_4$) |
| core radius ($r_c$) (mm) | 2 | 5 ($r_1$) | 6 ($r_2$) | 7 ($r_3$) | 8 ($r_4$) |
| | 2.5 | 5.5 ($r_1$) | 6.5 ($r_2$) | 7.5 ($r_3$) | 8.5 ($r_4$) |
| | 3 | 6 ($r_1$) | 7 ($r_2$) | 8 ($r_3$) | 9 ($r_4$) |
| | 3.5 | 6.5 ($r_1$) | 7.5 ($r_2$) | 8.5 ($r_3$) | 9.5 ($r_4$) |
| | 4 | 7 ($r_1$) | 8 ($r_2$) | 9 ($r_3$) | 10 ($r_4$) |

When the segment 61 is disposed at the radial location shown in Table 2, the core is not covered by the segment 61 even if the segment 61 is bent toward the core. Meanwhile, $r_1$, $r_2$, $r_3$, $r_4$ shown in Table 2 may be shifted toward the core according to a value. In one example, when α is 0.90, $r_1$, $r_2$, $r_3$, $r_4$ may be shifted toward the core by 10% of the core radius. In this case, when the segment 61 is bent toward the core, 10% of the core radius is covered by the segment 61. $r_1$, $r_2$, $r_3$, $r_4$ shown in Table 2 are limit values of the location where the segment 61 starts. Accordingly, the location of the segment 61 may be shifted by a predetermined distance to the outer circumference further to the radius shown in Table 1.

Figure 7D:
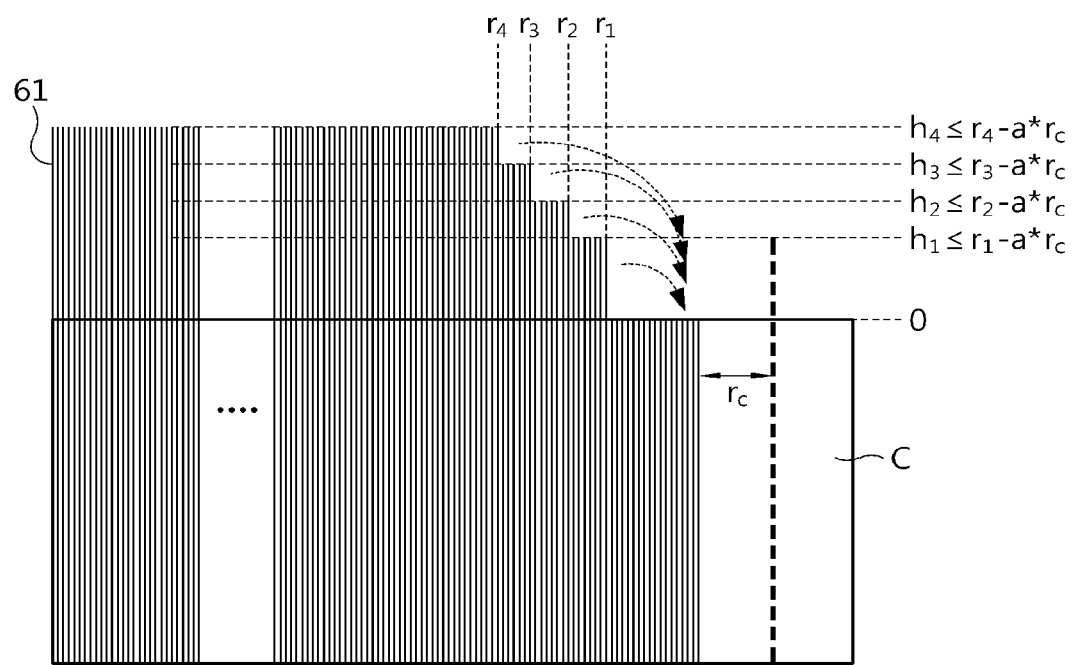
FIG. 7d is a diagram showing a relationship of heights $h_1$, $h_2$, $h_3$, $h_4$ of the segments, a core radius ($r_c$), and radii $r_1$, $r_2$, $r_3$, $r_4$ of a winding turns where the segments start appearing, according to an embodiment the present disclosure.

FIG. 7d is a diagram schematically illustrating the relationship between the heights $h_1$, $h_2$, $h_3$, $h_4$ of the segment, the core radius ($r_c$), and the radius $r_1$, $r_2$, $r_3$, $r_4$ of the winding turn at which the segment 61 begins to appear.

Referring to Table 2 and FIG. 7d together, for example, when the radius ($r_c$) of the core C is 3 mm, the start radius $r_1$, $r_2$, $r_3$ and $r_4$ of the winding turn including the segment 61 having the height of 3 mm ($h_1$), 4 mm ($h_2$), 5 mm ($h_3$) and 6 mm ($h_4$) may 6 mm, 7 mm, 8 mm and 9 mm, respectively, and the height of the segment 61 may be maintained as 6 mm from the radius of 9 mm to the last winding turn. Also, a winding turn having a radius less than 6 mm ($r_1$) may not include the segment 61. In this example, since the segment 61 of height 3 mm ($h_1$) closest to the core C is located from the winding turn having the radius of 6 mm, even if the segment 61 is bent toward the core C, the segment 61 covers only the radial region of 3 mm to 6 mm, and the core C is substantially not shielded. According to the a value of Formula 2, the location of the segment may be shifted toward the core C within 10% of the core radius ($r_c$).

In another aspect, a height of the segment 61, as the start radius (r) of the winding turn where the segment 61 is located based on the core center of the electrode assembly increases, may increase in substantially the same rate or different rage depending on the radius (r).

Preferably, the height (H) of the segment 61 may satisfy Formula 2 and simultaneously the maximum height of the segment may be limited.

Figure 7E:
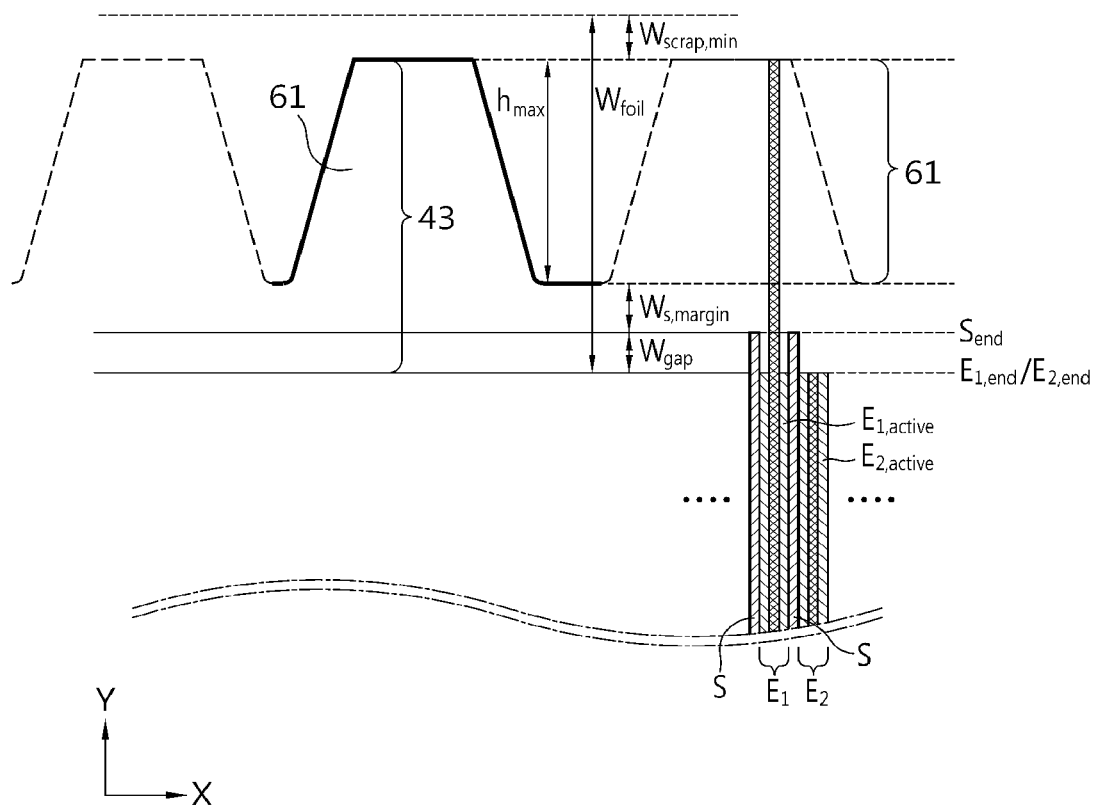
FIG. 7e is a diagram for determining a maximum value ($h_{max}$) of the height (H) of the segments in a height variable region of the segments.

FIG. 7e is a conceptual diagram for determining the maximum value ($h_{max}$) for the height (H) of the segment 61 in the height variable region of the segment 61.

Referring to FIG. 7e, in the winding structure of the electrode assembly, an electrode ($E_1$) including the segment 61 faces an electrode ($E_2$) of opposite polarity with the separator S interposed therebetween in the radial direction. Both surfaces of the electrode ($E_1$) are coated with an active material layer ($E_{1,active}$), and both surfaces of the electrode ($E_2$) are also coated with an active material layer ($E_{2,active}$). For electrical insulation, the end ($S_{end}$) of the separator S may further extend outward by a length corresponding to the insulation gap ($W_{gap}$) from the end ($E_{2,end}$) of the electrode ($E_2$). In addition, the end of the electrode ($E_1$) does not extend outward further to the end of the electrode ($E_2$) for electrical insulation. Therefore, a region corresponding to the insulation gap ($W_{gap}$) should be secured at the lower end of the uncoated portion 43. Also, when the electrodes ($E_1$, $E_2$) and the separator S are wound, the end ($S_{end}$) of the separator S causes meandering. Therefore, in order for the segment 61 to be exposed out of the separator S, a region ($W_{margin,min}$) corresponding to the minimum meandering margin of the separator S should be allocated to the uncoated portion 43. In addition, in order to cut the segment 61, a minimum cut scrap margin ($W_{scrap,min}$) should be allocated to the end of the current collector foil. Therefore, the maximum height ($h_{max}$) of the segment 61 in the height variable region of the segment 61 may be determined by Formula 3 below. In Formula 3, $W_{foil}$ corresponds to the width of the current collector foil before the current collector foil is cut.

$$h_{max} = W_{foil} - W_{scrap,min} - W_{margin,min} - W_{gap} \quad \text{<Formula 3>}$$

Preferably, the insulation gap ($W_{gap}$) may be in the range of 0.2 mm to 6 mm when the first electrode is a positive electrode and in the range of 0.1 mm to 2 mm when the first electrode is a negative electrode.

Preferably, the minimum cut scrap margin ($W_{scrap,min}$) may be in the range of 1.5 mm to 8 mm. The minimum cut scrap margin ($W_{scrap,min}$) may not be considered depending on the process of cutting the segment 61. For example, the cut groove 63 may be formed such that the upper side of the segment 61 is coincided with that of the current collector foil. In this case, $W_{scrap,min}$ of the formula 3 may be zero.

Preferably, the minimum meandering margin ($W_{margin,min}$) may be in the range of 0 to 1 mm.

In one example, the minimum cut scrap margin ($W_{scrap,min}$) may be 1.5 mm, and the minimum meandering margin ($W_{margin,min}$) of the separator S may be 0.5 mm. Under these conditions, when the width ($W_{foil}$) of the current collector foil before forming the segment 61 is 8 mm to 12 mm and the insulation gap ($W_{gap}$) is 0.6 mm, 0.8 mm and 1.0 mm, the result of calculating the maximum height ($h_{max}$) of the segment 61 using Formula 3 is as shown in Table 3 below.

TABLE 3

| item | | separator ↔ negative electrode gap (mm) | | |
|---|---|---|---|---|
| | | 0.6 | 0.8 | 1 |
| current collector foil width (mm) | 8 | 5.4 | 5.2 | 5 |
| | 9 | 6.4 | 6.2 | 6 |
| | 10 | 7.4 | 7.2 | 7 |
| | 11 | 8.4 | 8.2 | 8 |
| | 12 | 9.4 | 9.2 | 9 |

Considering Table 3, the maximum height ($h_{max}$) of the segment 61 in the height variable region of the segment 61 may be set to 10 mm. Therefore, in the height variable region of the segment 61, the height of the segment 61 satisfies Formula 2 and at the same time may be increased stepwise or gradually along the radial direction of the electrode assembly in the region of 2 mm to 10 mm.

Referring to FIG. 7b again, the separation pitch (P) of the segment 61 may be adjusted in the range of 0.05 to 1 mm. If the separation pitch (P) is less than 0.05 mm, cracks may occur in the uncoated portion 43 near the lower end of the cut groove 63 due to stress when the electrode travels in a winding process or the like. Meanwhile, if the separation pitch (P) exceeds 1 mm, an empty space (gap) or an area where the segments 61 do not overlap with each other enough to sufficiently secure the welding strength may occur when the segment 61 is bent.

Meanwhile, when the current collector 41 of the electrode 60 is made of aluminum, the separation pitch (P) is may be set to 0.5 mm or more. When the separation pitch (P) is 0.5 mm or more, it is possible to prevent cracks from occurring in the lower portion of the cut groove 63 even if the electrode 60 travels at a speed of 100 mm/sec or more under a tension of 300 gf or more during the winding process or the like.

According to the experimental results, when the current collector 41 of the electrode 60 is an aluminum foil with a thickness of 15 μm and the separation pitch (P) is 0.5 mm or more, cracks do not occur in the lower portion of the cut groove 63 when the electrode 60 travels under the above conditions.

As shown in FIG. 7b, the cut groove 63 is interposed between two segments 61 adjacent to each other in the winding direction X. The cut groove 63 corresponds to the space created as the uncoated portion 43 is removed. Preferably, the both ends of the lower portion of the cut groove 63 has a round shape. That is, the cut groove 63 includes a substantially flat bottom portion 63a and a round portion 63c. The round portion 63c connects the bottom portion 63a and the side 63b of the segment 61. In a modified example, the bottom portion 63a of the cut groove may be replaced with an arc shape. In this case, the sides 63b of the segments 61 may be smoothly connected by the arc shape of the bottom portion 63a.

The curvature radius of the round portion 63c may be in the range of 0 to 0.5 mm, more particularly in the range of 0 to 0.1 mm, or even more particularly in the range of 0.01 mm to 0.05 mm. When the curvature radius of the round portion 63c meets the above numerical range, it is possible to prevent cracks from occurring in the lower portion of the cut groove 63 while the electrode 60 is traveling in the winding process or the like.

In the plurality of segments 61, a lower internal angle (θ) may increase from the core to the outer circumference. The lower internal angle (θ) is an angle between a straight line extending from the bottom portion 63a of the cut groove 63 and a straight line extending from the side portion 53b of the segment 61. When the segment 61 is symmetrical in the left and right direction, the lower internal angles (θ) at the left and right sides are substantially the same.

If the radius of the electrode assembly increases, the radius of curvature increases. If the lower internal angle (θ) of the segments 61 increases as the radius of the electrode assembly increases, the stress generated in the radial and circumferential directions when the segment 61 is bent may be relieved. In addition, if the lower internal angle (θ) increases, when the segment 61 is bent, its area overlapping with the segment 61 located at an inner side and the number of overlapping layers also increase together, thereby ensuring uniform welding strength in the radial and circumferential directions and forming the bending surface region in a flat form.

Preferably, the lower internal angle (θ) may be determined by the radius of the winding turn where the segment 61 is located and the width (D) of the segment 61.

Figure 7F:
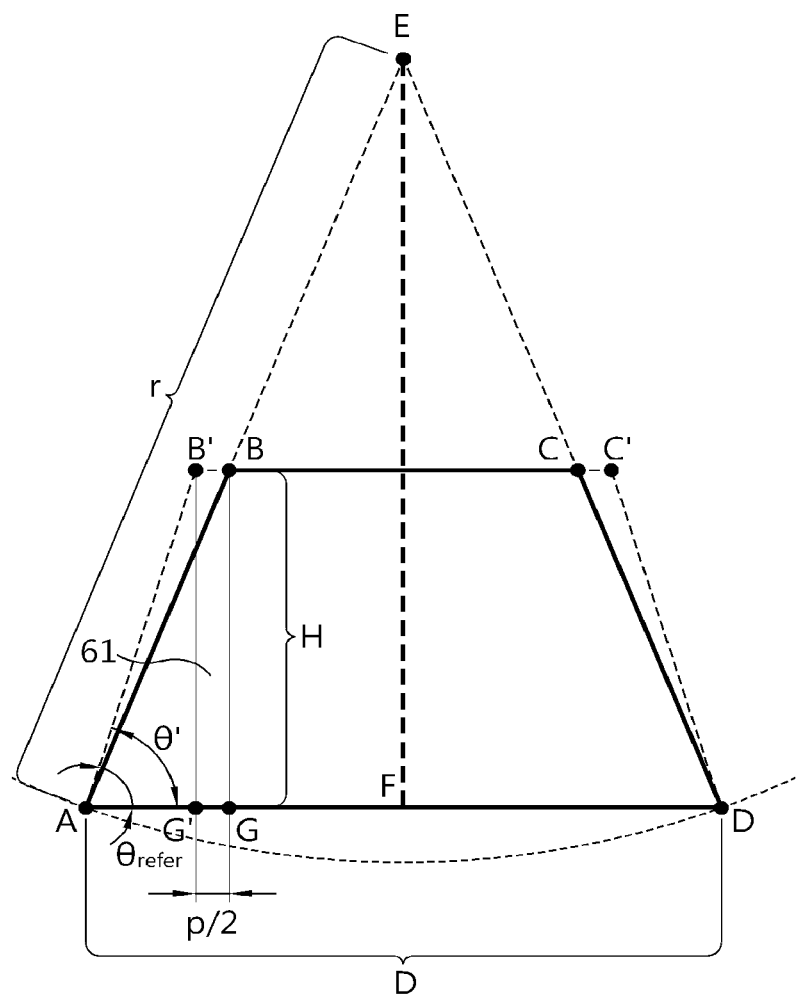
FIG. 7f is a schematic diagram for illustrating a formula for determining a lower internal angle (θ) of the segment.

FIG. 7f is a schematic diagram for explaining a formula for determining the lower internal angle (θ) of the segment 61.

Referring to FIG. 7f, the side of the segment 61 identically coincides with a line segment AE and a line segment DE connecting the core center (E) with both endpoints A and D of a line segment AD corresponding to the width (D) of the segment 61.

When the side of the segment 61 extends in the most ideal direction, assuming that line segment EF is approximately equal to the line segment AE and the line segment DE, the lower internal angle ($θ_{refer}$) of the segment 61 may be determined approximately from the width (D) of the segment 61 and the radius (r) of the winding turn where the segment 61 is located by using Formula 4 below.

$$\theta_{refer} = \cos^{-1}\left(\frac{0.5 * D}{r}\right) \qquad <\text{Formula 4}>$$

The angle in Formula 4 is an ideal criterion angle for the lower internal angle ($θ_{refer}$) of the segment 61. Meanwhile, a separation pitch (P) exists between adjacent segments 61 located in the same winding turn. The length of the separation pitch (P) is indicated by p. Since the separation pitch (P) exists between adjacent segments 61, a tolerance may be given to the lower internal angle (θ) by 50% of the separation pitch (P). That is, the width of the upper side BC of the segment 61 may be increased by p/2 at maximum to the upper side B'C'. The lower internal angle (θ') reflecting the tolerance may be expressed by Formula 5 below. The lower internal angle ($θ_{refer}$) is the ideal criterion angle ∠BAG, and the lower internal angle (θ') is the angle ∠B'AG' that reflects the tolerance according to the separation pitch (P). In Formula 5, H corresponds to the height of the segment 61, and p corresponds to the separation pitch.

$$\theta' = \tan^{-1}\left(\frac{2*H*\tan\theta_{refer}}{2*H - p*\tan\theta_{refer}}\right) \qquad <\text{Formula 5}>$$

Preferably, the lower internal angle (θ) of the segment 61 located at each winding turn of the electrode assembly may satisfy Formula 6 below. Then, when the segments 61 are bent toward the core center of the electrode assembly, the segments 61 adjacent in the circumferential direction do not interfere with each other and be bent smoothly.

$$\cos^{-1}\left(\frac{0.5*D}{r}\right) \le \theta \le \tan^{-1}\left(\frac{2*H*\tan\theta_{refer}}{2*H - p*\tan\theta_{refer}}\right) \qquad <\text{Formula 6}>$$

In one example, when the electrode 60 forms a winding structure with a diameter of 22 mm and a core radius of 4 mm, the lower internal angle of the segment 61 may be increased stepwise in the range of 60 degrees to 85 degrees in the height variable region.

Meanwhile, the lower internal angles of the segment 61 at the left and right sides may be different from each other. Nonetheless, at least one of the lower internal angles at the left and right sides of the segment 61 may be designed to satisfy the formula 6.

Referring to FIG. 7a again, the width ($d_{B1}$) of the first part B1 is designed so that the core of the electrode assembly is opened to the outside by 90% or more based on the diameter of the core when the segment 61 of the third part B2 is bent toward the core. The width ($d_{B1}$) of the first part B1 may increase in proportion to the bending length of segment 61 of Group 1. The bending length corresponds to a length from the bending point to the uppermost side of the segment 61. Preferably, when the electrode 60 is used to manufacture an electrode assembly of a cylindrical battery having a form factor of 4680, the width ($d_{B1}$) of the first part B1 may be set as 180 mm to 350 mm according to the diameter of the core of the electrode assembly and the height of the segment 61 included in Group 1.

The bending point of the segment 61 may be set at a line passing through the lower end of the cut groove 63 or at a point spaced upward from the line by a predetermined distance. When the segments 61 are bent toward the core at a point spaced from the lower end of the cut groove 63 by a predetermined distance, the segments may overlap more easily in the radial direction. When the segments 61 are bent, a segment located at an outer side based on the center of the core presses a segment at an inner side. At this time, if the bending point is spaced from the lower end of the cut groove 63 by a predetermined distance, a segment at an inner side is pressed by a segment at an outer side in the winding axis direction, so that the segments overlap better. Preferably, the separation distance of the bending point may be 1 mm or less. The minimum height of the segment 61 is 2 mm and thus a ratio of the separation distance to the minimum height of the segment 61 may be 50% or less.

In one embodiment, the width of each segment group may be designed to constitute the same winding turn of the electrode assembly. Here, the winding turn may be counted based on the end of the first part B1 when the electrode 60 is in a wound state.

In another modified example, the width of each segment group may be designed to constitute at least one winding turn of the electrode assembly.

In still another modification, the width and/or height and/or separation pitch of the segment 61 belonging to the same segment group may be increased or decreased gradually and/or stepwise and/or irregularly within the group or between the adjacent groups.

Groups 1 to 8 are only an example of segment groups included in the third part B2. The number of groups, the number of segments 61 included in each group, and the width of each group may be adjusted desirably so that the segments 61 overlap in multiple layers to disperse stress as much as possible during the bending process of the uncoated portion 43 and sufficiently secure the welding strength with a current collector.

In another modification, the height of the second part B3 may be decreased gradually or step by step, as in the first embodiment and the second embodiment.

In still another modification, the segment structure of the third part B2 is expandable to the second part B3 (see dotted line). In this case, the second part B3 may also include a plurality of segments like the third part B2. Preferably, the segment structure of the second part B3 may be substantially the same as the segment group at the outermost side of the third part B2. In this case, the segments included in the second part B3 and the third part B2 may have substantially the same in terms of the width, height, and separation pitch. In a modification, the segment of the second part B3 may have a width and/or height and/or separation pitch greater than that of the third part B2.

In third part B2, the region (Groups 1 to 7) in which the height of the segment 61 increases stepwise based on the winding direction of the electrode 60 is defined as a height variable region of the segment, and the segment group at the last (Group 8) may be defined as a height uniform region in which the height of the segment is maintained uniformly.

That is, in the third part B2, when the height of the segment 61 is gradually increased from $h_1$ to $h_N$, the region in which segments 61 having a height of $h_1$ to $h_{N-1}$ (N is height index and a natural number of 2 or above) is arranged corresponds to a height variable region, and the region in which segments 61 having a height of $h_N$ are arranged corresponds to a height uniform region. The ratio of the height variable region and the height uniform region to the length of the electrode 60 in the winding direction will be described later with reference to specific embodiments.

When the electrode plate 60 is used to manufacture an electrode assembly of a cylindrical battery having a form factor of 4680, the width ($d_{B1}$) of the first part B1 may be 180 to 350 mm. The width of Group 1 may be 35 to 40% of the width of the first part B1. The width of Group 2 may be 130 to 150% of the width of Group 1. The width of Group 3 may be 120 to 135% of the width of Group 2. The width of group 4 may be 85 to 90% of the width of group 3. The width of Group 5 may be 120 to 130% of the width of Group 4. The width of Group 6 may be 100 to 120% of the width of Group 5. The width of Group 7 may be 90 to 120% of the width of Group 6. The width of Group 8 may be 115 to 130% of the width of Group 7. The width ($d_{B3}$) of the second part B3 may be 180 to 350 mm, like the width of the first part B1.

The reason that the widths of Groups 1 to 8 do not show a constant increase or decrease pattern is that the segment width gradually increases from Group 1 to Group 8, but the number of segments included in the group is limited to an integer number and the thickness of the electrode has slight deviation along a winding direction. Accordingly, the number of segments may be reduced in a specific segment group. Therefore, the widths of the groups may show an irregular change pattern as in the above example from the core to the outer circumference.

That is, assuming that the width in the winding direction for each of the three segment groups consecutively adjacent to each other in the circumferential direction of the electrode assembly is W1, W2, and W3, respectively, it is possible to include a combination of segment groups in which W3/W2 is smaller than W2/W1.

In the specific example, Groups 4 to 6 corresponds to the above case. The width ratio of Group 5 to Group 4 is 120 to 130%, and the width ratio of Group 6 to Group 5 is 100 to 120%, which is smaller than 120 to 130%.

Figure 7G:
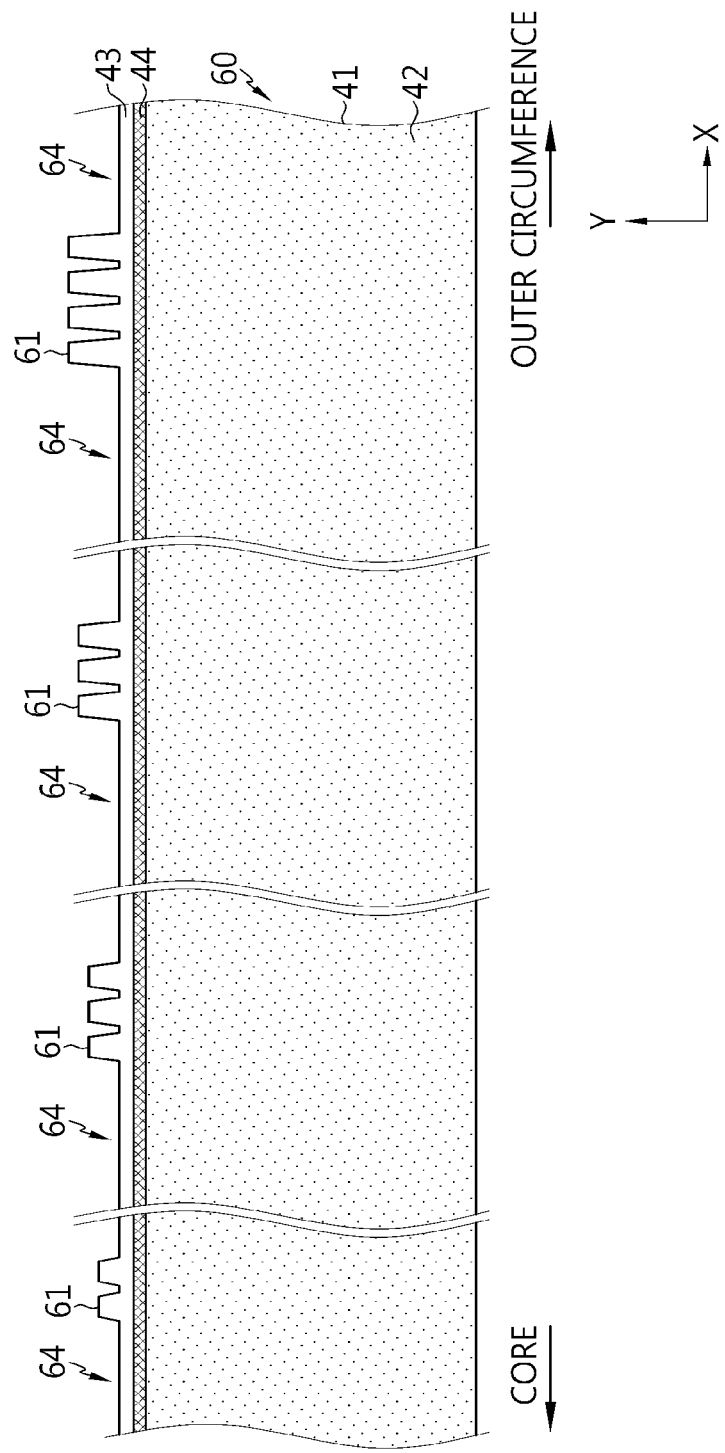
FIG. 7g is a plan view showing a modified structure of the electrode according to the fourth embodiment of the present disclosure.

According to another modification, when the uncoated portion 43 of the electrode 60 has a segment structure, the electrode 60 may include a segment skip region 64 in which some of the plurality of segments are regularly or irregularly omitted as shown in FIG. 7g.

Preferably, the segment skip region 64 may be provided in plural. In an example, the width of the segment skip region 64 may be constant from the core toward the outer circumference. In another example, the width of the segment skip region 64 may increase or decrease regularly or irregularly from the core toward the outer circumference. Preferably, the height of the uncoated portion existing in the segment skip region 64 may correspond to the height of the first part B1 and/or the second part B3.

The number of segments 61 existing between the segment skip regions 64 may be at least one. As shown in FIG. 7g, the electrode 60 may include an uncoated portion in which the number of segments 61 existing between the segment skip regions 64 increases from the core toward the outer circumference.

Figure 7H:
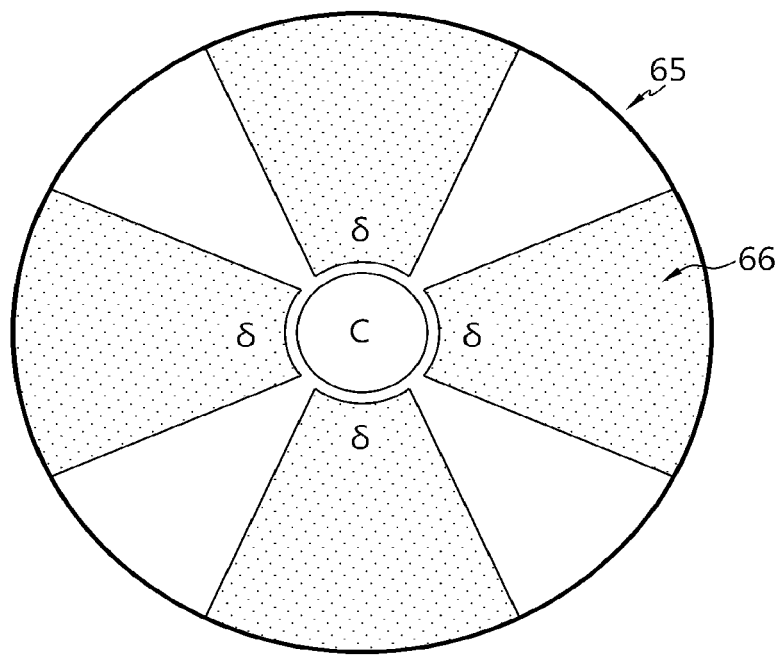
FIG. 7h is a top plan view showing an independent region where a plurality of segments may be located, when the electrode according to the modification of the present disclosure is wound as an electrode assembly.

Preferably, the width of the segment skip region 64 may be set such that when the electrode 60 is wound as shown in FIG. 7h, segments located in each winding turn may be located in a preset independent region 66 with respect to the core center C of the electrode assembly 65.

That is, the plurality of segments 61 may be located within a plurality of independent regions 66 with respect to the core center C when the electrode assembly 65 is viewed in the winding axis direction. The number of independent regions 66 may be changed to 2, 3, 4, 5, or the like.

Preferably, the independent region 66 may have a sectoral shape. In this case, the angle between the independent regions 66 may be substantially the same. In addition, the circumferential angle (δ) of the independent region 66 may be 20 degrees or more, optionally 25 degrees or more, optionally 30 degrees or more, optionally 35 degrees or more, or optionally 40 degrees or more.

In a modified example, the independent region 66 may have a geometric shape such as a square, a rectangle, a parallelogram, a trapezoidal, or the like.

In the present disclosure, the shape of the segment 61 may be variously modified.

Figure 8A:
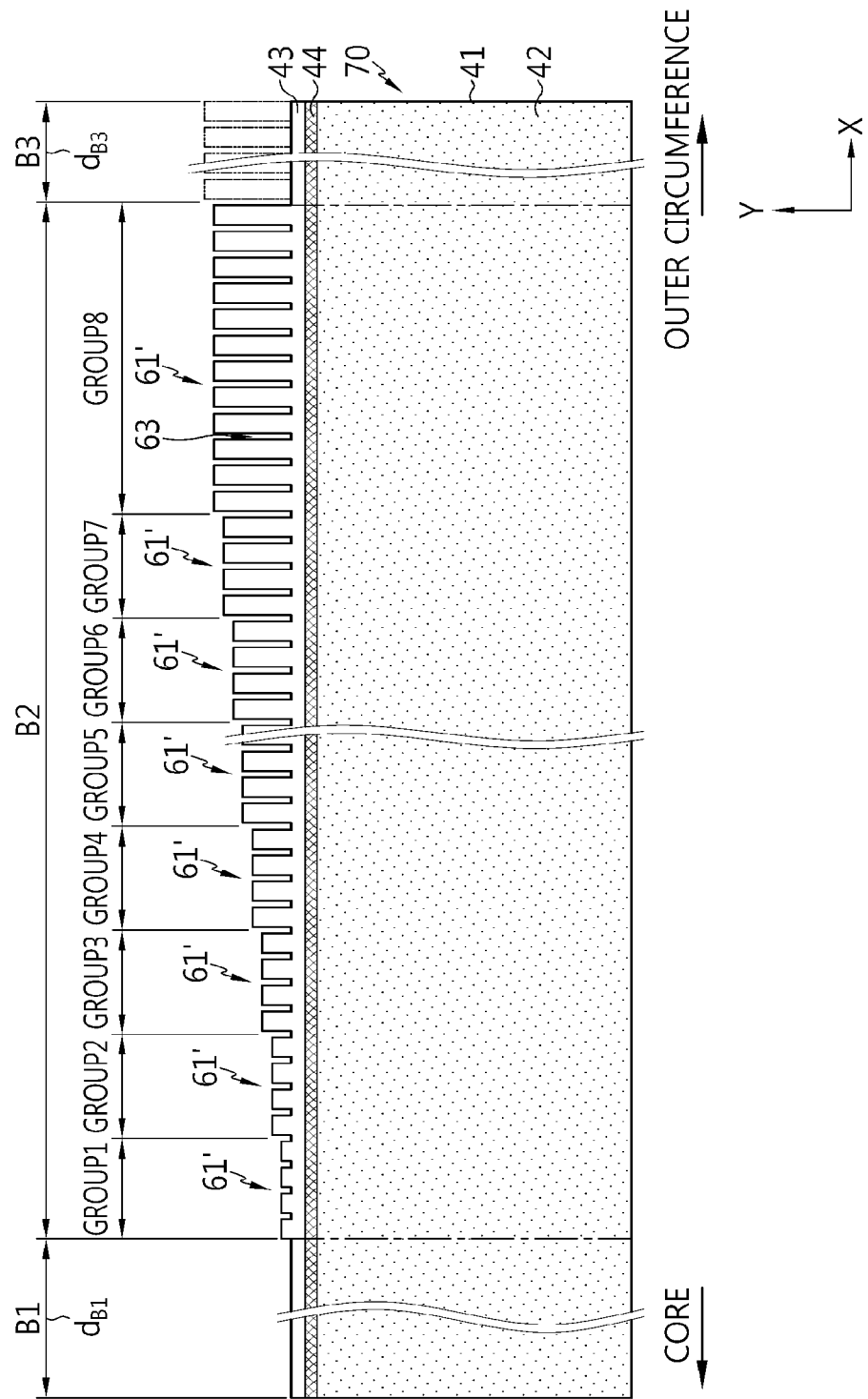
FIG. 8a is a plan view showing a structure of an electrode according to the fifth embodiment of the present disclosure.

FIG. 8a is a plan view showing the structure of an electrode 70 according to the fifth embodiment of the present disclosure.

Referring to FIG. 8a, the electrode 70 of the fifth embodiment has substantially the same configuration as that of the former embodiment, except that the shape of the segment 61' is different. Therefore, unless otherwise stated, the configuration of the fourth embodiment may be equally applied to the fifth embodiment.

The segment 61' has a geometric shape with substantially the same width at the top and bottom. Preferably, the segment 61' may have a rectangular shape.

Figure 8B:
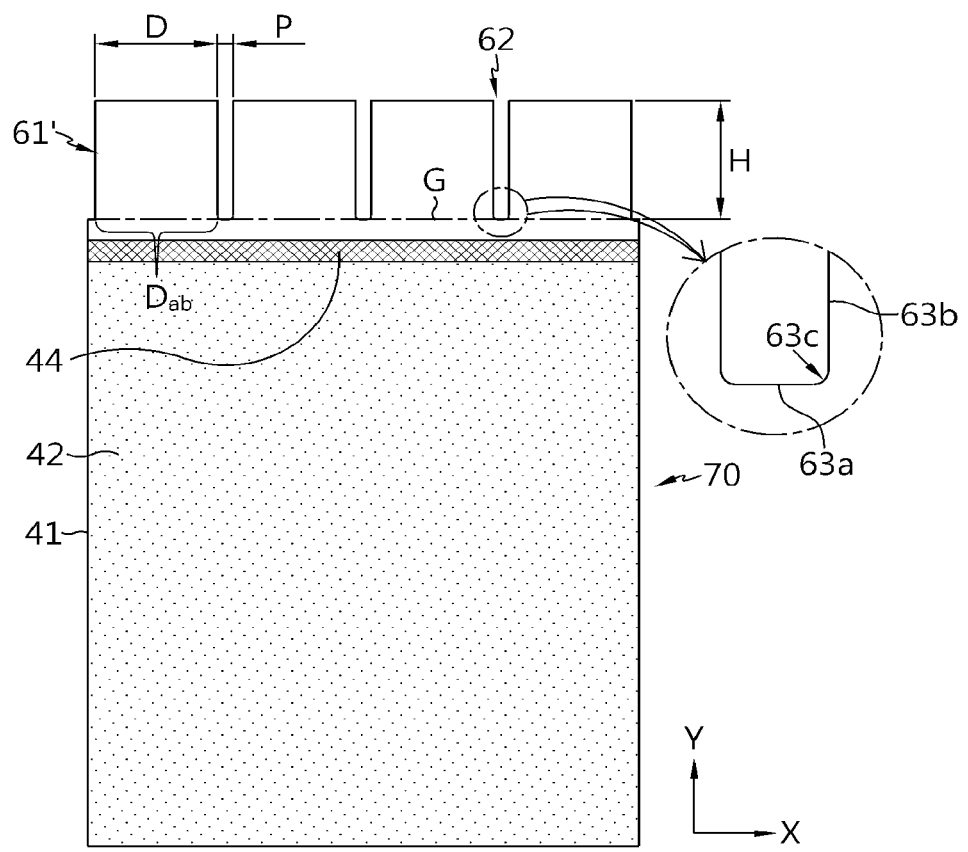
FIG. 8b is a diagram showing the definitions of width, height and separation pitch of a segment according to another embodiment of the present disclosure.

FIG. 8b is a diagram showing the definition of the width, height, and separation pitch of the rectangular segment 61'.

Referring to FIG. 8b, the width (D), height (H) and separation pitch (P) of the segment 61' may be set to prevent the uncoated portion 43 from being abnormally deformed while sufficiently increasing the number of overlapping layers of the uncoated portion 43, in order to prevent the uncoated portion 43 from being torn while bending the uncoated portion 43 and improve the welding strength with a current collector. The abnormal deformation means that the uncoated portion below the bending point does not maintain a straight line state and is collapsed and deformed irregularly.

The width (D) of the segment 61' is defined as a length between two points where two straight lines extending from both sides of the segment 61' meet a straight line extending from the bottom portion 63a of the cut groove 63. The height (H) of the segment 61' is defined as a shortest distance between the uppermost side of the segment 61' and the straight line extending from the bottom portion 63a of the cut groove 63. The separation pitch (P) of the segment 61' is defined as a length between two points where the straight line extending from the bottom portion 63a of the cut groove 63 meets straight lines extending from two sides 63b connected to the bottom portion 63a. When the side 63b and/or the bottom portion 63a is curved, the straight line may be replaced with a tangent line extending from the side 63b and/or the bottom portion 63a at the intersection point where the side 63b and the bottom portion 63a meet.

Preferably, the conditions regarding the width (D), height (H), and separation pitch (P) of the segment 61' are substantially the same as those of the fourth embodiment, and thus will not be described again. However, since the segment 61' has a rectangular shape, the lower internal angle of the segment 61' may be constant at 90 degrees.

Similar to the electrode 60 of the fourth embodiment, the electrode 70 according to the fifth embodiment may also include a segment skip region 64 in which some of the plurality of segments are regularly or irregularly omitted as shown in FIG. 8c.

In addition, when the electrode 70 including the segment skip region 64 is wound into an electrode assembly, the segments may be located within a plurality of independent regions 66 as shown in FIG. 7h.

As in the fourth embodiment and the fifth embodiment, when the third part B2 and the second part B3 include a plurality of segments 61, 61', the shape of each segment 61, 61' may be variously modified.

Preferably, the segment may be deformed into various shapes while satisfying at least one of the following conditions.

Condition 1: The width of the lower portion is greater than the width of the upper part.
Condition 2: The width of the lower portion and the width of the upper part are the same.
Condition 3: The width remains the same from the bottom to the top.
Condition 4: The width decreases from bottom to top.
Condition 5: The width decreases and then increases from bottom to top.
Condition 6: The width increases and then decreases from bottom to top.
Condition 7: The width increases from the bottom to the top and remains constant.

Condition 8: The width decreases from the bottom to the top and remains constant.

Condition 9: The internal angle of one side of the lower portion and the internal angle of the other side are the same Here, the internal angle may be defined as an angle formed by the side portion of the segment based on the width direction of the lower portion of the segment. When the side portion is curved, the internal angle is defined as an angle between a tangent line drawn at the lowest end of the curve and the width direction of the lower portion of the segment.

Condition 10: The internal angle of one side of the lower portion and the internal angle of the other side are different from each other.

Condition 11: The internal angle of one side of the lower portion and the internal angle of the other side of the lower portion have an acute angle, a right angle, or an obtuse angle, respectively.

Condition 12: Left and right symmetrical with respect to the winding axis direction.

Condition 13: Left and right asymmetrical with respect to winding axis direction.

Condition 14: The side portion has a straight line shape.

Condition 15: The side portion is curved.

Condition 16: The side portion is outwardly convex.

Condition 17: The side portion is inwardly convex.

Condition 18: The corner of the upper portion and/or the lower portion has a structure where a straight line meets a straight line.

Condition 19: The corner of the upper portion and/or the lower portion has a structure where a straight line meets a curve.

Condition 20: The corner of the upper portion and/or the lower portion has a structure where a curve meets a curve Condition 21: The corner of the upper portion and/or the lower portion has a round structure.

Figure 9:
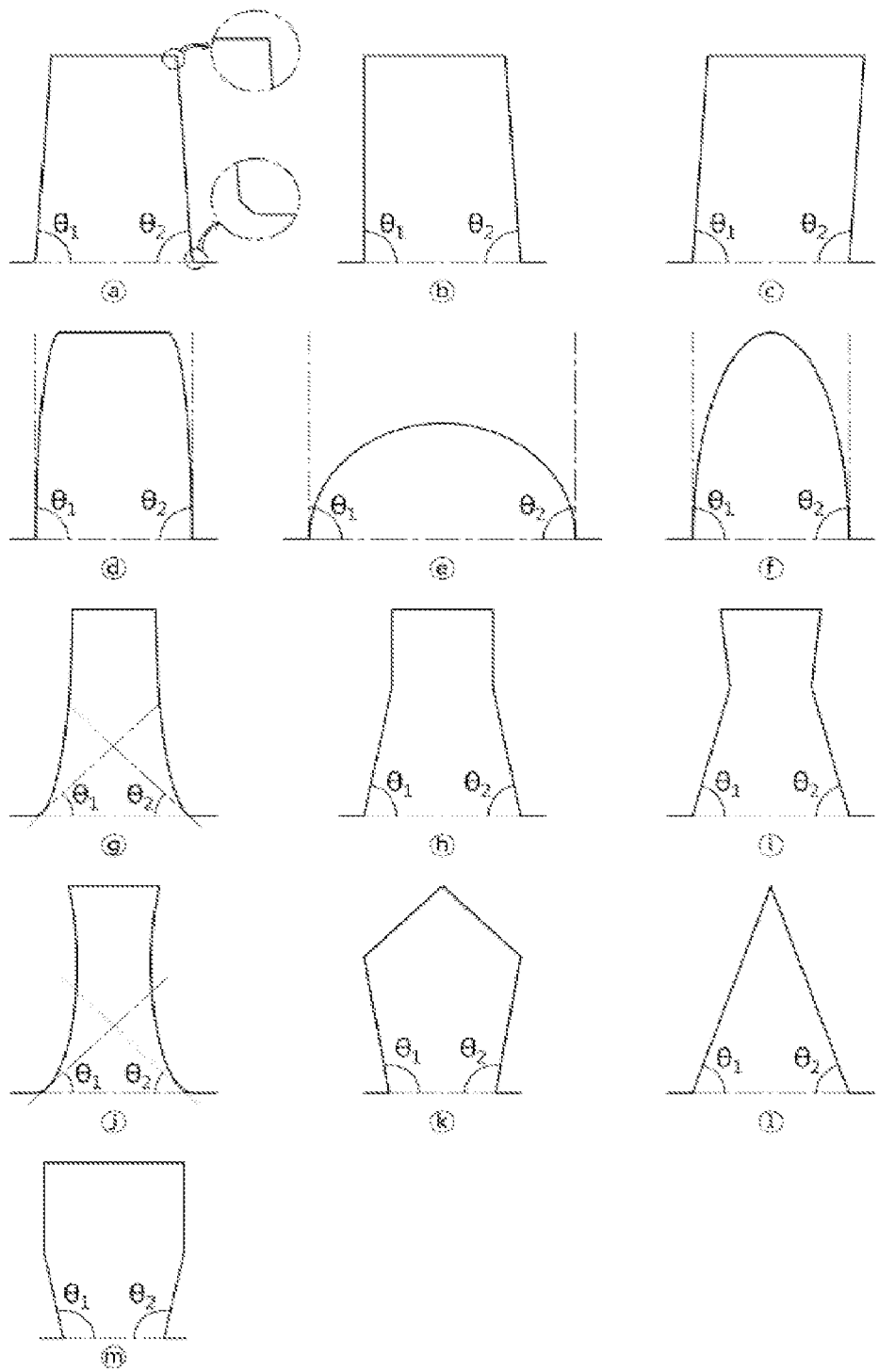
FIG. 9 is a diagram showing segment structures according to various modifications of the present disclosure.

FIG. 9 is a diagram exemplarily showing the shapes of segments according to modified examples of the present disclosure.

As shown in the drawing, the segment may have various geometric shapes in which a dotted line connecting the bottom portions of the cut grooves at both sides is the base. The geometric figure has a structure in which one or more straight lines, one or more curves, or a combination thereof is connected. In one example, the segment may have a polygonal shape, a round shape, or various shapes combined therewith.

Specifically, the segment may have a left-right symmetric trapezoidal shape ((a)); a left-right asymmetric trapezoidal shape ((b)); a parallelogram shape ((c)); a triangular shape ((l)); a pentagonal shape ((k)); an arc shape ((e)); or a semielliptical shape ((f)).

Since the shape of the segment is not limited to those shown in FIG. 9, it may be transformed into other polygonal shapes, other round shapes, or a combination thereof so as to satisfy at least one of Conditions 1 to 21 described above.

In the polygonal shapes (a), (b), (c), (k) and (l) of the segment, the corner of the upper portion and/or the lower portion may be a shape where a straight line meets a straight line, or a round shape (see the enlarged view of the corner of the upper portion and the lower portion of the shape (a)).

In the polygonal shapes (a), (b), (c), (k) and (l) of the segment and the curve shapes (e) and (f) of the segment, the internal angle ($\theta_1$) at one side of the lower portion and the internal angle ($\theta_2$) at the other side thereof may be the same or different from each other, and the internal angle ($\theta_1$) at one side of the lower portion and the internal angle ($\theta_2$) at the other side thereof may be any one of an acute angle, a right angle, or an obtuse angle, respectively. The internal angle is an angle where the base and the side of a geometric figure meet. When the side is a curve, the straight line may be replaced by a tangent line extending at a point where the base and the side meet.

The shape of the side portion of the segment having a polygonal shape may be modified in various ways.

In one example, the side portion of the segment shape (a) may be transformed into an outwardly convex curve as in the shape (d) or into a curve recessed into the segment as in the shape (g) or (j).

In another example, the side portion of the segment shape (a) may be transformed into a bent straight line recessed into the segment as in the shape (h) or (i). The side portion of the segment shape (a) may be transformed into a bent straight line convex outwardly.

In the segment shapes (d), (g), (j), (h) and (i) in which the side portion is variously modified, the internal angle ($\theta_1$) at one side of the lower portion and the internal angle ($\theta_2$) at the other side thereof may be the same or different from each other, and the internal angle ($\theta_1$) of one side of the lower portion and the internal angle ($\theta_2$) at the other side thereof may be any one of an acute angle, a right angle, or an obtuse angle, respectively.

The width of the segment may have various change patterns from the bottom to the top.

In one example, the width of the segment may be kept constant from the bottom to the top (shape (c)). In another example, the width of the segment may gradually decrease from the bottom to the top (shapes (a), (b), (d), (e), (f), and (g)). In still another example, the width of the segment may gradually decrease and then increase from the bottom to the top (shape (i) and (j)). In still another example, the width of the segment may gradually increase from the bottom to the top and then decrease (shape (k)). In still another example, the width of the segment may gradually decrease from the bottom to the top and then be maintained constant (shape (h)). The width of the segment may gradually increase from the bottom to the top and be maintained constant (shape (m)).

Meanwhile, among the shapes of the segments shown in FIG. 9, a polygonal shape with a flat top may be rotated by 180 degrees. In one example, when the segment shape (a), (b), (d) or (g) is rotated by 180 degrees, the width of the segment may gradually increase from the bottom to the top. In another example, if the segment shape (h) is rotated by 180 degrees, the width of the segment may be kept constant from the bottom to the top and then gradually increase.

In the above embodiments (modifications), according to another aspect of the present disclosure, it is possible to change the shapes of the segments 61, 61' differently depending on the region of the third part B2. In one example, a round shape (e.g., semicircle, semielliptical, etc.) that is advantageous for stress distribution is applied to a region where the stress is concentrated, and a polygonal shape (e.g., a rectangle, trapezoid, parallelogram, etc.) with the largest area may be applied a region where the stress is relatively low.

In the above embodiments (modifications), the segment structure of the third part B2 may also be applied to the first part B1. However, if the segment structure is applied to the first part B1, when the segments 61, 61' of the third part B2 are bent according to the radius of curvature of the core, the end of the first part B1 may be bent toward the outer circumference, which is called reverse forming. Therefore, the first part B1 has no segment, or even if the segment structure is applied to the first part B1, it is desirable to control the width and/or height and/or separation pitch of the segments 61, 61' as small as possible in consideration of the radius of curvature of the core such that reverse forming does not occur.

According to still another aspect of the present disclosure, after the electrode 60, 70 is wound into an electrode assembly, the segments exposed at the upper and lower portions of the electrode assembly may be overlapped into multiple layers along the radial direction of the electrode assembly to form a bending surface region.

Figure 10A:
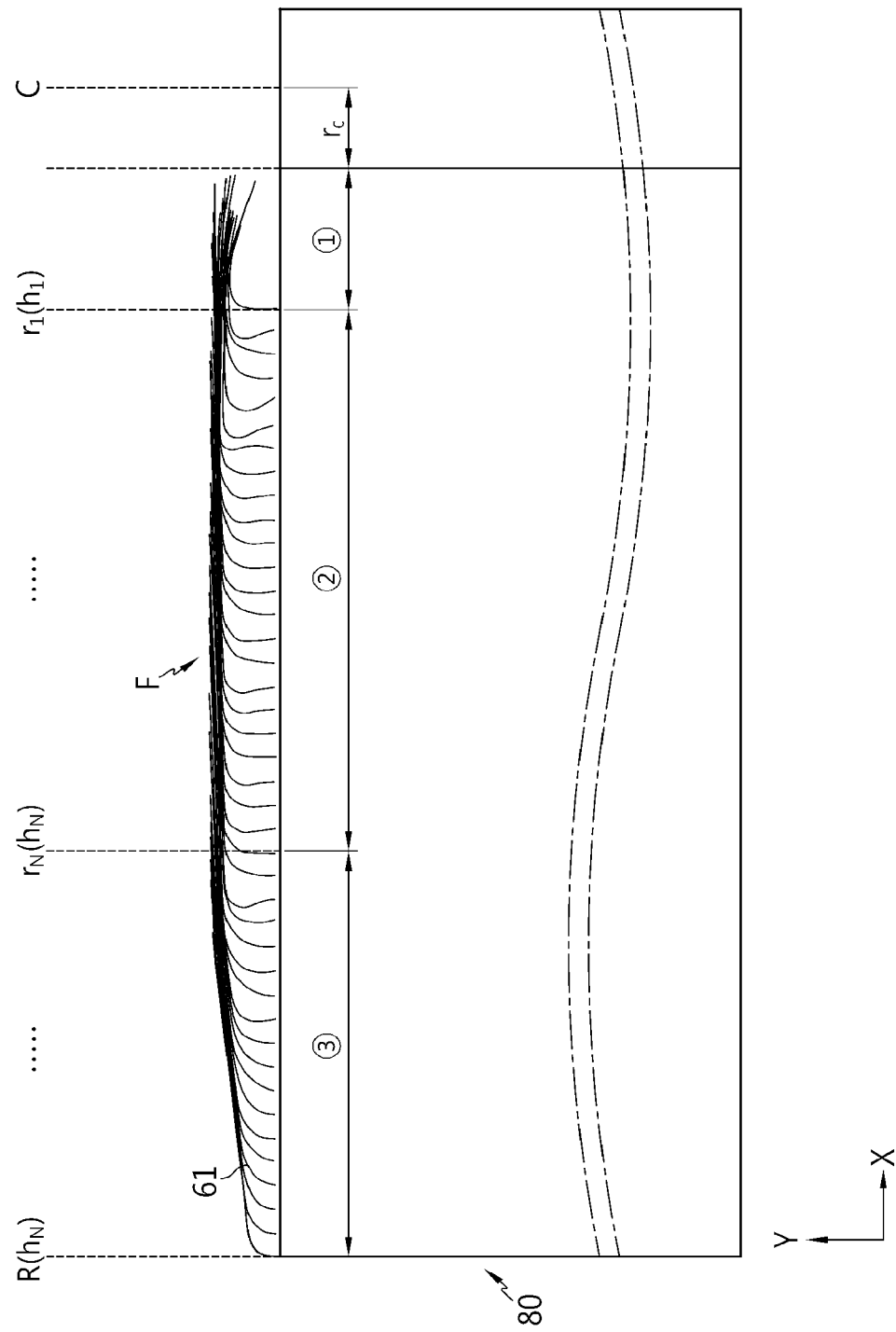
FIG. 10a is a diagram showing a cross section of a bending surface region formed by bending the segment toward the core of the electrode assembly.
Figure 10B:
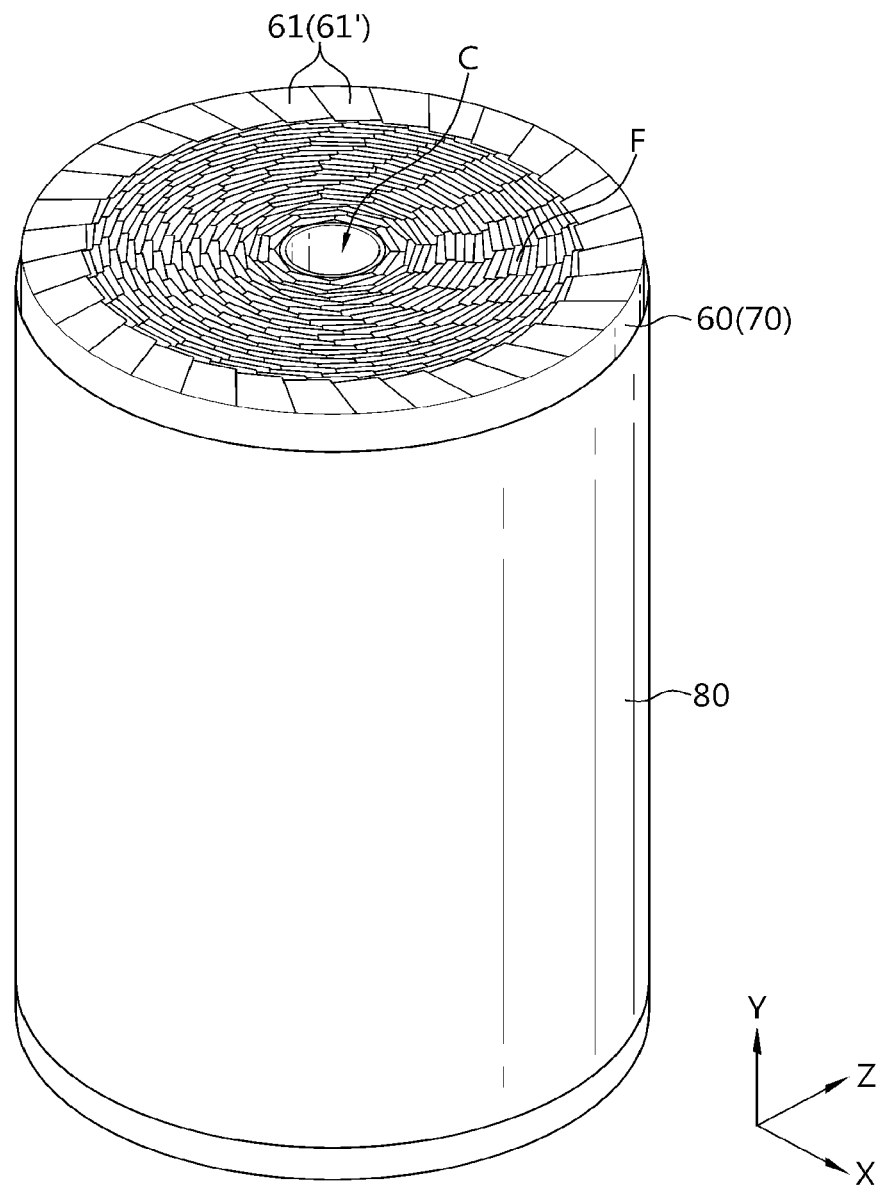
FIG. 10b is a top perspective view schematically showing an electrode assembly in which the bending surface region is formed.

FIG. 10a is a schematic diagram showing a cross section of the bending surface region F formed as the segment 61 is bent toward the core C of the electrode assembly 80. In FIG. 10a, only on a left side of the cross section of the bending surface region F is shown with respect to the winding axis of the electrode assembly 80. The bending surface region F may be formed at both the upper and lower portions of the electrode assembly 80. FIG. 10b is a top perspective view schematically showing the electrode assembly 80 at which the bending surface region F is formed.

Referring to FIGS. 10a and 10b, the bending surface region F has a structure in which the segments 61 are overlapped into multiple layers in the winding axis direction. The overlapping direction is the winding axis direction (Y). Region ① is a segment skip region (the first part B1) having no segment, and Regions ② and ③ are regions where the winding turn including the segment 61 is located. Region ② is a height variable region in which the height of the segment 61 is variable, and Region ③ is a height uniform region in which the height of the segment is maintained uniformly to the outer circumference of the electrode assembly. As will be described later, the radial lengths of Region ② and Region ③ may be variable. Meanwhile, the uncoated portion (the second part B3) included in at least one winding turn including the outermost winding turn may not include a segment structure. In this case, the second part B3 may be excluded from Region ③.

In Region ②, the heights of the segments 61 may be changed stepwise from the minimum height $h_1$ (=$h_{min}$) to the maximum height $h_N$ (=$h_{max}$) in the radius region of $r_1$ to $r_N$ of the electrode assembly 80. The height variable region in which the heights of segments 61 are variable is $r_1$ to $r_N$. From the radius $r_N$ to the radius R of the electrode assembly 80, the heights of the segments 61 are uniformly maintained at $h_N$. Uniform height means that the height deviation is within 5%.

At any radial location of Region ② and Region ③, the number of overlapping layers of the segments 61 varies depending on the radial location. In addition, the number of overlapping layers of the segments 61 may vary based on the width of Region ②, the minimum height ($h_1$) and the maximum height ($h_{N-1}$) of the segments in the height variable region of the segment 61, and the height change amount (Δh) of the segments 61. The number of overlapping layers of the segments 61 is the number of segments that meet a virtual line when the virtual line is drawn in the winding axis direction at any radial location of the electrode assembly 80.

Preferably, the number of overlapping layers of the segments 61 at each position of the bending surface region F may be optimized suitable for the required welding strength of the current collector by adjusting the height, width and separation pitch of the segment 61 according to the radius of the winding turn including the segment 61.

First, when the minimum height ($h_1$) of the segment is the same in the height variable region (②) of the segment 61, it will be described through specific examples how the number of overlapping layers of the segments 61 is changed along the radial direction of the bending surface region F according to the change in the maximum height ($h_N$) of the segment 61.

The electrode assemblies of Examples 1-1 to 1-7 are prepared. The electrode assemblies of these examples have a radius of 22 mm and a core diameter of 4 mm. The positive electrode and the negative electrode included in the electrode assembly have the electrode structure shown in FIG. 7a. That is, the segment has a trapezoidal shape. The second part B3 of the positive electrode and the negative electrode has no segment. The length of the second part B3 is 2% to 4% compared to the total length of the electrode. The positive electrode, the negative electrode and the separator are wound by the method described with reference to FIG. 2. The winding turns are between 48 turns and 56 turns, whereas the winding turns of these examples are 51 turns. The thicknesses of the positive electrode, the negative electrode and the separator are 149 μm, 193 μm, and 13 μm, respectively. The thickness of the positive electrode and the negative electrode is the thickness including the thickness of the active material layer. The thickness of the positive electrode current collecting plate and the negative electrode current collecting plate are 15 μm and 10 μm, respectively. The lengths of the positive electrode and the negative electrode in the winding direction are 3948 mm and 4045 mm, respectively.

In each example, the minimum height of the segment 61 is set to 3 mm so that the height variable region (②) of the segment 61 starts from a radius of 5 mm. Also, in each example, the height of the segment 61 is increased by 1 mm for every 1 mm increase in radius, and the maximum height of the segment 61 is changed variously from 4 mm to 10 mm.

Specifically, in Example 1-1, the height variable region (②) of the segment 61 is 5 mm to 6 mm, and the height of the segment 61 is variable at a radius from 3 mm to 4 mm. In Example 1-2, the height variable region (②) of the segment 61 is 5 mm to 7 mm, and the height of the segment 61 is variable from 3 mm to 5 mm. In Example 1-3, the height variable region (②) of the segment 61 is 5 mm to 8 mm, and the height of the segment 61 is variable from 3 mm to 6 mm. In Example 1-4, the height variable region (②) of the segment 61 is 5 mm to 9 mm, and the height of the segment 61 is variable from 3 mm to 7 mm. In Example 1-5, the height variable region (②) of the segment 61 is 5 mm to 10 mm, and the height of the segment 61 is variable from 3 mm to 8 mm. In Example 1-6, the height variable region (②) of the segment 61 is 5 mm to 11 mm, and the height of the segment 61 is variable from 3 mm to 9 mm. In Example 1-7, the height variable region (②) of the segment 61 is 5 mm to 12 mm, and the height of the segment 61 is variable from 3 mm to 10 mm. In Examples 1-1 to 1-7, the height of the segment is uniform from the radius corresponding to the upper limit of the height variable region (②) to the outer circumference. In one example, in Example 1-7, the height of the segment 61 located at a radius from 12 mm to 22 mm is uniform as 10 mm. Meanwhile, in the electrode assembly of the comparative example, the height of segment 61 is maintained at a single height of 3 mm from the radius of 5 mm to the radius of 22 mm.

Figure 10C:
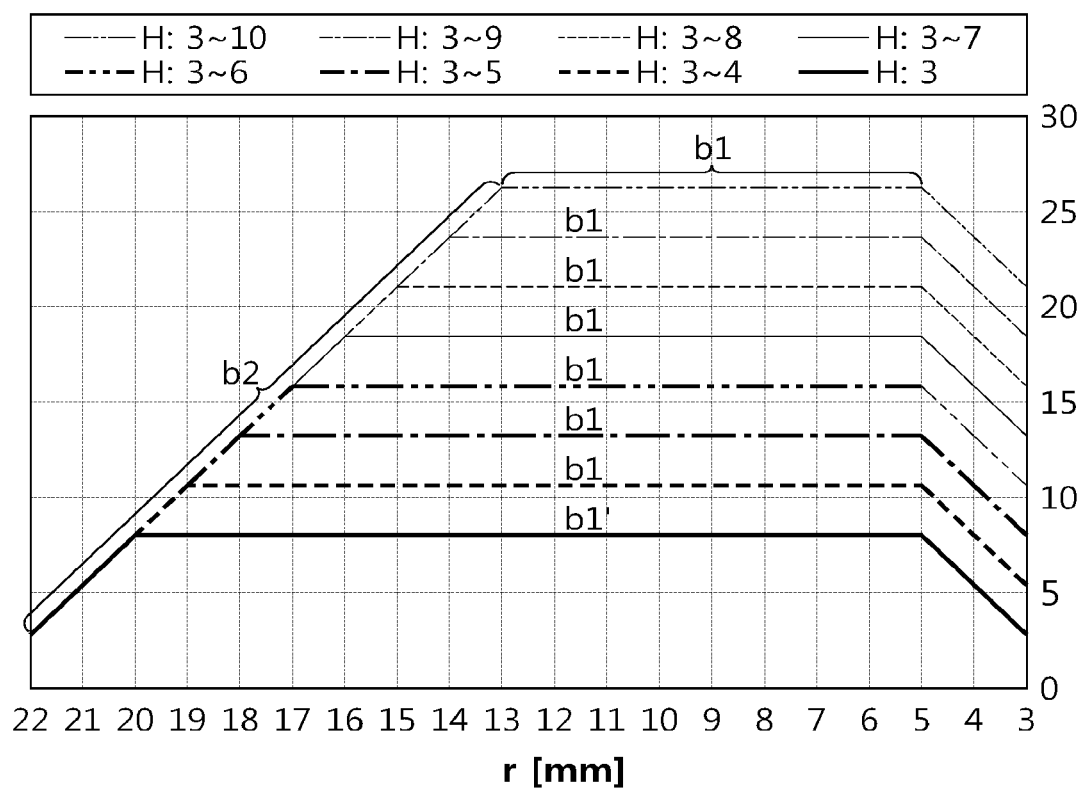
FIG. 10c is a graph showing results obtained by counting the number of overlapping layers of segments along a radial direction in a bending surface region of a positive electrode formed at an upper portion of the electrode assemblies according to Examples 1-1 to 1-7 and a comparative example.

FIG. 10c is a graph showing the results of counting the number of overlapping layers of the segments along the radial direction in the bending surface region F of the positive electrode formed on the upper portion of the electrode assemblies according to Examples 1-1 to 1-7 and the comparative example. The bending surface region of the negative electrode shows substantially the same result. The horizontal axis of the graph is the radius based on the core center, and the vertical axis of the graph is the number of overlapping layers counted at each radius point, and it is the same in FIGS. 10d and 10e, which will be explained later.

Referring to FIG. 10c, the overlapping layer number uniform region b1 of the segment is commonly shown in Examples 1-1 to 1-7 and the comparative example 1. The overlapping layer number uniform region b1 is a radial region of a flat region in each graph. The length of the overlapping layer number uniform region b1 increases as the maximum height of the segment decreases, and the overlapping layer number uniform region (b1') of the comparative example is longest. Meanwhile, the number of overlapping layers of the segments increases as the maximum height ($h^N$) of the segment increases. That is, if the maximum height ($h^N$) of the segment increases so that the width of the height variable region (②) of the segment increases, the number of overlapping layers of the segments increases, but the width of the overlapping layer number uniform region b1 decreases. At an outer side of overlapping layer number uniform region b1, the overlapping layer number decreasing region b2 appears, in which the number of overlapping layers decreases as the radius increases. The overlapping layer number decreasing region b2 is a radial region where the number of overlapping layers decreases as the radius of the electrode assembly increases. The overlapping layer number uniform region b1 and the overlapping layer number decreasing region b2 are adjacent in the radial direction and are complementary to each other. That is, if the length of one region increases, the length of the other region decreases. In addition, the amount of decrease in the number of overlapping layers in the overlapping layer number decreasing region b2 is proportional to the distance spaced apart from the overlapping layer number uniform region b1.

From the viewpoint of the number of overlapping layers of the segments, in Examples 1-1 to 1-7, the number of overlapping layers of the segments is 10 or more in the overlapping layer number uniform region b1. A region in which the number of overlapping layers of segments is or more may be set as a welding target region. The welding target region is a region where at least a part of the current collector can be welded.

In Examples 1-1 to 1-7, the overlapping layer number uniform region b1 starts from a radius point where the height variable region (②) of the segment starts. That is, the height variable region (②) starts from the radius of 5 mm and extends toward the outer circumference.

Table 4 below shows, in Examples 1-1 to 1-7 and comparative example 1, for the positive electrode, calculation results of a ratio of the length of the segment skip region (c, ① in FIG. 10a) to the radius (b–a) of the electrode assembly excluding the core, a ratio (e/f) of the length of the overlapping layer number uniform region b1 to the length (f) from the radius point (5 mm) where the overlapping layer number uniform region starts to an outermost point of the electrode assembly (22 mm), a ratio (d/f) of the length of the height variable region (d) of the segment (d) to the length (f) from the radius point (5 mm) where the overlapping layer number uniform region starts to the outermost point (22 mm) of the electrode assembly, a ratio (h) of the length of the electrode area corresponding to the segment skip region (first part B1) to the total length of the electrode, a ratio (i) of the length of the electrode area corresponding to the height variable region to the total length of the electrode, a ratio (j) of the electrode area corresponding to the height uniform region to total length of the electrode, and the like.

Except that the negative electrode shows a difference of 0.1 to 1.2% with respect to the parameter h, the remaining parameters are substantially the same as the positive electrode. The sum of proportions h, i and j is slightly different from 100%. The reason is that there is a region having no segment in the second part B3 corresponding to the outer circumferential uncoated portion of the electrode. For example, in Example 1-1, there is no segment in the second part B3 corresponding to approximately 4% of the total electrode length. In Table 4, a to f are parameters based on the length in the radial direction, and h, i and j are parameters based on the length in the lengthwise direction of the electrode before being wound into an electrode assembly. In addition, the parameters corresponding to the ratio (%) are values rounded to the first decimal place. These points are substantially the same in Tables 5 and 6, explained later.

TABLE 4

| Ref. | a. core radius (mm) | b. winding structure radius (mm) | c. segment skip region (mm) | d. height variable region (mm) | e. overlapping layer number uniform region (mm) | f. segment region (mm) | g. number of overlapping layers | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| Example 1-1 | 2 | 22 | 3 | 1 | 14 | 17 | 11 | 15% | 6% | 82% | 6% | 3% | 87% |
| Example 1-2 | 2 | 22 | 3 | 2 | 13 | 17 | 13 | 15% | 12% | 76% | 6% | 7% | 83% |
| Example 1-3 | 2 | 22 | 3 | 3 | 12 | 17 | 16 | 15% | 18% | 71% | 6% | 11% | 80% |
| Example 1-4 | 2 | 22 | 3 | 4 | 11 | 17 | 18 | 15% | 24% | 65% | 6% | 15% | 75% |
| Example 1-5 | 2 | 22 | 3 | 5 | 10 | 17 | 21 | 15% | 29% | 59% | 6% | 21% | 69% |
| Example 1-6 | 2 | 22 | 3 | 6 | 9 | 17 | 24 | 15% | 35% | 53% | 6% | 25% | 65% |
| Example 1-7 | 2 | 22 | 3 | 7 | 8 | 17 | 26 | 15% | 41% | 47% | 6% | 32% | 59% |
| Comparative Example 1 | 2 | 22 | 3 | 0 | 15 | 17 | 8 | 15% | 0% | 88% | 6% | — | — |

Seeing Example 1-1 to 1-7 of Table 4, the number of overlapping layers of the segments is 11 to 26, and the ratio (d/f) of the height variable region (d) to the radius region (f) including the segment is 6% to 41%. In addition, the ratio (e/f) of the overlapping layer number uniform region (e) to the radius region (f) including the segment is 47% to 82%. In addition, the ratio (c/(b−a)) of the segment skip region (c, ① in FIG. 10a) to the radius (b−a) of the electrode assembly excluding the core is 15%. In addition, the ratio of the length of the electrode area corresponding to the segment skip region (first part B1) to the total length of the electrode is 6%, the ratio of the length of the electrode area corresponding to the height variable region to the total length of the electrode is 3% to 32%, and the ratio of the length of the electrode area corresponding to the height uniform region to the total length of the electrode is 59% to 87%.

The number of overlapping layers (g) of the overlapping layer number uniform region is or more for all of Examples 1-1 to 1-7. The overlapping layer number uniform region (e) decreases as the height variable region (d) of the segment increases, but the number of overlapping layers (g) of the segments increases in the overlapping layer number uniform region (e). Preferably, the overlapping layer number uniform region (e) in which the number of overlapping layers (g) of the segments is 10 or more may be set as a welding target region.

In the cylindrical battery with form factors of 1865 and 2170, the radius of the electrode assembly is approximately 9 mm to 10 mm. Therefore, for a conventional cylindrical battery, the radial length of the segment region (f) cannot be secured at the level of 17 mm as in Examples 1-1 to 1-7, and the length of the overlapping layer number uniform region (e) in which the number of overlapping layers of the segments is 10 or more cannot be secured at the level of 8 mm to 14 mm. This is because, in the conventional cylindrical battery, when the radius of the core is designed to be 2 mm, which is the same as in Examples 1-1 to 1-7, the radial region in which the segments can be disposed is substantially only 7 mm to 8 mm. In addition, in the conventional cylindrical battery, the length of the electrode in the winding direction is in the level of 600 mm to 980 mm. Such a short electrode length is only about 15% to 24% of the length of the electrode used in Examples 1-1 to 1-7 (the positive electrode of 3948 mm, the negative electrode of 4045 mm). Accordingly, the numerical ranges for the parameters h, i and j cannot be easily derived from the design specifications of the conventional cylindrical battery.

Next, it will be explained through concrete examples how the number of overlapping layers of the segments changes in the radial direction of the bending surface region F according to the change in the minimum height ($h_1$) of the segment when the maximum height ($h_N$) of the segment is the same in the height variable region of the segment (② in FIG. 10a).

The electrode assemblies of Examples 2-1 to 2-5 has a radius of 22 mm, and the core C has a diameter of 4 mm. In the height variable region of the segment 61 (0 in FIG. 10a), the minimum height ($h_1$) is the same as 4 mm, and the maximum height ($h_N$) is changed from 6 mm to 10 mm by 1 mm. Therefore, in the electrode assemblies of Examples 2-1 to 2-5, the width of the height variable region (② in FIG. 10a) of the segment is 2 mm, 3 mm, 4 mm, 5 mm, and 6 mm, respectively, and the segment skip region (① of FIG. 10a) is a radial region having a radius from 2 mm to 6 mm.

The electrode assemblies Examples 3-1 to 3-4 have radius of 22 mm, and the core C has a diameter of 4 mm. In the height variable region of (② of FIG. 10a) of the segment 61, the minimum height ($h_1$) is the same as 5 mm, and the maximum height ($h_N$) is changed from 7 mm to 10 mm by 1 mm. Therefore, in the electrode assemblies of Examples 3-1 to 3-4, the width of the segment height variable region (② in FIG. 10a) is 2 mm, 3 mm, 4 mm, and 5 mm, respectively, and the segment skip region (① in FIG. 10a) is a radial region having a radius from 2 mm to 7 mm.

The electrode assemblies of Examples 4-1 to 4-3 have a radius of 22 mm, and the core C has a diameter of 4 mm. In the height variable region (② in FIG. 10a) of the segment 61, the minimum height ($h_1$) is the same as 6 mm, and the maximum height (h) is changed from 8 mm to 10 mm by 1 mm. Therefore, in the electrode assemblies of Examples 4-1 to 4-3, the width of the height variable region (② in FIG. 10a) of the segment is 2 mm, 3 mm, and 4 mm, respectively, and the segment skip region (① in FIG. 10a) is a radius region having a radius from 2 mm to 8 mm.

The electrode assemblies of Examples 5-1 to 5-2 have a radius of 22 mm, and the core C has a diameter of 4 mm. In the height variable region (② in FIG. 10a) of the segment 61, the minimum height ($h_1$) is the same as 7 mm, and the maximum height ($h_N$) is changed from 9 mm to 10 mm by 1 mm. Therefore, in the electrode assemblies of Examples 5-1 to 5-2, the width of the height variable region (② in FIG. 10a) of the segment is 2 mm and 3 mm, respectively, and the segment skip region (① in FIG. 10a) is a radius region having a radius from 2 mm to 9 mm.

Figure 10D:
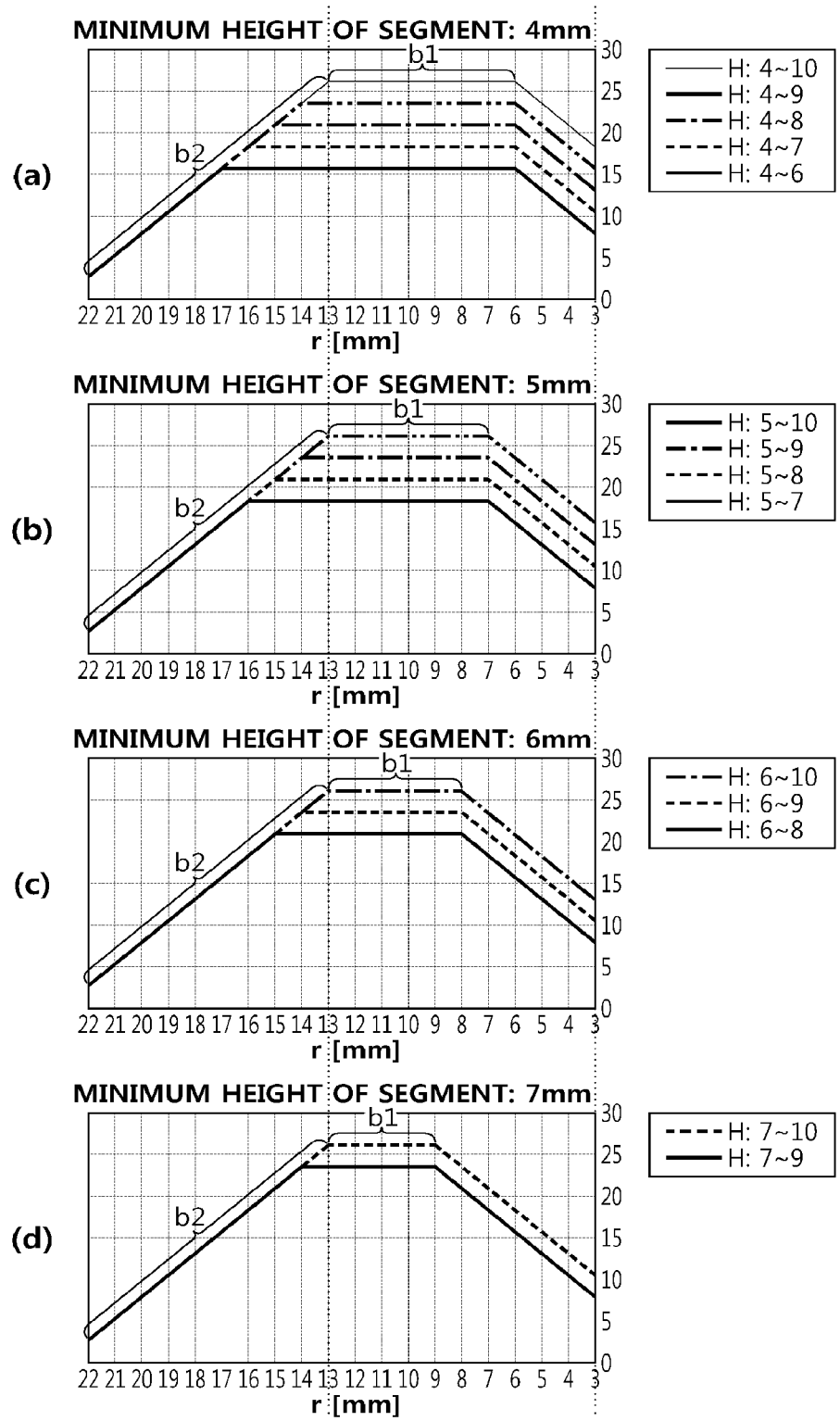
FIG. 10d is a graph showing results obtained by counting the number of overlapping layers of segments measured along the radial direction in a bending surface region of a positive electrode formed at an upper portion of the electrode assemblies according to Examples 2-1 to 2-5, Examples 3-1 to 3-4, Examples 4-1 to 4-3, and Examples 5-1 and 5-2.

FIG. 10d is graphs showing the results of counting the number of overlapping layers of segments measured along the radial direction in the bending surface region F of the positive electrode formed on the upper portion of the electrode assemblies of Examples 2-1 to 2-5, Examples 3-1 to 3-4, Examples 4-1 to 4-3, and Examples 5-1 to 5-2. The bending surface region of the negative electrode also shows substantially the same results.

In FIG. 10d, Graph (a) shows the result of counting the number of overlapping layers of the segments along the radial direction in the bending surface region F for Examples 2-1 to 2-5, Graph (b) shows the result for Examples 3-1 to 3-4, Graph C shows the result for Examples 4-1 to 4-3, and Graph (d) shows the result for Example 5-1 to Example 5-2.

Referring to FIG. 10d, the overlapping layer number uniform region b1 of the segment appears in common in all examples. The overlapping layer number uniform region b1 is a radial region of a flat region in the graph. The length of the overlapping layer number uniform region b1 increases as the maximum height ($h_N$) of the segment decreases when the minimum height ($h_1$) of the segment is the same. Also, the length of the overlapping layer number uniform region b1 increases as the minimum height ($h_1$) of the segment decreases when the maximum height ($h_N$) of the segment is the same. Meanwhile, in the overlapping layer number uniform region b1, the number of overlapping layers of the segments increases as the maximum height ($h_N$) of the segment increases. Also in the examples, the overlapping layer number decreasing region b2 appears adjacent to the overlapping layer number uniform region b1.

In the examples, the number of overlapping layers of the segments in the overlapping layer number uniform region b1 is all 10 or more. Preferably, the region in which the number of overlapping layers of segments is 10 or more may be set as a welding target region.

In the examples, the overlapping layer number uniform region b1 starts from a radius point where the height variable region (② in FIG. 10a) of the segment starts. In Examples 2-1 to 2-5, the height variable region (② in FIG. 10a) of the segment starts from 6 mm and extends toward the outer circumference. In Examples 3-1 to 3-4, the height variable region (②in FIG. 10a) of the segment starts from 7 mm and extends toward the outer circumference. In Examples 4-3 to 4-3, the height variable region (②) in FIG. 10a) of the segment starts from 8 mm and extends toward the outer circumference. In Examples 5-1 to 5-2, the height variable region (②in FIG. 10a) of the segment starts from 9 mm and extends toward the outer circumference.

Table 5 below shows the results of calculating various parameters such as a ratio (e/f) of the length of the overlapping layer number uniform region to the length from the radius point (6 mm, 7 mm, 8 mm, 9 mm) where the overlapping layer number uniform region starts to the outermost point (22 mm) of the electrode assembly, a ratio (d/f) of the length of the height variable region (②)) to the length from the radius point (6 mm, 7 mm, 8 mm, 9 mm) where the overlapping layer number uniform region starts to the outermost point (22 mm) of the electrode assembly, and the like for Examples 2-1 to 2-5, Examples 3-1 to 3-4, Examples 4-1 to 4-3, and Examples 5-1 to Example 5-2.

height ($h_1$) of the segment decreases, it may be understood that the width of the overlapping layer number uniform region increases proportionally as the width of the height variable region (②)) of the segment increases. The reason is that as the minimum length ($h_1$) of the segment is smaller, the radius point where the segment starts is closer to the core, so that the area where the segments are stacked is extended toward the core.

Seeing Table 5, it may be found that the number of overlapping layers of the segments is to 26, the ratio (d/f) of the height variable region (②) of the segment is 13% to 38%, and the ratio of the overlapping layer number uniform region (e/f) is 31% to 69%. In addition, the ratio (c/(b−a)) of the segment skip region (①) to the radius (b−a) of the electrode assembly excluding the core is 20% to 35%. In addition, the ratio of the length of the electrode area corresponding to the segment skip region (①) to the total length of the electrode is 10% to 20%, the ratio of the length of the electrode area corresponding to the height variable region (②) to the total length of the electrode is 6% to 25%, and

TABLE 5

| Ref. | a. core radius (mm) | b. winding structure radius (mm) | c. segment skip region (mm) | d. height variable region (mm) | e. overlapping layer number uniform region (mm) | f. segment region (mm) | g. number of overlapping layers | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| Example 2-1 | 2 | 22 | 4 | 2 | 7 | 16 | 16 | 20% | 13% | 44% | 10% | 6% | 81% |
| Example 2-2 | 2 | 22 | 4 | 3 | 8 | 16 | 18 | 20% | 19% | 50% | 10% | 11% | 77% |
| Example 2-3 | 2 | 22 | 4 | 4 | 9 | 16 | 21 | 20% | 25% | 56% | 10% | 16% | 72% |
| Example 2-4 | 2 | 22 | 4 | 5 | 10 | 16 | 24 | 20% | 31% | 63% | 10% | 20% | 68% |
| Example 2-5 | 2 | 22 | 4 | 6 | 11 | 16 | 26 | 20% | 38% | 69% | 10% | 25% | 65% |
| Example 3-1 | 2 | 22 | 5 | 2 | 6 | 15 | 18 | 25% | 13% | 40% | 13% | 7% | 77% |
| Example 3-2 | 2 | 22 | 5 | 3 | 7 | 15 | 21 | 25% | 20% | 47% | 13% | 12% | 72% |
| Example 3-3 | 2 | 22 | 5 | 4 | 8 | 15 | 24 | 25% | 27% | 53% | 13% | 16% | 68% |
| Example 3-4 | 2 | 22 | 5 | 5 | 9 | 15 | 26 | 25% | 33% | 60% | 13% | 22% | 62% |
| Example 4-1 | 2 | 22 | 6 | 2 | 5 | 14 | 21 | 30% | 14% | 36% | 16% | 9% | 72% |
| Example 4-2 | 2 | 22 | 6 | 3 | 6 | 14 | 24 | 30% | 21% | 43% | 16% | 13% | 68% |
| Example 4-3 | 2 | 22 | 6 | 4 | 7 | 14 | 26 | 30% | 29% | 50% | 16% | 19% | 62% |
| Example 5-1 | 2 | 22 | 7 | 2 | 4 | 13 | 24 | 35% | 15% | 31% | 20% | 9% | 68% |
| Example 5-2 | 2 | 22 | 7 | 3 | 5 | 13 | 26 | 35% | 23% | 38% | 20% | 15% | 62% |

Seeing Example 2-5, Example 3-4, Example 4-3, and Example 5-2 of Table 5 along with FIGS. 10a and 10d, the maximum height ($h_N$) of the segment in the height variable region (②)) of the segment is the same as 10 mm, but the minimum height ($h_1$) of the segment increases to 4 mm, 5 mm, 6 mm, and 7 mm by 1 mm, and the length of the height variable region (②)) decreases to 6 mm, 5 mm, 4 mm, 3 mm by 1 mm. In the four examples, the ratio (e/f) of the overlapping layer number uniform region is the maximum in Example 2-5 as 69% and the minimum in Example 5-2 as 38%, and the number of overlapping layers of the overlapping layer number uniform region is the same in all examples.

From the results shown in Table 5, when the maximum height ($h_N$) of the segment is the same and the minimum the ratio of the length of the electrode area corresponding to the height uniform region (③) to the total length of the electrode is 62% to 81%.

In the cylindrical battery form factors of 1865 and 2170, the radius of the electrode assembly is approximately 9 mm to 10 mm. Therefore, it is impossible that the radial length of the segment region (f) is secured at the level of 13 mm to 16 mm as in the examples, and it is impossible that the length of the segment skip region (c, ①) is secured in the level of 4 mm to 7 mm while the length of the overlapping layer number uniform region (e) in which the number of overlapping layers of the segments is 10 or more is secured in the level of 5 mm to 11 mm. This is because, in the conventional cylindrical battery, when the radius of the core is designed to be 2 mm, which is the same as in the examples, the radial region in which the segments can be disposed is substantially only 7 mm to 8 mm. In addition, in the conventional cylindrical battery, the length of the electrode in the winding direction is in the level of 600 mm to 980 mm. Such a short electrode length is only about 15% to 24% of the electrode length (the positive electrode of 3948 mm, the negative electrode of 4045 mm) in the examples. Accordingly, the numerical ranges for the parameters h, i and j cannot be easily derived from the design specifications of the conventional cylindrical battery.

Next, it will be explained through specific examples how the number of overlapping layers of the segments is changed according to the diameter of the core C of the electrode assembly along the radial direction of the bending surface region F when the minimum height ($h_1$) and the maximum height ($h_N$) of the segment are the same in the height variable region (②) of the segment.

The electrode assemblies of Examples 6-1 to 6-6 have a radius of 22 mm, and the core C has a radius of 4 mm. In the height variable region (②) of the segment 61, the minimum height ($h_1$) of the segment is the same as 3 mm, and the maximum height ($h_N$) of the segment is changed from 5 mm to 10 mm by 1 mm. Therefore, in the electrode assemblies of Examples 6-1 to 6-6, the width of the height variable region (②) of the segment is 2 mm, 3 mm, 4 mm, 5 mm, 6 mm, and 7 mm, respectively, and the segment skip region (①) is a radial region having a radius from 4 mm to 7 mm.

The electrode assemblies of Examples 7-1 to 7-6 have a radius of 22 mm, and the core C has a radius of 2 mm. In the height variable region (②) of the segment 61, the minimum height ($h_1$) of the segment is the same as 3 mm, and the maximum height ($h_N$) of the segment is changed from 5 mm to 10 mm by 1 mm. Therefore, in the electrode assemblies of Examples 7-1 to 7-6, the width of the height variable region (②) of the segment is 2 mm, 3 mm, 4 mm, 5 mm, 6 mm, and 7 mm, respectively, and the segment skip region (①) is a radial region having a radius from 2 mm to 5 mm.

Figure 10E:
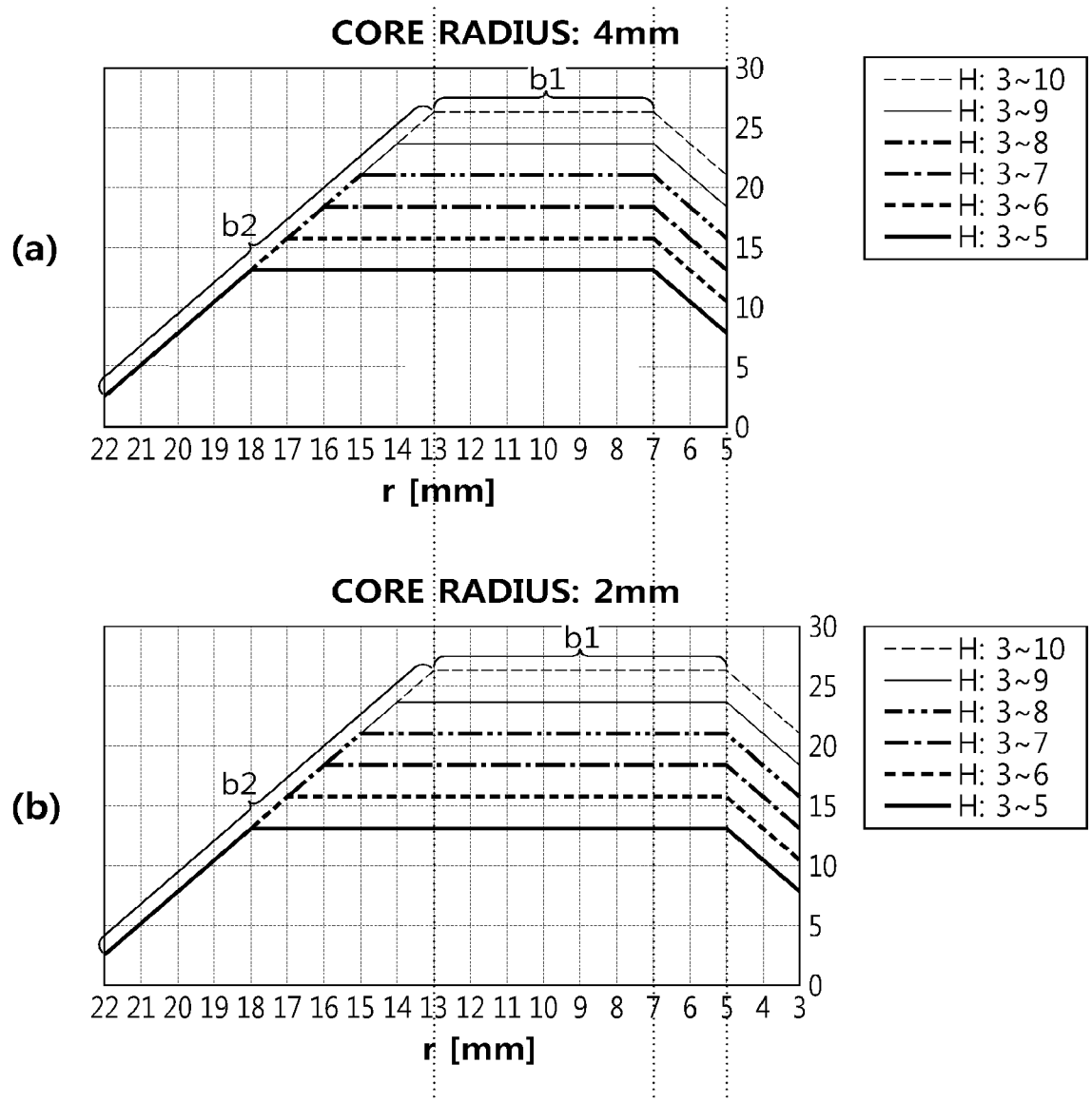
FIG. 10e is a graph showing results obtained by counting the number of overlapping layers of segments measured along the radial direction in a bending surface region of a positive electrode formed at an upper portion of the electrode assemblies according to Examples 6-1 to 6-6 and Examples 7-1 to 7-6.
Figure 10F:
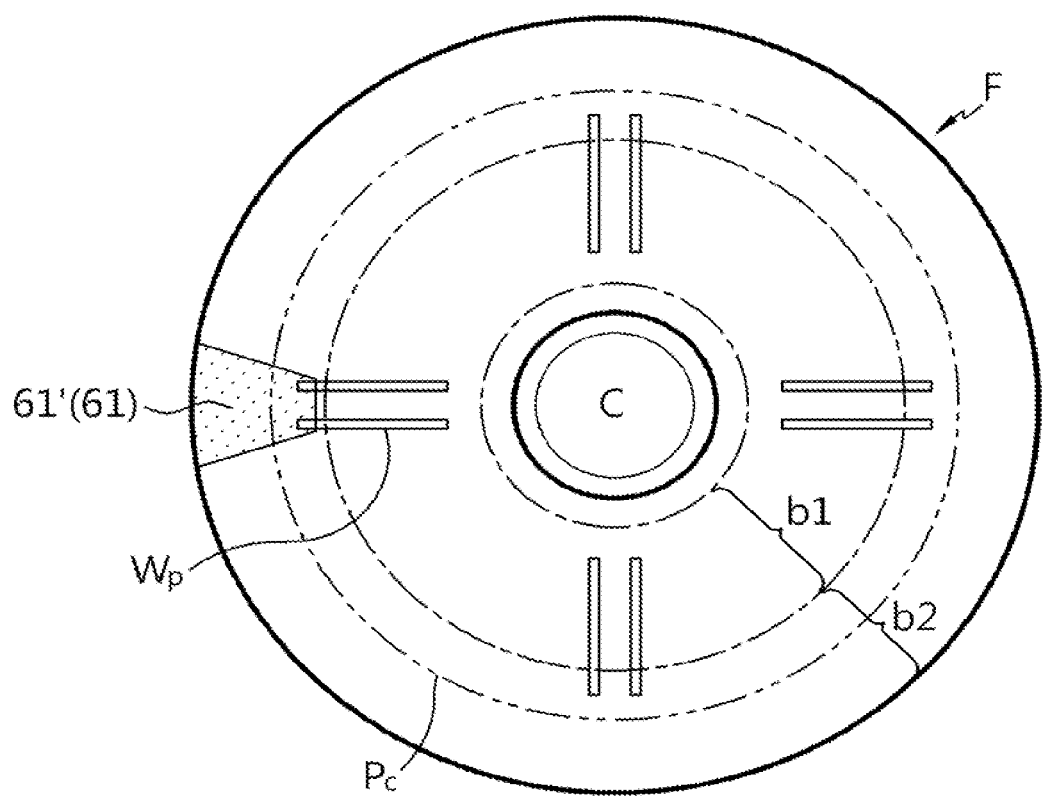
FIG. 10f is a top plan view of the electrode assembly showing an overlapping layer number uniform region b1 and an overlapping layer number decreasing region b2 in the bending surface region of the segment according to an embodiment of the present disclosure.

FIG. 10*e* are graphs showing the results of counting the number of overlapping layers of the segments measured along the radial direction in the bending surface region F of the positive electrode formed on the upper portion of the electrode assembly for Examples 6-1 to 6-6 and Examples 7-1 to 7-6. Substantially the same results are shown in the bending surface region of the negative electrode.

In FIG. 10*e*, Graph (a) shows the results of counting the number of overlapping layers of segments measured along the radial direction in the bending surface region F for Examples 6-1 to 6-6, and Graph (b) shows the results for Examples 7-1 to 7-6.

Referring to FIG. 10*e*, the overlapping layer number uniform region b1 of the segment appears in common in all examples. The overlapping layer number uniform region b1 is a radial region of a flat region in the graph. The radial length of the overlapping layer number uniform region b1 increases as the maximum height ($h_N$) of the segment decreases when the minimum height ($h_1$) of the segment is the same. Meanwhile, in the overlapping layer number uniform region b1, the number of overlapping layers of the segments increases as the maximum height ($h_N$) of the segment increases. In the examples, the overlapping layer number decreasing region b2 appears adjacent to the overlapping layer number uniform region b1.

In the examples, the number of overlapping layers of the segments in the overlapping layer number uniform region b1 is 10 or more for all examples. Preferably, a region in which the number of overlapping layers of segments is 10 or more may be set as a welding target region.

In the examples, the overlapping layer number uniform region b1 starts from a radius point where the height variable region (②) of the segment starts. In Examples 6-1 to 6-6, the radius at which the segment height variable region (②) starts is 7 mm, and in Examples 7-1 to 7-6, the radius at which the segment height variable region (②) starts is 5 mm.

Table 6 below shows the results of calculating various parameters including a ratio (e/f) of the length of the overlapping layer number uniform region to the length from the radius point (7 mm, 5 mm) where the overlapping layer number uniform region starts to the outermost point (22 mm) of the electrode assembly, a ratio (d/f) of the length of the height variable region (②) to the length from the radius point (7 mm, 5 mm) where the overlapping layer number uniform region starts to the outermost point (22 mm) of the electrode assembly, for Examples 6-1 to 6-6 and Examples 7-1 to 7-6, and the like.

TABLE 6

| Ref. | a. core radius (mm) | b. winding structure radius (mm) | c. segment skip region (mm) | d. height variable region (mm) | e. overlapping layer number uniform region (mm) | f. segment region (mm) | g. number of overlapping layers | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| Example 6-1 | 4 | 22 | 3 | 2 | 11 | 15 | 13 | 17% | 13% | 73% | 6% | 7% | 83% |
| Example 6-2 | 4 | 22 | 3 | 3 | 10 | 15 | 16 | 17% | 20% | 67% | 6% | 11% | 80% |
| Example 6-3 | 4 | 22 | 3 | 4 | 9 | 15 | 18 | 17% | 27% | 60% | 6% | 15% | 75% |
| Example 6-4 | 4 | 22 | 3 | 5 | 8 | 15 | 21 | 17% | 33% | 53% | 6% | 21% | 69% |
| Example 6-5 | 4 | 22 | 3 | 6 | 7 | 15 | 24 | 17% | 40% | 47% | 6% | 25% | 65% |
| Example 6-6 | 4 | 22 | 3 | 7 | 6 | 15 | 26 | 17% | 47% | 40% | 6% | 32% | 59% |
| Example 7-1 | 2 | 22 | 3 | 2 | 13 | 17 | 13 | 15% | 12% | 76% | 6% | 7% | 83% |
| Example 7-2 | 2 | 22 | 3 | 3 | 12 | 17 | 16 | 15% | 18% | 71% | 6% | 11% | 80% |
| Example 7-3 | 2 | 22 | 3 | 4 | 11 | 17 | 18 | 15% | 24% | 65% | 6% | 15% | 75% |

TABLE 6-continued

| Ref. | a. core radius (mm) | b. winding structure radius (mm) | c. segment skip region (mm) | d. height variable region (mm) | e. overlapping layer number uniform region (mm) | f. segment region (mm) | g. number of overlapping layers | c/(b − a) (%) | d/f (%) | e/f (%) | h. ratio of segment skip region | i. ratio of height variable region | j. ratio of height uniform region |
|---|---|---|---|---|---|---|---|---|---|---|---|---|---|
| Example 7-4 | 2 | 22 | 3 | 5 | 10 | 17 | 21 | 15% | 29% | 59% | 6% | 21% | 69% |
| Example 7-5 | 2 | 22 | 3 | 6 | 9 | 17 | 24 | 15% | 35% | 53% | 6% | 25% | 65% |
| Example 7-6 | 2 | 22 | 3 | 7 | 8 | 17 | 26 | 15% | 41% | 47% | 6% | 32% | 59% |

Seeing Examples 6-6 and 7-6 in Table 6 along with FIG. 10a, the minimum height ($h_1$) and the maximum height ($h_N$) of the segment in the height variable region (②) of the segment are the same as 3 mm and 10 mm, respectively. However, in Example 6-6, the radius of the core is larger by 2 mm compared to that of Example 7-6. Therefore, in Example 6-6, the overlapping layer number uniform region (e) and the segment region (f) are smaller by 2 mm compared to those of Example 7-6, and the number of overlapping layers of the segments in the overlapping layer number uniform region is the same. These results are derived from the difference in the radius of the core. From the results shown in Table 6, it may be understood that, when the width of the height variable region (②) of the segment is the same, as the radius (a) of the core is smaller, the ratio (d/f) of the height variable region (②) decreases, whereas the ratio (e/f) of the overlapping layer number uniform region increases.

Seeing Table 6, it may be found that the number of overlapping layers of the segments is to 26, the ratio (d/f) of the height variable region (②) is 12% to 47%, and the ratio (e/f) of the length of the overlapping layer number uniform region is 40% to 76%. In addition, the ratio (c/(b−a)) of the segment skip region (①) to the radius (b−a) of the electrode assembly excluding the core is 15% to 17%. In addition, the ratio of the length of the electrode area corresponding to the segment skip region (①) to the total length of the electrode is 6%, the ratio of the length of the electrode area corresponding to the height variable region (②) to the total length of the electrode is 7% to 32%, and the ratio of the length of the electrode area corresponding to the height uniform region (③) to the total length of the electrode is 59% to 83%.

For the cylindrical batteries with form factors of 1865 and 2170, the radius of the electrode assembly is approximately 9 mm to 10 mm. Therefore, it is impossible that the radial length of the segment region (f) is secured in the level of 15 mm to 17 mm, and the length of the segment skip region (①) is secured in the level of about 3 mm, and simultaneously the length of the overlapping layer number uniform region (e) in which the number of overlapping layers of the segments is 10 or more is secured in the level of 6 mm to 13 mm as in the examples. This is because, in the conventional cylindrical battery, when the radius of the core is designed to be 2 mm to 4 mm, which is the same as in the examples, the radial region in which segments can be disposed is substantially only 5 mm to 8 mm. In addition, in the conventional cylindrical battery, the length of the electrode in the winding direction is in the level of 600 mm to 980 mm. Such a short electrode length is only about 15% to 24% of the electrode length (the positive electrode of 3948 mm, the negative electrode of 4045 mm) in the examples. Accordingly, the numerical ranges for the parameters h, i and j may not be easily derived from the design specifications of the conventional cylindrical battery.

Comprehensively considering the data in Tables 4 to 6, the number of overlapping layers of the segments in the overlapping layer number uniform region of the segment may be 11 to 26. Also, the ratio (d/f) of the height variable region (②) of the segment may be 6% to 47%. In addition, the ratio (e/f) of the overlapping layer number uniform region may be 31% to 82%. In addition, the ratio (c/(b−a)) of the length of the segment skip region (①) to the radius of the electrode assembly excluding the core may be 15% to 35%. In addition, the ratio of the length of the electrode area corresponding to the segment skip region (①) to the total length (in the winding direction length) of the electrode may be 6% to 20%. In addition, the ratio of the length of the electrode area corresponding to the height variable region (②) of the segment to the total length of the electrode may be 3% to 32%. In addition, the ratio of the length of the electrode area corresponding to the height uniform region (③) of the segment to the total length of the electrode may be 59% to 87%.

Meanwhile, the parameters described through Tables 4 to 6 may be varied according to design factors including the radius (a) of the core; the radius (b) of the electrode assembly; the minimum height ($h_1$) and the maximum height ($h_N$) in the height variable region (②) of the segment; the change amount (Δh) in height of the segment per 1 mm increase in radius; the thickness of the positive electrode, the negative electrode, and the separator; and the like.

Therefore, in the overlapping layer number uniform region of the segment, the number of overlapping layers of the segments may be expanded to 10 to 35. The ratio (d/f) of the height variable region (②) of the segment may be expanded to 1% to 50%. In addition, the ratio (e/f) of the overlapping layer number uniform region may be expanded to 30% to 85%. In addition, the ratio (c/(b−a)) of the length of the segment skip region (①) to the radius of the electrode assembly excluding the core may be expanded to 10% to 40%. In addition, the ratio of the length of the electrode area corresponding to the segment skip region (①) to the total length (in the winding direction length) of the electrode may be expanded to 1% to 30%. In addition, the ratio of the length of the electrode area corresponding to the height variable region (②) of the segment to the total length of the electrode may be expanded to 1% to 40%. In addition, the ratio of the length of the electrode area corresponding to the height uniform region (③) of the segment to the total length of the electrode may be expanded to 50% to 90%. In the above examples, the height index 'N' in the maximum height ($h_N$) of the segment in the height variable region (②) and the height uniform region (③) is in the range of 2 to 8. For example, referring to Table 4, the height index 'N' for examples 1-1 and 1-7 is 2 and 8, respectively. However, the height index 'N' may vary in accordance with the height change amount (Δh) of the segment in a radial direction of the electrode assembly. When the radial length of the height variable region (②) is fixed, as the height change amount (Δh) of the segment decreases, the height index 'N' correspondingly increases and vice versa. Preferably, the height index 'N' may be expanded to the range of 2 to 20 and, optionally, further to the range of 2 to 30.

In the bending surface region F formed at the top and bottom of the electrode assembly, the overlapping layer number uniform region may be used as a welding target region of the current collector.

Preferably, the welding region of the current collector overlaps at least 50% with the overlapping layer number uniform region in the radial direction of the electrode assembly. Here, the overlapping ratio may be higher.

Preferably, the remaining region of the welding region of the current collector that does not overlap with the overlapping layer number uniform region may overlap with the overlapping layer number decreasing region adjacent to the overlapping layer number uniform region in the radial direction.

The remaining region of the welding region of the current collector that does not overlap with the overlapping layer number uniform region may overlap with a region of the overlapping layer number decreasing region in which the number of overlapping layers of segments is 10 or more.

If the current collector is welded to the region where the number of overlapping layers of the segments is 10 or more, it is preferable in terms of welding strength and in terms of preventing damage to the separator or the active material layer during welding. In particular, it is useful when welding the current collector using a high-power laser with high penetration characteristics.

If the overlapping layer number uniform region in which 10 or more segments are stacked is welded to the current collector with a laser, even if the laser output is increased to improve the welding quality, the overlapping layer number uniform region absorbs most of the laser energy to form welding beads, so it is possible to prevent the separator and the active material layer under the bending surface region F from being damaged by the laser.

In addition, in the area irradiated with laser, the number of overlapping layers of segments is 10 or more, so welding beads are formed with sufficient volume and thickness. Accordingly, the welding strength may be sufficiently secured and the resistance of the welding interface may be lowered to a level suitable for rapid charging.

When welding the current collector, the laser output may be determined by the desired welding strength between the bending surface region F and the current collector. The welding strength increases proportionally with the number of overlapping layers of segments. This is because as the number of overlapping layers increases, the volume of welding beads formed by the laser increases. The welding beads are formed when the material of the current collector and the material of the segment are melted together. Therefore, if the volume of the welding beads is large, the current collector and the bending surface region are coupled stronger and the contact resistance of the welding interface is lowered.

The welding strength may be 2 kgf/cm$^2$ or more, more particularly 4 kgf/cm$^2$ or more. The maximum welding strength may be dependent on a power of a laser welding equipment. As one example, the welding strength may be set to 8 kgf/cm$^2$ or less, more particularly 6 kgf/cm$^2$ or less, but the present invention is not limited thereto.

If the welding strength satisfies the above numerical range, the physical properties of the welding interface do not deteriorate even if severe vibration is applied to the electrode assembly along the winding axis direction and/or the radial direction, and the resistance of the welding interface may also be reduced due to the sufficient volume of the welding beads.

The laser power to satisfy the welding strength condition varies depending on the laser equipment, and it may be appropriately adjusted in the range of 250 W to 320 W or 40% to 100% of the maximum laser power specification provided by the corresponding equipment.

The welding strength may be defined as a tensile force per unit area (kgf/cm$^2$) of the current collector when the current collector starts to separate from the bending surface region F. Specifically, after the current collector is completely welded, a tensile force may be applied to the current collector, but the magnitude of the tensile force may be gradually increased. If the tensile force exceeds a threshold, the segment begins to separate from the welding interface. At this time, the value obtained by dividing the tensile force applied to the current collector by the area of the current collector corresponds to the welding strength.

In the bending surface region F, segments are stacked into multiple layers, and according to the above embodiments, the number of overlapping layers of the segments may be increased from 10 sheets at minimum to 35 sheets at maximum.

The thickness of the positive electrode current collector (foil) constituting an uncoated portion 43 may be in the range of 10 μm to 25 μm, and the thickness of the negative electrode current collector (foil) constituting an uncoated portion 43 may be in the range of 5 μm to 20 μm. Therefore, the bending surface region F of the positive electrode may include a region where the total overlapping thickness of the segments is 100 μm to 875 um. In addition, the bending surface region F of the negative electrode may include a region where the total overlapping thickness of the segments is 50 μm to 700 μm.

FIG. 10$f$ is a top plan view showing an electrode assembly in which the overlapping layer number uniform region b1 and the overlapping layer number decreasing region b2 are depicted in the bending surface region F of the segments 61, 61' according to an embodiment of the present disclosure.

Referring to FIG. 10$f$, the area between two circles indicated by thick solid lines corresponds to the bending surface region F of the segment, and the area between two circles indicated by dashed-dotted lines corresponds to the overlapping layer number uniform region b1 in which the number of overlapping layers of the segments is 10 or more, and the outer region of the overlapping layer number uniform region b1 corresponds to the overlapping layer number decreasing region b2.

In one example, if the current collector ($P_c$) is welded to the bending surface region F, a welding pattern ($W_p$) is formed on the surface of the current collector ($P_c$). The welding pattern ($W_p$) may be a line pattern or a dot array pattern. The welding pattern ($W_p$) corresponds to the welding region, and may overlap with the overlapping layer number uniform region b1 of the segment by 50% or more along the radial direction. Accordingly, a part of the welding pattern ($W_p$) may be included in the overlapping layer number uniform region b1, and the remainder of the welding pattern ($W_p$) may be included in the overlapping layer number decreasing region b1 outside the overlapping layer number uniform region b1. Of course, the entire welding pattern ($W_p$) may overlap with the overlapping layer number uniform region b1 in order to maximize a welding strength and lower a resistance in the welding region.

The area of the bending surface region F may be defined as the sum of the area of the overlapping layer number uniform region b1 of the segment and the area of the overlapping layer number decreasing region b2. Since the ratio (e/f) of the overlapping layer number uniform region b1 is 30% to 85%, preferably 31% to 82%, the ratio of the area of the overlapping layer number uniform region b1 to the area of the bending surface region F may be 9% ($30^2/100^2$) to 72% ($85^2/100^2$), preferably 10% ($31^2/100^2$) to 67% ($82^2/100^2$).

Preferably, the edge of the portion where the current collector (Pc) contacts the bending surface region F may cover the end of the segments 61, 61' bent toward the core C in the last winding turn of the height uniform region (③). In this case, since a welding pattern ($W_p$) is formed in a state where the segments 61, 61' are pressed by the current collector ($P_c$), the current collector ($P_c$) and the bending surface region F are strongly coupled. As a result, the segments 61, 61' stacked in the winding axis direction are closely adhered to each other, thereby lowering the resistance at the welding interface and preventing the segments 61, 61' from lifting.

Meanwhile, the bending direction of the segment may be opposite to that described above. That is, the segment may be bent from the core toward the outer circumference. In this case, the pattern in which the height of the segment is changed along the winding direction (X-axis direction) may be opposite to that of the former embodiments (modified examples). For example, the height of the segment may be lowered stepwise from the core toward the outer circumference. Also, the structure applied to the first part B1 and the structure applied to the second part B3 may be switched with each other. Preferably, the height change pattern of the segment may be designed such that the height of the segment is gradually decreased from the core side to the outer circumference side, but the end of the segment is not exposed out of the outer circumference of the electrode assembly when the segment closest to the outer circumference of the electrode assembly is bent toward the outer circumference.

The electrode structure of the above embodiments (modifications) may be applied to at least one of the first electrode and the second electrode having different polarities included in the jelly-roll type electrode assembly or other type of electrode assembly known in the art. In addition, when the electrode structure of the above embodiments (modifications) is applied to any one of the first electrode and the second electrode, the conventional electrode structure may be applied to the other one. In addition, the electrode structures applied to the first electrode and the second electrode may not be identical but be different from each other.

For example, when the first electrode and the second electrode are a positive electrode and a negative electrode, respectively, any one of the above embodiments (modifications) may be applied to the first electrode and the conventional electrode structure (see FIG. 1) may be applied to the second electrode.

As another example, when the first electrode and the second electrode are a positive electrode and a negative electrode, respectively, any one of the above embodiments (modifications) may be selectively applied to the first electrode and any one of the above embodiments (modifications) may be selectively applied to the second electrode.

In the present disclosure, a positive electrode active material coated on the positive electrode and a negative electrode active material coated on the negative electrode may employ any active material known in the art without limitation.

In one example, the positive electrode active material may include an alkali metal compound expressed by a general formula $A[A_xM_y]O_{2+z}$ (A includes at least one element among Li, Na and K; M includes at least one element selected from is Ni, Co, Mn, Ca, Mg, Al, Ti, Si, Fe, Mo, V, Zr, Zn, Cu, Al, Mo, Sc, Zr, Ru, and Cr; x≥0, 1≤x+y≤2, −0.1≤z≤2; and the stoichiometric modulus x, y and z are selected so that the compound maintains electrical neutrality).

In another example, the positive electrode active material may be an alkali metal compound $xLiM^1O_2\text{-}(1-x)Li_2M^2O_3$ disclosed in U.S. Pat. Nos. 6,677,082, 6,680,143, et al., wherein $M^1$ includes at least one element having an average oxidation state 3; $M^2$ includes at least one element having an average oxidation state 4; and 0≤x≤1).

In still another example, the positive electrode active material may be lithium metal phosphate expressed by a general formula $Li_aM^1_xFe_{1-x}M^2_yP_{1-y}M^3_zO_{4-z}$ ($M^1$ includes at least one element selected from the Ti, Si, Mn, Co, Fe, V, Cr, Mo, Ni, Nd, Al, Mg and Al; $M^2$ includes at least one element selected from Ti, Si, Mn, Co, Fe, V, Cr, Mo, Ni, Nd, Al, Mg, Al, As, Sb, Si, Ge, V and S; $M^3$ includes a halogen element optionally including F; 0<a≤2, 0≤x≤1, 0≤y<1, 0≤z<1; the stoichiometric coefficient a, x, y and z are selected so that the compound maintains electrical neutrality), or $Li_3M_2(PO_4)_3$ (M includes at least one element selected from Ti, Si, Mn, Fe, Co, V, Cr, Mo, Ni, Al, Mg and Al).

Preferably, the positive electrode active material may include primary particles and/or secondary particles in which the primary particles are aggregated.

In one example, the negative electrode active material may employ carbon material, lithium metal or lithium metal compound, silicon or silicon compound, tin or tin compound, or the like. Metal oxides such as $TiO_2$ and $SnO_2$ with a potential of less than 2V may also be used as the negative electrode active material. As the carbon material, both low-crystalline carbon, high-crystalline carbon or the like may be used.

The separator may employ a porous polymer film, for example, a porous polymer film made of a polyolefin-based polymer such as ethylene homopolymer, propylene homopolymer, ethylene/butene copolymer, ethylene/hexene copolymer, ethylene/methacrylate copolymer, or the like, or laminates thereof. As another example, the separator may employ a common porous nonwoven fabric, for example, a nonwoven fabric made of high melting point glass fiber, polyethylene terephthalate fiber, or the like.

A coating layer of inorganic particles may be included in at least one surface of the separator. It is also possible that the separator itself is made of a coating layer of inorganic particles. Particles in the coating layer may be coupled with a binder so that an interstitial volume exists between adjacent particles.

The inorganic particles may be made of an inorganic material having a dielectric constant of 5 or more. As a non-limiting example, the inorganic particles may include at least one material selected from the group consisting of $Pb(Zr,Ti)O_3$ (PZT), $Pb_{1-x}La_xZr_{1-y}Ti_yO_3$ (PLZT), PB(Mg$_3$Nb$_{2/3}$)O$_3$—PbTiO$_3$ (PMN-PT), BaTiO$_3$, hafnia (HfO$_2$), SrTiO$_3$, TiO$_2$, Al$_2$O$_3$, ZrO$_2$, SnO$_2$, CeO$_2$, MgO, CaO, ZnO and Y$_2$O$_3$.

Hereinafter, the structure of the electrode assembly according to an embodiment of the present disclosure will be described in detail.

Figure 11:
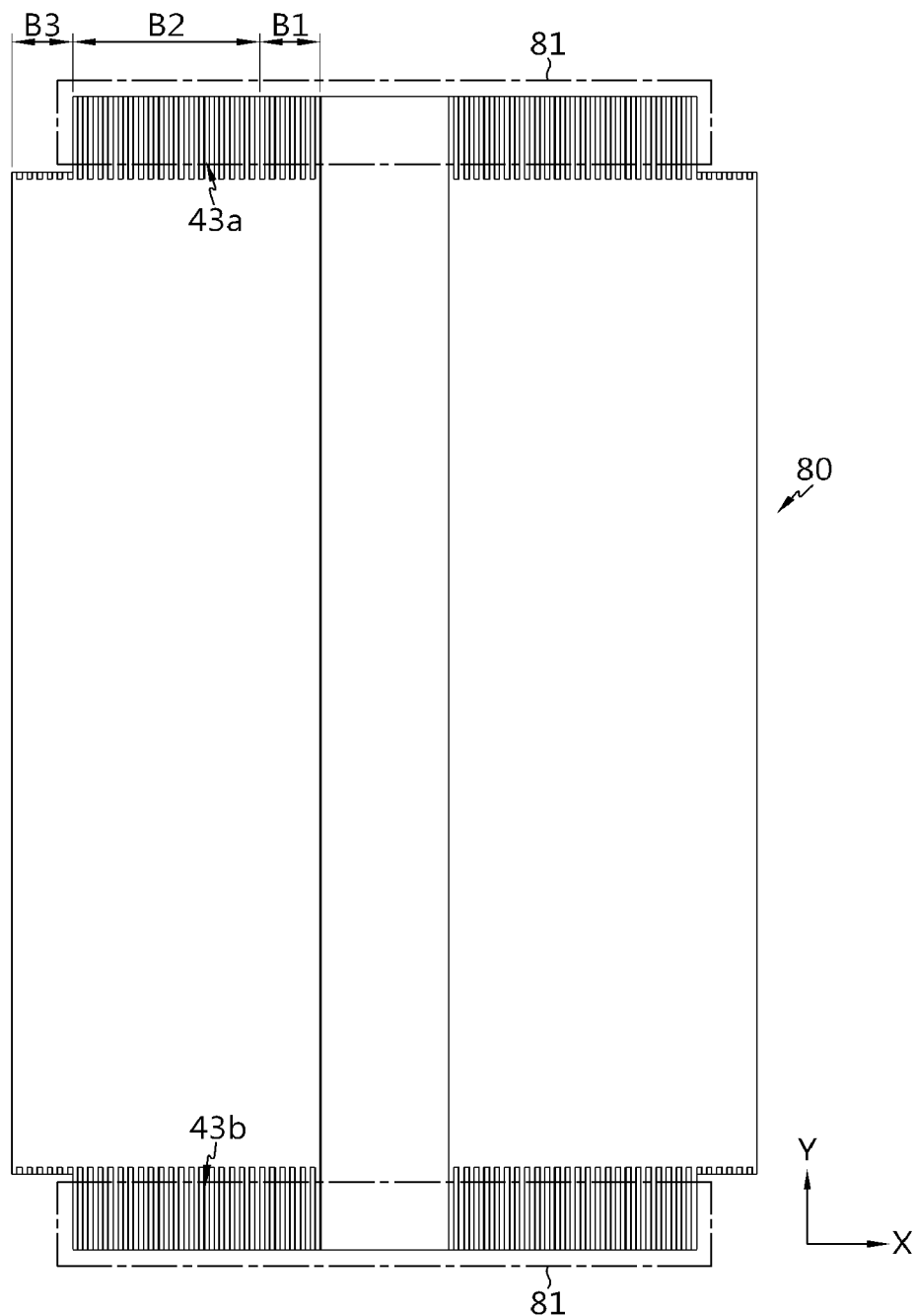
FIG. 11 is a sectional view showing a jelly-roll type electrode assembly in which the electrode of the first embodiment is applied to a first electrode (a positive electrode) and a second electrode (a negative electrode), taken along the Y-axis direction (winding axis direction).

FIG. 11 is a sectional view showing a jelly-roll type electrode assembly 80 in which the electrode 40 of the first embodiment is applied to the first electrode (the positive electrode) and the second electrode (the negative electrode), taken along the Y-axis direction (winding axis direction).

Figure 2:
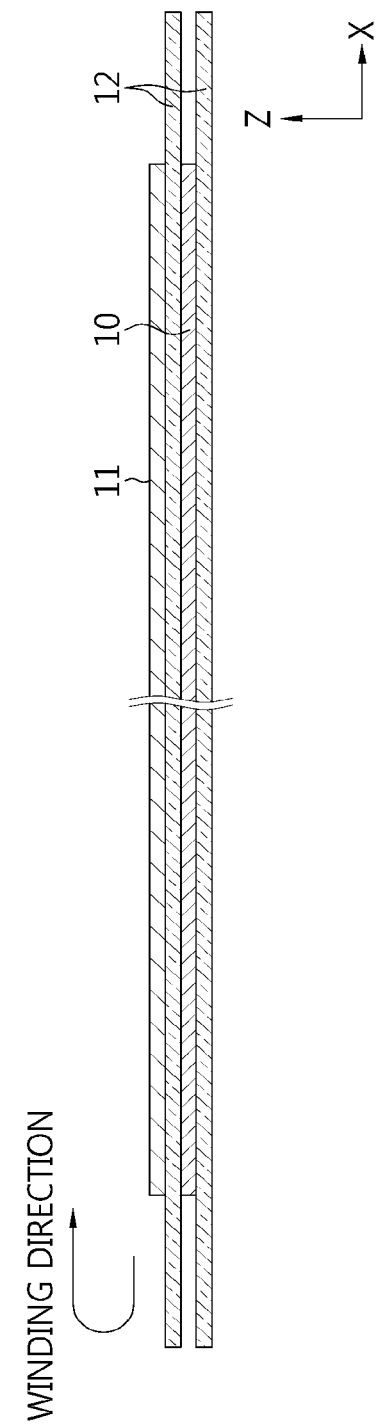
FIG. 2 is a diagram showing an electrode winding process of the conventional tab-less cylindrical battery.
Figure 3:
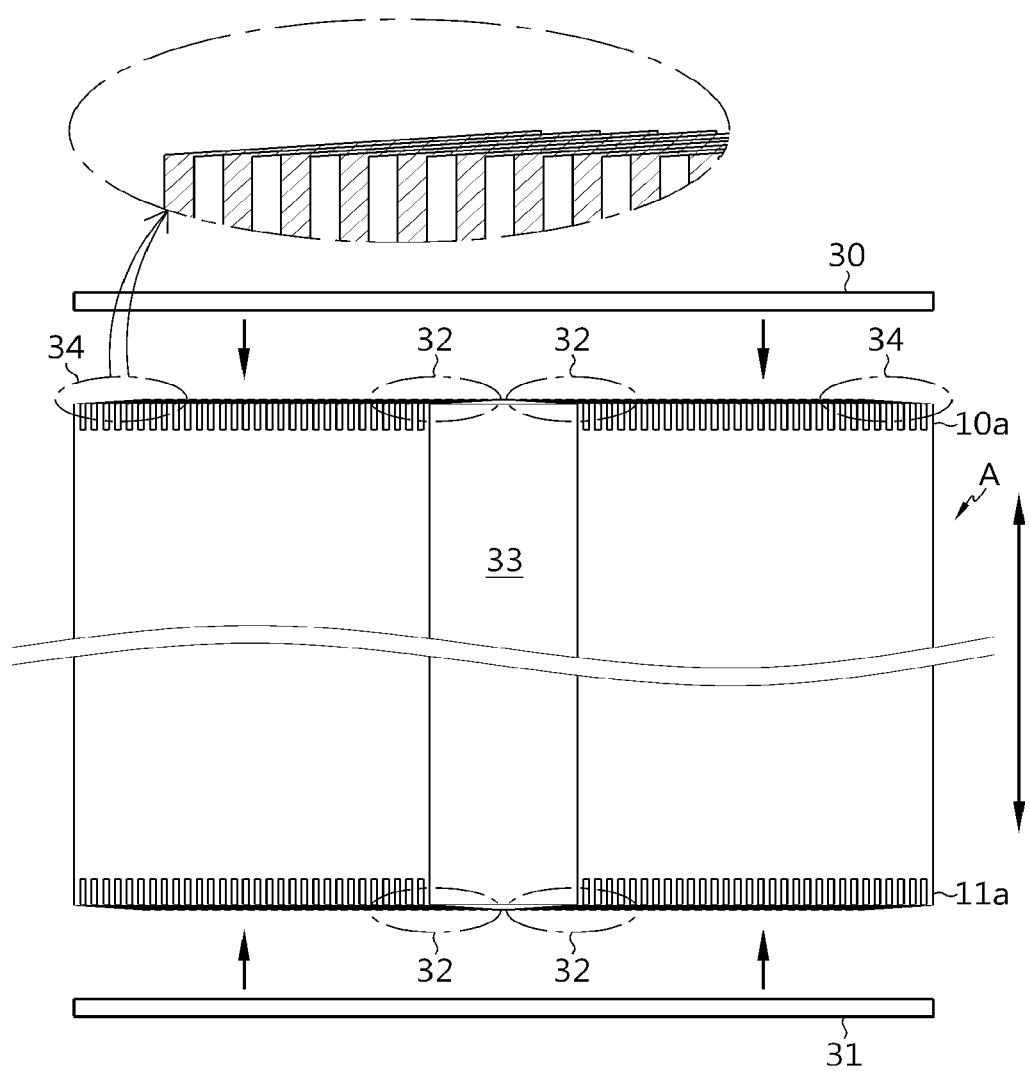
FIG. 3 is a diagram showing a process of welding a current collector to a bent surface region of an uncoated portion in the conventional tab-less cylindrical battery.

The electrode assembly 80 may be manufactured by the winding method described with reference to FIG. 2. For convenience of description, the protruding structures of the first uncoated portion 43a and the second uncoated portion 43b extending out of the separator are illustrated in detail, and the winding structures of the first electrode, the second electrode, and the separator are not depicted. The first uncoated portion 43a protruding upward extends from the first electrode, and the second uncoated portion 43b protruding downward extends from the second electrode.

The patterns in which the heights of the first and second uncoated portions 43a, 43b change are schematically illustrated. That is, the height of the uncoated portion may vary irregularly depending on the position at which the cross-section is cut. For example, at a cross-section where the sides of the trapezoidal segments 61, 61' or the cut grooves 63 are cut, the height of the uncoated portion in the cross section is lower than the height H of the segments 61, 61'. Accordingly, it should be understood that the heights of the uncoated portions depicted in the drawings showing the cross-section of the electrode assembly correspond to the average of the heights (H in FIGS. 7b and 8b) of the uncoated portion included in each winding turn.

Referring to FIG. 11, the first uncoated portion 43a includes a first part B1 adjacent to the core of the electrode assembly 80, a second part B3 adjacent to the outer circumference of the electrode assembly 80, and a third part B2 interposed between the first part B1 and the second part B3.

The height (length in the Y-axis direction) of the second part B3 is relatively smaller than the height of the third part B2. Accordingly, it is possible to prevent that an internal short circuit occurs since the beading portion and the second part B3 contact each other while the beading portion of the battery housing is being pressed near the second part B3.

The second uncoated portion 43b has the same structure as the first uncoated portion 43a. In one modification, the second uncoated portion 43b may have a conventional electrode structure or an electrode structure of other embodiments (modifications).

The ends 81 of the first uncoated portion 43a and the second uncoated portion 43b may be bent in the radial direction of the electrode assembly 80, for example from the outer circumference toward the core. At this time, the second part B3 may not be substantially bent.

Figure 12:
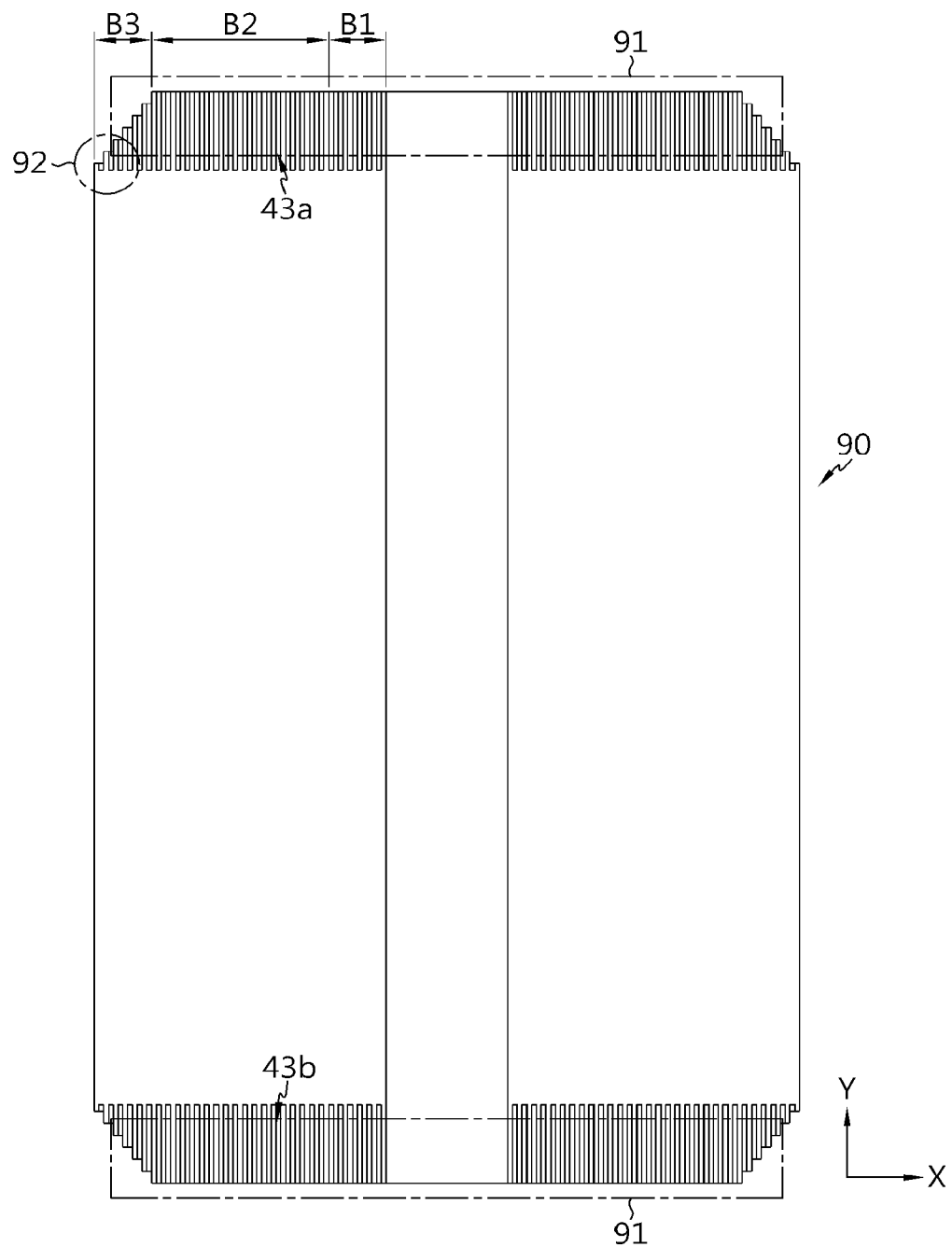
FIG. 12 is a sectional view showing a jelly-roll type electrode assembly in which the electrode of the second embodiment is applied to the first electrode (the positive electrode) and the second electrode (the negative electrode), taken along the Y-axis direction (winding axis direction).

FIG. 12 is a sectional view showing a jelly-roll type electrode assembly 90 in which the electrode 45 of the second embodiment is applied to the first electrode (the positive electrode) and the second electrode (the negative electrode), taken along the Y-axis direction (winding axis direction).

Referring to FIG. 12, the first uncoated portion 43a includes a first part B1 adjacent to the core of the electrode assembly 90, a second part B3 adjacent to the outer circumference of the electrode assembly 90, and a third part B2 interposed between the first part B1 and the second part B3.

The height of the second part B3 is relatively smaller than the height of the third part B2 and decreases gradually or stepwise from the core to the outer circumference. Accordingly, it is possible to prevent that an internal short circuit occurs since the beading portion and the second part B3 contact each other while the beading portion of the battery housing is being pressed near the second part B3.

The second uncoated portion 43b has the same structure as the first uncoated portion 43a. In one modification, the second uncoated portion 43b may have a conventional electrode structure or an electrode structure of other embodiments (modifications).

The ends 91 of the first uncoated portion 43a and the second uncoated portion 43b may be bent in the radial direction of the electrode assembly 90, for example from the outer circumference to the core. At this time, the outermost portion 92 of the second part B3 may not be substantially bent.

Figure 13:
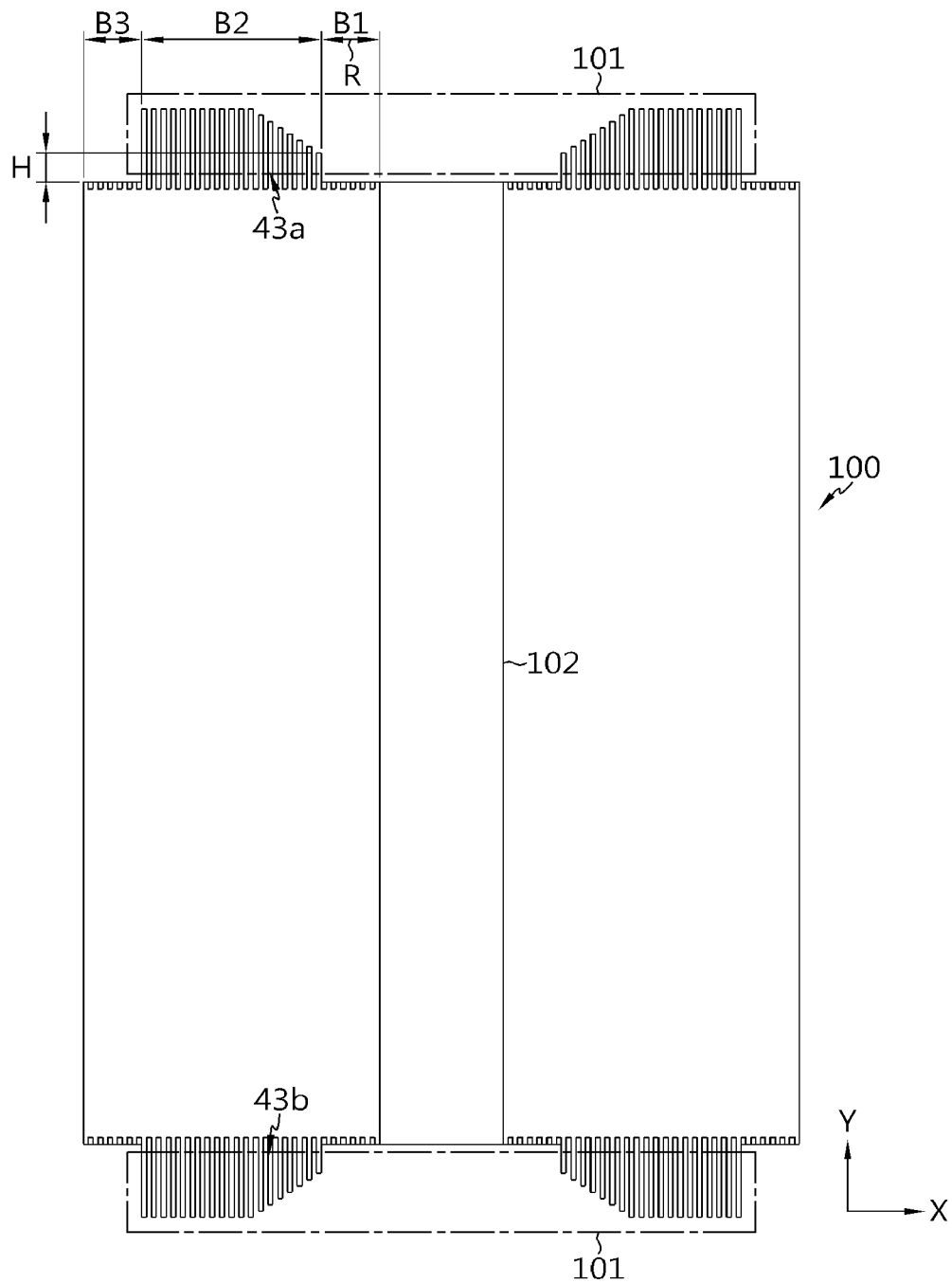
FIG. 13 is a sectional view showing a jelly-roll type electrode assembly in which any one of the electrodes of the third to fifth embodiments (modifications thereof) is applied to the first electrode (the positive electrode) and the second electrode (the negative electrode), taken along the Y-axis direction (winding axis direction).

FIG. 13 is a sectional view showing a jelly-roll type electrode assembly 100 in which any one of the electrodes 50, 60, 70 of the third to fifth embodiments (modifications thereof) are applied to the first electrode (the positive electrode) and the second electrode (the negative electrode), taken along the Y-axis direction (winding axis direction).

Referring to FIG. 13, the first uncoated portion 43a includes a first part B1 adjacent to the core of the electrode assembly 100, a second part B3 adjacent to the outer circumference of the electrode assembly 100, and a third part B2 interposed between the first part B1 and the second part B3.

The height of the first part B1 is relatively smaller than the height of the third part B2. In addition, the bending length of the uncoated portion 43a located at the innermost side of the third part B2 is equal to or smaller than the radial length (R) of the first part B1. The bending length (H) corresponds to the distance from the bending point of the uncoated portion 43a to the top of the uncoated portion 43a. In a modified example, the bending length (H) may be smaller than the sum of the radial length (R) of the first part B1 and 10% of the radius of the core 102.

Therefore, even if the third part B2 is bent, the core 102 of the electrode assembly 100 is open to the outside by 90% or more of the diameter of the core 102. The core 102 is a cavity at the center of the electrode assembly 100. If the core 102 is not blocked, there is no difficulty in the electrolyte injection process, and the electrolyte injection efficiency is improved. In addition, by inserting a welding jig through the core 102, the welding process may be easily performed between the current collector of the negative electrode (or, the positive electrode) and the battery housing (or, the terminal).

The height of the second part B3 is relatively smaller than the height of the third part B2. Accordingly, while the beading portion of the battery housing is being pressed near the second part B3, it is possible to prevent the beading portion and the second part B3 from coming into contact with each other to cause an internal short circuit.

In one modification, the height of the second part B3 may be decreased gradually or stepwise, unlike that shown in FIG. 13. Also, in FIG. 13, although the height of the third part B2 is partially the same in a circumferential direction, the height of the third part B2 may increase gradually or stepwise from the boundary between the first part B1 and the third part B2 to the boundary between the third part B2 and the second part B3. When the third part B2 is divided into a plurality of segments, a region in which the height of the uncoated portion 43a changes corresponds to the height variable region (②) in FIG. 10a) of the segment.

The second uncoated portion 43b has the same structure as the first uncoated portion 43a. In one modification, the second uncoated portion 43b may have a conventional electrode structure or an electrode structure of other embodiments (modifications).

The ends 101 of the first uncoated portion 43a and the second uncoated portion 43b may be bent in the radial direction of the electrode assembly 100, for example from the outer circumference to the core. At this time, the first part B1 and the second part B3 are not substantially bent.

When the third part B2 includes a plurality of segments, the bending stress may be relieved to prevent the uncoated portion 43a near the bending point from being torn or abnormally deformed. In addition, when the width and/or height and/or separation pitch of the segment is adjusted according to the numerical range of the above embodiment, the segments are bent toward the core and overlap in multiple layers to sufficiently secure the welding strength, and an empty hole (gap) is not formed in the bent surface region.

Figure 14:
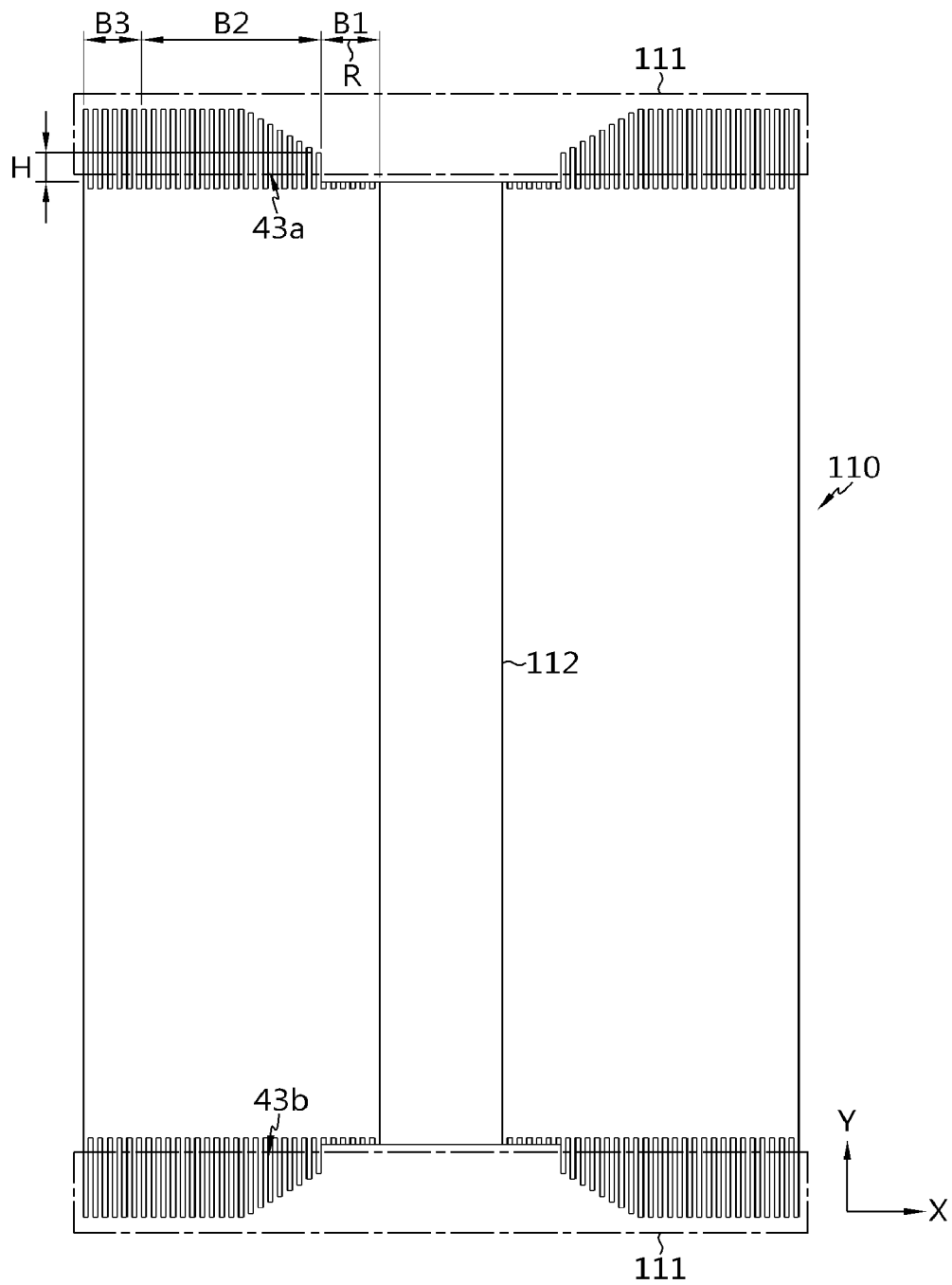
FIG. 14 is a sectional view showing an electrode assembly according to still another embodiment of the present disclosure, taken along the Y-axis direction (winding axis direction).

FIG. 14 is a sectional view showing an electrode assembly 110 according to still another embodiment of the present disclosure, taken along the Y-axis direction (winding axis direction).

Referring to FIG. 14, the electrode assembly 110 is substantially the same as the electrode assembly 100 of FIG. 13, except that the height of the second part B3 is substantially the same as the height of the outermost side of the third part B2.

The second part B3 may include a plurality of segments. The configuration of the plurality of segments is substantially the same as described in the fourth and fifth embodiments (modifications) related to electrodes.

In the electrode assembly 110, the height of the first part B1 is relatively smaller than the height of the third part B2. Also, the bending length (H) of the uncoated portion located at the innermost side of the third part B2 is equal to or smaller than the radial length (R) of the first part B1. Preferably, the first part B1 may be the segment skip region having no segment (0 in FIG. 10a). In a modified example, the bending length (H) may be smaller than the sum of the radial length (R) of the first part B1 and 10% of the radius of the core 102.

Therefore, even if the third part B2 is bent, the core 112 of the electrode assembly 110 is opened to the outside by at least 90% or more of the diameter of the core 112. If the core 112 is not blocked, there is no difficulty in the electrolyte injection process and the electrolyte injection efficiency is improved. In addition, by inserting a welding jig through the core 112, the welding process may be easily performed between the current collector of the negative electrode (or, the positive electrode) and the battery housing (or, the terminal).

In one modification, the structure in which the height of the third part B2 increases gradually or stepwise from the core toward the outer circumference may be extended to the second part B3. In this case, the height of the uncoated portion 43a may be increased gradually or stepwise from the boundary between the first part B1 and the third part B2 to the outermost surface of the electrode assembly 110.

The second uncoated portion 43b has the same structure as the first uncoated portion 43a. In one modification, the second uncoated portion 43b may have a conventional electrode structure or an electrode structure of other embodiments (modifications).

The ends 111 of the first uncoated portion 43a and the second uncoated portion 43b may be bent in the radial direction of the electrode assembly 110, for example from the outer circumference toward the core. At this time, the first part B1 is not substantially bent.

When the third part B2 and the second part B3 include a plurality of segments, the bending stress may be relieved to prevent the uncoated portions 43a, 43b near the bending point from being torn or abnormally deformed. In addition, when the width and/or height and/or separation pitch of the segment is adjusted according to the numerical range of the above embodiment, the segments are bent toward the core and overlap in multiple layers to sufficiently secure the welding strength, and an empty hole (gap) is not formed in the bent surface region.

Figure 15:
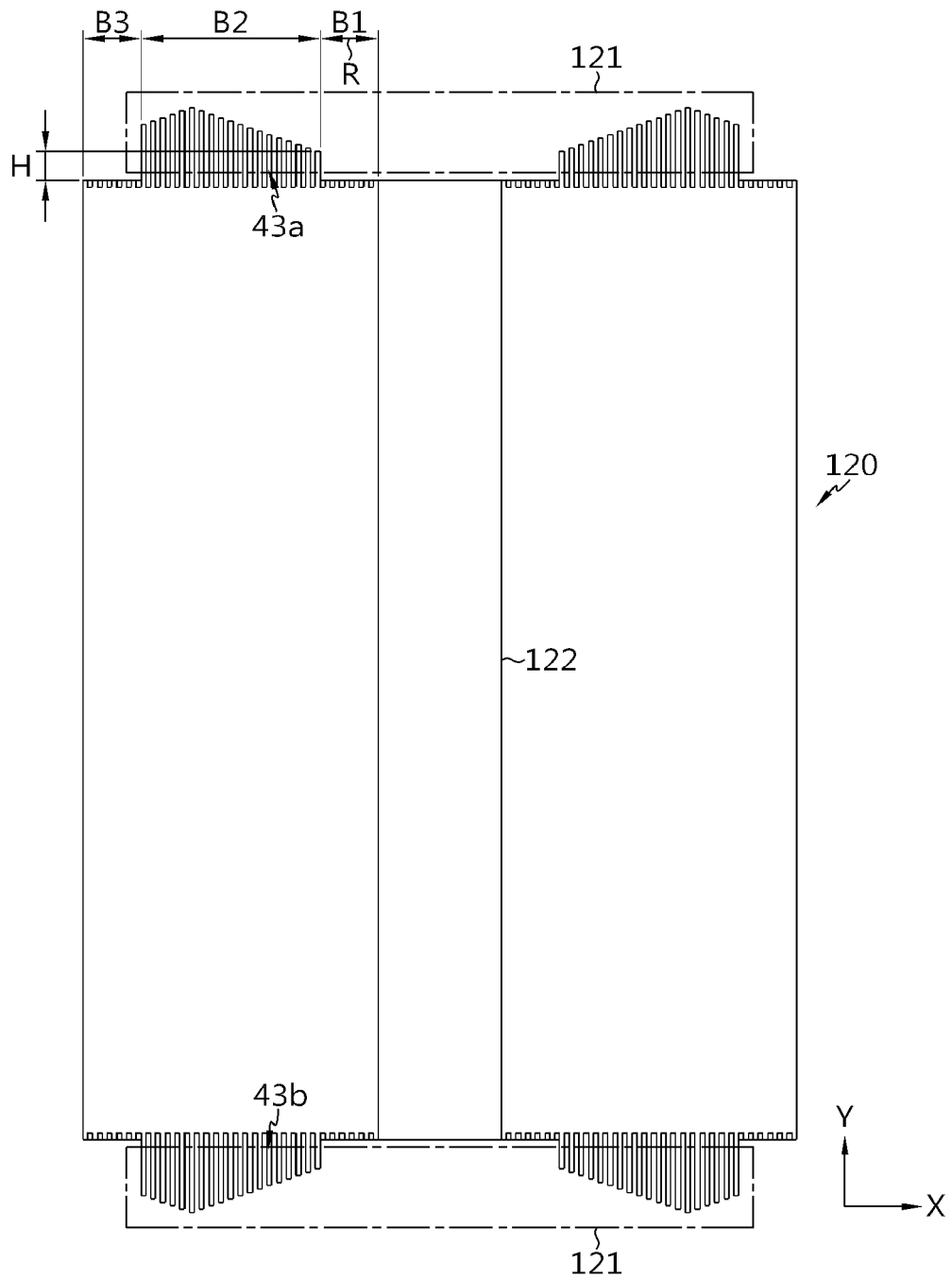
FIG. 15 is a sectional view showing an electrode assembly according to still another embodiment of the present disclosure, taken along the Y-axis direction (winding axis direction).

FIG. 15 is a sectional view showing an electrode assembly 120 according to still another embodiment of the present disclosure, taken along the Y-axis direction (winding axis direction).

Referring to FIG. 15, the electrode assembly 120 is substantially the same as the electrode assembly 100 of FIG. 13, except that the height of the third part B2 has a pattern increasing and then decreasing gradually or stepwise. The radial region in which the height of the third part B2 changes may be regarded as the height variable region (②) in FIG. 10a) of the segment. Even in this case, the height variable region of the segment may be designed so that the overlapping layer number uniform region in which the number of overlapping layers of segments is 10 or more appears in the numerical range described above in the bending surface region F formed by bending the third part B2.

This change in height of the third part B2 may be implemented by using the step pattern (see FIG. 6) or adjusting the height of segments (see FIG. 7a or 8a) included in the third part B2.

In the electrode assembly 120, the height of the first part B1 is relatively smaller than the height of the third part B2. Also, the bending length (H) of the uncoated portion located at the innermost side of the third part B2 is equal to or smaller than the radial length (R) of the first part B1. The region corresponding to the first part B1 corresponds to the segment skip region having no segment (① in FIG. 10a). In a modified example, the bending length (H) may be smaller than the sum of the radial length (R) of the first part B1 and 10% of the radius of the core 102.

Therefore, even if the third part B2 is bent toward the core, the core 122 of the electrode assembly 120 is opened to the outside by at least 90% or more of its diameter. If the core 122 is not blocked, there is no difficulty in the electrolyte injection process and the electrolyte injection efficiency is improved. In addition, by inserting a welding jig through the core 122, the welding process may be easily performed between the current collector of the negative electrode (or, the positive electrode) and the battery housing (or, the terminal).

Also, the height of the second part B3 is relatively smaller than the height of the third part B2, and preferably no segment may be formed in the second part B3. Accordingly, it is possible to prevent that an internal short circuit occurs since the beading portion and the second part B3 contact each other while the beading portion of the battery housing is being pressed near the second part B3. In one modification, the height of the second part B3 may decrease gradually or stepwise toward the outer circumference.

The second uncoated portion 43b has the same structure as the first uncoated portion 43a. In a modification, the second uncoated portion 43b may have a conventional electrode structure or an electrode structure of other embodiments (modifications).

The ends 121 of the first uncoated portion 43a and the second uncoated portion 43b may be bent from the outer circumference of the electrode assembly 120 to the core. At this time, the first part B1 and the second part B3 are not substantially bent.

When the third part B2 includes a plurality of segments, the bending stress may be relieved to prevent the uncoated portions 43a, 43b from being torn or abnormally deformed. In addition, when the width and/or height and/or separation pitch of the segment is adjusted according to the numerical range of the above embodiment, the segments are bent toward the core and overlap in multiple layers to sufficiently secure the welding strength, and an empty hole (gap) is not formed in the bent surface region.

Figure 16:
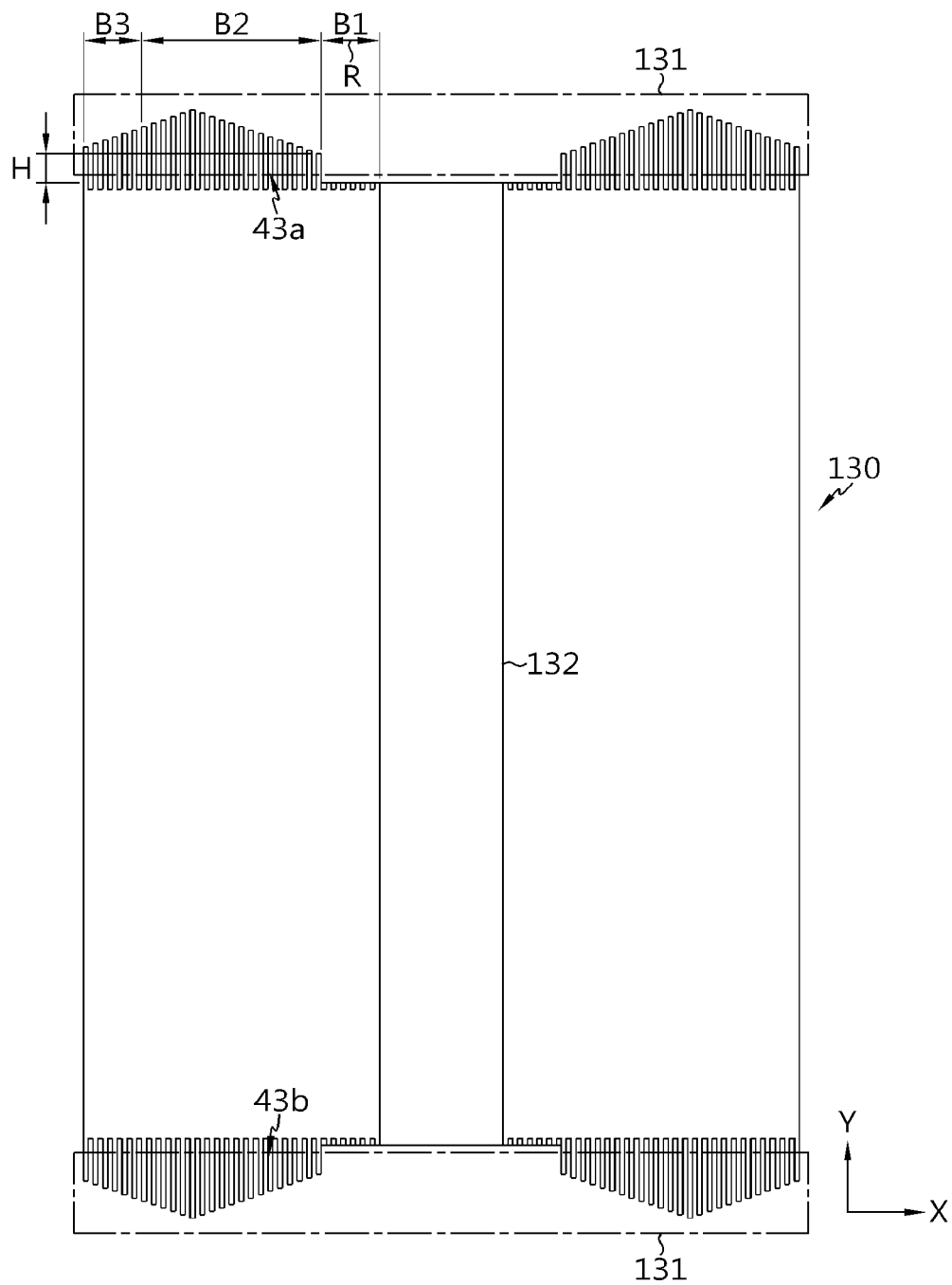
FIG. 16 is a sectional view showing an electrode assembly according to still another embodiment of the present disclosure, taken along the Y-axis direction (winding axis direction).

FIG. 16 is a sectional view showing an electrode assembly 130 according to still another embodiment of the present disclosure, taken along the Y-axis direction (winding axis direction).

Referring to FIG. 16, the electrode assembly 130 is substantially the same as the electrode assembly 120 of FIG. 15, except that the height of the second part B3 has a pattern that decreases gradually or stepwise from the boundary point of the second part B3 and the third part B2 toward the outermost surface of the electrode assembly 130.

This change in the height of the second part B3 may be implemented by extending the step pattern (see FIG. 6) included in the third part B2 to the second part B3 while simultaneously decreasing the height of the pattern toward the outer circumference gradually or stepwise. In addition, in another modification, the change in height of the second part B3 may be implemented by extending the segment structure of the third part B2 to the second part B3 while simultaneously decreasing the height of the segments gradually or stepwise toward the outer circumference.

In the electrode assembly 130, the height of the first part B1 is relatively smaller than the height of the third part B2. Also, in the third part B2, the bending length (H) of the innermost uncoated portion is equal to or smaller than the radial length (R) of the first part B1. The first part B1 corresponds to the segment skip region having no segment (①in FIG. 10a). In a modified example, the bending length (H) may be smaller than the sum of the radial length (R) of the first part B1 and 10% of the radius of the core 102.

Accordingly, even if the third part B2 is bent toward the core, the core 132 of the electrode assembly 130 is opened to the outside by at least 90% or more of its diameter. If the core 132 is not blocked, there is no difficulty in the electrolyte injection process and the electrolyte injection efficiency is improved. In addition, by inserting a welding jig through the core 132, the welding process may be easily performed between the current collector of the negative electrode (or, the positive electrode) and the battery housing (or, the terminal).

The second uncoated portion 43b has the same structure as the first uncoated portion 43a. In one modification, the second uncoated portion 43b may have a conventional electrode structure or an electrode structure of other embodiments (modifications).

The ends 131 of the first uncoated portion 43a and the second uncoated portion 43b may be bent from the outer circumference of the electrode assembly 130 to the core. At this time, the first part B1 is not substantially bent.

When the third part B2 and the second part B3 include a plurality of segments, the bending stress may be relieved to prevent the uncoated portions 43a, 43b near the bending point from being torn or abnormally deformed. In addition, when the width and/or height and/or separation pitch of the segment is adjusted according to the numerical range of the above-described embodiment, the segments are bent toward the core and overlap in multiple layers to sufficiently secure the welding strength, and an empty hole (gap) is not formed in the bent surface region.

Meanwhile, in the former embodiments (modified examples), the ends of the first uncoated portion 43a and the second uncoated portion 43b may be bent from the core toward the outer circumference. In this case, it is preferable that the second part B3 is designed as the segment skip region having no segment (0 in FIG. 10a) and is not bent toward the outer circumference. In addition, the width of the second part B3 in the radial direction may be equal to or greater than the length at which the outermost uncoated portion (or segment) of the third part B2 is bent. Only then, when the outermost uncoated portion (or segment) of the third part B2 is bent toward the outer circumference, the end of the bent portion does not protrude toward the inner surface of the battery housing beyond the outer circumference of the electrode assembly. Also, the change pattern of the segment structure may be opposite to the former embodiments (modified examples). For example, the height of the segment may be increased stepwise or gradually from the core toward the outer circumference. That is, by arranging the segment skip region (① of FIG. 10a), the height variable region (② of FIG. 10a) of the segment, and the height uniform region (③ of FIG. 10a) of the segment from the outer circumference of the electrode assembly to the core in order, the overlapping layer number uniform region in which the number of overlapping layers of segments is 10 or more may appear in a desired numerical range in the bending surface region.

Various electrode assembly structures according to an embodiment of the present disclosure may be applied to a cylindrical battery.

Preferably, the cylindrical battery may be, for example, a cylindrical battery whose form factor ratio (defined as a value obtained by dividing the diameter of the cylindrical battery by height, namely a ratio of height (H)-to-diameter (Φ)) is greater than about 0.4. Here, the form factor means a value indicating the diameter and height of a cylindrical battery.

Preferably, the cylindrical battery may have a diameter of 40 mm to 50 mm and a height of 60 mm to 130 mm. The form factor of the cylindrical battery according to an embodiment of the present disclosure may be, for example, 46110, 4875, 48110, 4880, or 4680. In the numerical value representing the form factor, first two numbers indicate the diameter of the battery and remaining numbers indicate the height of the battery.

When an electrode assembly having a tab-less structure is applied to a cylindrical battery having a form factor ratio of more than 0.4, the stress applied in the radial direction when the uncoated portion is bent is large, so that the uncoated portion may be easily torn. In addition, when welding the current collector to the bent surface region of the uncoated portion, it is necessary to sufficiently increase the number of overlapping layers of the uncoated portion on the bent surface region in order to sufficiently secure the welding strength and lower the resistance. This requirement may be achieved by the electrode and the electrode assembly according to the embodiments (modifications) of the present disclosure.

A battery according to an embodiment of the present disclosure may be a cylindrical battery having an approximately cylindrical shape, whose diameter is approximately 46 mm, height is approximately 110 mm, and form factor ratio is 0.418.

A battery according to another embodiment may be a cylindrical battery having a substantially cylindrical shape, whose diameter is about 48 mm, height is about 75 mm, and form factor ratio is 0.640.

A battery according to still another embodiment may be a cylindrical battery having an approximately cylindrical shape, whose diameter is approximately 48 mm, height is approximately 110 mm, and form factor ratio is 0.436.

A battery according to still another embodiment may be a cylindrical battery having an approximately cylindrical shape, whose diameter is approximately 48 mm, height is approximately 80 mm, and form factor ratio is 0.600.

A battery according to still another embodiment may be a cylindrical battery having an approximately cylindrical shape, whose diameter is approximately 46 mm, height is approximately 80 mm, and form factor ratio is 0.575.

Conventionally, batteries having a form factor ratio of about 0.4 or less have been used. That is, conventionally, for example, 1865 battery, 2170 battery, etc. were used. The 1865 battery has a diameter of approximately 18 mm, height of approximately 65 mm, and a form factor ratio of 0.277. The 2170 battery has a diameter of approximately 21 mm, a height of approximately 70 mm, and a form factor ratio of 0.300.

Hereinafter, the cylindrical battery according to an embodiment of the present disclosure will be described in detail.

Figure 17:
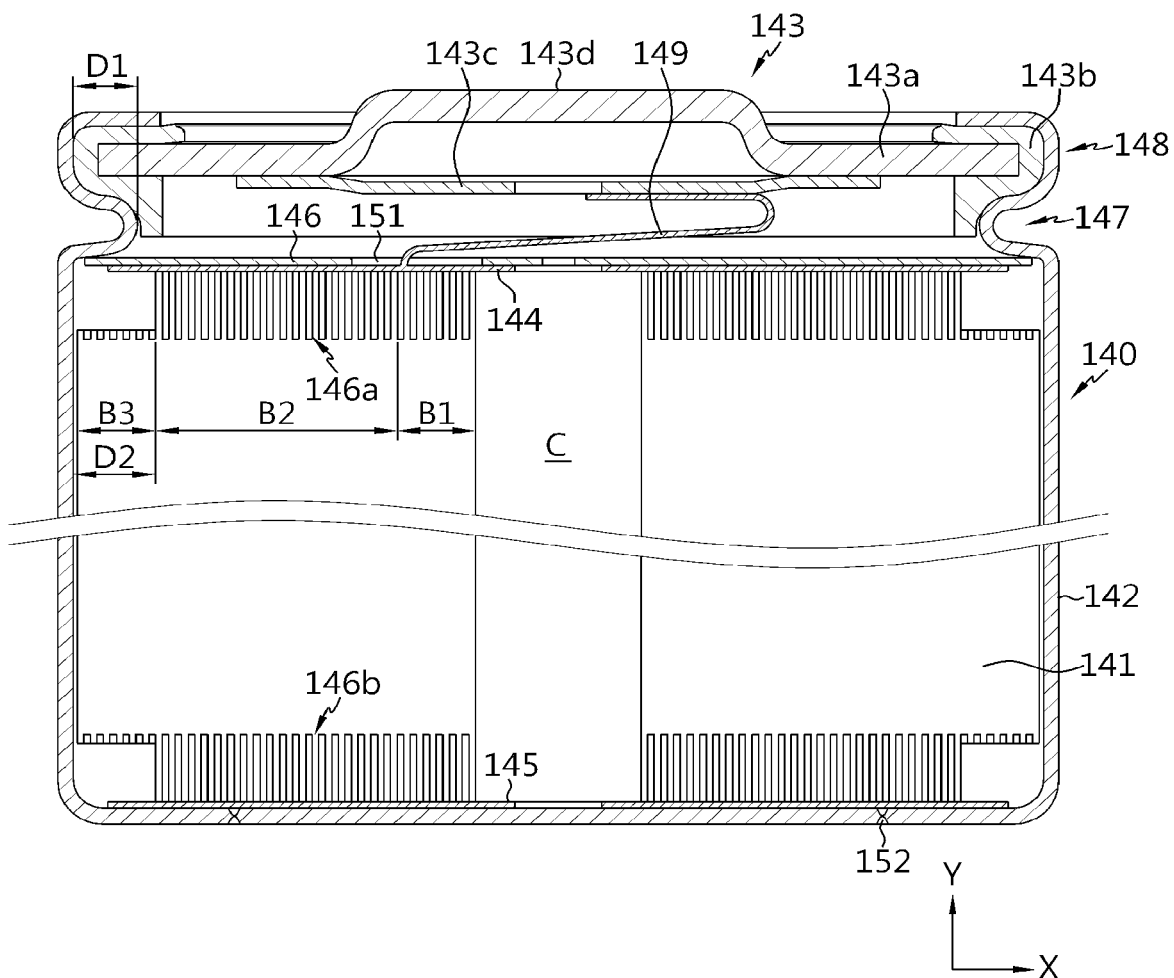
FIG. 17 is a sectional view showing a cylindrical battery according to an embodiment of the present disclosure, taken along the Y-axis direction.

FIG. 17 is a sectional view showing a cylindrical battery 140 according to an embodiment of the present disclosure, taken along the Y-axis direction.

Referring to FIG. 17, the cylindrical battery 140 according to an embodiment of the present disclosure includes an electrode assembly 141 having a first electrode, a separator and a second electrode, a battery housing 142 for accommodating the electrode assembly 141, and a sealing body 143 for sealing an open end of the battery housing 142.

The battery housing 142 is a cylindrical container with an opening at the top. The battery housing 142 is made of a conductive metal material such as aluminum, steel or stainless steel. A nickel coating layer may be formed on the surface of the battery housing 142. The battery housing 142 accommodates the electrode assembly 141 in the inner space through the top opening and also accommodates the electrolyte.

The electrolyte may be a salt having a structure like $A^+B^-$. Here, $A^+$ includes an alkali metal cation such as $Li^+$, $Na^+$, or $K^+$, or a combination thereof. and $B^-$ includes at least one anion selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2$, $CH_3CO_2^-$, $SCN^-$ and $(CF_3CF_2SO_2)_2N^-$.

The electrolyte may also be dissolved in an organic solvent. The organic solvent may employ propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or a mixture thereof.

The electrode assembly 141 may have a jelly-roll shape but the present invention is not limited thereto. The electrode assembly 141 may be manufactured by winding a laminate formed by sequentially laminating a lower separator, a first electrode, an upper separator, and a second electrode at least once, based on the winding axis of the core C, as shown in FIG. 2.

The first electrode and the second electrode have different polarities. That is, if one has positive polarity, the other has negative polarity. At least one of the first electrode and the second electrode may have an electrode structure according to the above embodiments (modifications). In addition, the other of the first electrode and the second electrode may have a conventional electrode structure or an electrode structure according to embodiments (modifications). The electrode pair included in the electrode assembly 141 is not limited to one pair, but two or more pairs may also be included.

A first uncoated portion 146a of the first electrode and a second uncoated portion 146b of the second electrode protrude from the upper and lower portions of the electrode assembly 141, respectively. The first electrode has the electrode structure of the first embodiment (modification). Accordingly, in the first uncoated portion 146a, the height of the second part B3 is smaller than the height of the uncoated portion of the other region. The second part B3 is spaced apart from the inner circumference of the battery housing 142, particularly the beading portion 147, with a predetermined interval. Therefore, the second part B3 of the first electrode does not come into contact with the battery housing 142 electrically connected to the second electrode, thereby preventing an internal short circuit of the battery 140.

The second uncoated portion 146b of the second electrode may have the same structure as the first uncoated portion 146a. In another modification, the second uncoated portion 146b may optionally have the structure of the uncoated portion of the electrode according to embodiments (modifications).

The sealing body 143 may include a cap 143a having a plate shape, a first gasket 143b for providing airtightness between the cap 143a and the battery housing 142 and having insulation property, and a connection plate 143c electrically and mechanically coupled to the cap 143a.

The cap 143a is a component made of a conductive metal material, and covers the top opening of the battery housing 142. The cap 143a is electrically connected to the uncoated portion 146a of the first electrode, and is electrically insulated from the battery housing 142 by means of the first gasket 143b. Accordingly, the cap 143a may function as a first electrode terminal (for example, the positive electrode) of the cylindrical battery 140.

The cap 143a is placed on the beading portion 147 formed on the battery housing 142, and is fixed by a crimping portion 148. Between the cap 143a and the crimping portion 148, the first gasket 143b may be interposed to secure the airtightness of the battery housing 142 and the electrical insulation between the battery housing 142 and the cap 143a. The cap 143a may have a protrusion 143d protruding upward from the center thereof.

The battery housing 142 is electrically connected to the second uncoated portion 146b of the second electrode. Therefore, the battery housing 142 has the same polarity as the second electrode. If the second electrode has negative polarity, the battery housing 142 also has negative polarity.

The battery housing 142 includes the beading portion 147 and the crimping portion 148 at the top thereof. The beading portion 147 is formed by press-fitting the periphery of the outer circumference of the battery housing 142. The beading portion 147 prevents the electrode assembly 141 accommodated inside the battery housing 142 from escaping through the top opening of the battery housing 142, and may function as a support portion on which the sealing body 143 is placed.

The inner circumference of the beading portion 147 is spaced apart from the second part B3 of the first electrode with a predetermined interval. More specifically, the lower end of the inner circumference of the beading portion 147 is spaced apart from the second part B3 of the first electrode with a predetermined interval. In addition, since the second part B3 has a low height, the second part B3 is not substantially affected even when the battery housing 142 is press-fitted from the outside to form the beading portion 147. Accordingly, the second part B3 is not compressed by other components such as the beading portion 147, and thus the shape of the electrode assembly 141 is prevented from being partially deformed, thereby preventing a short circuit inside the cylindrical battery 140.

Preferably, when the press-in depth of the beading portion 147 is defined as D1 and the radial length from the inner circumference of the battery housing 142 to the boundary point of the second part B3 and the third part B2 is defined as D2, the formula D1≤D2 may be satisfied. In this case, damage to the second part B3 is substantially prevented when the battery housing is press-fitted to form the beading portion 147.

The crimping portion 148 is formed on the beading portion 147. The crimping portion has an extended and bent shape to cover the outer circumference of the cap 143a disposed on the beading portion 147 and a part of the upper surface of the cap 143a.

The cylindrical battery 140 may further include a first current collector 144 and/or a second current collector 145 and/or an insulator 146.

The first current collector 144 is coupled to the upper portion of the electrode assembly 141. The first current collector 144 is made of a conductive metal material such as aluminum, copper, steel and nickel, and is electrically connected to the uncoated portion 146a of the first electrode. The electric connection may be performed by welding. A lead 149 may be connected to the first current collector 144. The lead 149 may extend upward above the electrode assembly and be coupled to the connection plate 143c or directly coupled to the lower surface of the cap 143a. The lead 149 may be connected to other components by welding.

Preferably, the first current collector 144 may be integrally formed with the lead 149. In this case, the lead 149 may have an elongated plate shape extending outward from the vicinity of the center of the first current collector 144.

The first current collector 144 may include a plurality of unevenness radially formed on a lower surface thereof. When the radial unevenness is provided, the unevenness may be press-fitted into the first uncoated portion 146a of the first electrode by pressing the first current collector 144.

The first current collector 144 is coupled to the end of the first uncoated portion 146a. The first uncoated portion 146a and the first current collector 144 may be coupled, for example, by laser welding. Laser welding may be performed in a manner that partially melts a base material of the current collector 144. In a modification, the first current collector 144 and the first uncoated portion 146a may be welded in a state where a solder is interposed therebetween. In this case, the solder may have a lower melting point compared to the first current collector 144 and the first uncoated portion 146a. Laser welding may be replaced by resistance welding, ultrasonic welding, spot welding, or the like.

The second current collector 145 may be coupled to the lower surface of the electrode assembly 141. One side of the second current collector 145 may be coupled to the second uncoated portion 146b by welding, and the other side may be coupled to the inner bottom surface of the battery housing 142 by welding. The coupling structure between the second current collector 145 and the second uncoated portion 146b may be substantially the same as the coupling structure between the first current collector 144 and the first uncoated portion 146a.

The uncoated portions 146a, 146b are not limited to the illustrated structure. Accordingly, the uncoated portions 146a, 146b may selectively adopt not only a conventional uncoated portion structure but also the uncoated portion structure of the electrode according to embodiments (modifications).

The insulator 146 may cover the first current collector 144. The insulator 146 may cover the first current collector 144 at the upper surface of the first current collector 144, thereby preventing direct contact between the first current collector 144 and the inner circumference of the battery housing 142.

The insulator 146 has a lead hole 151 so that the lead 149 extending upward from the first current collector 144 may be withdrawn therethrough. The lead 149 is drawn upward through the lead hole 151 and coupled to the lower surface of the connection plate 143c or the lower surface of the cap 143a.

A peripheral region of the edge of the insulator 146 may be interposed between the first current collector 144 and the beading portion 147 to fix the coupled body of the electrode assembly 141 and the first current collector 144. Accordingly, in the coupled body of the electrode assembly 141 and the first current collector 144, the movement of the battery 140 in the winding axis direction Y may be restricted, thereby improving the assembly stability of the battery 140.

The insulator 146 may be made of an insulating polymer resin. In one example, the insulator 146 may be made of polyethylene, polypropylene, polyimide, or polybutylene terephthalate.

The battery housing 142 may further include a venting portion 152 formed at a lower surface thereof. The venting portion 152 corresponds to a region having a smaller thickness compared to the peripheral region of the lower surface of the battery housing 142. The venting portion 152 is structurally weak compared to the surrounding area. Accordingly, when an abnormality occurs in the cylindrical battery 140 and the internal pressure increases to a predetermined level or more, the venting portion 152 may be ruptured so that the gas generated inside the battery housing 142 is discharged to the outside. The internal pressure at which the venting portion 152 ruptures may be approximately 15 kgf/cm² to 35 kgf/cm².

The venting portion 152 may be formed continuously or discontinuously while drawing a circle at the lower surface of the battery housing 142. In a modification, the venting portion may be formed in a straight pattern or other patterns.

Figure 18:
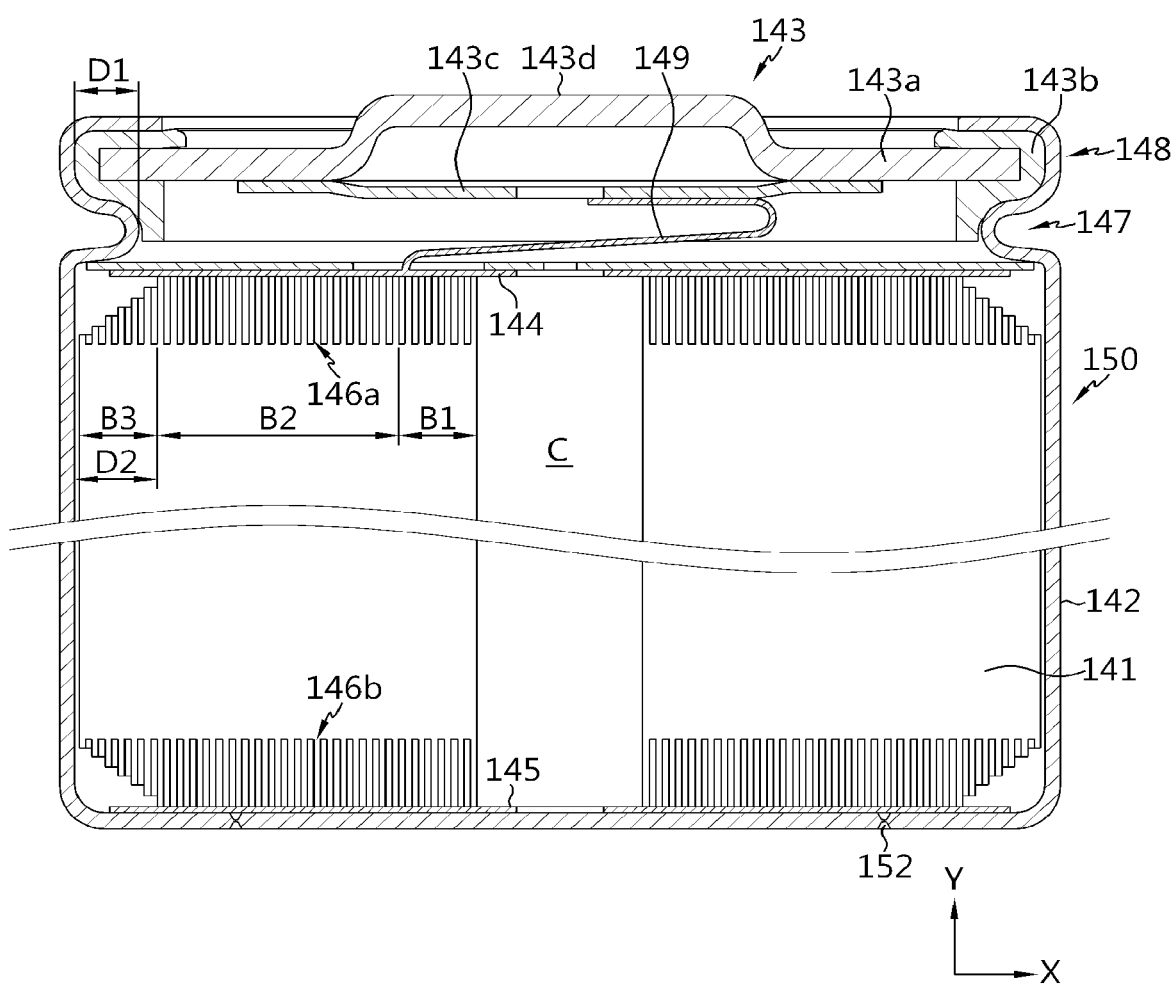
FIG. 18 is a sectional view showing a cylindrical battery according to another embodiment of the present disclosure, taken along the Y-axis direction.

FIG. 18 is a sectional view showing a cylindrical battery 150 according to another embodiment of the present disclosure, taken along the Y-axis direction.

Referring to FIG. 18, the cylindrical battery 150 is substantially the same as the cylindrical battery 140 of FIG. 17, except that the electrode structure of the second embodiment (modification) is employed in the first uncoated portion 146a of the first electrode.

Referring to FIG. 18, the first uncoated portion 146a of the first electrode may have a shape in which the height of the second part B3 is decreased gradually or stepwise toward the inner circumference of the battery housing 142. Preferably, the virtual line connecting the top end of the second part B3 may have the same or similar shape as the inner circumference of the beading portion 147.

The second part B3 forms an inclined surface. Accordingly, when the battery housing is press-fitted to form the beading portion 147, it is possible to prevent the second part B3 from being compressed and damaged by the beading portion 147. In addition, it is possible to suppress the phenomenon that the second part B3 comes into contact with the battery housing having a different polarity to cause an internal short circuit.

The remaining components of the cylindrical battery 150 are substantially the same as the embodiment (modification) described above.

The uncoated portions 146a, 146b are not limited to the illustrated structure. Accordingly, the uncoated portions 146a, 146b may selectively have not only a conventional uncoated portion structure but also the uncoated portion structure of the electrode according to embodiments (modifications).

Figure 19:
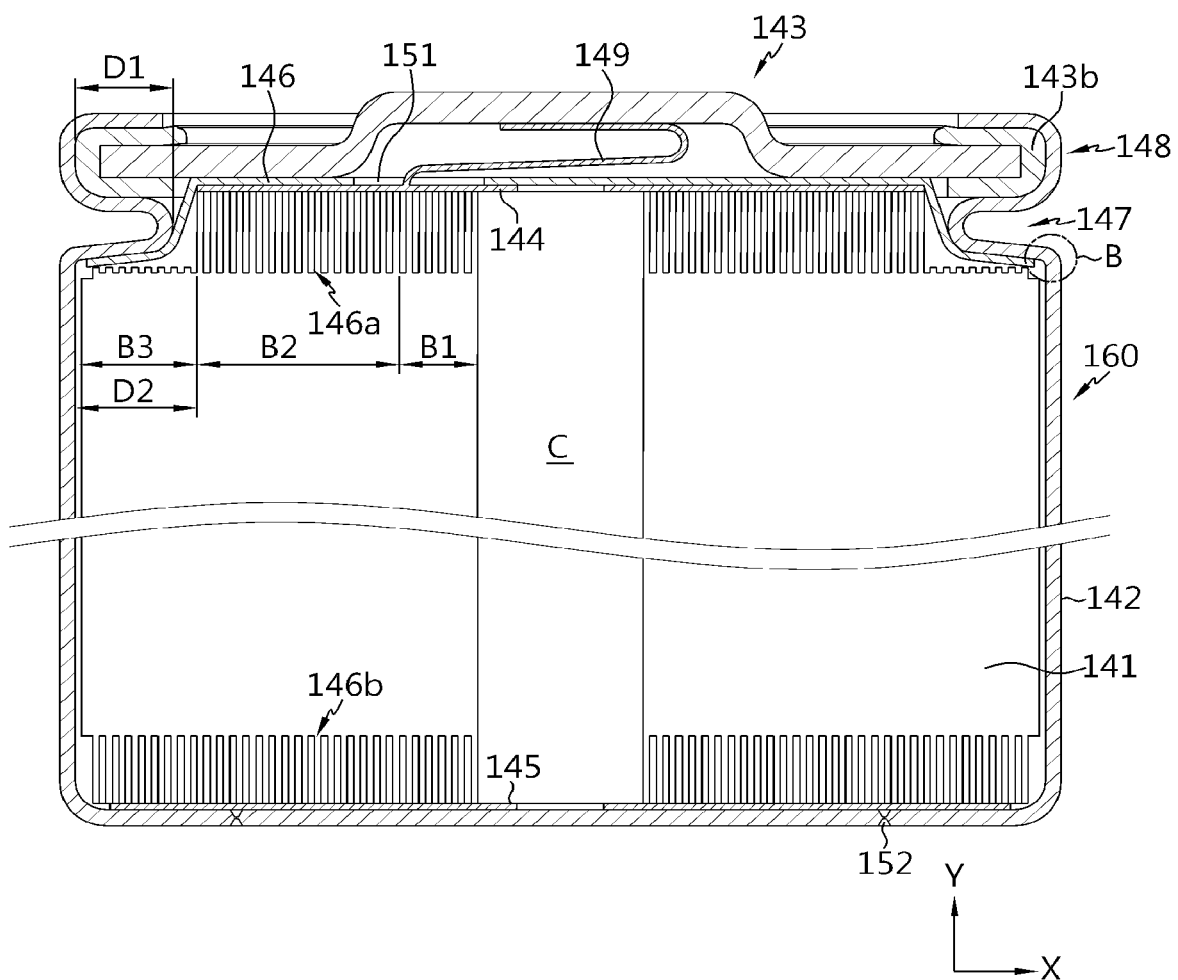
FIG. 19 is a sectional view showing a cylindrical battery according to still another embodiment of the present disclosure, taken along the Y-axis direction.

FIG. 19 is a sectional view showing a cylindrical battery 160 according to still another embodiment of the present disclosure, taken along the Y-axis direction.

Referring to FIG. 19, the cylindrical battery 160 is substantially the same as the cylindrical batteries 140, 150 described above, except that the lead 149 connected to the first current collector 144 is directly connected to the cap 143a of the sealing body 143 through the lead hole 151 of the insulator 146, and the insulator 146 and the first current collector 144 have a structure in close contact with the lower surface of the cap 143a.

In the cylindrical battery 160, the diameter of the first current collector 144 and the outermost diameter of the third part B2 are smaller than the minimum inner diameter of the battery housing 142. Also, the diameter of the first current collector 144 may be equal to or greater than the outermost diameter of the third part B2.

Specifically, the minimum inner diameter of the battery housing 142 may correspond to the inner diameter of the battery housing 142 at a position where the beading portion 147 is formed. At this time, the outermost diameter of the first current collector 144 and the third part B2 is smaller than the inner diameter of the battery housing 142 at the position where the beading portion 147 is formed. Also, the diameter of the first current collector 144 may be equal to or greater than the outermost diameter of the third part B2. The peripheral region of the edge of the insulator 146 may be interposed between the second part B3 and the beading portion 147 in a state of being bent downward to fix the coupled body of the electrode assembly 141 and the first current collector 144.

Preferably, the insulator 146 may include a portion covering the second part B3 and a portion covering the first current collector 144, and a portion connecting these two portions may have a form curved together in response to the curved shape of the beading portion 147. The insulator 146 may insulate the second part B3 and the inner circumference of the beading portion and at the same time insulate the first current collector 144 and the inner circumference of the beading portion 147.

The first current collector 144 may be positioned higher than the lower end of the beading portion 147, and may be coupled to the first part B1 and the third part B2. At this time, the press-in depth D1 of the beading portion 147 is less than or equal to the distance D2 from the inner circumference of the battery housing 142 to the boundary between the second part B3 and the third part B2. Accordingly, the first part B1, the third part B2, and the first current collector coupled thereto may be positioned higher than the lower end of the beading portion 147. The lower end of the beading portion 147 means a bending point (B) between the portion of the battery housing 142 in which the electrode assembly 141 is accommodated and the beading portion 147.

Since the first part B1 and the third part B2 occupy the inner space of the beading portion 147 in the radial direction, an empty space between the electrode assembly 141 and the cap 143a may be minimized. In addition, the connection plate 143c located in the empty space between the electrode assembly 141 and the cap 143a is omitted. Accordingly, the lead 149 of the first current collector 144 may be directly coupled to the lower surface of the cap 143a. According to the above structure, an empty space in the battery may be reduced, and the energy density may be maximized as much as the reduced empty space.

In the cylindrical battery 160, the first current collector 144 and the second current collector 145 may be welded to the ends of the first and second uncoated portions 146a, 146b, respectively, in the same manner as in the above embodiment.

The uncoated portions 146a, 146b are not limited to the illustrated structure. Accordingly, the uncoated portions 146a, 146b may selectively have not only a conventional uncoated portion structure but also the uncoated portion structure of the electrode according to embodiments (modifications).

Figure 20:
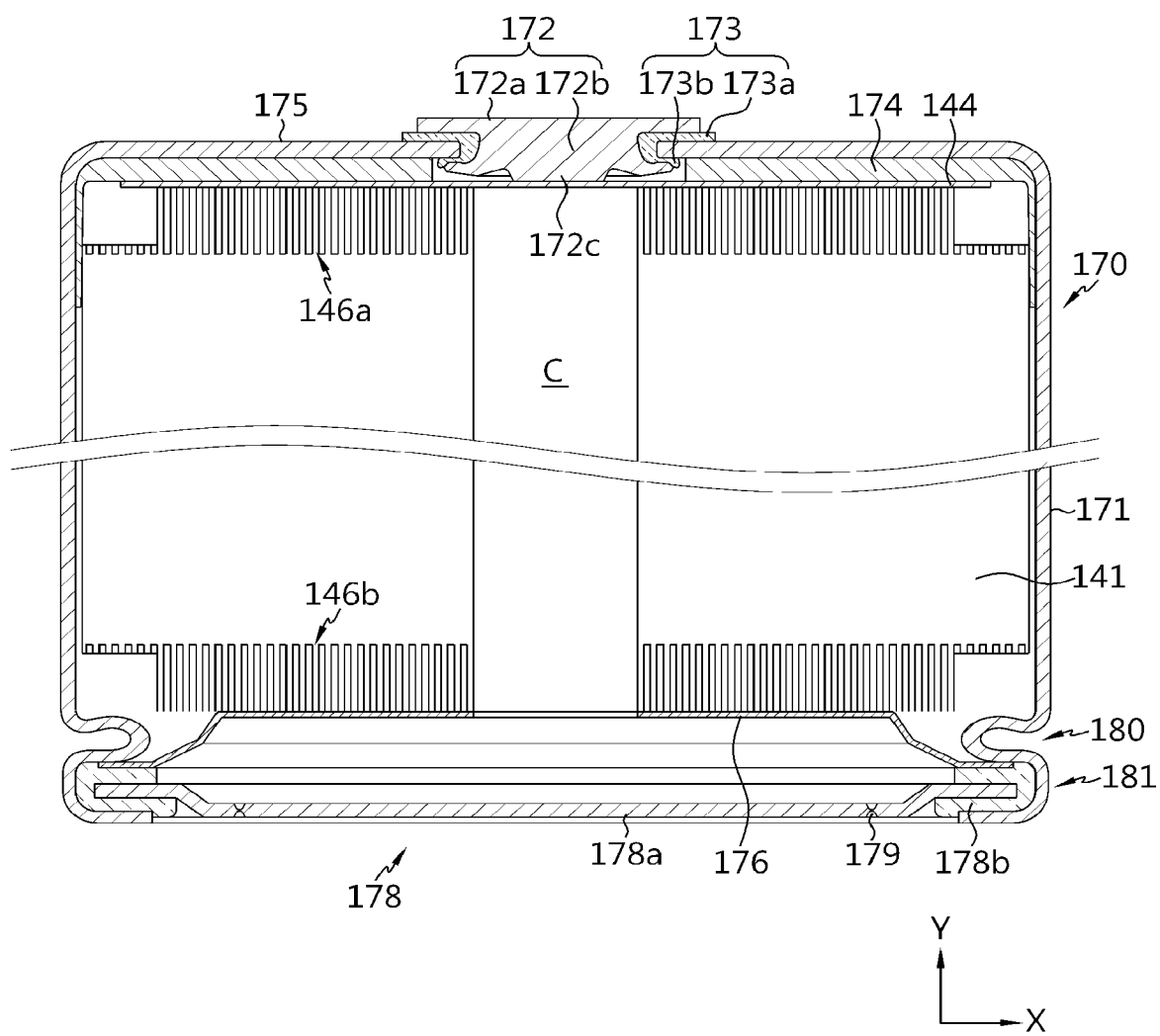
FIG. 20 is a sectional view showing a cylindrical battery according to still another embodiment of the present disclosure, taken along the Y-axis.

FIG. 20 is a sectional view showing a cylindrical battery 170 according to still another embodiment of the present disclosure, taken along the Y-axis.

Referring to FIG. 20, the structure of the electrode assembly of the cylindrical battery is substantially the same as that of the cylindrical battery 140 of in FIG. 17, and the other structure except for the electrode assembly is changed.

Specifically, the cylindrical battery 170 includes a battery housing 171 through which a terminal 172 is installed. The terminal 172 is installed through a perforation hole formed in the closed surface (the upper surface in the drawing) of the battery housing 171. The terminal 172 is riveted to the perforation hole of the battery housing 171 in a state where a second gasket 173 made of an insulating material is interposed therebetween. The terminal 172 is exposed to the outside in a direction opposite to the direction of gravity.

The terminal 172 includes a terminal exposing portion 172a and a terminal insert portion 172b. The terminal exposing portion 172a is exposed to the outside of the closed surface of the battery housing 171. The terminal exposing portion 172a may be located approximately at a central portion of the closed surface of the battery housing 171. The maximum diameter of the terminal exposing portion 172a may be larger than the maximum diameter of the perforation hole formed in the battery housing 171. The terminal insert portion 172b may be electrically connected to the uncoated portion 146a of the first electrode through approximately the central portion of the closed surface of the battery housing 171. The bottom edge of the terminal insert portion 172b may be riveted onto the inner surface of the battery housing 171. That is, the bottom edge of the terminal insert portion 172b may have a shape curved toward the inner surface of the battery housing 171. A flat portion 172c is included inside the bottom edge of the terminal insert portion 172b. The maximum diameter of the riveted lower portion of the terminal insert portion 172b may be larger than the maximum diameter of the perforation hole of the battery housing 171.

The flat portion 172c of the terminal insert portion 172b may be welded to the center of the first current collector 144 connected to the first uncoated portion 146a of the first electrode. As the welding method, laser welding is preferred, but other welding methods such as ultrasonic welding may be used.

An insulator 174 made of an insulating material may be interposed between the first current collector 144 and the inner surface of the battery housing 171. The insulator 174 covers the upper portion of the first current collector 144 and the top edge of the electrode assembly 141. Accordingly, it is possible to prevent the second part B3 of the electrode assembly 141 from contacting the inner surface of the battery housing 171 having a different polarity to cause a short circuit.

The thickness of the insulator 174 corresponds to or is slightly larger than the distance between the upper surface of the first current collector 144 and the inner surface of the closed portion of the battery housing 171. Accordingly, the insulator 174 may be in contact with the upper surface of the first current collector 144 and the inner surface of the closed portion of the battery housing 171.

The terminal insert portion 172b of the terminal 172 may be welded to the first current collector 144 through the perforation hole of the insulator 174. The diameter of the perforation hole formed in the insulator 174 may be larger than the diameter of the riveting portion at the lower end of the terminal insert portion 172b. Preferably, the perforation hole may expose the lower portion of the terminal insert portion 172b and the second gasket 173.

The second gasket 173 is interposed between the battery housing 171 and the terminal to prevent the battery housing 171 and the terminal 172 having opposite polarities from electrically contacting each other. Accordingly, the upper surface of the battery housing 171 having an approximately flat shape may function as a second electrode terminal (for example, the negative electrode) of the cylindrical battery 170.

The second gasket 173 includes a gasket exposing portion 173a and a gasket insert portion 173b. The gasket exposing portion 173a is interposed between the terminal exposing portion 172a of the terminal 172 and the battery housing 171. The gasket insert portion 173b is interposed between the terminal insert portion 172b of the terminal 172 and the battery housing 171. The gasket insert portion 173b may be deformed together when the terminal insert portion 172b is riveted, so as to be in close contact with the inner surface of the battery housing 171. The second gasket 173 may be made of, for example, a polymer resin having insulation.

The gasket exposing portion 173a of the second gasket 173 may have an extended shape to cover the outer circumference of the terminal exposing portion 172a of the terminal 172. When the second gasket 173 covers the outer circumference of the terminal 172, it is possible to prevent a short circuit from occurring while an electrical connection part such as a bus bar is coupled to the upper surface of the battery housing 171 and/or the terminal 172. The gasket exposing portion 173a may have an extended shape to cover not only the outer circumference surface of the terminal exposing portion 172a but also a part of the upper surface thereof.

When the second gasket 173 is made of a polymer resin, the second gasket 173 may be coupled to the battery housing 171 and the terminal 172 by thermal fusion. In this case, airtightness at the coupling interface between the second gasket 173 and the terminal 172 and at the coupling interface between the second gasket 173 and the battery housing 171 may be enhanced. Meanwhile, when the gasket exposing portion 173a of the second gasket 173 has a shape extending to the upper surface of the terminal exposing portion 172a, the terminal 172 may be integrally coupled with the second gasket 173 by insert injection molding.

In the upper surface of the battery housing 171, a remaining area 175 other than the area occupied by the terminal 172 and the second gasket 173 corresponds to the second electrode terminal having a polarity opposite to that of the terminal 172.

The second current collector 176 is coupled to the lower portion of the electrode assembly 141. The second current collector 176 is made of a conductive metal material such as aluminum, steel, copper or nickel, and is electrically connected to the second uncoated portion 146b of the second electrode.

Preferably, the second current collector 176 is electrically connected to the battery housing 171. To this end, at least a portion of the edge of the second current collector 176 may be interposed and fixed between the inner surface of the battery housing 171 and a first gasket 178b. In one example, at least a portion of the edge of the second current collector 176 may be fixed to the beading portion 180 by welding in a state of being supported on the bottom surface of the beading portion 180 formed at the bottom of the battery housing 171. In a modification, at least a portion of the edge of the second current collector 176 may be directly welded to the inner wall surface of the battery housing 171.

The second current collector 176 may include a plurality of unevenness) radially formed on a surface facing the second uncoated portion 146b. When the unevenness is formed, the unevenness may be press-fitted into the second uncoated portion 146b by pressing the second current collector 176.

Preferably, the second current collector 176 and the ends of the second uncoated portion 146b may be coupled by welding, for example, laser welding. In addition, the welding portions of the second current collector 176 and the second uncoated portion 146b may be spaced apart by a predetermined distance toward the core C based on the inner circumference of the beading portion 180.

A sealing body 178 for sealing the lower open end of the battery housing 171 includes a cap 178a having a plate shape and a first gasket 178b. The first gasket 178b electrically separates the cap 178a and the battery housing 171. A crimping portion 181 fixes the edge of the cap 178a and the first gasket 178b together. The cap 178a has a venting portion 179. The configuration of the venting portion 179 is substantially the same as the above embodiment (modification). The lower surface of the cap 178a may be located higher than the lower end of the crimping portion 181. In this case, a space is formed below the cap 178a, thereby securing smooth venting. This is particularly useful when the cylindrical battery 170 is installed so that the crimping portion 181 faces the direction of gravity.

Preferably, the cap 178a is made of a conductive metal material. However, since the first gasket 178b is interposed between the cap 178a and the battery housing 171, the cap 178a does not have electrical polarity. The sealing body 178 mainly seals the open end of the lower portion of the battery housing 171 and functions to discharge gas when the internal pressure of the battery 170 increases over a critical value. The critical value of the internal pressure is 15 kgf/cm$^2$ to 35 kgf/cm$^2$.

Preferably, the terminal 172 electrically connected to the first uncoated portion 146a of the first electrode is used as the first electrode terminal. In addition, in the upper surface of the battery housing 171 electrically connected to the second uncoated portion 146b of the second electrode through the second current collector 176, a part 175 except for the terminal 172 is used as the second electrode terminal having a different polarity from the first electrode terminal. If two electrode terminals are located at the upper portion of the cylindrical battery 170 as above, it is possible to arrange electrical connection components such as bus bars at only one side of the cylindrical battery 170. This may bring about simplification of the battery pack structure and improvement of energy density. In addition, since the part 175 used as the second electrode terminal has an approximately flat shape, a sufficient connecting area may be secured for connecting electrical connection components such as bus bars. Accordingly, the cylindrical battery 170 may reduce the resistance at the connection portion of the electrical connection components to a desirable level.

Meanwhile, the structure of the uncoated portion and the structure of the electrode assembly 141 are not limited to those shown in the drawings, and may be replaced with the structures of the above embodiments (modifications).

Figure 21:
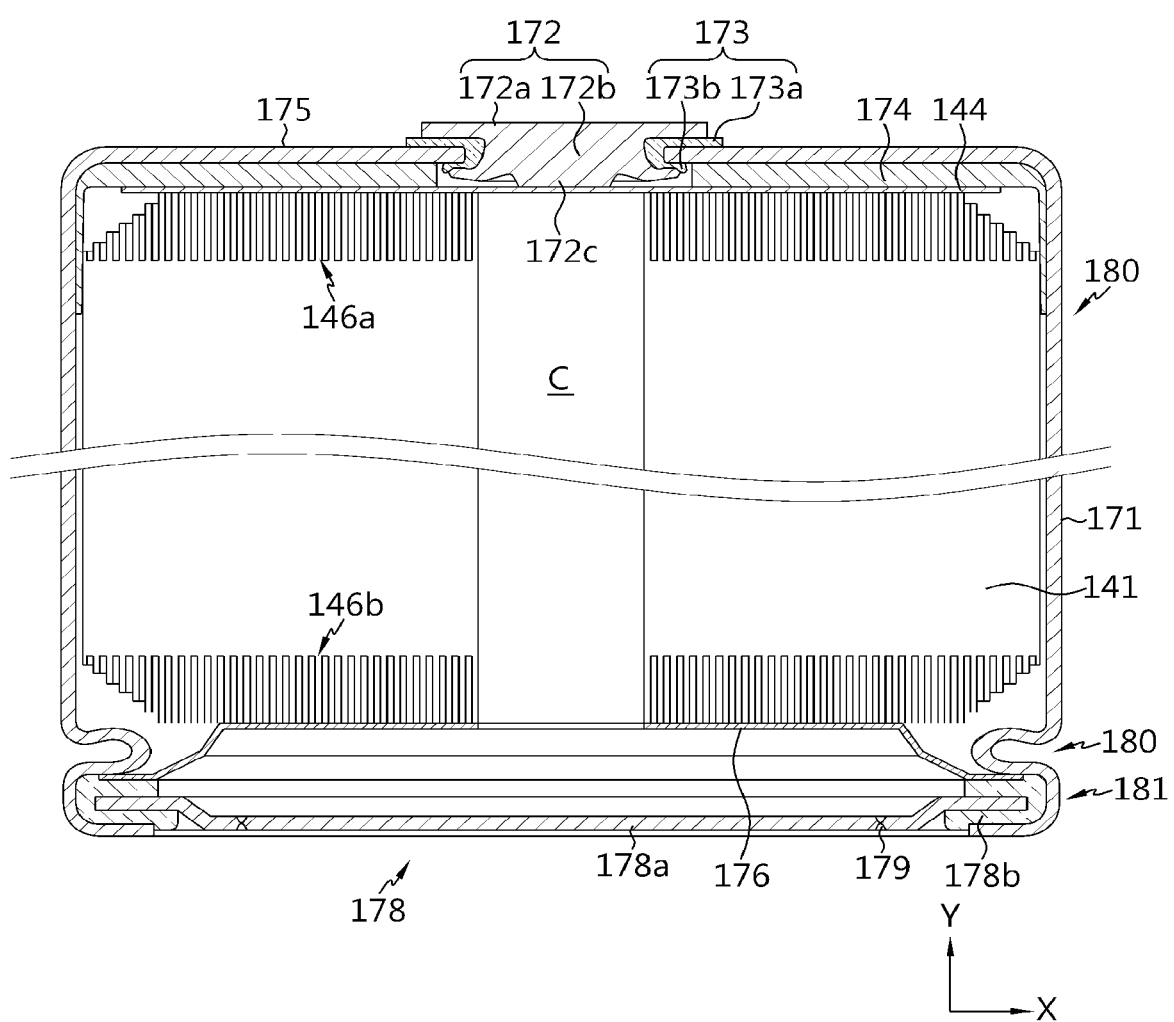
FIG. 21 is a sectional view showing a cylindrical battery according to still another embodiment of the present disclosure, taken along the Y-axis.

FIG. 21 is a sectional view showing a cylindrical battery 180 according to still another embodiment of the present disclosure, taken along the Y-axis.

Referring to FIG. 21, the structure of the electrode assembly 141 of the cylindrical battery 180 is substantially the same as that of the cylindrical battery 150 illustrated in FIG. 18, and the components other than the electrode assembly 141 are substantially the same as the cylindrical battery 170 shown in FIG. 20.

Accordingly, the configuration of the embodiment (modification) with respect to the cylindrical batteries 150, 170 may be equally applied to the cylindrical battery 180.

In addition, the structure of the electrode assembly 141 and the structure of the uncoated portion are not limited to those shown in the drawing, and may be replaced with the structures of the above embodiments (modifications).

Figure 22:
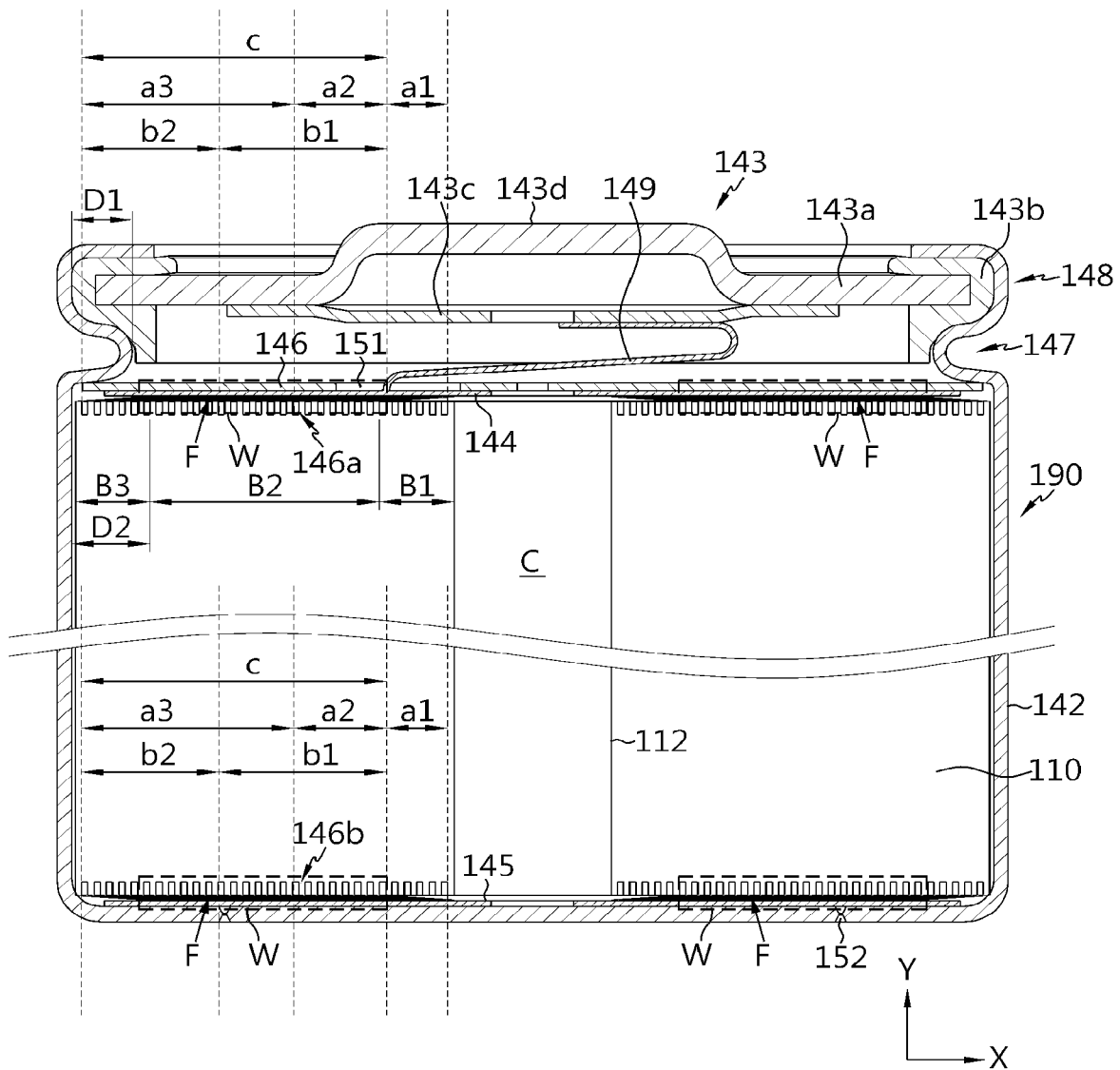
FIG. 22 is a sectional view showing a cylindrical battery according to still another embodiment of the present disclosure, taken along the Y-axis.

FIG. 22 is a sectional view showing a cylindrical battery 190 according to still another embodiment of the present disclosure, taken along the Y-axis.

Referring to FIG. 22, the cylindrical battery 190 includes the electrode assembly 110 illustrated in FIG. 14, and the components other than the electrode assembly 110 are substantially the same as the cylindrical battery 140 illustrated in FIG. 17. Accordingly, the configuration described with reference to FIGS. 14 and 17 may be applied substantially in the same manner to this embodiment.

Referring to FIGS. 10a and 22, the first and second uncoated portions 146a, 146b of the electrode assembly 110 are bent in the radial direction of the electrode assembly 110, for example from the outer circumference to the core to form a bending surface region F.

The first part B1 has a lower height than the other portions and corresponds to the segment skip region a1 having no segment, so it is not bent toward the core.

Preferably, the bending surface region F may include a segment skip region a1, a height variable region a2 of the segment, and a height uniform region a3 of the segment from the core toward the outer circumference.

As shown in FIGS. 10c, 10d and 10e, the bending surface region F includes an overlapping layer number uniform region b1 adjacent to the segment skip region a1, in which the number of overlapping layers of segments is 10 or more.

The bending surface region F may also include an overlapping layer number decreasing region b2 adjacent to the outer circumference of the electrode assembly 110, in which the number of overlapping layers of segments gradually decreases toward the outer circumference. Preferably, the overlapping layer number uniform region b1 may be set as the welding target region.

In the bending surface region F, the preferable numerical ranges of the ratio (a2/c) which is a ratio of the height variable region a2 to the radius region c including segments, the ratio (b1/c) of the overlapping layer number uniform region b1 to the radius region c including segments, and the ratio of the area of the overlapping layer number uniform region b1 to the area of the bending surface region F are already described above, and thus will not be described again.

The first current collector 144 may be laser-welded to the bending surface region F of the first uncoated portion 146a, and the second current collector 145 may be laser-welded to the bending surface region F of the second uncoated portion 146b. The welding method may be replaced by ultrasonic welding, resistance welding, spot welding, or the like.

Preferably, 50% or more of the welding region W of the first current collector 144 and the second current collector 145 may overlap with the overlapping layer number uniform region b1 of the bending surface region F. Optionally, the remaining region of the welding region W may overlap with the overlapping layer number decreasing region b2 of the bending surface region F. In terms of high welding strength, low resistance of the welding interface, and prevention of damage to the separator or the active material layer, it is more preferable that the entire welding region W overlaps with the overlapping layer number uniform region b1.

Preferably, in the overlapping layer number uniform region b1 overlapping with the welding region W and, optionally, the overlapping layer number decreasing region b2, the number of overlapping layers of segments may be 10 to 35.

Optionally, when the number of overlapping layers of segments in the overlapping layer number decreasing region b2 overlapping with the welding region W is less than 10, the laser power for welding the overlapping layer number decreasing region b2 may be lowered below that of the overlapping layer number uniform region b1. That is, when the welding region W overlaps with the overlapping layer number uniform region b1 and the overlapping layer number decreasing region b2 at the same time, the laser power may be varied according to the number of overlapping layers of segments. In this case, the welding strength of the overlapping layer number uniform region b1 may be greater than the welding strength of the overlapping layer number decreasing region b2.

In the bending surface region F formed at the upper and lower portions of the electrode assembly 110, the radial length of the segment skip region a1 and/or the height variable region a2 of the segment and/or the height uniform region a3 of the segment may be the same or different from each other.

In the electrode assembly 110, the height of the first part B1 is relatively smaller than that of the other portions. Also, as shown in FIG. 14, the bending length (H) of the uncoated portion located at the innermost side of the third part B2 is smaller than a value obtained by adding the radial length (R) of the first part B1 and 10% of the radius of the core 112.

Accordingly, even when the first uncoated portion 146a is bent toward the core, the core of the electrode assembly 110 may be opened to the outside by at least 90% or more of its diameter. If the core 112 is not blocked, there is no difficulty in the electrolyte injection process and the electrolyte injection efficiency is improved. In addition, by inserting a welding jig through the core 112, the welding process between the second current collector 145 and the battery housing 142 may be easily performed.

When the uncoated portions 146a, 146b have a segment structure, if the width and/or height and/or separation pitch of the segments are adjusted to satisfy the numerical ranges of the above embodiment, the segments are overlapped in multiple layers to sufficiently secure welding strength when the segments are bent, and an empty space (gap) is not formed in the bent surface region F.

Preferably, the first current collector 144 and the second current collector 145 may have an outer diameter covering the ends of the segments 61, 61' (see FIG. 10f) bent in the last winding turn of the height uniform region a3 of the first electrode and the second electrode. In this case, welding may be performed in a state where the segments forming the bending surface region F are uniformly pressed by the current collector, and the tightly stacked state of the segments may be maintained well even after welding. The tightly stacked state means a state in which there are substantially no gaps between the segments as shown in FIG. 10a. The tightly stacked state contributes to lowering the resistance of the cylindrical battery 190 to a level suitable for rapid charging (e.g., 4 milliohms) or below.

The structures of the uncoated portions 146a, 146b may be changed to the structures according to the above embodiments (modifications). In addition, a conventional uncoated portion structure may be applied to any one of the uncoated portions 146a, 146b without limitation.

Figure 23:
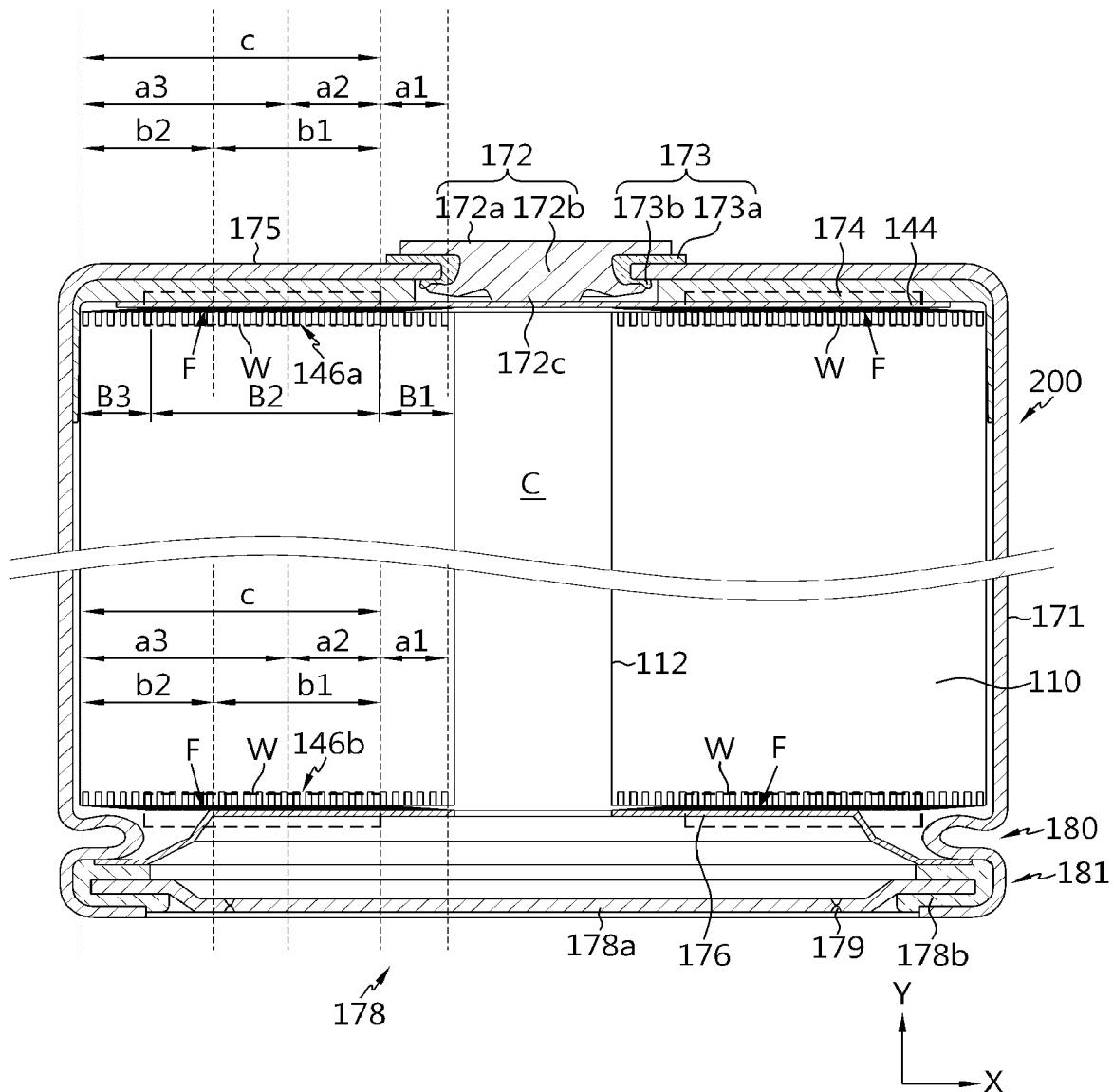
FIG. 23 is a sectional view showing a cylindrical battery according to still another embodiment of the present disclosure, taken along the Y-axis.

FIG. 23 is a sectional view showing a cylindrical battery 200 according to still another embodiment of the present disclosure, taken along the Y-axis.

Referring to FIG. 23, the cylindrical battery 200 includes the electrode assembly 110 illustrated in FIG. 14, and the components other than the electrode assembly 110 are substantially the same as those of the cylindrical battery 180 illustrated in FIG. 21. Accordingly, the configuration described with reference to FIGS. 14 and 21 may be applied substantially in the same manner to this embodiment.

Referring to FIGS. 10a and 23, the first and second uncoated portions 146a, 146b of the electrode assembly 110 are bent in the radial direction of the electrode assembly 110, for example from the outer circumference toward the core, to form a bending surface region F.

The first part B1 has a lower height than the other portions and corresponds to the segment skip region a1 having to segment, so it is not bent toward the core.

Preferably, the bending surface region F may include a segment skip region a1, a height variable region a2 of the segment, and a height uniform region a3 of the segment from the core toward the outer circumference.

As shown in FIGS. 10c, 10d and 10e, the bending surface region F includes an overlapping layer number uniform region b1 adjacent to the segment skip region a1, in which the number of overlapping layers of segments is 10 or more.

The bending surface region F may also include an overlapping layer number decreasing region b2 adjacent to the outer circumference of the electrode assembly 110, in which the number of overlapping layers of segments decreases toward the outer circumference. Preferably, the overlapping layer number uniform region b1 may be set as the welding target region.

In the bending surface region F, the preferable numerical ranges of the ratio (a2/c) which is a ratio of the height variable region a2 to a radius region c including segments, the ratio (b1/c) of the overlapping layer number uniform region b1 to the radius region c including segments, and the ratio of the area of the overlapping layer number uniform region b1 to the area of the bending surface region F are already described above, and thus will not be described again.

The first current collector 144 may be laser-welded to the bending surface region F of the first uncoated portion 146a, and the second current collector 176 may be laser-welded to the bending surface region F of the second uncoated portion 146b. The welding method may be replaced by ultrasonic welding, resistance welding, spot welding, or the like. The welding region W of the second current collector 176 and the second uncoated portion 146b may be spaced apart from the inner surface of the beading portion 180 by a predetermined distance.

Preferably, 50% or more of the welding region W of the first current collector 144 and the second current collector 176 may overlap with the overlapping layer number uniform region b1 of the bending surface region F. Optionally, the remaining region of the welding region W may overlap with the overlapping layer number decreasing region b2 of the bending surface region F. In terms of high welding strength, low resistance of the welding interface, and prevention of damage to the separator or the active material layer, it is more preferable that the entire welding region W overlaps with the overlapping layer number uniform region b1.

Preferably, in the overlapping layer number uniform region b1 overlapping with the welding region W and, optionally, the overlapping layer number decreasing region b2, the number of overlapping layers of segments may be 10 to 35.

Optionally, when the number of overlapping layers of segments in the overlapping layer number decreasing region b2 overlapping with the welding region W is less than 10, the laser power for welding the overlapping layer number decreasing region b2 may be lowered below that of the overlapping layer number uniform region b1. That is, when the welding region W overlaps with the overlapping layer number uniform region b1 and the overlapping layer number decreasing region b2 at the same time, the laser power may be varied according to the number of overlapping layers of segments. In this case, the welding strength of the overlapping layer number uniform region b1 may be greater than the welding strength of the overlapping layer number decreasing region b2.

In the bending surface region F formed at the upper and lower portions of the electrode assembly 110, the radial length of the segment skip region a1 and/or the height variable region a2 of the segment and/or the height uniform region a3 of the segment may be the same or different from each other.

In the electrode assembly 110, the height of the first part B1 is relatively smaller than that of the other portions. Also, as shown in FIG. 14, the bending length (H) of the uncoated portion located at the innermost side of the third part B2 is smaller than a value obtained by adding the radial length (R) of the first part B1 and 10% of the radius of the core 112.

Therefore, even when the uncoated portion 146a is bent toward the core, the core 112 of the electrode assembly 110 may be opened to the outside by at least 90% or more of its diameter. If the core 112 is not blocked, there is no difficulty in the electrolyte injection process and the electrolyte injection efficiency is improved. In addition, by inserting a welding jig through the core 112, the welding process between the first current collector 144 and the terminal 172 may be easily performed.

When the first and second uncoated portions 146a, 146b have a segment structure, if the width and/or height and/or separation pitch of the segments are adjusted to satisfy the numerical ranges of the above embodiment, the segments may be overlapped in multiple layers to sufficiently secure welding strength when the segments are bent, and an empty space (gap) is not formed in the bent surface region F.

Preferably, in the first current collector 144 and the second current collector 176, the regions contacting the first and second uncoated portions 146a, 146 may have an outer diameter covering the ends of the segments 61, 61' (see FIG. 10f) bent in the last winding turn of the height uniform region a3 of the first electrode and the second electrode. In this case, welding may be performed in a state where the segments forming the bending surface region F are uniformly pressed by the current collector, and the tightly stacked state of the segments may be maintained well even after welding. The tightly stacked state means a state in which there are substantially no gaps between the segments as shown in FIG. 10a. The tightly stacked state contributes to lowering the resistance of the cylindrical battery 190 to a level suitable for rapid charging (e.g., 4 milliohms) or below.

The structures of the uncoated portions 146a, 146b may be changed to the structures according to the above embodiments (modifications). In addition, a conventional uncoated portion structure may be applied to any one of the uncoated portions 146a, 146b without limitation.

Figure 24:
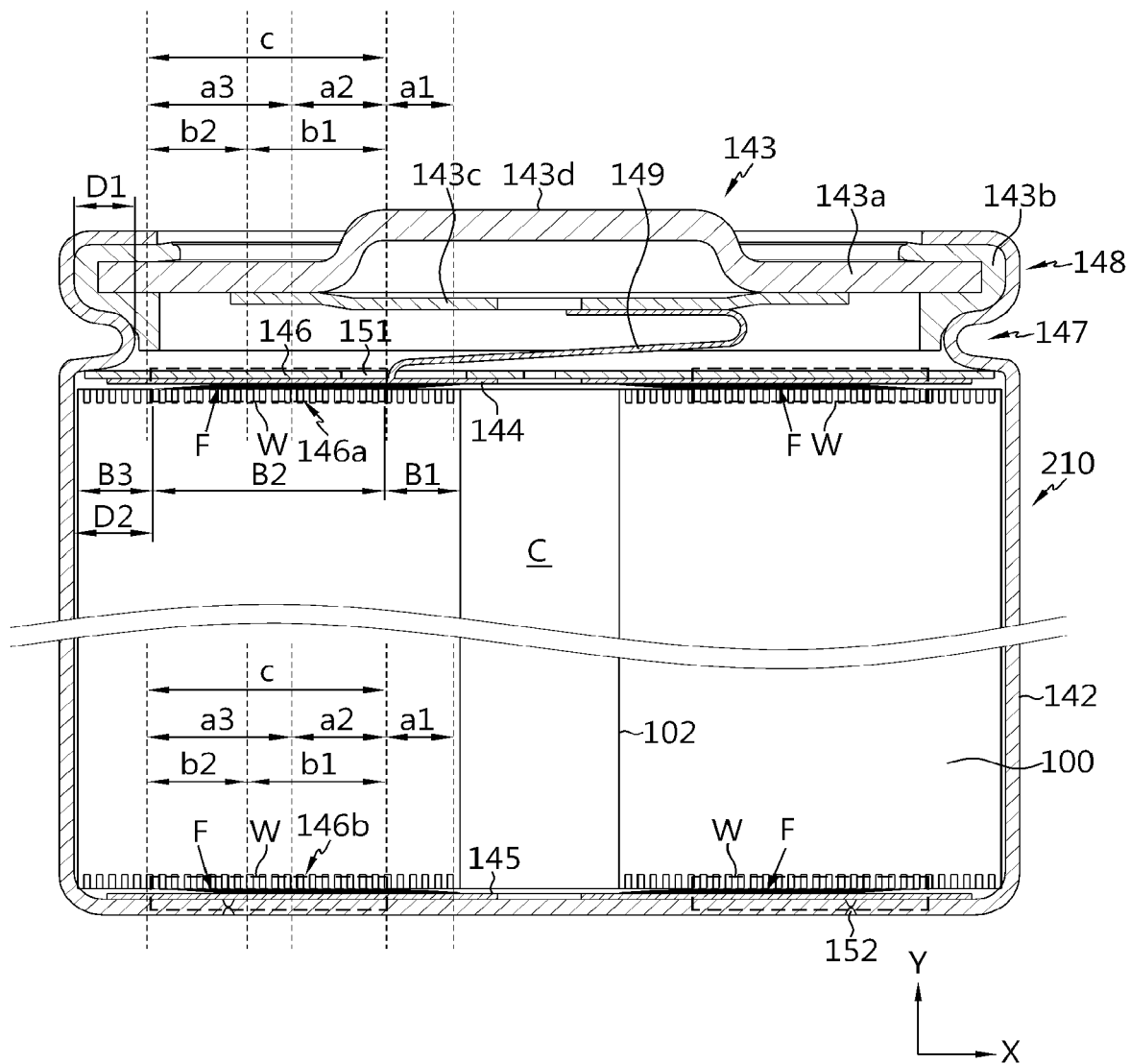
FIG. 24 is a sectional view showing a cylindrical battery according to still another embodiment of the present disclosure, taken along the Y-axis.

FIG. 24 is a cross-sectional view showing a cylindrical battery 210 according to still another embodiment of the present disclosure, taken along the Y-axis.

Referring to FIG. 24, the cylindrical battery 210 includes the electrode assembly 100 illustrated in FIG. 13, and the configuration other than the electrode assembly 100 is substantially the same as the cylindrical battery 140 illustrated in FIG. 17. Therefore, the configuration described with reference to FIGS. 13 and 17 may be applied substantially identically in this embodiment.

Preferably, the first and second uncoated portions 146a, 146b of the electrode assembly are divided into a plurality of segments, and the plurality of segments are bent in a radial direction of the electrode assembly 100, for example from the outer circumference toward the core. At this time, the first part B1 and the second part B3 of the first uncoated portion 146a have a lower height than the other portions and have no segment, and thus they are not substantially bent. This is the same for the second uncoated portion 146b.

Also in this embodiment, the bending surface region F may include a segment skip region a1, a height variable region a2 of the segment, and a height uniform region a3 of the segment from the core toward the outer circumference. However, since the second part B3 is not bent, the radial length of the bending surface region F may be shorter than that of the former embodiment.

As shown in FIGS. 10c, 10d and 10e, the bending surface region F includes an overlapping layer number uniform region b1 adjacent to the segment skip region a1, in which the number of overlapping layers of segments is 10 or more.

The bending surface region F may also include an overlapping layer number decreasing region b2 adjacent to the second part B3 of the electrode assembly 110, in which the number of overlapping layers of segments gradually decreases toward the outer circumference. Preferably, the overlapping layer number uniform region b1 may be set as the welding target region.

In the bending surface region F, the preferable numerical ranges of the ratio (a2/c) which is a ratio of the height variable region a2 to a radius region (c) including segments, the ratio (b1/c) of the overlapping layer number uniform region b1 to the radius region including segments (c), and the ratio of the area of the overlapping layer number uniform region b1 to the area of the bending surface region F are already described above, and thus will not be described again.

The first current collector 144 may be welded to the bending surface region F of the first uncoated portion 146a, and the second current collector 145 may be welded to the bending surface region F of the second uncoated portion 146b.

The overlapping relationship of the overlapping layer number uniform region b1 and the overlapping layer number decreasing region b2 with the welding region W, the outer diameter of the first current collector 144 and the second current collector 145, the configuration in which the first part B1 does not close the core by at least 10% or more of its diameter, and the like are substantially the same as described above.

Meanwhile, the second part B3 has no segment and has a height lower than that of the third part B2. Accordingly, when the first uncoated portion 146a is bent, the second part B3 is not substantially bent. In addition, since the second part B3 is sufficiently spaced apart from the beading portion 147, it is possible to solve the problem that the second part B3 is damaged while the beading portion 147 is press-fitted.

The structures of the uncoated portions 146a, 146b may be changed to the structures according to the above embodiments (modifications). In addition, a conventional uncoated portion structure may be applied to any one of the uncoated portions 146a, 146b without limitation.

Figure 25:
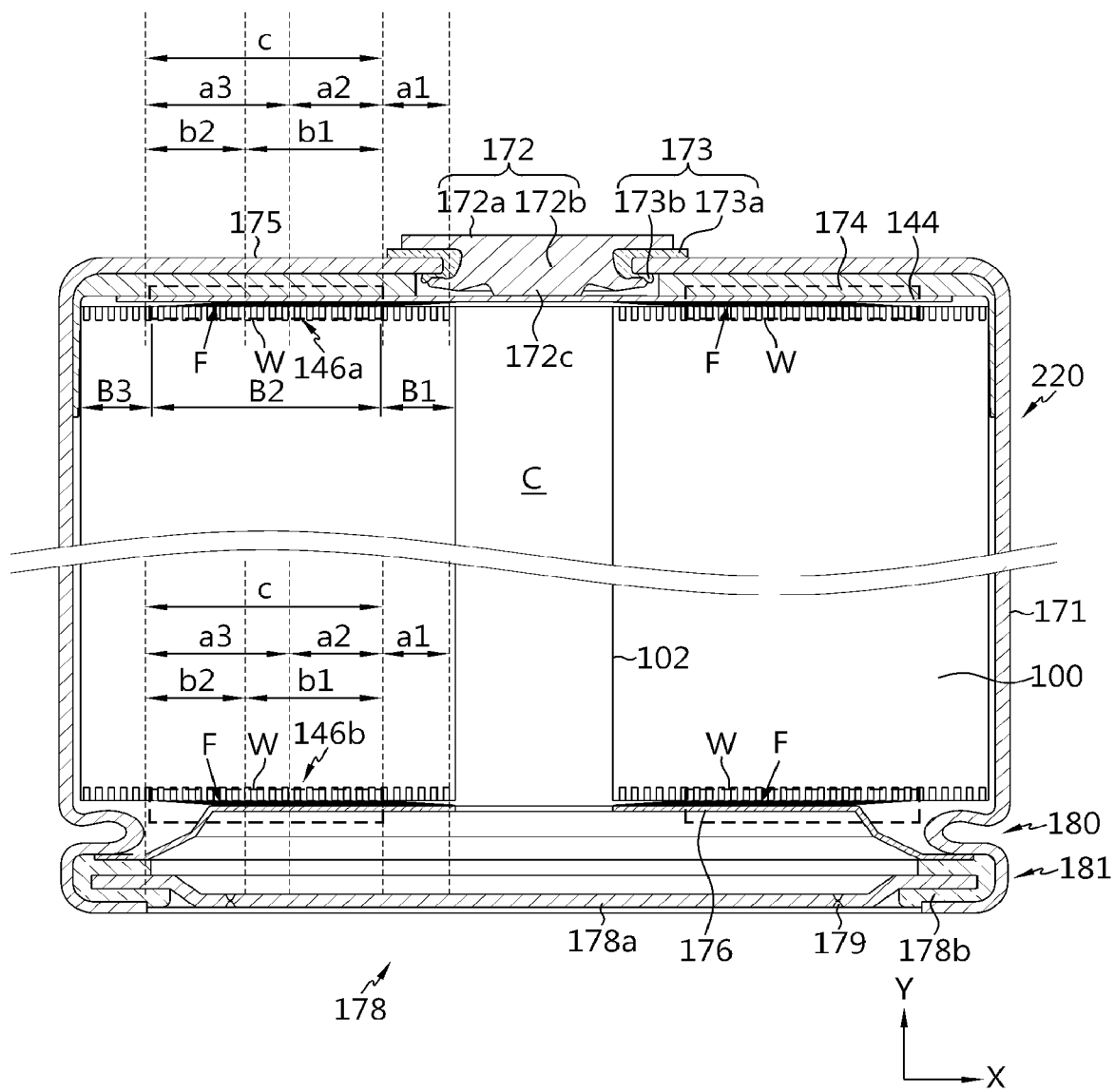
FIG. 25 is a sectional view showing a cylindrical battery according to still another embodiment of the present disclosure, taken along the Y-axis.

FIG. 25 is a cross-sectional view showing a cylindrical battery 220 according to still another embodiment of the present disclosure, taken along the Y-axis.

Referring to FIG. 25, the cylindrical battery 220 includes the electrode assembly 100 illustrated in FIG. 24, and the configuration other than the electrode assembly 100 is substantially the same as the cylindrical battery 180 illustrated in FIG. 21. Therefore, the configuration described with reference to FIGS. 21 and 24 may be applied substantially identically in this embodiment.

Preferably, the first and second uncoated portions 146a, 146b of the electrode assembly are divided into a plurality of segments, and the plurality of segments are bent from the outer circumference toward the core. At this time, the first part B1 and the second part B3 of the first uncoated portion 146a have a lower height than the other portions and have no segment, and thus they are not substantially bent. This is the same for the second uncoated portion 146b.

Therefore, in this embodiment, similar to the embodiment of FIG. 24, the bending surface region F may include a segment skip region a1, a height variable region a2 of the segment, and a height uniform region a3 of the segment from the core toward the outer circumference. However, since the second part B3 is not bent, the radial length of the bending surface region F may be shorter than that of the former embodiment.

As shown in FIGS. 10c, 10d and 10e, the bending surface region F includes an overlapping layer number uniform region b1 adjacent to the segment skip region a1, in which the number of overlapping layers of segments is 10 or more.

The bending surface region F may also include an overlapping layer number decreasing region b2 adjacent to the second part B3 of the electrode assembly 110, in which the number of overlapping layers of segments gradually decreases toward the outer circumference. Preferably, the overlapping layer number uniform region b1 may be set as the welding target region.

In the bending surface region F, the preferable numerical ranges of the ratio (a2/c) which is a ratio of the height variable region a2 to a radius region including segments (c), the ratio (b1/c) of the overlapping layer number uniform region b1 to the radius region (c) including segments, and the ratio of the area of the overlapping layer number uniform region b1 to the area of the bending surface region F are already described above, and thus will not be described again.

The first current collector 144 may be welded to the bending surface region F of the first uncoated portion 146a, and the second current collector 176 may be welded to the bending surface region F of the second uncoated portion 146b.

The overlapping relationship of the overlapping layer number uniform region b1 and the overlapping layer number decreasing region b2 with the welding region W, the outer diameter of the first current collector 144 and the second current collector 176, the configuration in which the first part B1 does not close the core by at least 10% or more of its diameter, and the like are substantially the same as described above.

The structures of the uncoated portions 146a, 146b may be changed to the structures according to the former embodiments (modifications). In addition, the conventional uncoated portion structure may be applied to any one of the uncoated portions 146a, 146b without limitation.

Figure 26:
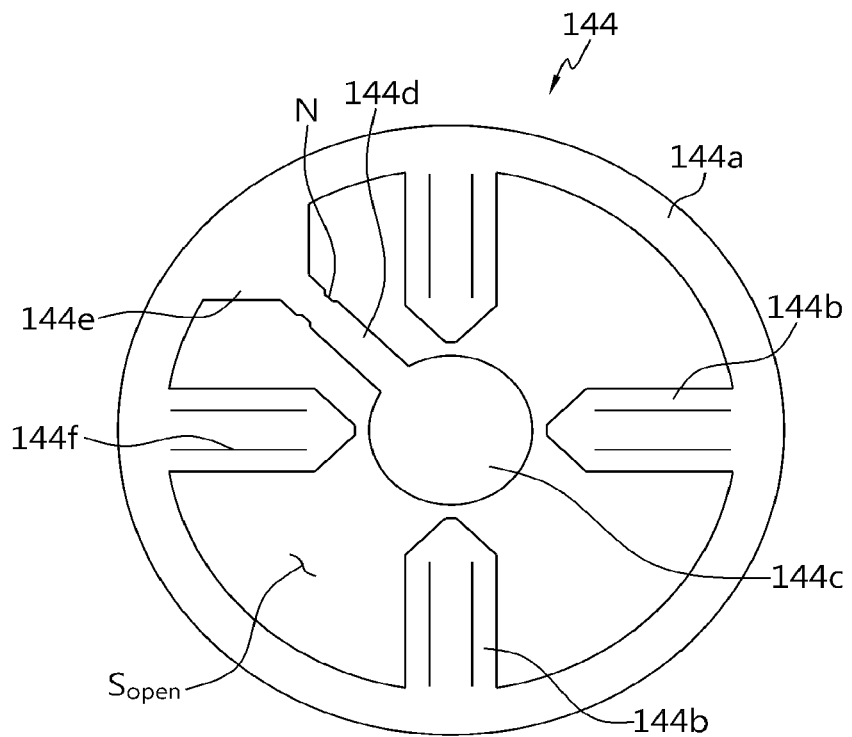
FIG. 26 is a top plan view showing a structure of a first current collector according to an embodiment of the present disclosure.
Figure 27:
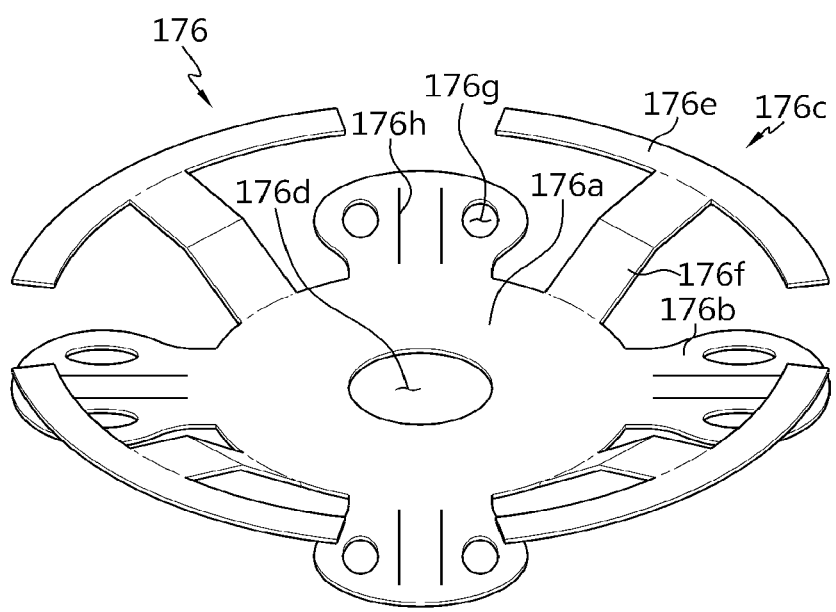
FIG. 27 is a perspective view showing a structure of a second current collector according to an embodiment of the present disclosure.

In the former embodiments (modified examples), the first current collector 144 and the second current collector 176 included in the cylindrical battery 170, 180, 200, 220 including the terminal 172 may have an improved structure as shown in FIGS. 26 and 27.

The improved structure of the first current collector 144 and the second current collector may contribute to lowering the resistance of the cylindrical battery, improving the vibration resistance, and improving the energy density. In particular, the first current collector 144 and the second current collector 176 are more effective when used in a large cylindrical battery in which a ratio of diameter to height is greater than 0.4.

FIG. 26 is a top plan view showing the structure of the first current collector 144 according to an embodiment of the present disclosure.

Referring to FIGS. 23 and 26 together, the first current collector 144 may include an edge portion 144a, a first uncoated portion coupling portion 144b, and a terminal coupling portion 144c. The edge portion 144a is disposed on the electrode assembly 110. The edge portion 144a may have a substantially rim shape having an empty space ($S_{open}$) formed therein. In the drawings of the present disclosure, only a case in which the edge portion 144a has a substantially circular rim shape is illustrated, but the present disclosure is not limited thereto. The edge portion 144a may have a substantially rectangular rim shape, a hexagonal rim shape, an octagonal rim shape, or other rim shapes, unlike the illustrated one. The number of the edge portion 144a may be increased to two or more. In this case, another edge portion in a rim shape may be provided to the inner side of the edge portion 144a.

The terminal coupling portion 144c may have a diameter equal to or greater than the diameter of the flat portion 172c formed on the bottom surface of the terminal 172 in order to secure a welding area for coupling with the flat portion 172c formed on the bottom surface of the terminal 172.

The first uncoated portion coupling portion 144b extends inward from the edge portion 144a and is coupled to the uncoated portion 146a through welding. The terminal coupling portion 144c is spaced apart from the first uncoated portion coupling portion 144b and is positioned inside the edge portion 144a. The terminal coupling portion 144c may be coupled to the terminal 172 by welding. The terminal coupling portion 144c may be located, for example, approximately at the center of the inner space ($S_{open}$) surrounded by the edge portion 144a. The terminal coupling portion 144c may be provided at a position corresponding to the hole formed in the core C of the electrode assembly 110. The terminal coupling portion 144c may be configured to cover the hole formed in the core C of the electrode assembly 110 so that the hole formed in the core C of the electrode assembly 110 is not exposed out of the terminal coupling portion 144c. To this end, the terminal coupling portion 144c may have a larger diameter or width than the hole formed in the core C of the electrode assembly 110.

The first uncoated portion coupling portion 144b and the terminal coupling portion 144c may not be directly connected, but may be disposed to be spaced apart from each other and indirectly connected by the edge portion 144a. Since the first current collector 144 has a structure in which the first uncoated portion coupling portion 144b and the terminal coupling portion 144c are not directly connected to each other but are connected through the edge portion 144c as above, when shock and/or vibration occurs at the cylindrical battery 200, it is possible to disperse the shock applied to the coupling portion between the first uncoated portion coupling portion 144b and the first uncoated portion 146a and the coupling portion between the terminal coupling portion 144c and the terminal 172. In the drawings of the present disclosure, only a case in which four first uncoated portion coupling portions 144b are provided is illustrated, but the present disclosure is not limited thereto. The number of the first uncoated portion coupling portions 144b may be variously determined in consideration of manufacturing difficulty according to the complexity of the shape, electric resistance, the space ($S_{open}$) inside the edge portion 144a considering electrolyte impregnation, and the like.

The first current collector 144 may further include a bridge portion 144d extending inward from the edge portion 144a and connected to the terminal coupling portion 144c. At least a part of the bridge portion 144d may have a smaller sectional area compared to the first uncoated portion coupling portion 144b and the edge portion 144a. For example, at least a part of the bridge portion 144d may be formed to have a smaller width and/or thickness compared to the first uncoated portion coupling portion 144b. In this case, the electric resistance increases in the bridge portion 144d. As a result, when a current flows through the bridge portion 144d, the relatively large resistance causes a part of the bridge portion 144d to be melted due to overcurrent heating. Accordingly, the overcurrent is irreversibly blocked. The sectional area of the bridge portion 144d may be adjusted to an appropriate level in consideration of the overcurrent blocking function.

The bridge portion 144d may include a taper portion 144e whose width is gradually decreased from the inner surface of the edge portion 144a toward the terminal coupling portion 144c. When the taper portion 144e is provided, the rigidity of the component may be improved at the connection portion between the bridge portion 144d and the edge portion 144a. When the taper portion 144e is provided, in the process of manufacturing the cylindrical battery 200, for example, a transfer device and/or a worker may easily and safely transport the first current collector 144 and/or a coupled body of the first current collector 144 and the electrode assembly by gripping the taper portion 144e. That is, when the taper portion 144e is provided, it is possible to prevent product defects that may occur by gripping a portion where welding is performed with other components such as the first uncoated portion coupling portion 144b and the terminal coupling portion 144c.

The first uncoated portion coupling portion 144b may be provided in plural. The plurality of first uncoated portion coupling portions 144b may be disposed substantially at regular intervals from each other in the extending direction of the edge portion 144a. An extension length of each of the plurality of first uncoated portion coupling portions 144b may be substantially equal to each other. The first uncoated portion coupling portion 144b may be coupled to the bending surface region F of the uncoated portion 146a by laser welding. The welding may be replaced by ultrasonic welding, spot welding, or the like.

The welding pattern 144f formed by welding between the first uncoated portion coupling portion 144b and the bending surface region F may have a structure to extend along the radial direction of the electrode assembly 110. The welding pattern 144f may be a line pattern or a dot array pattern.

The welding pattern 144f corresponds to the welding region. Therefore, the welding pattern 144f preferably overlaps with the overlapping layer number uniform region b1 of the bending surface region F by 50% or more. The welding pattern 144f that does not overlap with the overlapping layer number uniform region b1 may overlap with the overlapping layer number decreasing region b2. The entire welding pattern 144f may overlap with the overlapping layer number uniform region b1 of the bending surface region F. In the bending surface region F below the region where the welding pattern 144f is formed, the number of overlapping layers of segments is preferably 10 or more in the overlapping layer number uniform region b1 and, optionally, the overlapping layer number decreasing region b2.

The terminal coupling portion 144c may be disposed to be surrounded by the plurality of first uncoated portion coupling portions 144b. The terminal coupling portion 144c may be coupled to the flat portion 172c of the terminal 172 by welding. The bridge portion 144d may be positioned between a pair of first uncoated portion coupling portions 144b adjacent to each other. In this case, the distance from the bridge portion 144d to any one of the pair of first uncoated portion coupling portions 144b along the extending direction of the edge portion 144a may be substantially equal to the distance from the bridge portion 144d to the other one of the pair of first uncoated portion coupling portions 144b along the extending direction of the edge portion 144a. The plurality of first uncoated portion coupling portions 144b may be formed to have substantially the same sectional area. The plurality of first uncoated portion coupling portions 144b may be formed to have substantially the same width and thickness.

The bridge portion 144d may be provided in plural. Each of the plurality of bridge portions 144d may be disposed between a pair of first uncoated portion coupling portions 144b adjacent to each other. The plurality of bridge portions 144d may be disposed substantially at regular intervals to each other in the extending direction of the edge portion 144a. A distance from each of the plurality of bridge portions 144d to one of the pair of first uncoated portion coupling portions 144b adjacent to each other along the extending direction of the edge portion 144a may be substantially equal to a distance from each of the plurality of the bridge portion 144d to the other of the pair of first uncoated portion coupling portions 144b.

In the case where the first uncoated portion coupling portion 144b and/or the bridge portion 144d is provided in plural as described above, if the distance between the first uncoated portion coupling portions 144b and/or the distance between the bridge portions 144d and/or the distance between the first uncoated portion coupling portion 144b and the bridge portion 144d is uniformly formed, a current flowing from the first uncoated portion coupling portion 144b toward the bridge portion 144d or a current flowing from the bridge portion 144d toward the first uncoated portion coupling portion 144b may be smoothly and uniformly formed.

The bridge portion 144d may include a notching portion N formed to partially reduce a sectional area of the bridge portion 144d. The sectional area of the notching portion N may be adjusted, for example, by partially reducing the width and/or thickness of the bridge portion 144d. When the notching portion N is provided, electric resistance is increased in the region where the notching portion N is formed, thereby enabling rapid current interruption when overcurrent occurs.

The notching portion N is preferably provided in a region corresponding to the overlapping layer number uniform region b1 of the electrode assembly 110 in order to prevent substances generated during rupturing from flowing into the electrode assembly 110. This is because, in this region, the number of overlapping layers of the segments of the uncoated portion 146a is maintained to the maximum and thus the overlapped segments may function as a mask.

The notching portion N may be surrounded by an insulating tape. Then, since the heat generated at the notching portion N is not dissipated to the outside, the notching portion N may be ruptured more quickly when an overcurrent flows through the bridge portion 144d.

FIG. 27 is a top plan view showing the structure of the second current collector 176 according to an embodiment of the present disclosure.

Referring to FIGS. 23 and 27 together, the second current collector 176 is disposed below the electrode assembly 110. In addition, the second current collector 176 may be configured to electrically connect the uncoated portion 146b of the electrode assembly 110 and the battery housing 171. The second current collector 176 is made of a metal material with conductivity and is electrically connected to the bending surface region F of the uncoated portion 146b. In addition, the second current collector 176 is electrically connected to the battery housing 171. The edge portion of the second current collector 176 may be interposed and fixed between the inner surface of the battery housing 171 and the first gasket 178b. Specifically, the edge portion of the second current collector 176 may be interposed between the lower surface of the beading portion 180 of the battery housing 171 and the first gasket 178b. However, the present disclosure is not limited thereto, and the edge portion of the second current collector 176 may be welded to the inner wall surface of the battery housing 171 in a region where the beading portion 180 is not formed.

The second current collector 176 may include a support portion 176a disposed below the electrode assembly 110, a second uncoated portion coupling portion 176b extending from the support portion 176a approximately along the radial direction of the electrode assembly 110 and coupled to the bending surface region F of the uncoated portion 146b, and a housing coupling portion 176c extending from the support portion 176a toward the inner surface of the battery housing 171 approximately along an inclined direction based on the radial direction of the electrode assembly 110 and coupled to the inner surface of the battery housing 171. The second uncoated portion coupling portion 176b and the housing coupling portion 176c are indirectly connected through the support portion 176a, and are not directly connected to each other. Therefore, when an external shock is applied to the cylindrical battery 200 of the present disclosure, it is possible to minimize the possibility of damage to the coupling portion of the second current collector 176 and the electrode assembly 110 and the coupling portion of the second current collector 176 and the battery housing 171. However, the second current collector of the present disclosure is not limited to the structure where the second uncoated portion coupling portion 176b and the housing coupling portion 176c are only indirectly connected. For example, the second current collector 176 may have a structure that does not include the support portion 176a for indirectly connecting the second uncoated portion coupling portion 176b and the housing coupling portion 176c and/or a structure in which the uncoated portion 146b and the housing coupling portion 176c are directly connected to each other.

The support portion 176a and the second uncoated portion coupling portion 176b are disposed below the electrode assembly 110. The second uncoated portion coupling portion 176b is coupled to the bending surface region F of the uncoated portion 146b. In addition to the second uncoated portion coupling portion 176b, the support portion 176a may also be coupled to the uncoated portion 146b. The second uncoated portion coupling portion 176b and the bending surface region F of the uncoated portion 146b may be coupled by welding. The welding may be replaced with ultrasonic welding, spot welding, or the like. The support portion 176a and the second uncoated portion coupling portion 176b are located higher than the beading portion 180 when the beading portion 180 is formed on the battery housing 171.

The support portion 176a has a current collector hole 176d formed at a location corresponding to the hole formed at the core C of the electrode assembly 110. The core C of the electrode assembly 110 and the current collector hole 176d communicating with each other may function as a passage for inserting a welding rod for welding between the terminal 172 and the terminal coupling portion 144c of the first current collector 144 or for irradiating a laser beam.

The current collector hole 176d may have a radius of 0.5 $r_c$ or more compared to the radius ($r_c$) of the hole formed in the core C of the electrode assembly 110. If the radius of the current collector hole 176d is 0.5 $r_c$ to 1.0 $r_c$, when a vent occurs in the cylindrical battery 200, it is possible to prevent that the winding structure of the separator or the electrodes near the core C of the electrode assembly 110 is pushed out of the core C due to the vent pressure. When the radius of the current collector hole 176d is greater than 1.0 $r_c$, the core C is opened to the maximum, so the electrolyte may be easily injected during the electrolyte injection process.

When the second uncoated portion coupling portion 176b is provided in plural, the plurality of second uncoated portion coupling portions 176b may have a shape extending approximately radially from the support portion 176a of the second current collector 176 toward the sidewall of the battery housing 171. The plurality of second uncoated portion coupling portions 176b may be positioned to be spaced apart from each other along the periphery of the support portion 176a.

The housing coupling portion 176c may be provided in plural. In this case, the plurality of housing coupling portions 176c may have a shape extending approximately radially from the center of the second current collector 176 toward the sidewall of the battery housing 171. Accordingly, the electrical connection between the second current collector 176 and the battery housing 171 may be made at a plurality of points. Since the coupling for electrical connection is made at a plurality of points, the coupling area may be maximized, thereby minimizing electric resistance. The plurality of housing coupling portions 176c may be positioned to be spaced apart from each other along the periphery of the support portion 176a. At least one housing coupling portion 176c may be positioned between the second uncoated portion coupling portions 176b adjacent to each other. The plurality of housing coupling portions 176c may be coupled to, for example, the beading portion 180 in the inner surface of the battery housing 171. The housing coupling portions 176c may be coupled, particularly, to the lower surface of the beading portion by laser welding. The welding may be replaced with ultrasonic welding, spot welding, or the like. By coupling the plurality of housing coupling portions 176c on the beading portion 180 by welding in this way, the current path is dispersed radially, thereby limiting the resistance level of the cylindrical battery 200 to about 4 milliohms or less. In addition, as the lower surface of the beading portion 180 has a shape extending in a direction approximately parallel to the upper surface of the battery housing 171, namely in a direction approximately perpendicular to the sidewall of the battery housing 171, and the housing coupling portion 176c also has a shape extending in the same direction, namely in the radial direction and the circumferential direction, the housing coupling portion 176c may be stably in contact with the beading portion 180. In addition, as the housing coupling portion 176c is stably in contact with the flat portion of the beading portion 180, the two components may be welded smoothly, thereby improving the coupling force between the two components and minimizing the increase in resistance at the coupling portion.

The housing coupling portion 176c may include a contact portion 176e coupled onto the inner surface of the battery housing 171 and a connection portion 176f for connecting the support portion 176a and the contact portion 176e.

The contact portion 176e is coupled onto the inner surface of the battery housing 171. In the case where the beading portion 180 is formed on the battery housing 171, the contact portion 176e may be coupled onto the beading portion 180 as described above. More specifically, the contact portion 176e may be electrically coupled to the flat portion formed at the lower surface of the beading portion 180 formed on the battery housing 171, and may be interposed between the lower surface of the beading portion 180 and the first gasket 178b. In this case, for stable contact and coupling, the contact portion 176e may have a shape extending on the beading portion 180 by a predetermined length along the circumferential direction of the battery housing 171.

The connection portion 176f may be bent at an obtuse angle. The bending point may be higher than the intermediate point of the connection portion 176f. When the connection portion 176f is bent, the contact portion 176e may be stably supported on the flat surface of the beading portion 180. The connection portion 176f may be divided into a lower portion and an upper portion based on the bending point, and the length of the lower portion may be greater than that of the upper portion. In addition, the inclination angle with respect to the surface of the support portion 176a may be greater at the lower portion of the bending point rather than at the upper portion. If the connection portion 176f is bent, the connection portion 176f may buffer the pressure (force) applied in the vertical direction of the battery housing 171. For example, if a pressure is transmitted to the contact portion 176e in the sizing process for the battery housing so that the contact portion 176e moves vertically toward the support portion 176b, the bending point of the connection portion 176f may move upward to deform the shape of the connection portion 176, thereby buffering the stress.

Meanwhile, the maximum distance from the center of the second current collector 176 to the end of the second uncoated portion coupling portion 176b along the radial direction of the electrode assembly 110 is preferably equal to or smaller than the inner diameter of the battery housing 171 in a region where the beading portion 180 is formed, namely the minimum inner diameter of the battery housing 171. This is to prevent the end of the second uncoated portion coupling portion 176b from pressing the edge of the electrode assembly 110 during the sizing process for compressing the battery housing 171 along the height direction.

The second uncoated portion coupling portion 176b includes a hole 176g. The hole 176g may be used as a passage through which the electrolyte may move. The welding pattern 176h formed by welding between the second uncoated portion coupling portion 176b and the bending surface region F may have a structure to extend along the radial direction of the electrode assembly 110. The welding pattern 176h may be a line pattern or a dot array pattern.

The welding pattern 176h corresponds to the welding region. Therefore, the welding pattern 176h preferably overlaps with the overlapping layer number uniform region b1 of the bending surface region F by 50% or more. The welding pattern 176h that does not overlap with the overlapping layer number uniform region b1 may overlap with the overlapping layer number decreasing region b2. The entire welding pattern 176h may overlap with the overlapping layer number uniform region b1 of the bending surface region F. In the bending surface region F above the region where the welding pattern 176h is formed, the number of overlapping layers of segments is preferably 10 or more in the overlapping layer number uniform region b1 and, optionally, the overlapping layer number decreasing region b2.

The diameters of the first current collector 144 and the second current collector 176 described above are different from each other. The diameter is an outer periphery diameter of the contact area between the bending surface region F and the current collector. The diameter is defined as a maximum value among distances between two points where a straight line passing through the center of the core C of the electrode assembly meets the boundary of the contact area. Since the second current collector 176 is located inside the beading portion 180, the diameter of the second current collector 176 is smaller than the diameter of the first current collector 144. Also, the length of the welding pattern 144f of the first current collector 144 is longer than the length of the welding pattern 176h of the second current collector 176. Preferably, the welding pattern 144f and the welding pattern 176h may extend from substantially the same point toward the outer circumference with respect to the center of the core C.

The cylindrical battery 170, 180, 200, 220 according to an embodiment of the present disclosure have an advantage in that electrical connection can be performed at the upper portion thereof.

Figure 28:
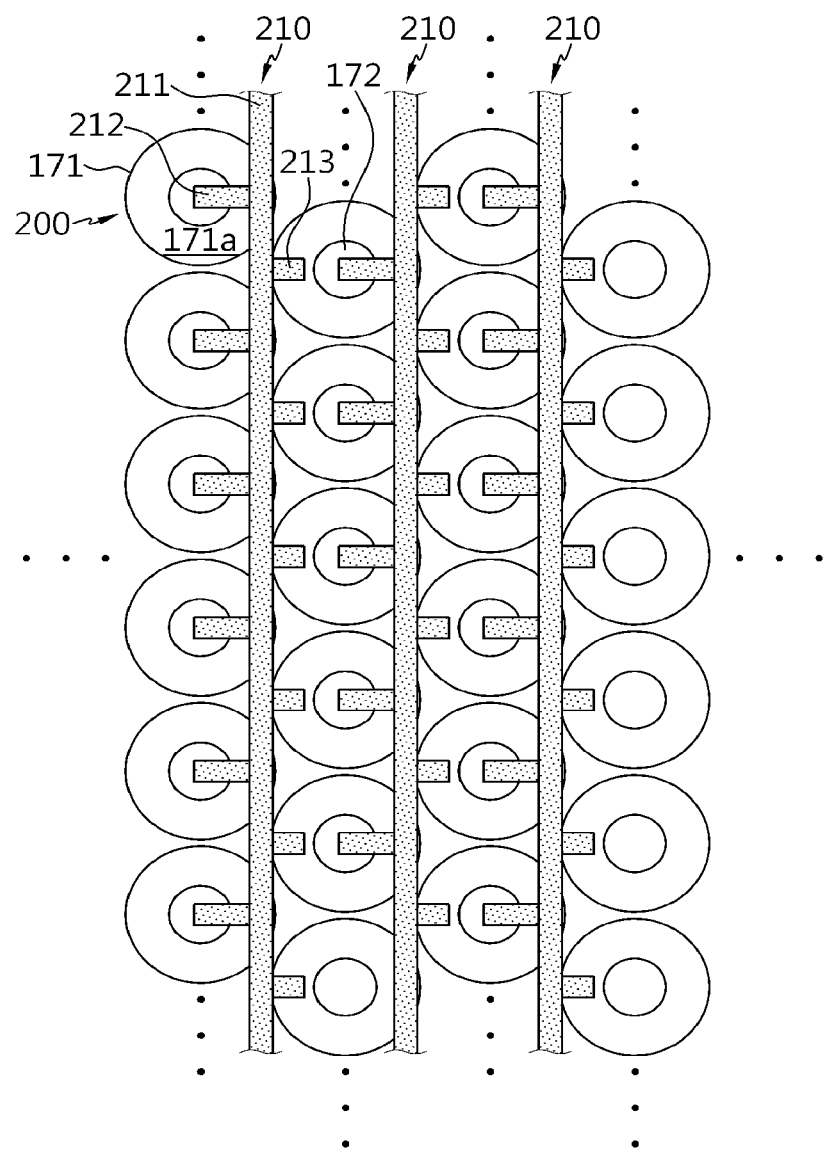
FIG. 28 is a top plan view showing a state in which a plurality of cylindrical batteries are electrically connected.
Figure 29:
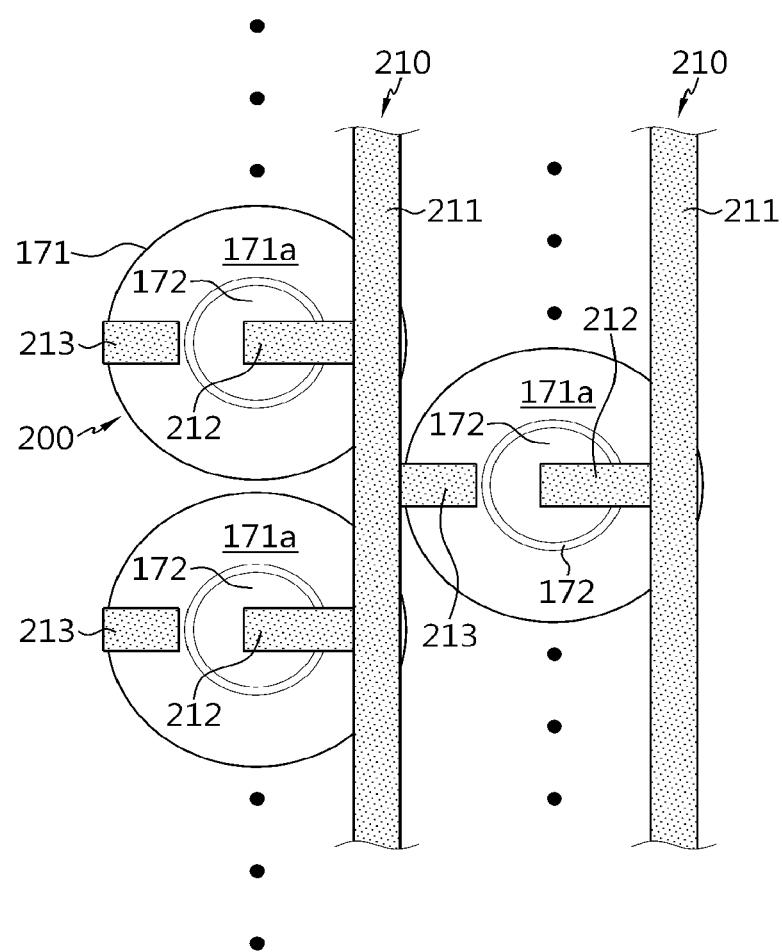
FIG. 29 is a partially enlarged view of FIG. 28.

FIG. 28 is a top plan view illustrating a state in which a plurality of cylindrical batteries are electrically connected, and FIG. 29 is a partially enlarged view of FIG. 28. The cylindrical battery 200 may be replaced with the cylindrical battery 170, 180, 220 having a different structure.

Referring to FIGS. 28 and 29, a plurality of cylindrical batteries 200 may be connected in series and in parallel at an upper portion of the cylindrical batteries 200 using a bus bar 210. The number of cylindrical batteries 200 may be increased or decreased in consideration of the capacity of the battery pack.

In each cylindrical battery 200, the terminal 172 may have a positive polarity, and the flat surface 171a around the terminal 172 of the battery housing 171 may have a negative polarity, or vice versa.

Preferably, the plurality of cylindrical batteries 200 may be arranged in a plurality of columns and rows. Columns are provided in an upper and a lower direction on the drawing, and rows are provided in a left and right direction on the drawing. In addition, in order to maximize space efficiency, the cylindrical batteries 200 may be arranged in a closest packing structure. The closest packing structure is formed when an equilateral triangle is formed by connecting the centers of the terminals 172 exposed out of the battery housing 171 to each other. Preferably, the bus bar 210 connects the cylindrical batteries 200 arranged in the same column in parallel to each other, and connects the cylindrical batteries 200 arranged in two neighboring columns in series with each other.

Preferably, the bus bar 210 may include a body portion 211, a plurality of first bus bar terminals 212 and a plurality of second bus bar terminals 213 for serial and parallel connection.

The body portion 211 may extend along the column of the cylindrical battery 200 between neighboring terminals 172. Alternatively, the body portion 211 may extend along the row of the cylindrical batteries 1, and the body portion 211 may be regularly bent like a zigzag shape.

The plurality of first bus bar terminals 212 may extend from one side of the body portion and may be electrically coupled to the terminal 172 of the cylindrical battery 200 located at one side. The electrical connection between the first bus bar terminal 212 and the terminal 172 may be achieved by laser welding, ultrasonic welding, or the like.

The plurality of second bus bar terminals 213 may extend from the other side of the body portion 211 and may be electrically coupled to the flat surface 171a around the terminal located at the other side. The electrical coupling between the second bus bar terminal 213 and the flat surface 171a may be performed by laser welding, ultrasonic welding, or the like.

Preferably, the body portion 211, the plurality of first bus bar terminals 212 and the plurality of second bus bar terminals 213 may be made of one conductive metal plate. The metal plate may be, for example, an aluminum plate or a copper plate, but the present disclosure is not limited thereto. In a modified example, the body portion 211, the plurality of first bus bar terminals 212 and the second bus bar terminals 213 may be manufactured as separate pieces and then coupled to each other by welding or the like.

The cylindrical battery 200 of the present disclosure as described above has a structure in which resistance is minimized by enlarging the welding area by means of the bending surface region F, multiplexing current paths by means of the second current collector 176, minimizing a current path length, or the like. The AC resistance of the cylindrical battery 200 measured through a resistance meter between the positive electrode and the negative electrode, namely between the terminal 172 and the flat surface 171a around the terminal 172, may be about 4 milliohms or below suitable, but greater than 0 milliohms, such as 0.01 milliohms, for fast charging.

In the cylindrical battery 200 according to the present disclosure, since the terminal 172 having a positive polarity and the flat surface 171a having a negative polarity are located in the same direction, it is easy to electrically connect the cylindrical batteries 200 using the bus bar 210

In addition, since the terminal 172 of the cylindrical battery 200 and the flat surface 171a around the terminal 172 have a large area, the coupling area of the bus bar 210 may be sufficiently secured to sufficiently reduce the resistance of the battery pack including the cylindrical battery 200.

In addition, since electrical wiring can be performed at the upper portion of the cylindrical battery 200, there is an advantage in that the energy density per unit volume of a battery module/pack may be maximized.

The cylindrical battery according to the above embodiments (modifications) may be used to manufacture a battery pack.

Figure 30:
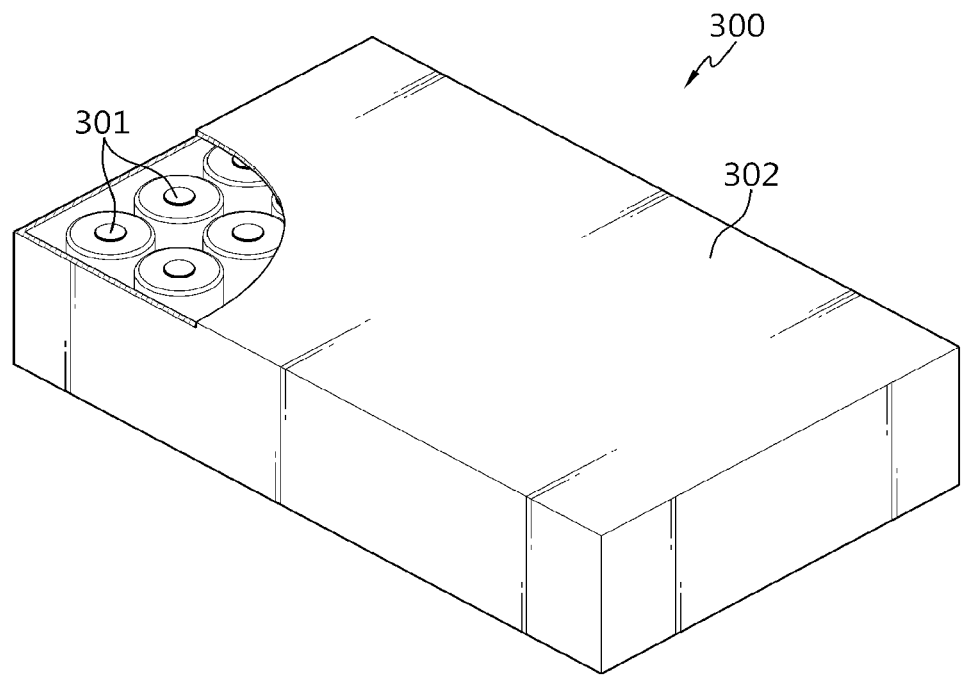
FIG. 30 is a diagram schematically showing a battery pack according to an embodiment of the present disclosure.

FIG. 30 is a diagram schematically showing a battery pack according to an embodiment of the present disclosure.

Referring to FIG. 30, a battery pack 300 according to an embodiment of the present disclosure includes an aggregate in which cylindrical batteries 301 are electrically connected, and a pack housing 302 for accommodating the aggregate. The cylindrical battery 301 may be any one of the batteries according to the above embodiments (modifications). In the drawing, components such as a bus bar, a cooling unit, and an external terminal for electrical connection of the cylindrical batteries 301 are not depicted for convenience of illustration.

The battery pack 300 may be mounted to a vehicle. The vehicle may be, for example, an electric vehicle, a hybrid electric vehicle, or a plug-in hybrid vehicle. The vehicle includes a four-wheeled vehicle or a two-wheeled vehicle.

Figure 31:
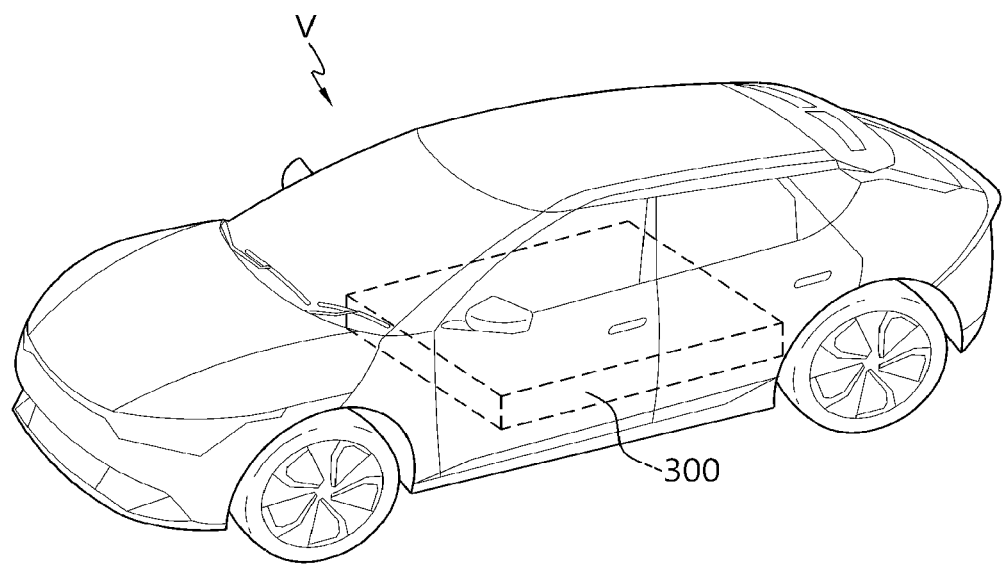
FIG. 31 is a diagram schematically showing a vehicle including the battery pack according to an embodiment of the present disclosure.

FIG. 31 is a diagram schematically showing a vehicle including the battery pack 300 of FIG. 30 according to an embodiment of the present disclosure.

Referring to FIG. 31, a vehicle V according to an embodiment of the present disclosure includes the battery pack 300 according to an embodiment of the present disclosure. The vehicle V operates by receiving power from the battery pack 300 according to an embodiment of the present disclosure.

According to the present disclosure, since the uncoated portions themselves protruding from the upper and lower portions of the electrode assembly are used as electrode tabs, it is possible to reduce the internal resistance of the battery and increase the energy density.

According to another embodiment of the present disclosure, since the structure of the uncoated portion of the electrode assembly is improved so that the electrode assembly does not interfere with the inner circumference of the battery in the process of forming the beading portion of the battery housing, it is possible to prevent a short circuit in the cylindrical battery caused by partial deformation of the electrode assembly.

According to still another embodiment of the present disclosure, since the structure of the uncoated portion of the electrode assembly is improved, it is possible to prevent the uncoated portion from being torn when the uncoated portion is bent, and the number of overlapping layers of the uncoated portions is sufficiently increased to improve welding strength of the current collector.

According to still another embodiment of the present disclosure, it is possible to improve physical properties of a region where the current collector is welded, by applying a segment structure to the uncoated portion of the electrode and optimizing the dimensions (width, height, separation pitch) of the segments to sufficiently increase the number of overlapping layers of the segments in an area used as a welding target region.

According to still another embodiment of the present disclosure, it is possible to provide an electrode assembly with improved energy density and reduced resistance by applying a structure in which a current collector is welded over a large area to a bending surface region formed by bending the segments.

According to still another embodiment of the present disclosure, it is possible to provide a cylindrical battery including an improved design so as to perform electrical wiring at an upper portion thereof.

According to still another embodiment of the present disclosure, since the structure of the uncoated portion adjacent to the core of the electrode assembly is improved, it is possible to prevent the cavity in the core of the electrode assembly from being blocked when the uncoated portion is bent. Thus, the electrolyte injection process and the process of welding the battery housing (or, the terminal) with the current collector may be carried out easily.

According to still another embodiment of the present disclosure, it is possible to provide a cylindrical battery having a structure that has a low internal resistance, prevents internal short circuit and improves welding strength between the current collector and the uncoated portion, and a battery pack and a vehicle including the cylindrical battery.

In particular, the present disclosure may provide a cylindrical battery having a diameter to a height ratio of 0.4 or more and a resistance of 4 milliohms or less, and a battery pack and a vehicle including the same.

The present disclosure has been described in detail. However, it should be understood that the detailed description and specific examples, while indicating embodiments of the disclosure, are given by way of illustration only, since various changes and modifications within the scope of the disclosure will become apparent to those skilled in the art from this detailed description.

What is claimed is:

1. An electrode assembly comprising:
   a first electrode;
   a second electrode; and
   a separator between the first electrode and the second electrode, the first electrode, the second electrode, and the separator wound about an axis defining a core and an outer circumference of the electrode assembly,
   wherein the first electrode has a pair of first sides and a pair of second sides extending between the pair of first sides, a first portion extending between the pair of first sides, and a second portion extending between the pair of first sides,
   wherein the first portion is coated with an active material along a winding direction, and at least a part of the second portion includes an electrode tab,
   wherein the second portion includes a first part including an innermost winding turn adjacent to the core of the electrode assembly, a second part including an outermost winding turn adjacent to the outer circumference of the electrode assembly, and a third part between the first part and the second part, wherein the second portion extends at least a minimum height along an entire length thereof between the pair of first sides, wherein the first part or the second part has a smaller height than the third part in a direction of the axis and the first part does not include a segment that is independently bendable, and wherein the third part is bent along a radial direction to define a bending surface region, and the first part or the second part has a smaller height than the bending surface region.

2. The electrode assembly according to claim 1, wherein the third part is bent along a radial direction of the electrode assembly to define the electrode tab, or wherein the second part and the third part are bent along the radial direction of the electrode assembly to define the electrode tab.

3. The electrode assembly according to claim 1, wherein at least a partial region of the third part is divided into a plurality of segments that are independently bendable and each of the plurality of segments has a geometric shape in which one or more straight lines, one or more curves, or a combination thereof are connected.

4. The electrode assembly according to claim 3, wherein the geometric shape of each of the plurality of segments has a lower internal angle that increases individually or in groups in one direction parallel to the winding direction.

5. The electrode assembly according to claim 3, wherein each of the plurality of segments has a geometric shape with a width that gradually decreases from a lower portion to an upper portion, and a lower internal angle ($\theta$) of the geometric shape of a segment located in a winding turn having a radius r falls within an angle range of the following formula:

$$\cos^{-1}\left(\frac{0.5*D}{r}\right) \leq \theta \leq \tan^{-1}\left(\frac{2*H*\tan\theta_{refer}}{2*H - p*\tan\theta_{refer}}\right)$$

wherein D is a width of the segment in the winding direction, r is a radius of the winding turn including the segment, H is a height of the segment, and p is a separation pitch of the segment.

6. The electrode assembly according to claim 3, wherein the plurality of segments have a cut groove between segments adjacent to each other along the winding direction, and a lower portion of the cut groove includes a bottom portion and a round portion connecting both ends of the bottom portion to sides of the segments adjacent to each other.

7. The electrode assembly according to claim 6, wherein the bottom portion of the cut groove is flat.

8. The electrode assembly according to claim 6, wherein the bottom portion of the cut groove is spaced apart from the first portion by a predetermined distance.

9. The electrode assembly according to claim 6, wherein an insulating coating layer covers a boundary between the first portion and a region of the second portion provided in a section where the bottom portion of the cut groove and the first portion are separated, and wherein the second electrode includes a third portion coated with an active material along the winding direction, and an end of the third portion is located at a height between an upper end and a lower end of the insulating coating layer in the direction of the axis.

10. The electrode assembly according to claim 3, wherein in each of the plurality of segments, a width of the segment in the winding direction D(r) satisfies the following formula:

$1 \leq D(r) \leq (2*\pi*r/360°)*45°$, wherein r is a radius of a winding turn including the segment based on a core center of the electrode assembly.

11. The electrode assembly according to claim 10, wherein in each of the plurality of segments, as the radius r of the winding turn where the segment is located based on the core center of the electrode assembly increases, the width D(r) in the winding direction increases or decreases gradually or stepwise.

12. The electrode assembly according to claim 3, wherein the core of the electrode assembly is not covered by a bent portion of the plurality of the segment by at least 90% or more of a diameter thereof.

13. The electrode assembly according to claim 3, wherein the electrode assembly includes a segment skip region having no segment, a height variable region where segments have variable heights, and a height uniform region where segments have a substantially uniform height in order along a radial direction, based on a cross section along the direction of the axis, and the plurality of segments are disposed in the height variable region and the height uniform region and bent along the radial direction of the electrode assembly forming a bending surface region.

14. The electrode assembly according to claim 3, wherein widths of the plurality of segments in the winding direction or heights thereof in the direction of the axis, or both increase gradually or stepwise along one direction parallel to the winding direction.

15. The electrode assembly according to claim 3, wherein the plurality of segments form a plurality of segment groups along one direction parallel to the winding direction of the electrode assembly, and segments belonging to the same segment group are substantially the same as each other in terms of a width in the winding direction and a height in the direction of the axis.

16. The electrode assembly according to claim 3, wherein widths of the segments belonging to the same segment group in the winding direction or heights thereof in the direction of the axis, or both increase stepwise along one direction parallel to the winding direction of the electrode assembly.

17. The electrode assembly according to claim 3, wherein the electrode assembly includes a bending surface region formed by bending the plurality of segments along a radial direction of the electrode assembly, and wherein, when the number of segments meeting a virtual line parallel to the direction of the axis at any radial location of the bending surface region based on a core center of the electrode assembly is defined as the number of overlapping layers of segments at the corresponding radial location, the bending surface region includes an overlapping layer number uniform region in which the number of overlapping layers of segments is substantially uniform from the core toward the outer circumference and an overlapping layer number decreasing region located adjacent to the overlapping layer number uniform region and the number of overlapping layers of segments in the overlapping layer number decreasing region gradually decreases toward the outer circumference, and wherein, in the overlapping layer number uniform region, the number of overlapping layers of the segments is 10 to 35.

18. The electrode assembly according to claim 3,
wherein the electrode assembly includes a bending surface region formed by bending the plurality of segments along a radial direction of the electrode assembly, and wherein, when the number of segments meeting a virtual line parallel to the direction of the axis at any radial location of the bending surface region based on a core center of the electrode assembly is defined as the number of overlapping layers of segments at the corresponding radial location, the bending surface region includes an overlapping layer number uniform region in which the number of overlapping layers of segments is substantially uniform from the core toward the outer circumference and an overlapping layer number decreasing region located adjacent to the overlapping layer number uniform region and the number of overlapping layers of segments in the overlapping layer number decreasing region gradually decreases toward the outer circumference, wherein a ratio of a radial length of the overlapping layer number uniform region to a radial length of the overlapping layer number uniform region and the overlapping layer number decreasing region is 30% to 85%, and wherein the first electrode is a positive electrode, and in the overlapping layer number uniform region, an overlapping thickness of segments is between 100 μm and 875 μm, or wherein the first electrode is a negative electrode, and in the overlapping layer number uniform region, an overlapping thickness of segments is between 50 μm and 700 μm.

19. The electrode assembly according to claim 18, further comprising:
a current collector welded to the bending surface region,
wherein, in the radial direction of the electrode assembly, a welding region of the current collector overlaps with the overlapping layer number uniform region by at least 50%, and
wherein a welding strength of the current collector to the welding region is at least 2 kgf/cm2 or more.

20. The electrode assembly according to claim 1,
wherein the third part is divided into a plurality of regions having different heights along one direction parallel to the winding direction, and the height of the third part in the plurality of regions increases gradually or stepwise along one direction parallel to the winding direction.

21. The electrode assembly according to claim 1,
wherein the third part includes a plurality of segment skip regions along the one direction parallel to the winding direction,
wherein the plurality of segment skip regions have widths gradually increasing or decreasing along the one direction parallel to the winding direction, and
wherein the plurality of segments are located in at least two sectoral regions or polygonal regions disposed in a circumferential direction based on a core center of the electrode assembly.

22. A battery, comprising:
an electrode assembly including a first electrode, a second electrode, and a separator between the first electrode and the second electrode, the first electrode, the second electrode, and the separator wound about an axis defining a core and an outer circumference,
wherein the first electrode has a pair of first sides and a pair of second sides extending between the pair of first sides, a first portion extending between the pair of first sides, and a second portion extending between the pair of first sides,
wherein the first portion is coated with an active material along a winding direction, at least a part of the second portion includes an electrode tab, the second portion includes a first part including an innermost winding turn adjacent to the core of the electrode assembly, a second part including an outermost winding turn adjacent to the outer circumference of the electrode assembly, and a third part between the first part and the second part, the first part or the second part has a smaller height than the third part in the direction of the axis, and the first part the first part does not include a segment that is independently bendable,
wherein the second portion extends at least a minimum height along an entire length thereof between the pair of first sides, and
wherein the third part is bent along a radial direction to define a bending surface region, and the first part or the second part has a smaller height than the bending surface region;
a battery housing including a first end with a first opening and a second end opposite thereto, wherein the electrode assembly is accommodated in a space between the first end and the second end, and the battery housing is electrically connected to one of the first electrode or the second electrode to have a first polarity;
a sealing body sealing the first opening at the first end of the battery housing; and
a terminal electrically connected to the other of the first electrode or the second electrode to have a second polarity and having a surface exposed outside the battery housing.

23. The battery according to claim 22,
wherein the second part has a smaller height than the third part in the direction of the axis,
wherein the battery housing includes a beading portion press-fitted inward at a region adjacent to the first opening at the first end, and
wherein a press-in depth D1 of the beading portion and a distance D2 from an inner circumference of the battery housing to a boundary between the second part and the third part satisfy a formula D1<D2.

24. The battery according to claim 22, further comprising:
a first current collector electrically connected to the second portion,
wherein the terminal is a rivet terminal installed in a hole formed in the second end of the battery housing to be insulated therefrom and electrically connected to the first current collector to have the second polarity.

25. The battery according to claim 24, further comprising:
an insulator between an inner surface of the bottom portion of the battery housing and an upper surface of the first current collector to electrically insulate the inner surface of the bottom portion of the battery housing and the first current collector,
wherein the insulator has a thickness corresponding to a distance between the inner surface of the bottom portion of the battery housing and the upper surface of the first current collector and is in contact with the inner surface of the bottom portion of the battery housing and the upper surface of the first current collector.

26. The battery according to claim 25,
wherein the terminal includes a flat portion at a lower end thereof,
wherein the insulator has an opening for exposing the flat portion, and
wherein the flat portion is welded to the first current collector through the opening.

27. The battery according to claim 22,
wherein the second electrode has a pair of third sides and a pair of fourth sides extending between the pair of third sides, a third portion extending between the pair of third sides, and a fourth portion extending between the pair of third sides,
wherein the third portion is coated with an active material along the winding direction,
wherein the second electrode has the first polarity, and at least a part of the fourth portion includes an electrode tab, and
wherein the battery further includes a second current collector electrically connected to the fourth portion and having an edge at least partially coupled to a sidewall of the battery housing.

28. The battery according to claim 27,
wherein the battery housing includes a beading portion press-fitted inward at an inner wall adjacent to the first opening at the first end, and the edge of the second current collector is electrically connected to the beading portion.

29. The battery according to claim 28,
wherein the battery includes a cap having an edge supported by the beading portion and having no polarity, a gasket between the edge of the cap and the first opening at the first end of the battery housing, and a crimping portion bent and extended into the first opening of the battery housing and surrounding and fixing the edge of the cap together with the gasket, and
wherein the edge of the second current collector is fixed between the beading portion and the gasket by the crimping portion.

30. A method of producing a battery, the method comprising:
forming an electrode assembly having a first electrode, a second electrode and a separator between the first electrode and the second electrode,
wherein the first electrode, the second electrode, and the separator are wound about an axis defining a core and a circumferential surface of the electrode assembly,
wherein the first electrode has a pair of first sides and a pair of second sides extending between the pair of first sides, a first portion extending between the pair of first sides, and a second portion extending between the pair of first sides,
wherein the first portion is coated with an active material along a winding direction,
wherein at least a part of the second portion includes an electrode tab,
wherein the second portion includes a first part including an innermost winding turn adjacent to the core of the electrode assembly, a second part including an outermost winding turn adjacent to the outer circumference of the electrode assembly, and a third part between the first part and the second part, the first part or the second part has a smaller height than the third part in the direction of the axis, and the first part the first part does not include a segment that is independently bendable,
wherein the second portion extends at least a minimum height along an entire length thereof between the pair of first sides, and
wherein the third part is bent along a radial direction to define a bending surface region, and the first part or the second part has a smaller height than the bending surface region;
forming a battery housing having a first end with a first opening and a second end opposite the first end, the battery housing accommodating the electrode assembly in a space between the first end and the second end and electrically connected to one of the first electrode or the second electrode to have a first polarity;
forming a sealing body sealing the first opening at the first end of the battery housing; and
forming a terminal electrically connected to the other of the first electrode or the second electrode to have a second polarity and having a surface exposed outside the battery housing.

* * * * *